US012468706B2

(12) United States Patent
Bove et al.

(10) Patent No.: US 12,468,706 B2
(45) Date of Patent: Nov. 11, 2025

(54) QUERY EXECUTION IN DATABASE SYSTEMS BASED ON DISJUNCTION PROBABILITY

(71) Applicant: Ocient Holdings LLC, Chicago, IL (US)

(72) Inventors: Samuel Peter Bove, Chicago, IL (US); Ellis Mihalko Saupe, University City, MO (US); George Kondiles, Chicago, IL (US); Ryan Joseph Kluzinski, Vancouver (CA); Susmita Saha, Chicago, IL (US); Sarah Kate Schieferstein, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/901,356

(22) Filed: Sep. 30, 2024

(65) Prior Publication Data

US 2025/0021563 A1    Jan. 16, 2025

Related U.S. Application Data

(63) Continuation of application No. 18/494,230, filed on Oct. 25, 2023, now Pat. No. 12,130,817.

(Continued)

(51) Int. Cl.
*G06F 16/20* (2019.01)
*G06F 16/2455* (2019.01)
*G06F 16/28* (2019.01)

(52) U.S. Cl.
CPC ...... *G06F 16/24553* (2019.01); *G06F 16/288* (2019.01)

(58) Field of Classification Search
CPC . G06F 16/24553; G06F 16/248; G06F 16/288
See application file for complete search history.

(56) References Cited

U.S. PATENT DOCUMENTS

| 5,548,770 A | 8/1996 | Bridges |
| 6,230,200 B1 | 5/2001 | Forecast |

(Continued)

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

(Continued)

*Primary Examiner* — Diedra McQuitery
(74) *Attorney, Agent, or Firm* — Garlick & Markison; Patricia M. Healy

(57) ABSTRACT

A database system operates by: determining a query for execution against a dataset that indicates a filtering predicate denoting a disjunction between a first range-based predicate and a second range-based predicate; accessing distribution data for the dataset indicating a plurality of kernels for a plurality of points in a multi-dimensional space; identifying a first sub-region within the multi-dimensional space corresponding to the first range-based predicate; identifying a second sub-region within the multi-dimensional space corresponding to the second range-based predicate; computing a disjunction probability approximation value based on an average portion summation value across a plurality of portion summation values generated for the plurality of kernels; and executing the query based on the disjunction probability approximation value.

20 Claims, 76 Drawing Sheets

Related U.S. Application Data

(60) Provisional application No. 63/381,218, filed on Oct. 27, 2022.

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 11,027,743 | B1* | 6/2021 | Dutordoir ............ G05B 13/028 |
| 2001/0051949 | A1 | 12/2001 | Carey |
| 2002/0032676 | A1 | 3/2002 | Reiner |
| 2004/0162853 | A1 | 8/2004 | Brodersen |
| 2008/0013784 | A1* | 1/2008 | Takeshima ........... G06V 10/267 |
| | | | 382/260 |
| 2008/0133456 | A1 | 6/2008 | Richards |
| 2009/0063397 | A1* | 3/2009 | Beavin .............. G06F 16/24537 |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2014/0280161 | A1* | 9/2014 | Riggs ................. G06F 16/9554 |
| | | | 707/756 |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |

OTHER PUBLICATIONS

Amazon DynamoDB: ten things you really should know, Nov. 13, 2015, Chandan Patra, http://cloudacademy. .com/blog/amazon-dynamodb-ten-thing.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 network conn. = network connection computing device 18 computing device 18 node 37 node 37 node 37

FIG. 20 query processing system 2510 query execution module 2504 database system 10 database system 10 query execution module 2504 database system 10 join process 2530 join process 2530 database system 10

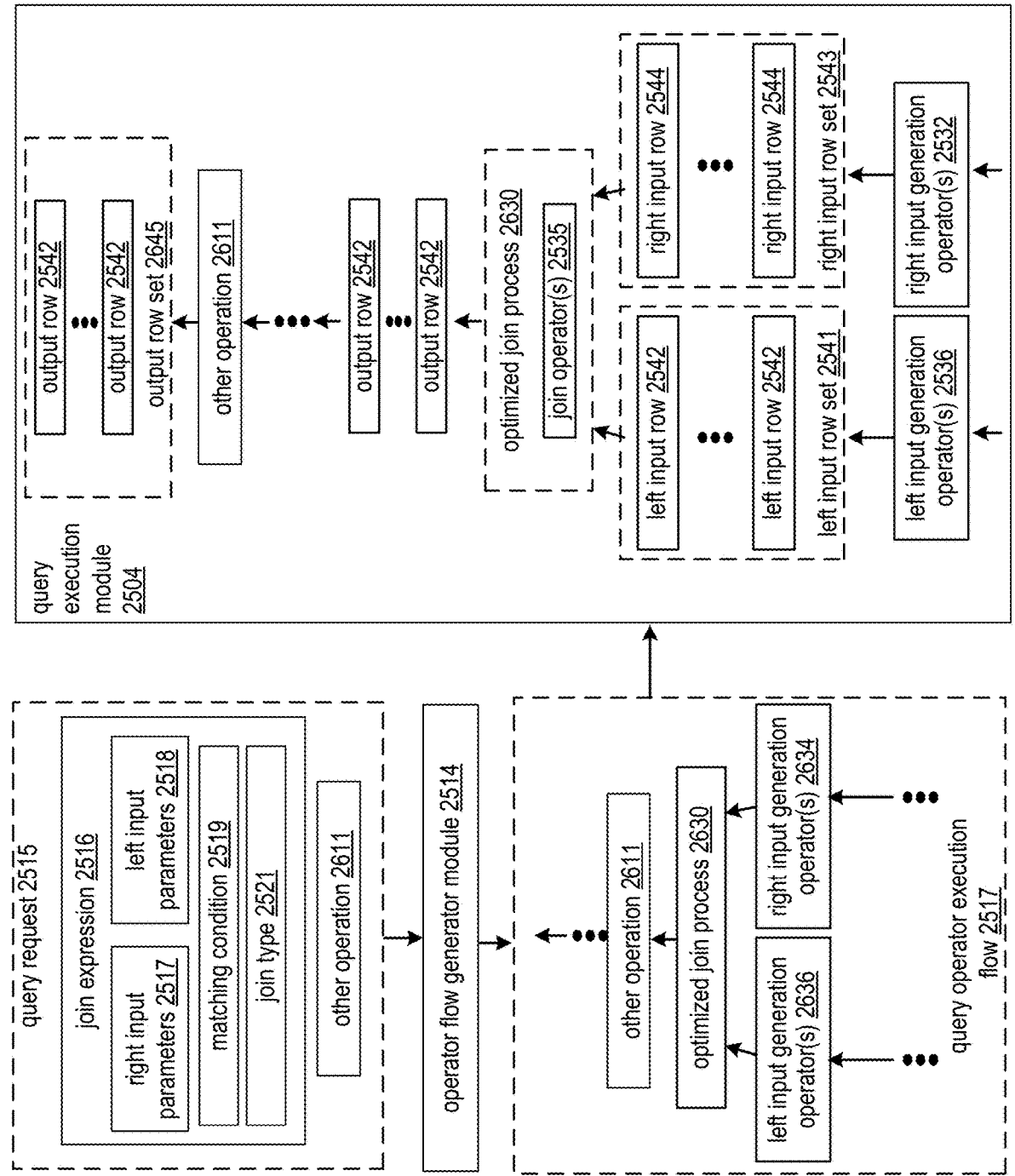
FIG. 27A database system 10 database system 10 query execution module 2504 query execution module 2504 database system 10 database system 10

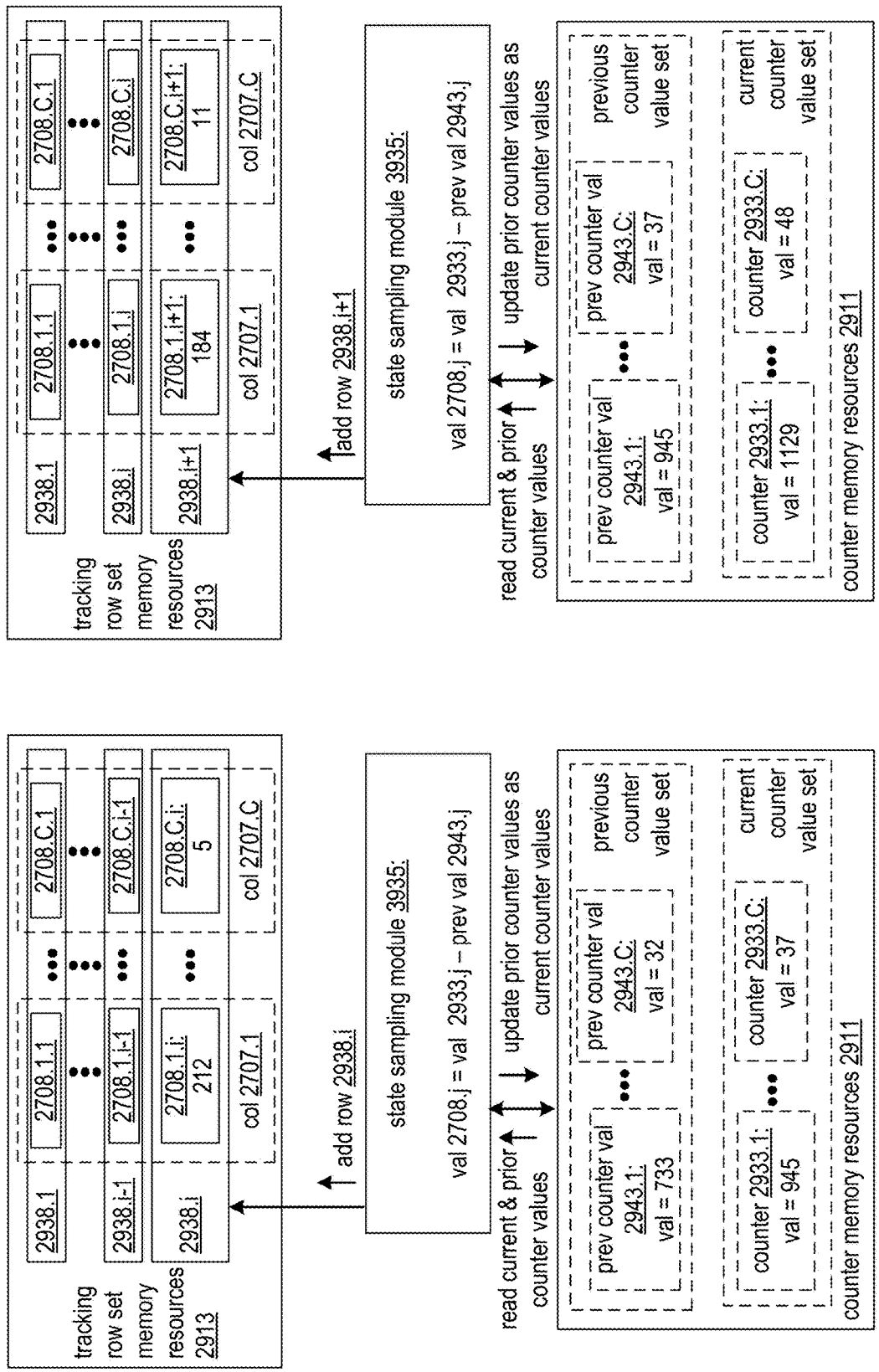

database system 10 database system 10 database system 10

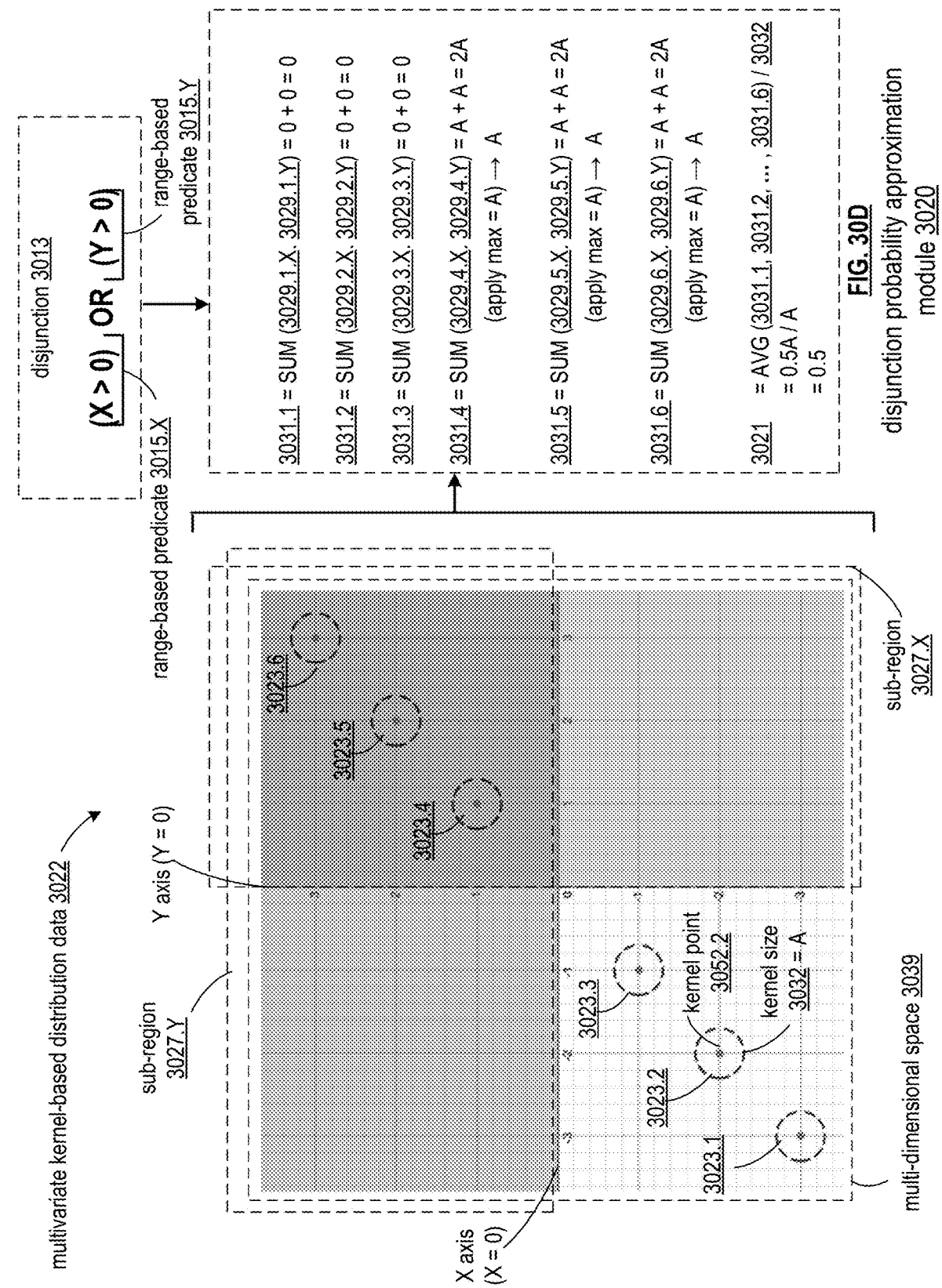

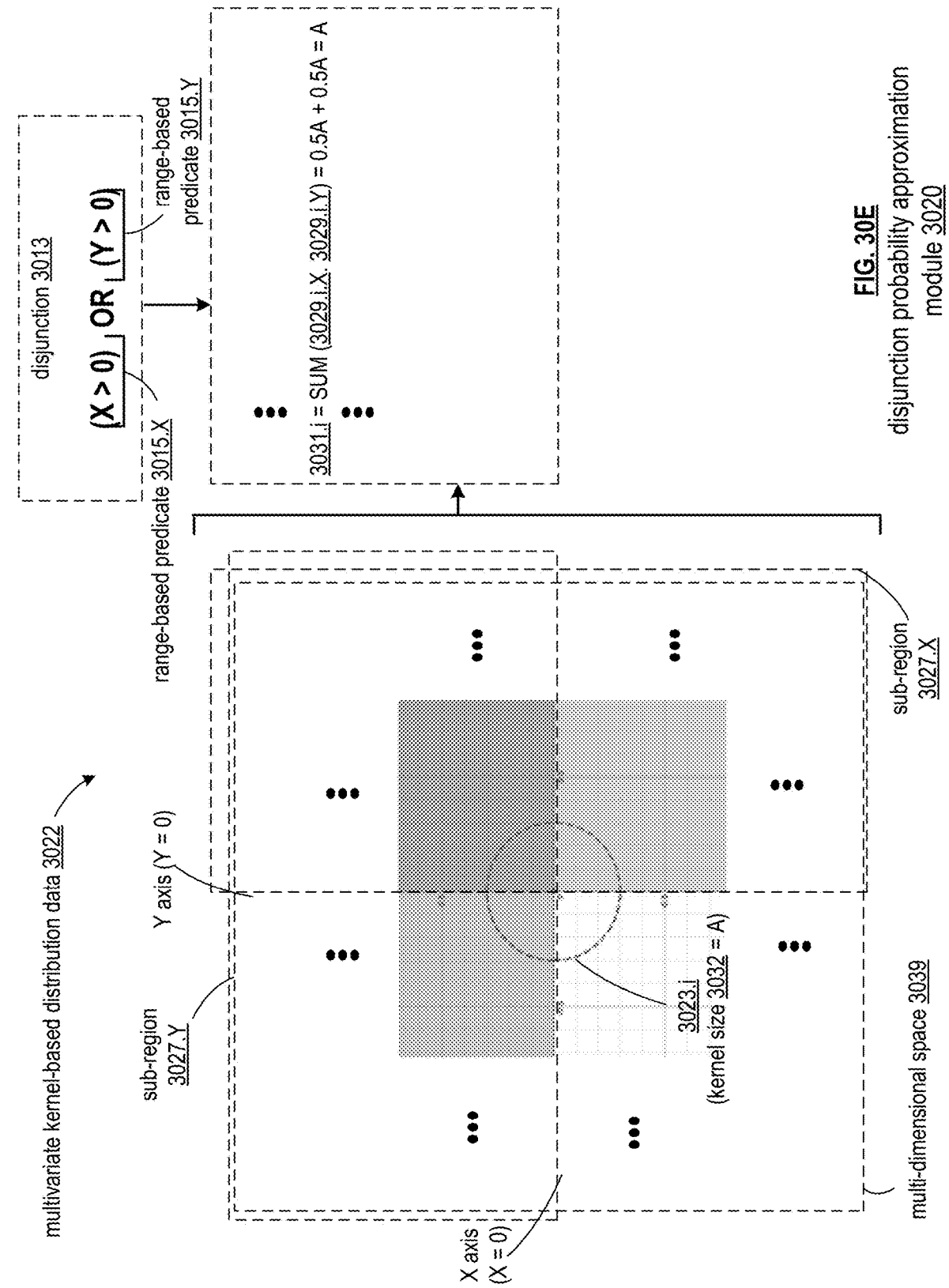

database system 10

QUERY EXECUTION IN DATABASE SYSTEMS BASED ON DISJUNCTION PROBABILITY

CROSS-REFERENCE TO RELATED APPLICATIONS

The present U.S. Utility Patent Application claims priority pursuant to 35 U.S.C. § 120 as a continuation of U.S. Utility application Ser. No. 18/494,230, entitled "GENERATING EXECUTION TRACKING ROWS DURING QUERY EXECUTION VIA A DATABASE SYSTEM", filed Oct. 25, 2023, which claims priority pursuant to 35 U.S.C. § 119(e) to U.S. Provisional Application No. 63/381,218, entitled "OPTIMIZING AND TRACKING QUERY EXECUTION EFFICIENCY IN DATABASE SYSTEMS", filed Oct. 27, 2022, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 27A is a schematic block diagram of a database system executing an optimized join process based on a join expression of a query request in accordance with various embodiments;

FIG. 27I is a logic diagram illustrating a method for execution in accordance with various embodiments;

FIGS. 29D and 29E are schematic block diagrams of an operator execution module that performs two consecutive sampling processes to generate two corresponding rows of a tracking row set in accordance with various embodiments;

FIG. 30D illustrates example computing of a disjunction probability approximation value for an example disjunction based on example multivariate kernel-based distribution data in accordance with various embodiments;

FIG. 30E illustrates example computing of a kernel portion for an example kernel intersecting bounds for subregions of an example disjunction a in accordance with various embodiments;

DETAILED DESCRIPTION OF THE INVENTION

Figure 1:
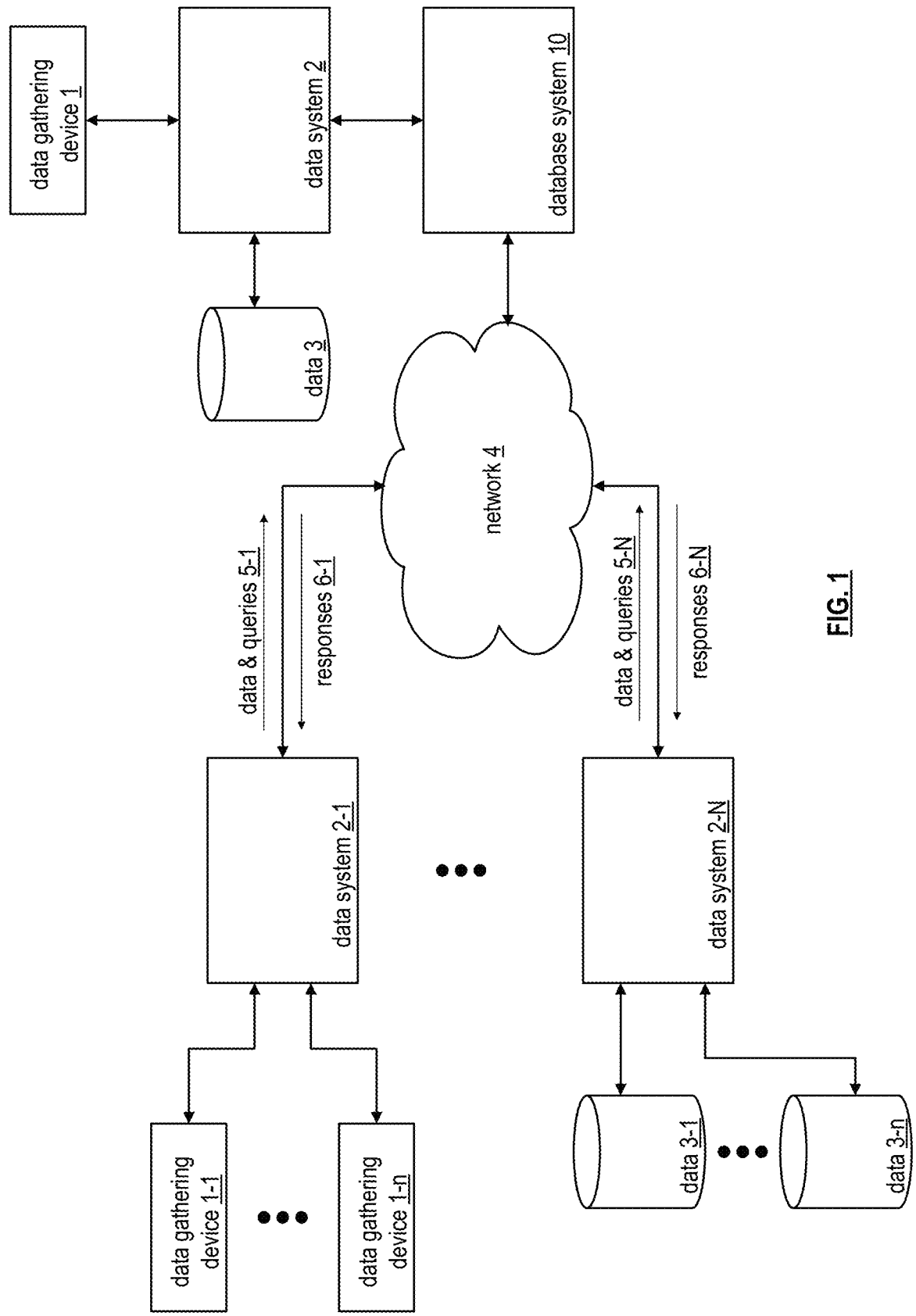
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
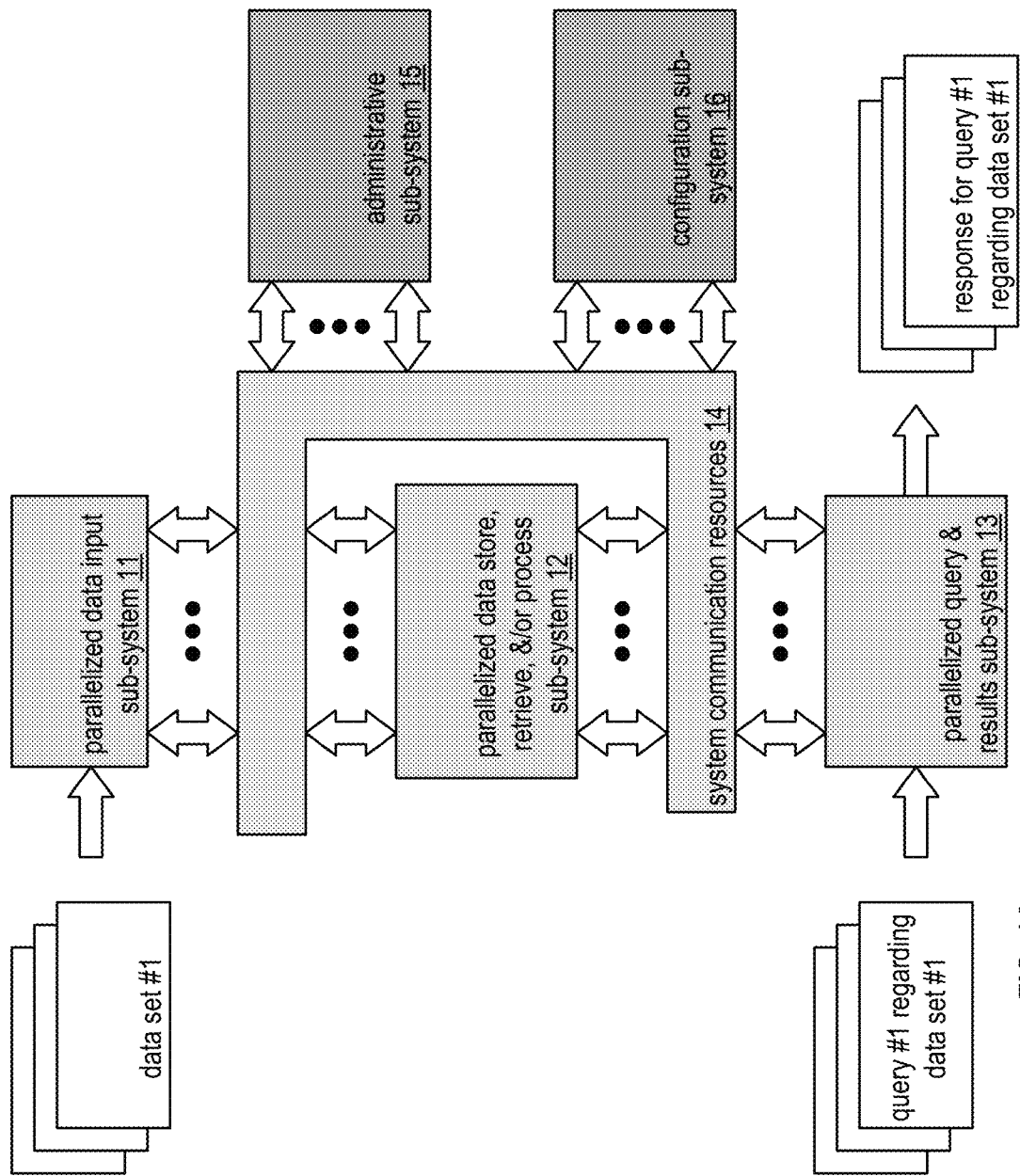
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input subsystem 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
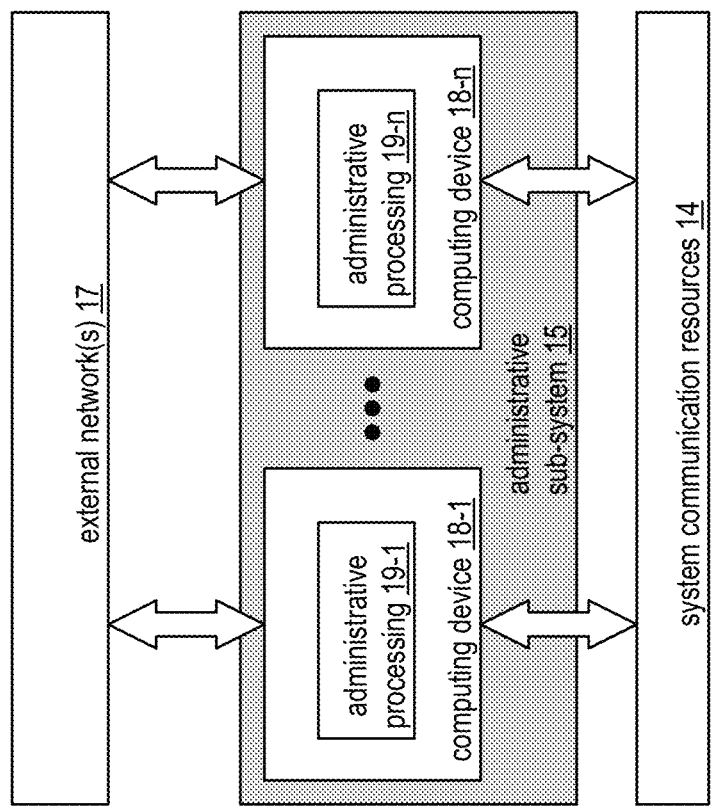
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-*n*. Each of the computing devices executes an administrative processing function utilizing a corresponding administrative processing of administrative processing 19-1 through 19-*n* (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
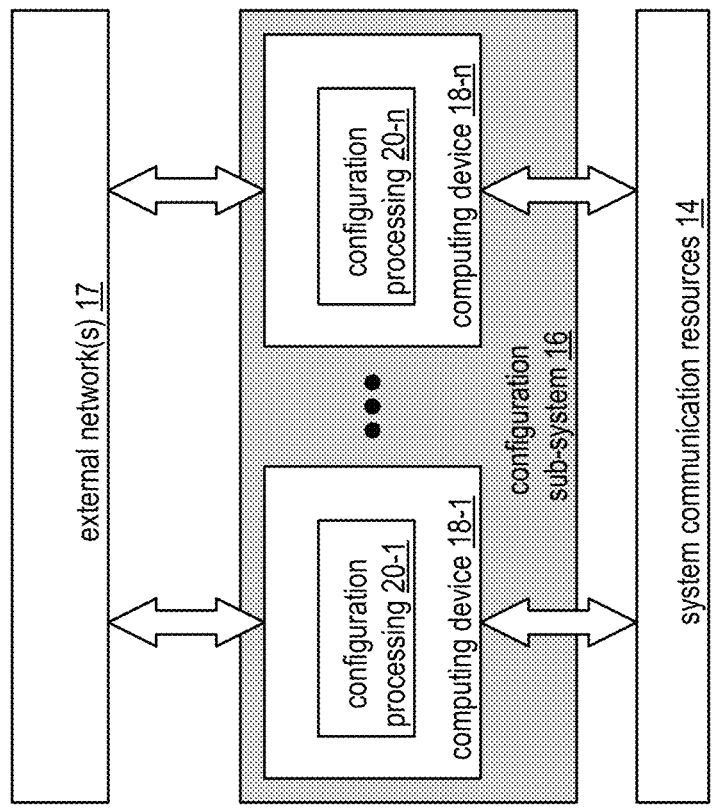
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
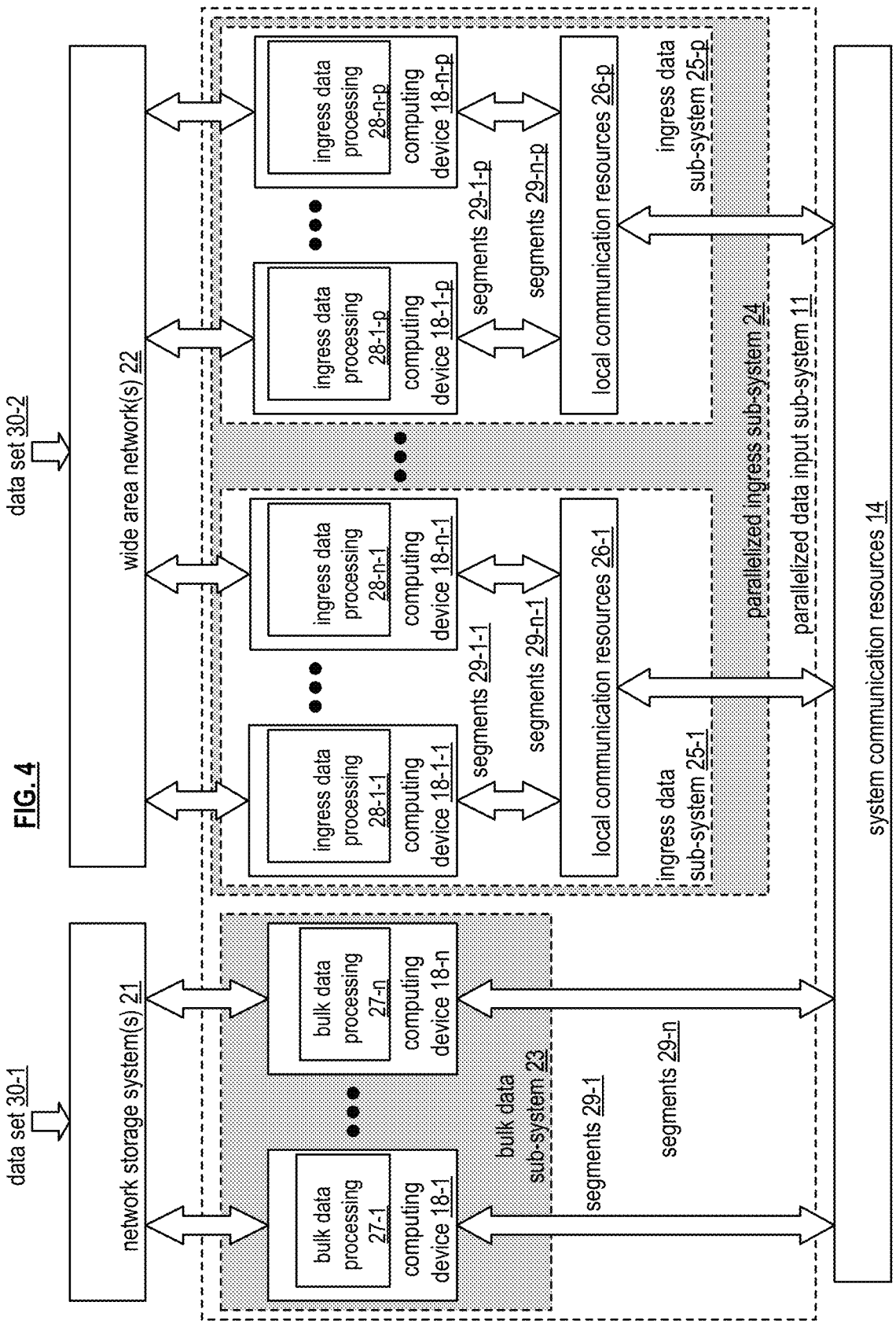
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
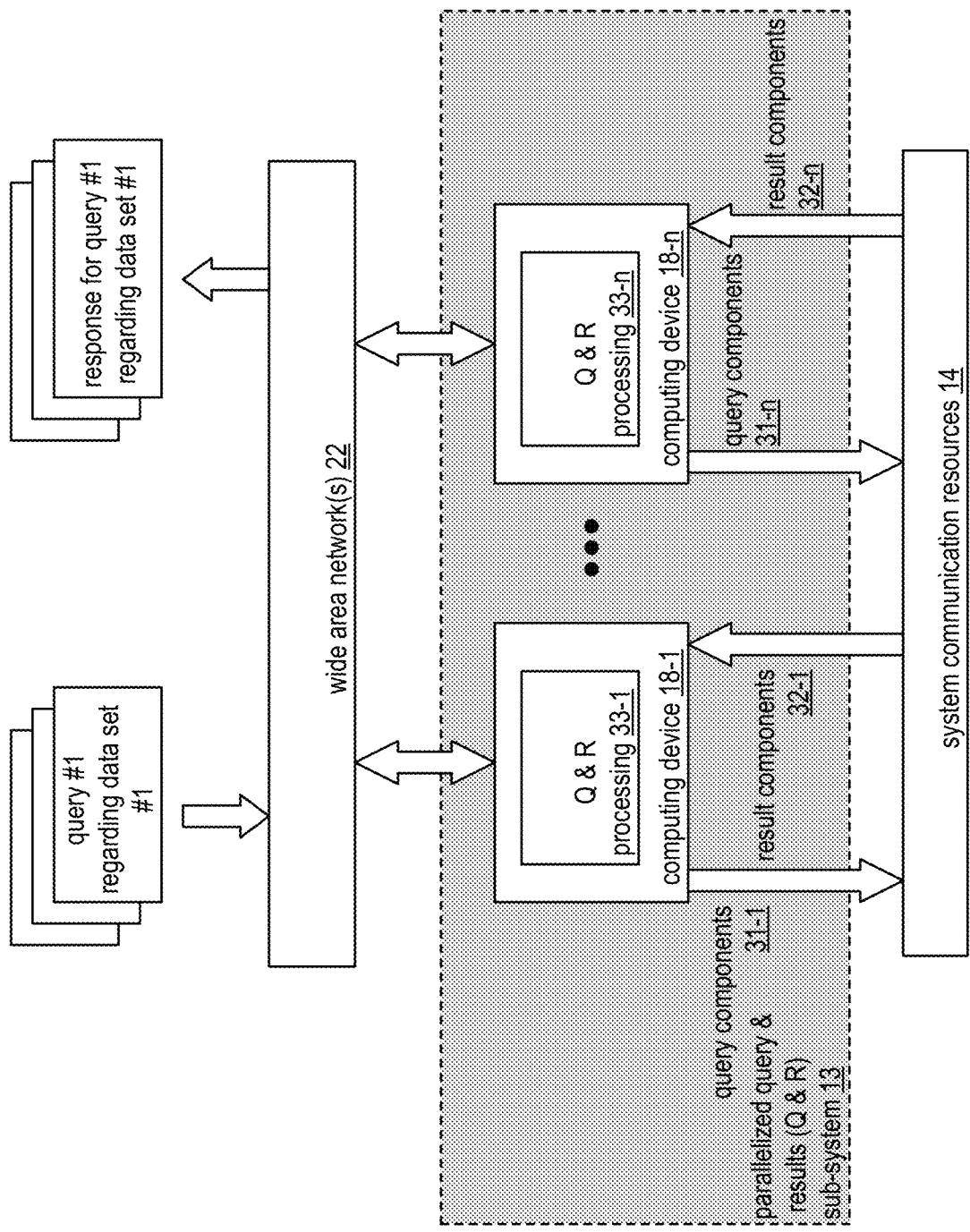
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
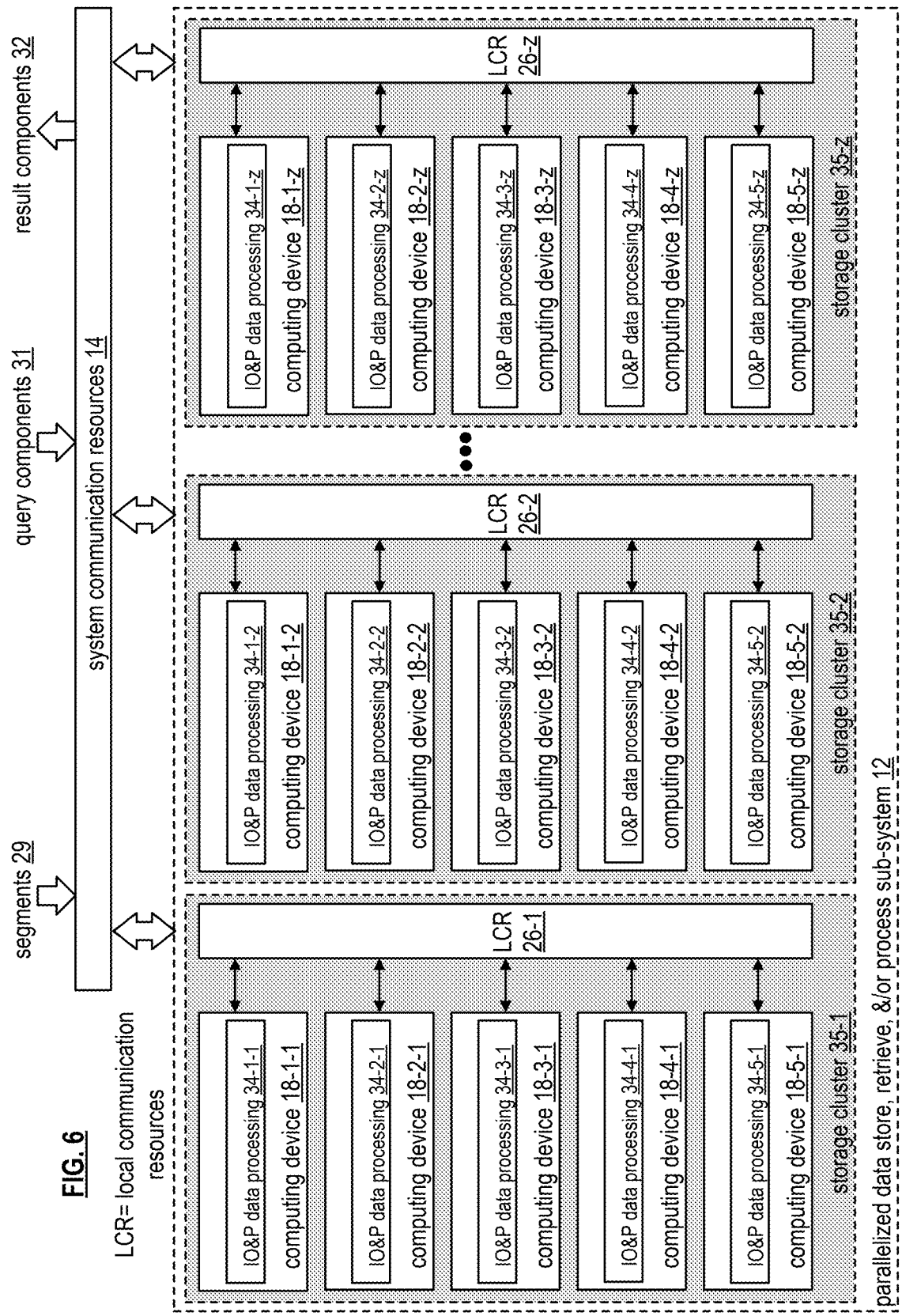
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-$n$ are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
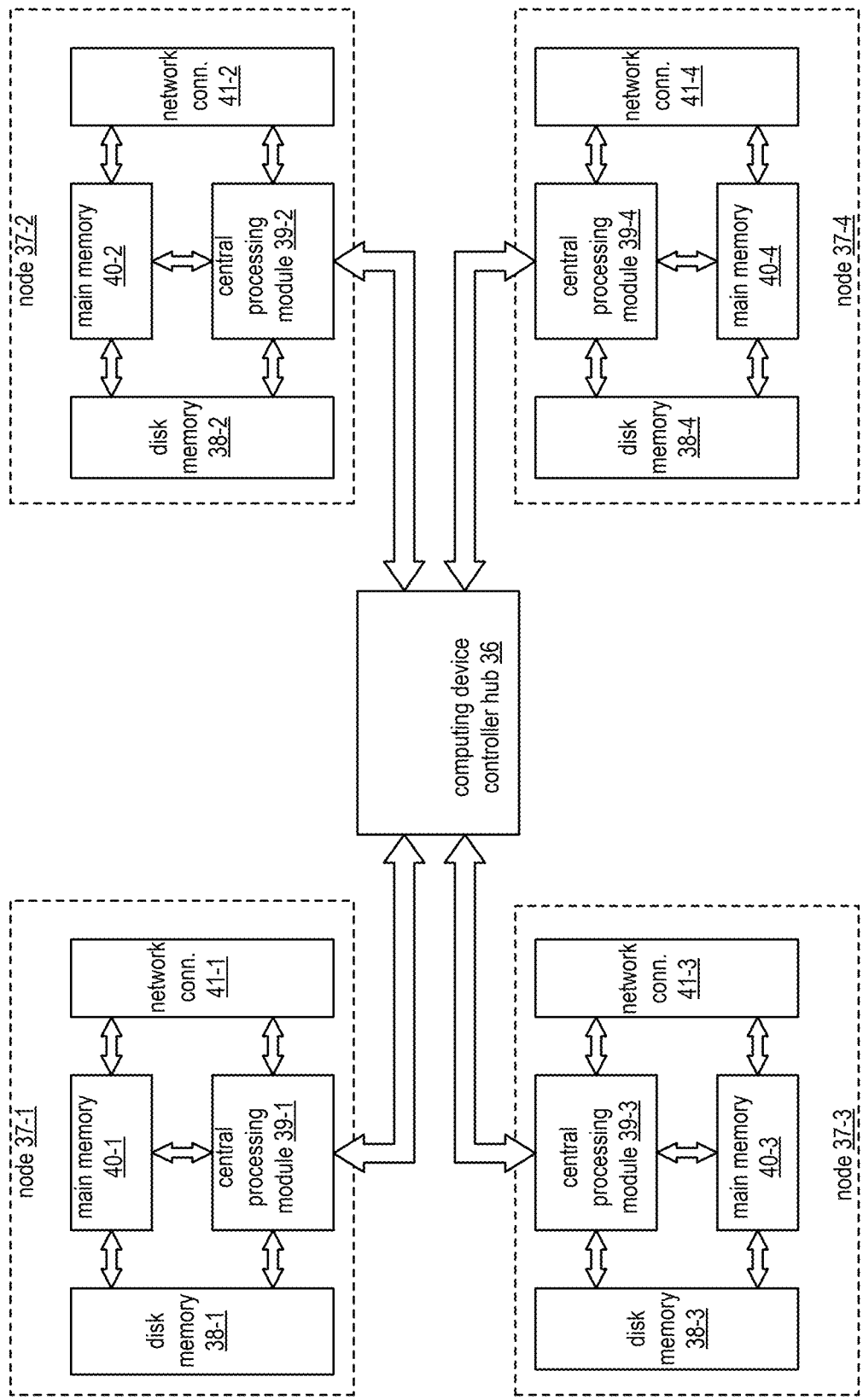
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
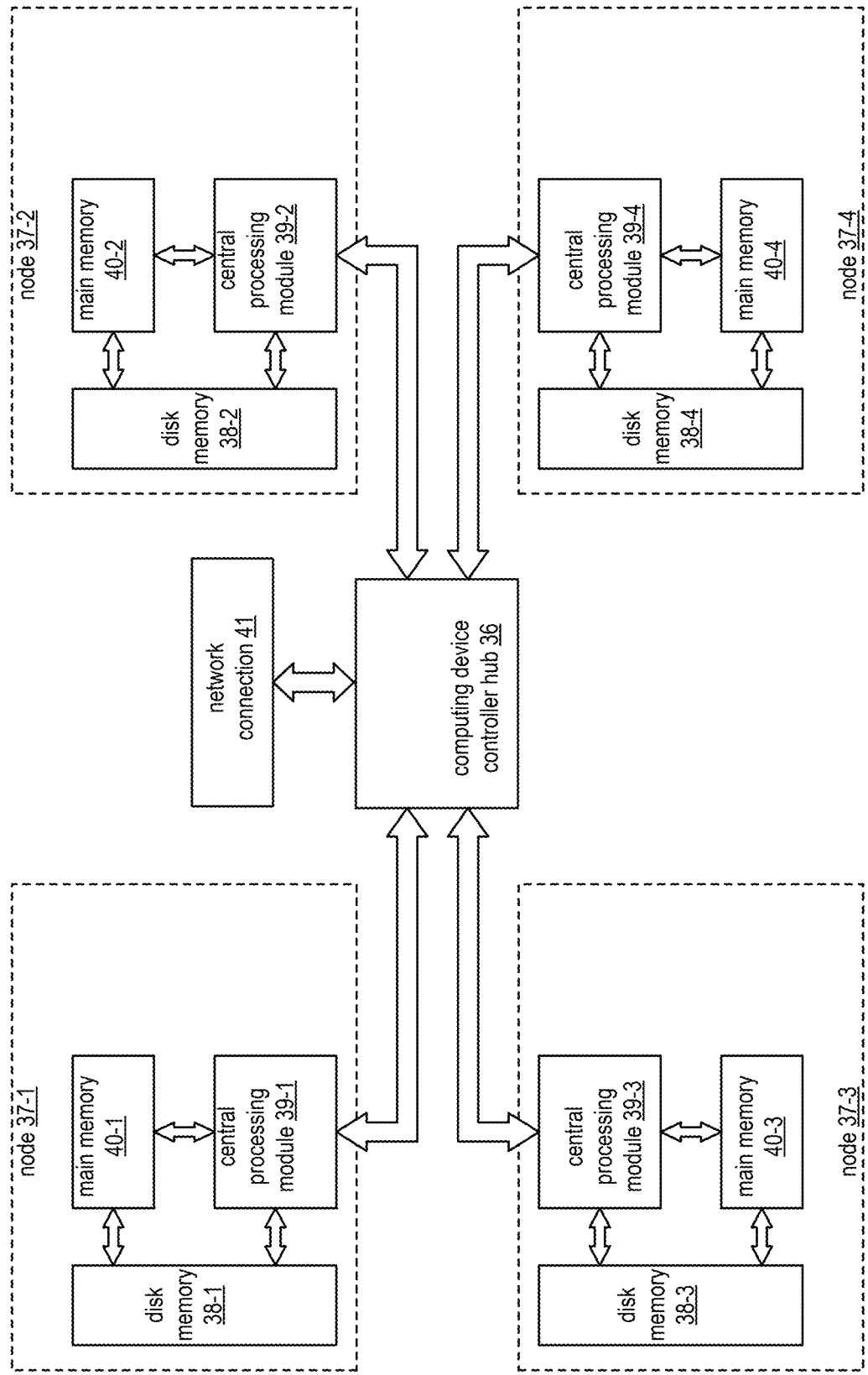
FIG. 8 is a schematic block diagram of another embodiment of a computing device in accordance with the present invention.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
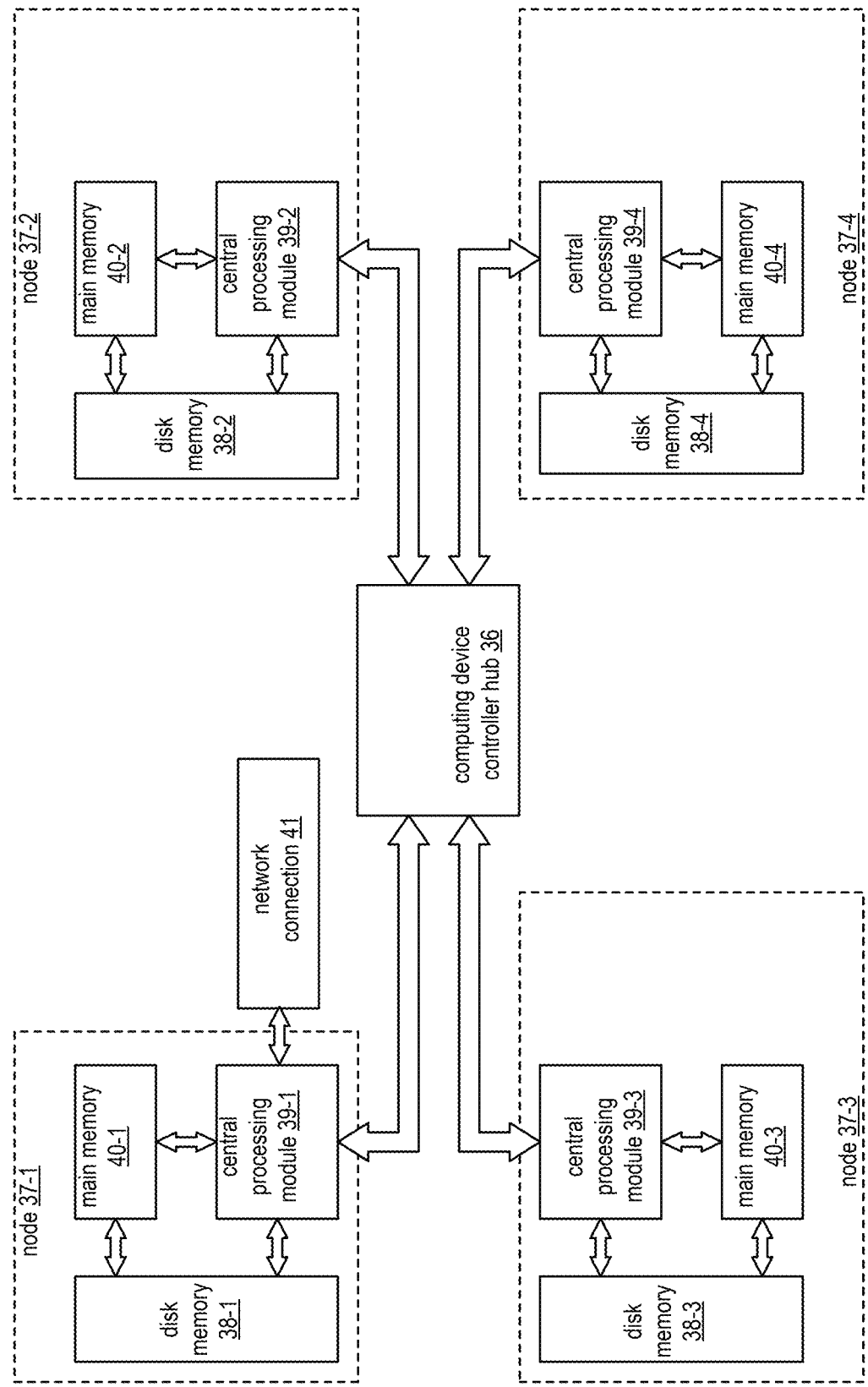
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
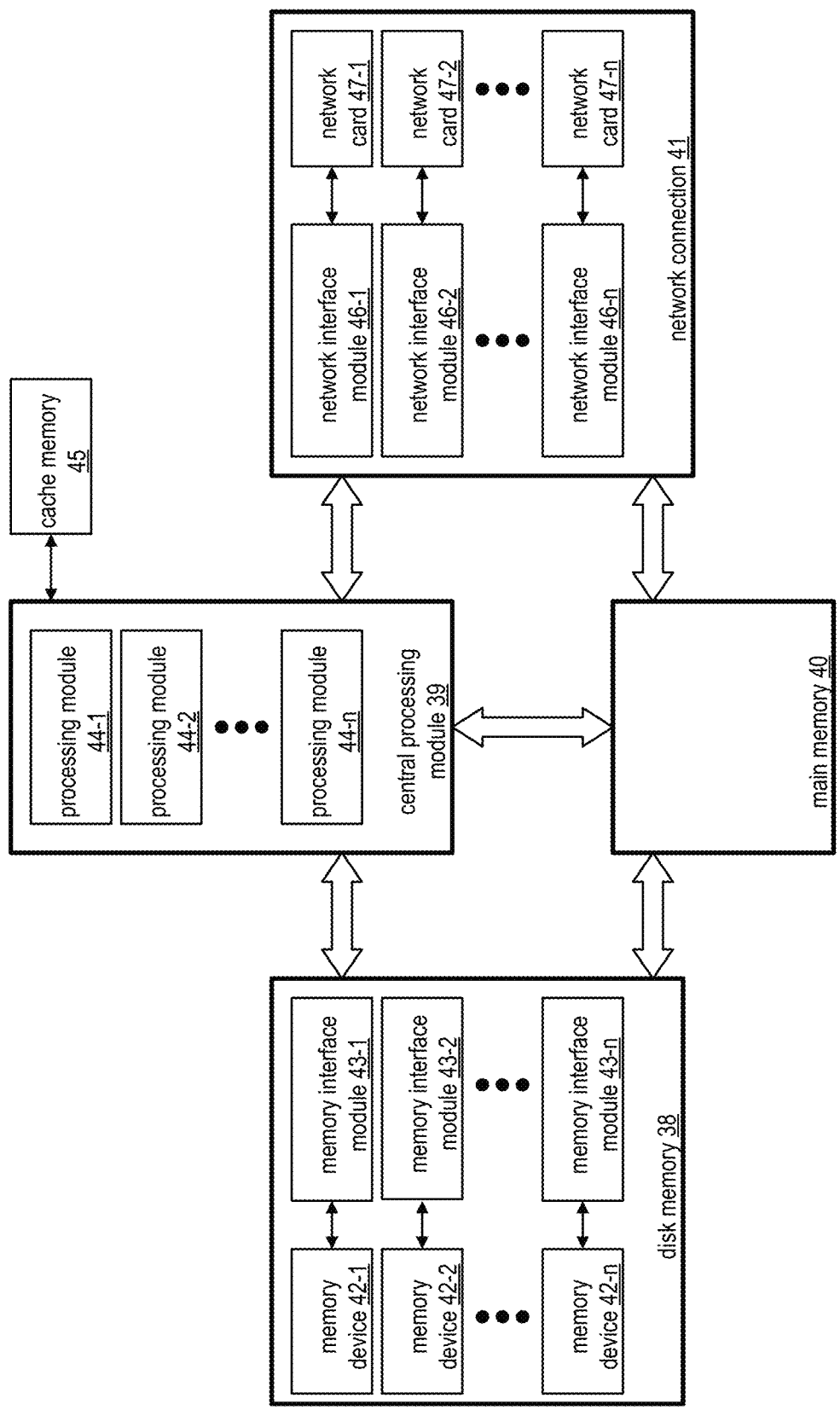
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-$n$ and an associated one or more cache memory 45. A processing module is as defined at the end of the detailed description.

The disk memory 38 includes a plurality of memory interface modules 43-1 through 43-$n$ and a plurality of memory devices 42-1 through 42-$n$ (e.g., non-volatile memory). The memory devices 42-1 through 42-$n$ include, but are not limited to, solid state memory, disk drive memory, cloud storage memory, and other non-volatile memory. For each type of memory device, a different memory interface module 43-1 through 43-$n$ is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-$n$ and a plurality of network cards 47-1 through 47-$n$. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-$n$ include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
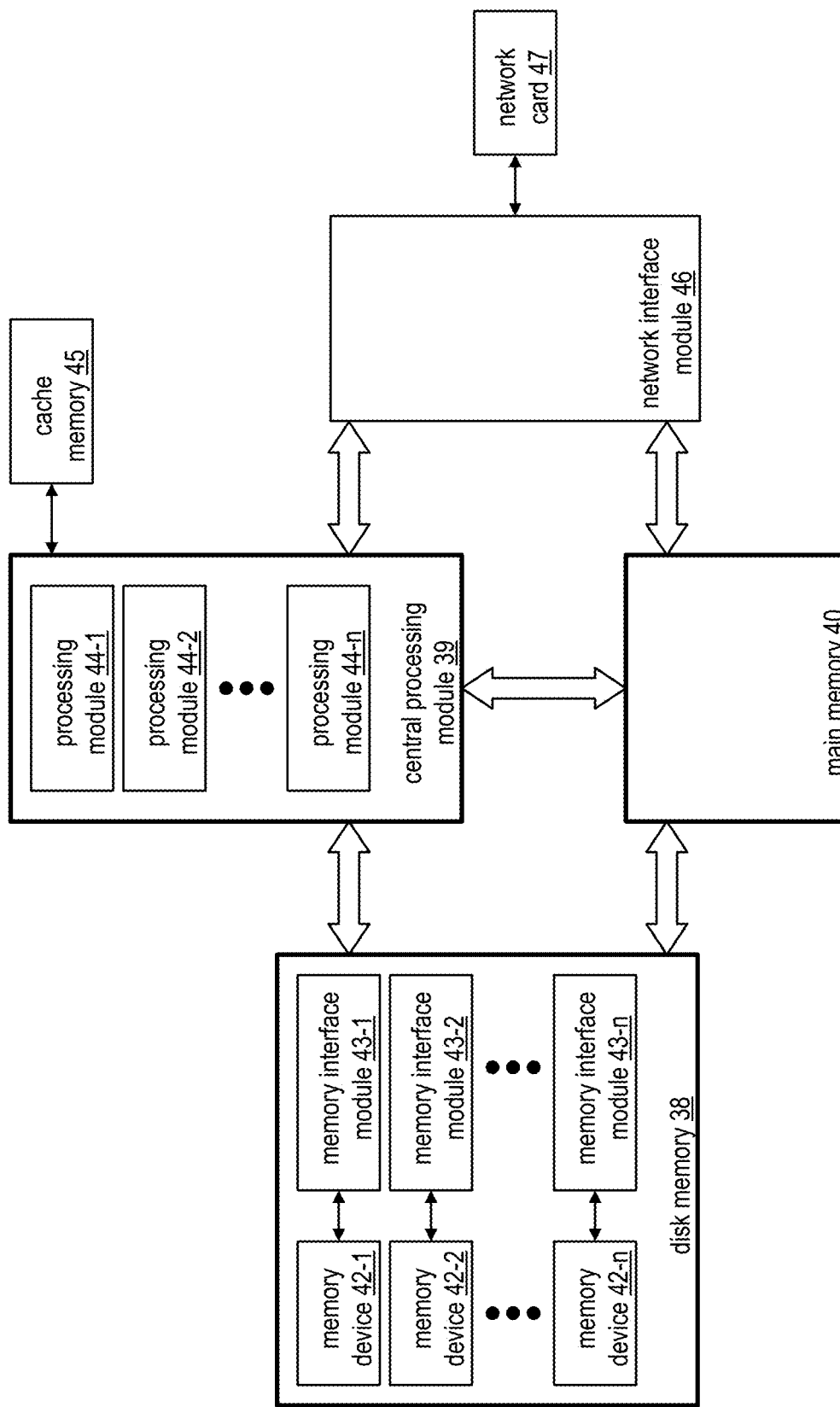
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
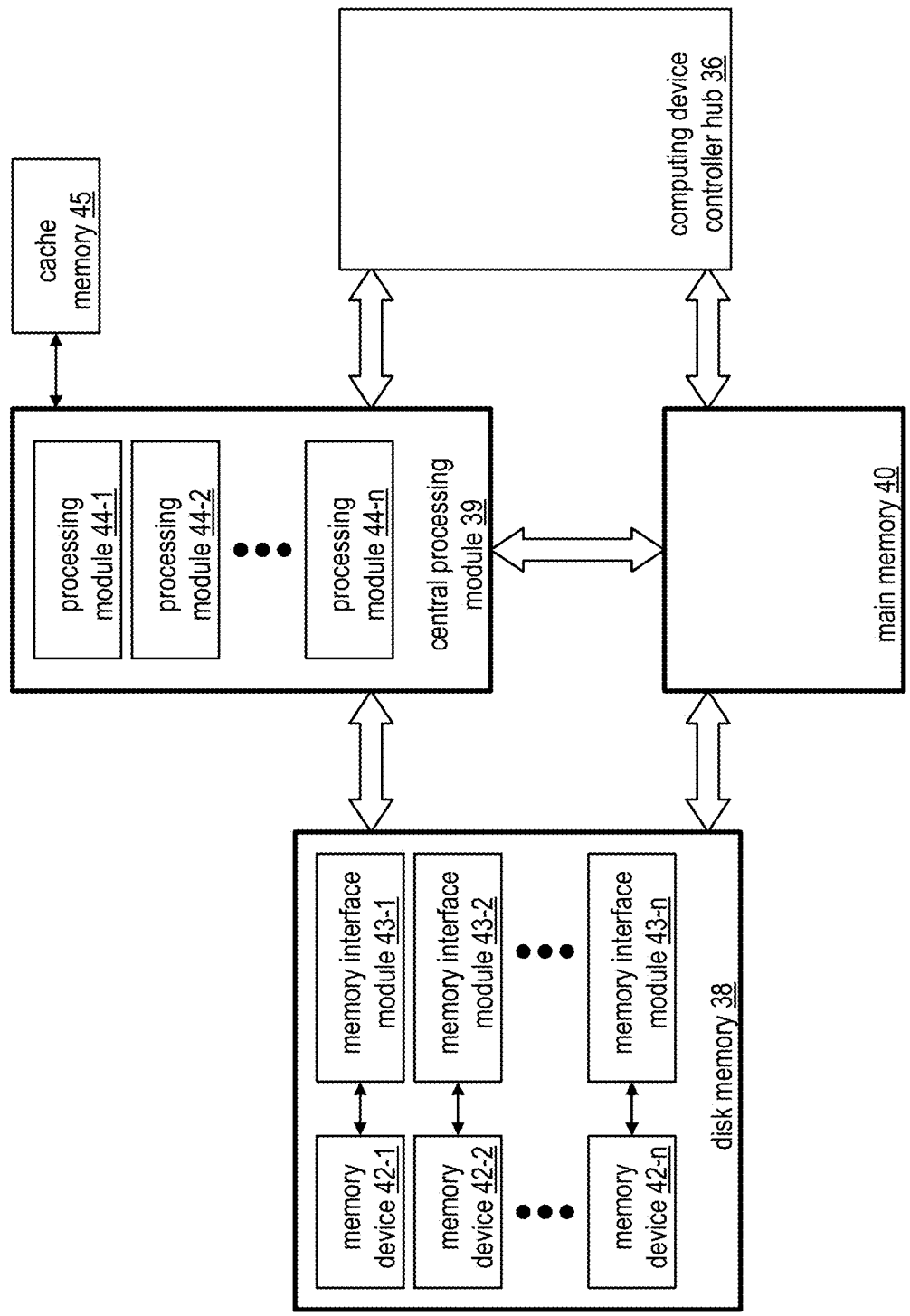
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
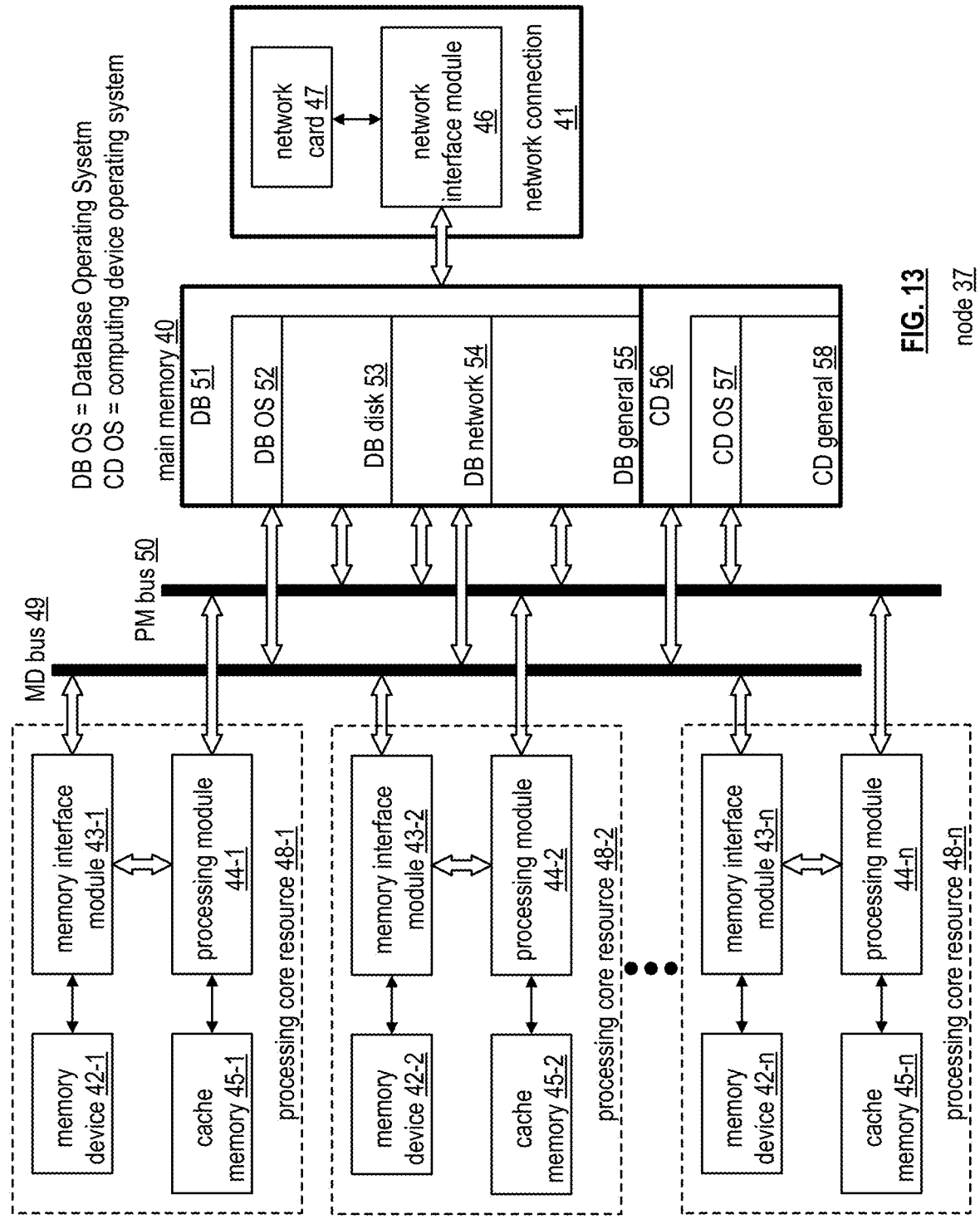
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-$n$, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-$n$, a corresponding memory interface module 43-1 through 43-$n$, a corresponding memory device 42-1 through 42-$n$, and a corresponding cache memory 45-1 through 45-$n$. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
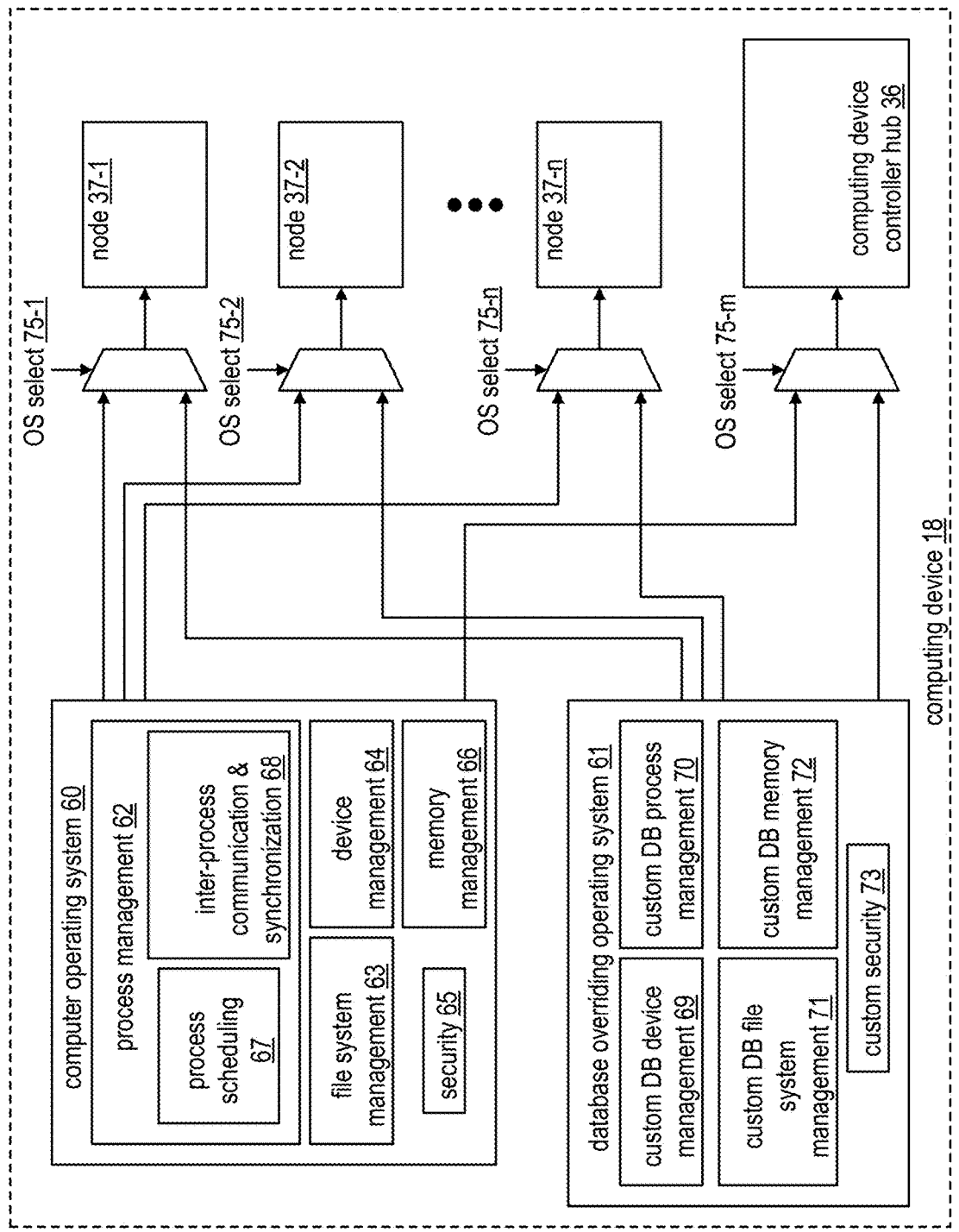
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-$n$ when communicating with nodes 37-1 through 37-$n$ and via OS select 75-$m$ when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
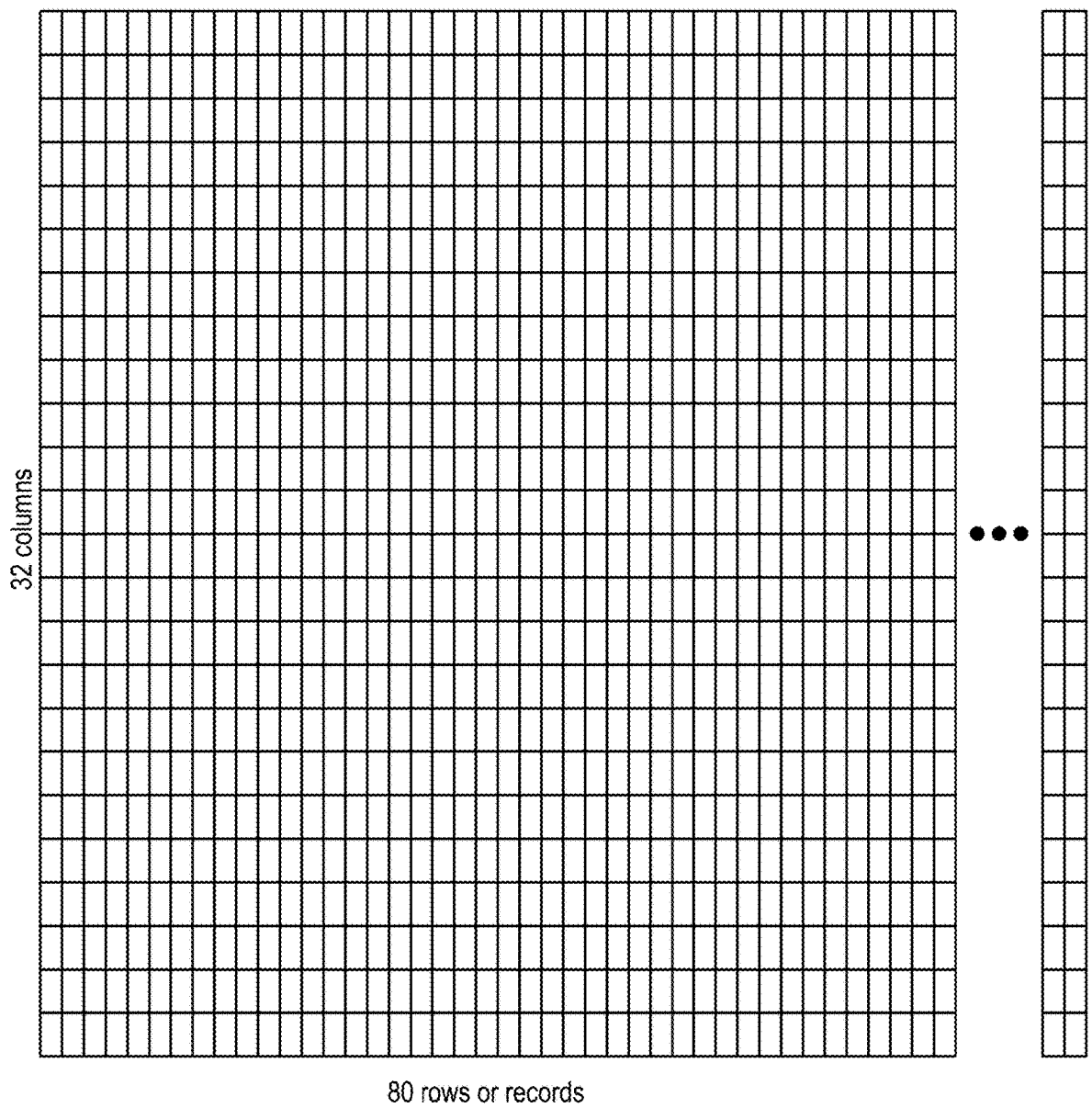

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
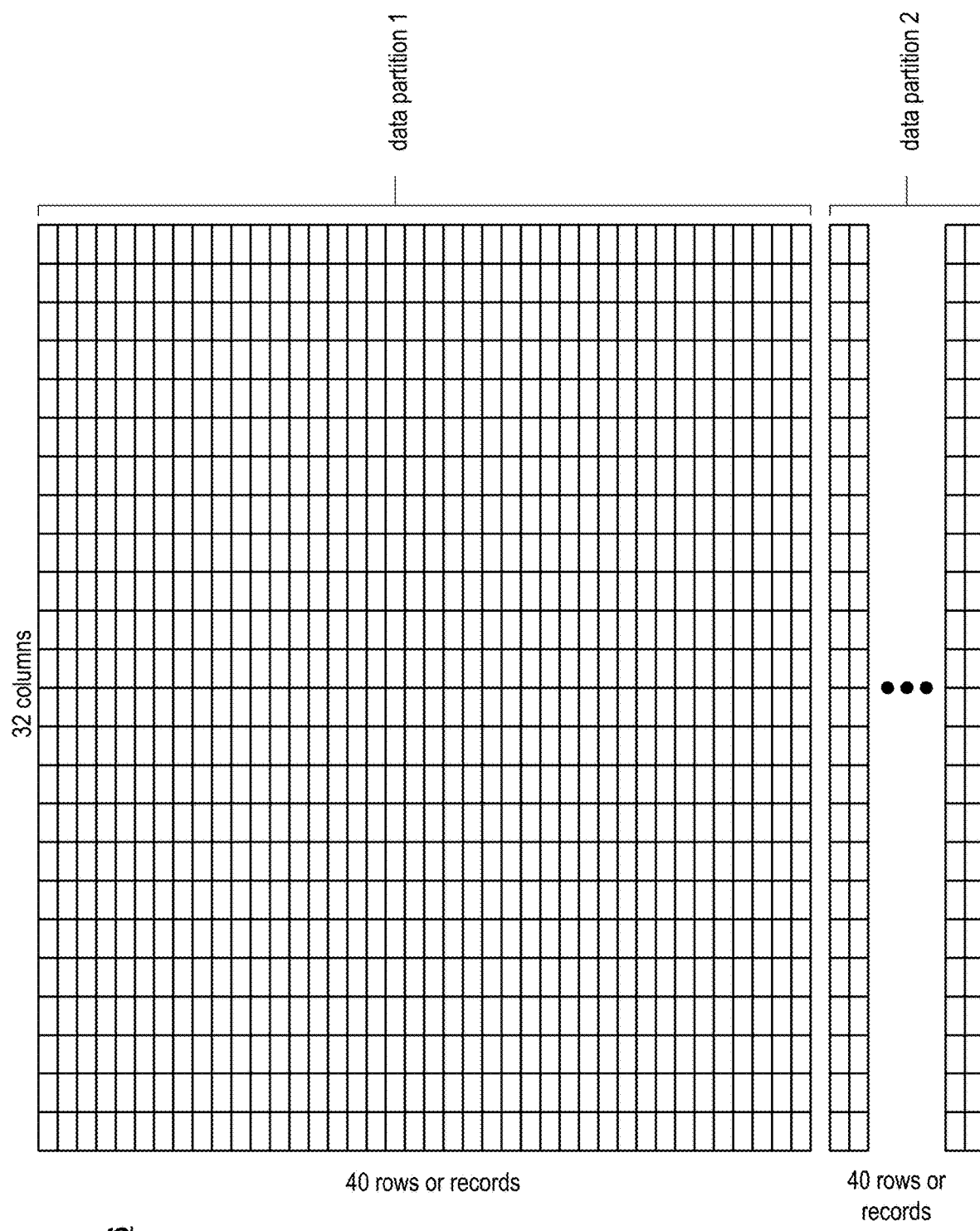

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
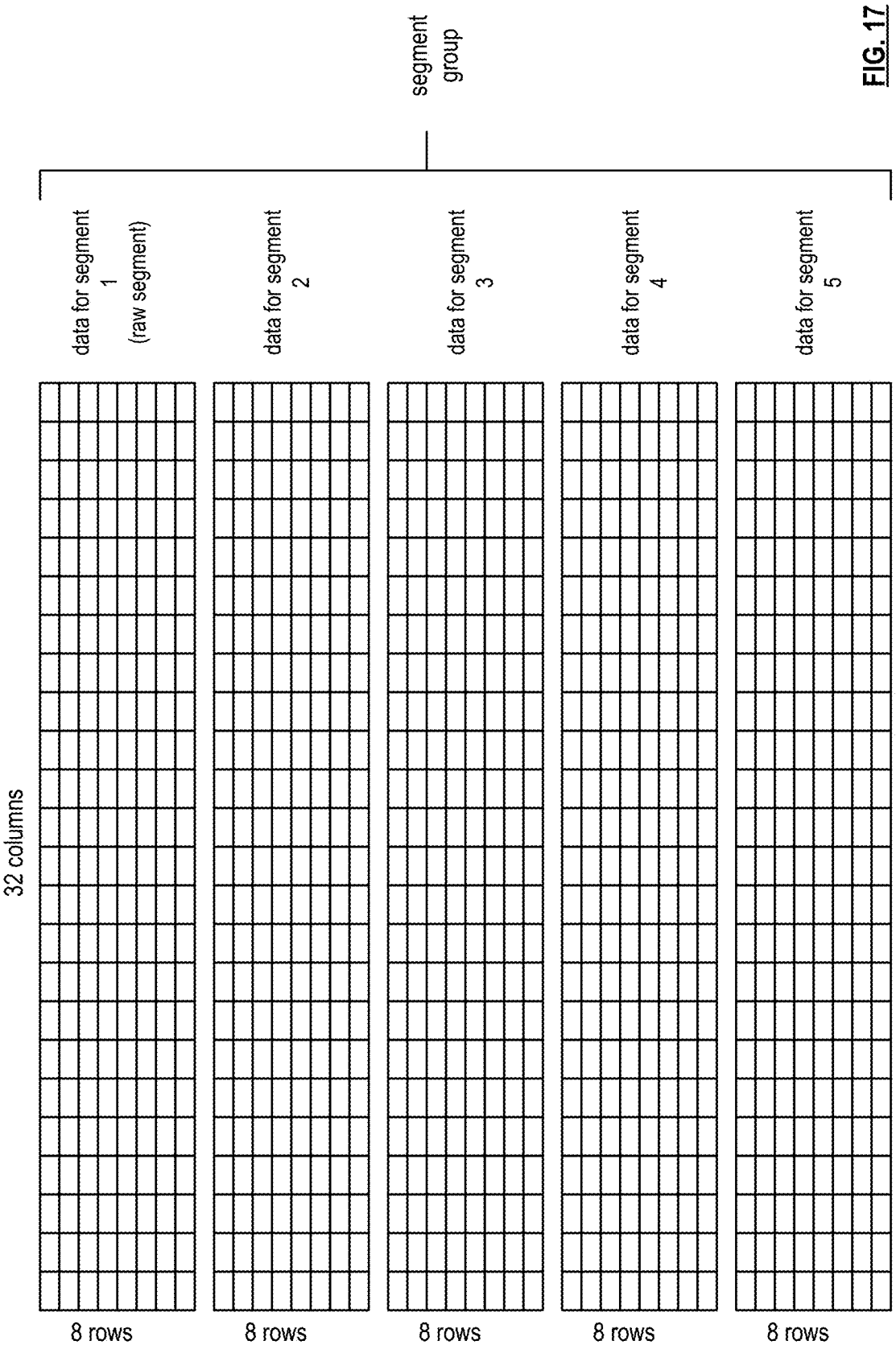

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
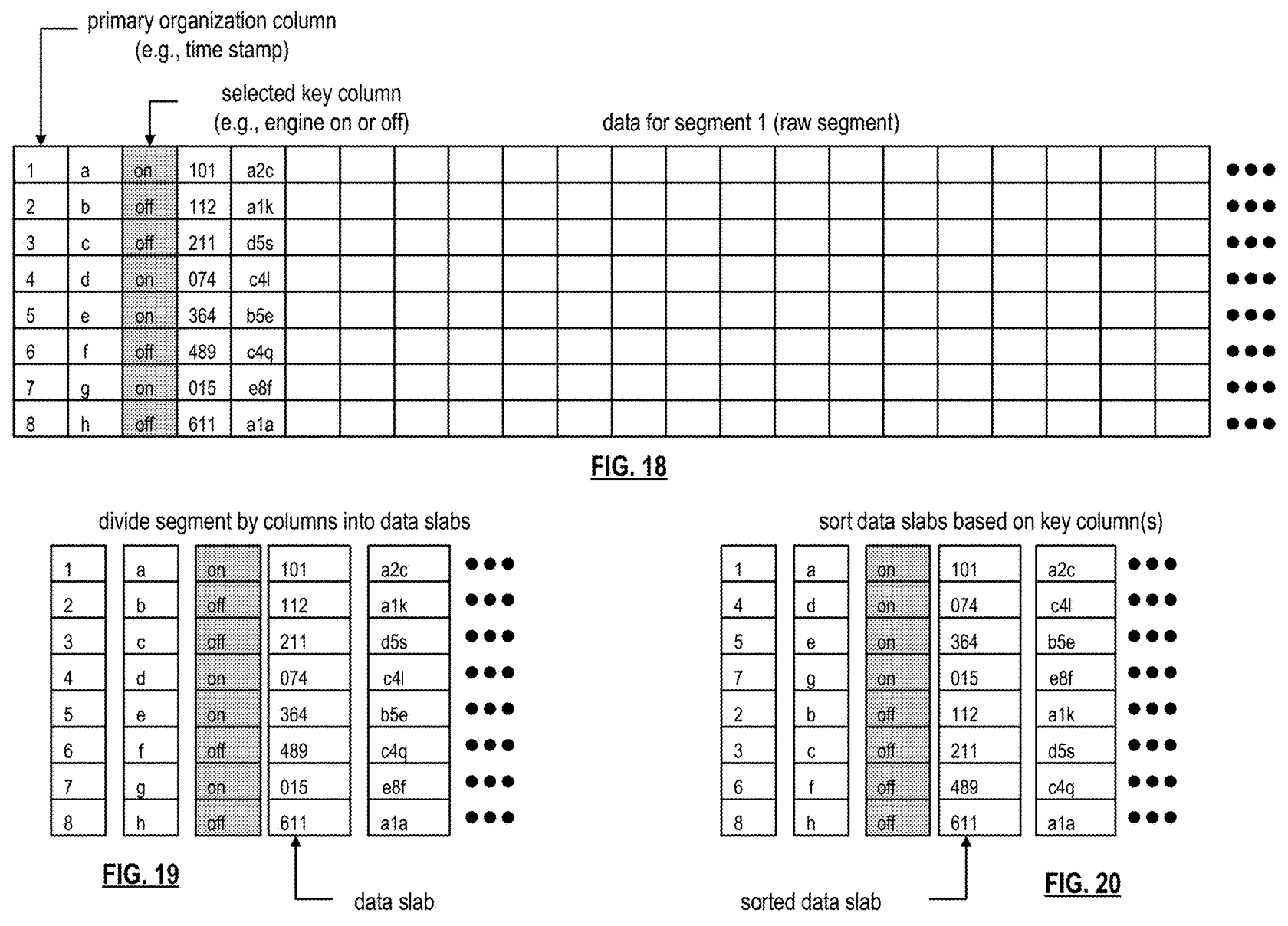

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
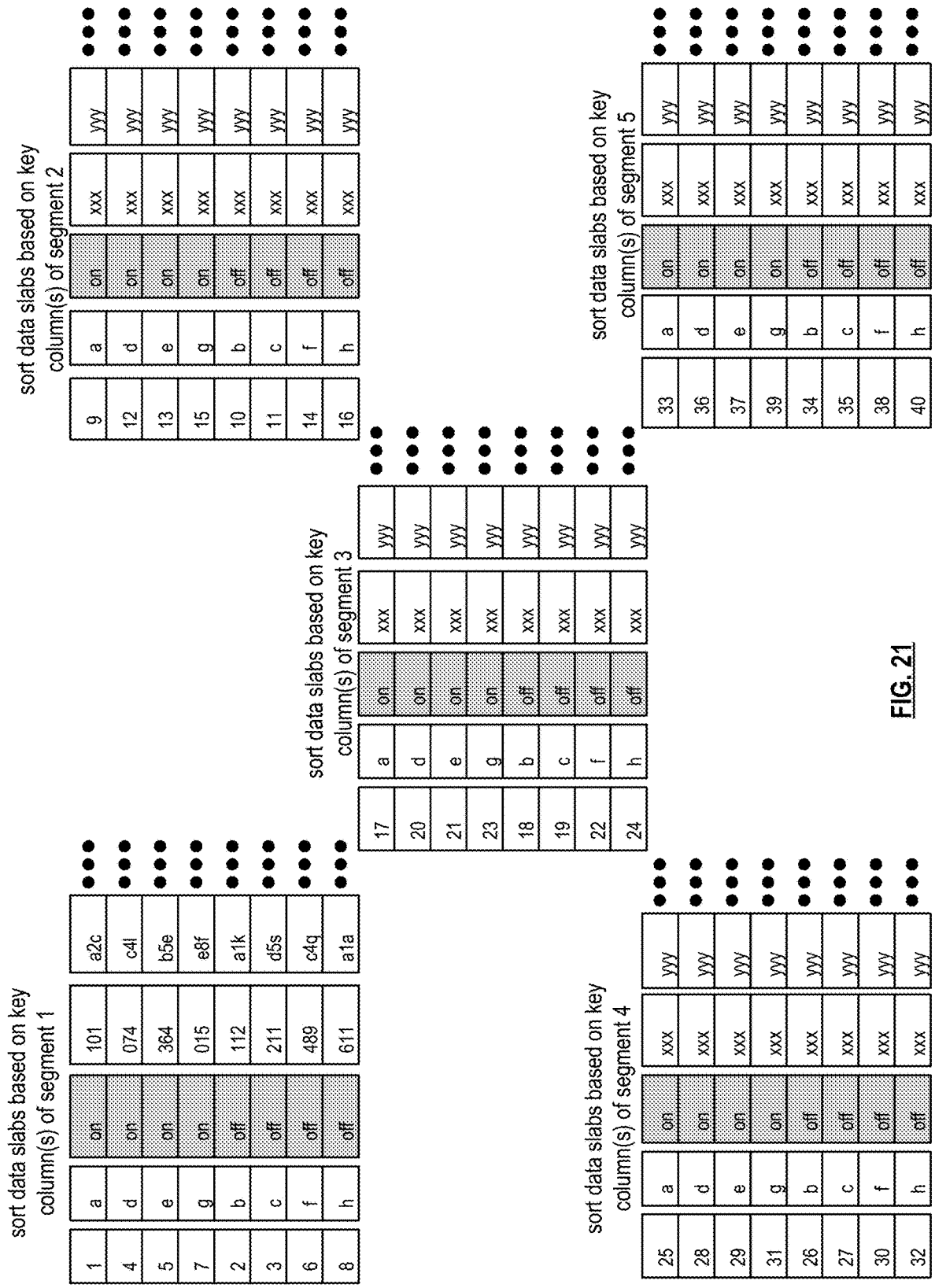

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
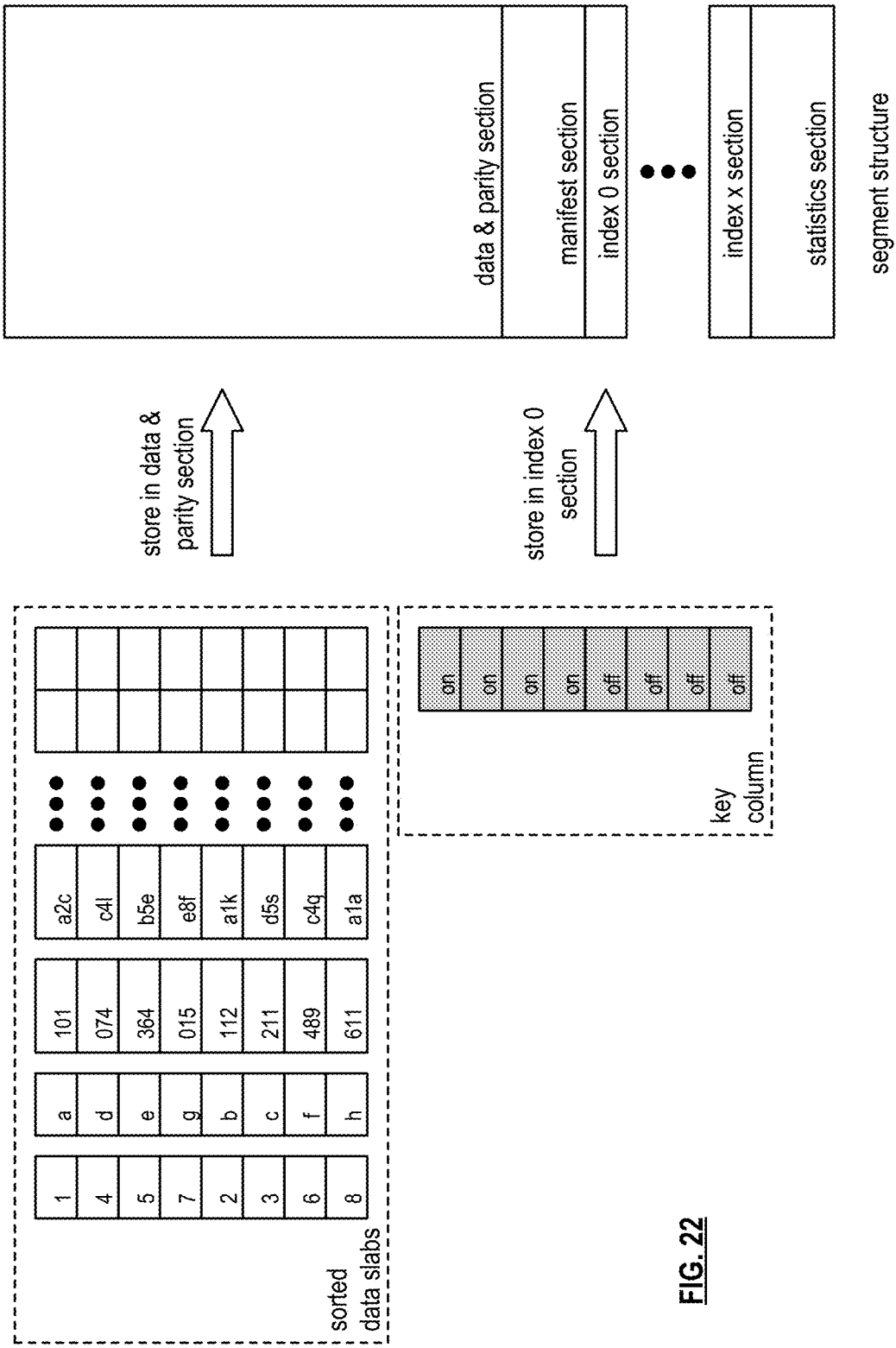

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited to, number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
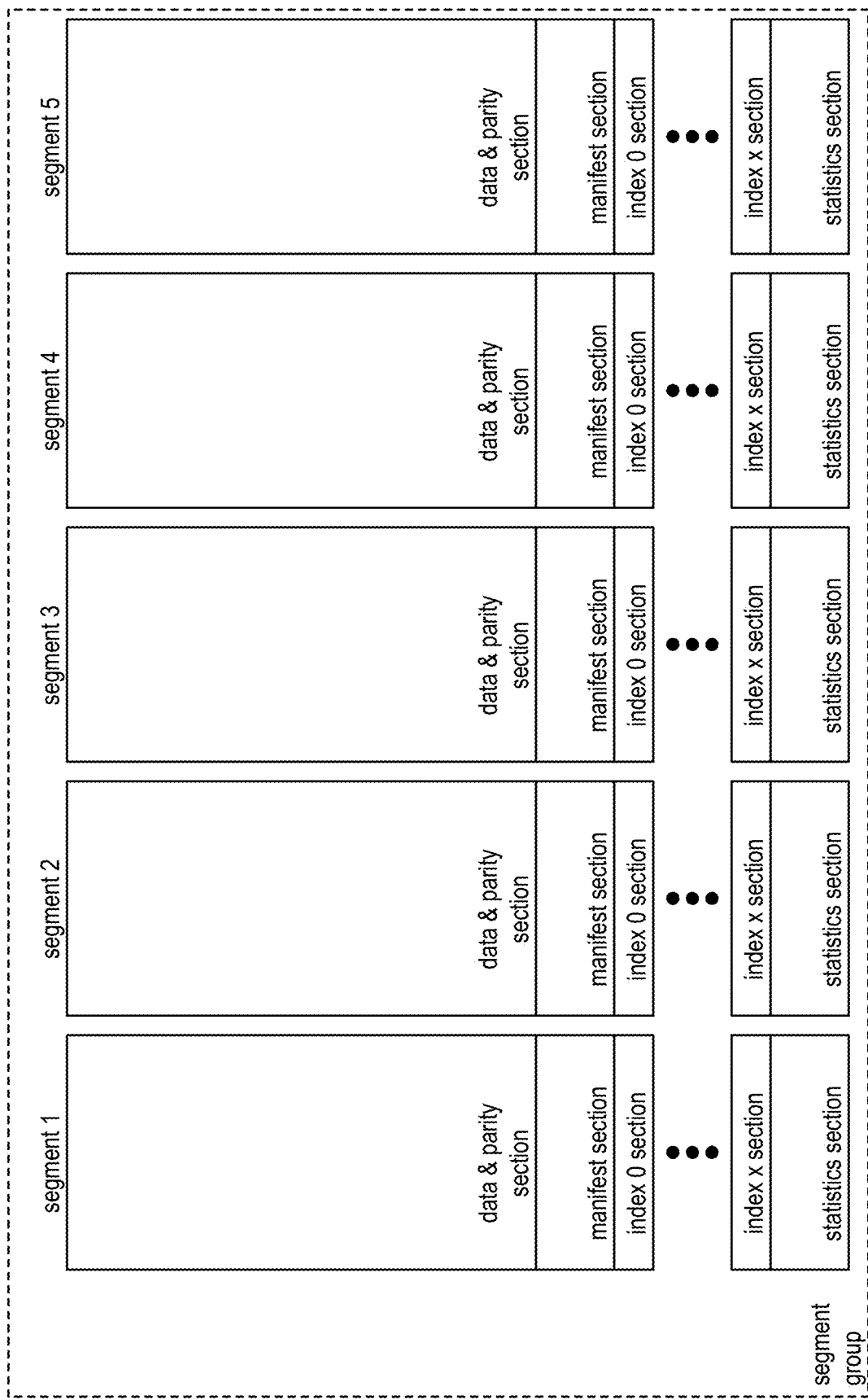

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
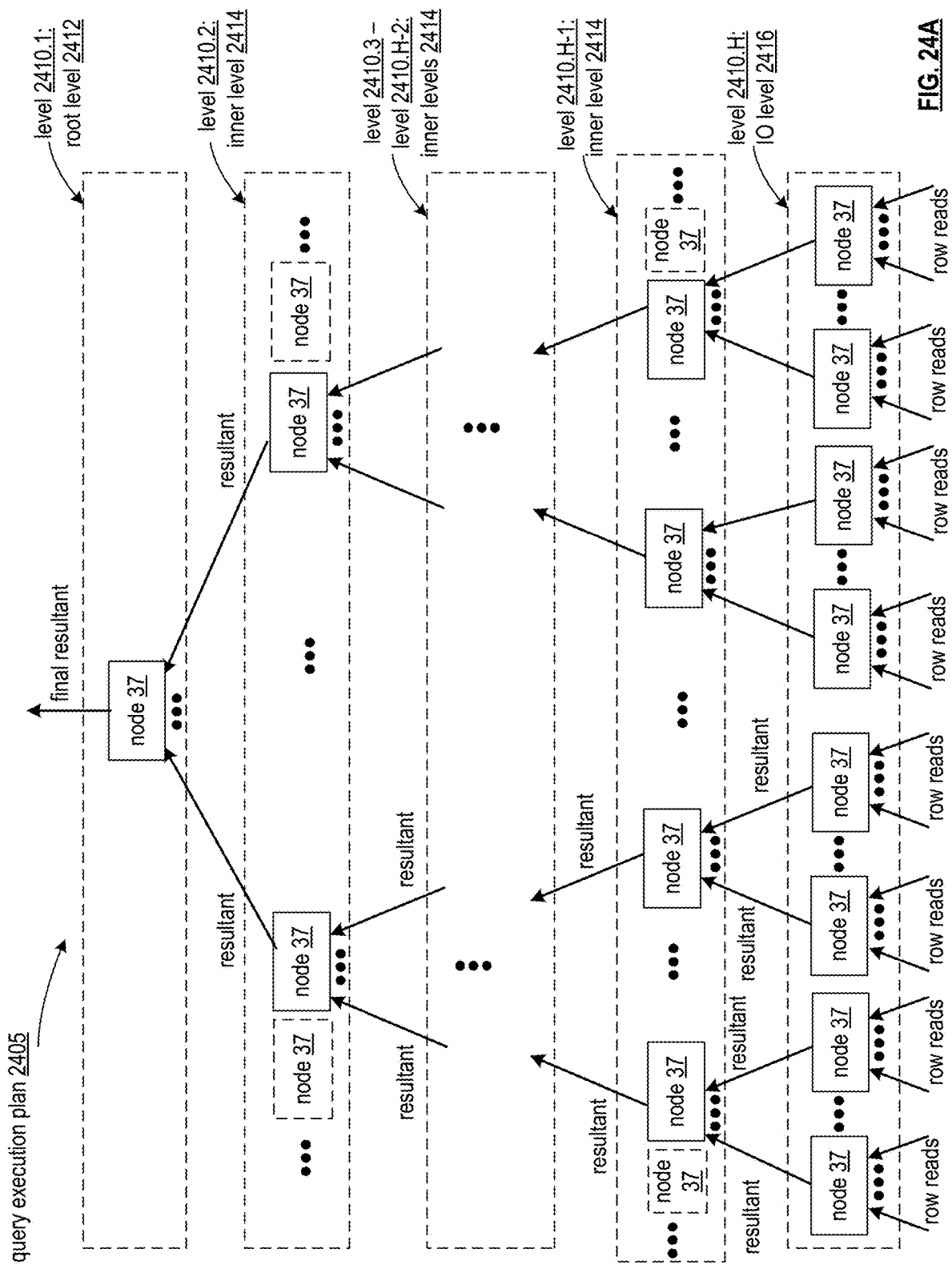
FIG. 24A is a schematic block diagram of a query execution plan in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-*z* and/or all nodes in all storage clusters 35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the JO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the JO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the JO level, such as the entire query operator execution flow and/or the portion of the query operator execution flow performed upon data that has already been read from storage by nodes at the JO level. In some cases, some operators beyond row reads are also performed by the nodes at the JO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
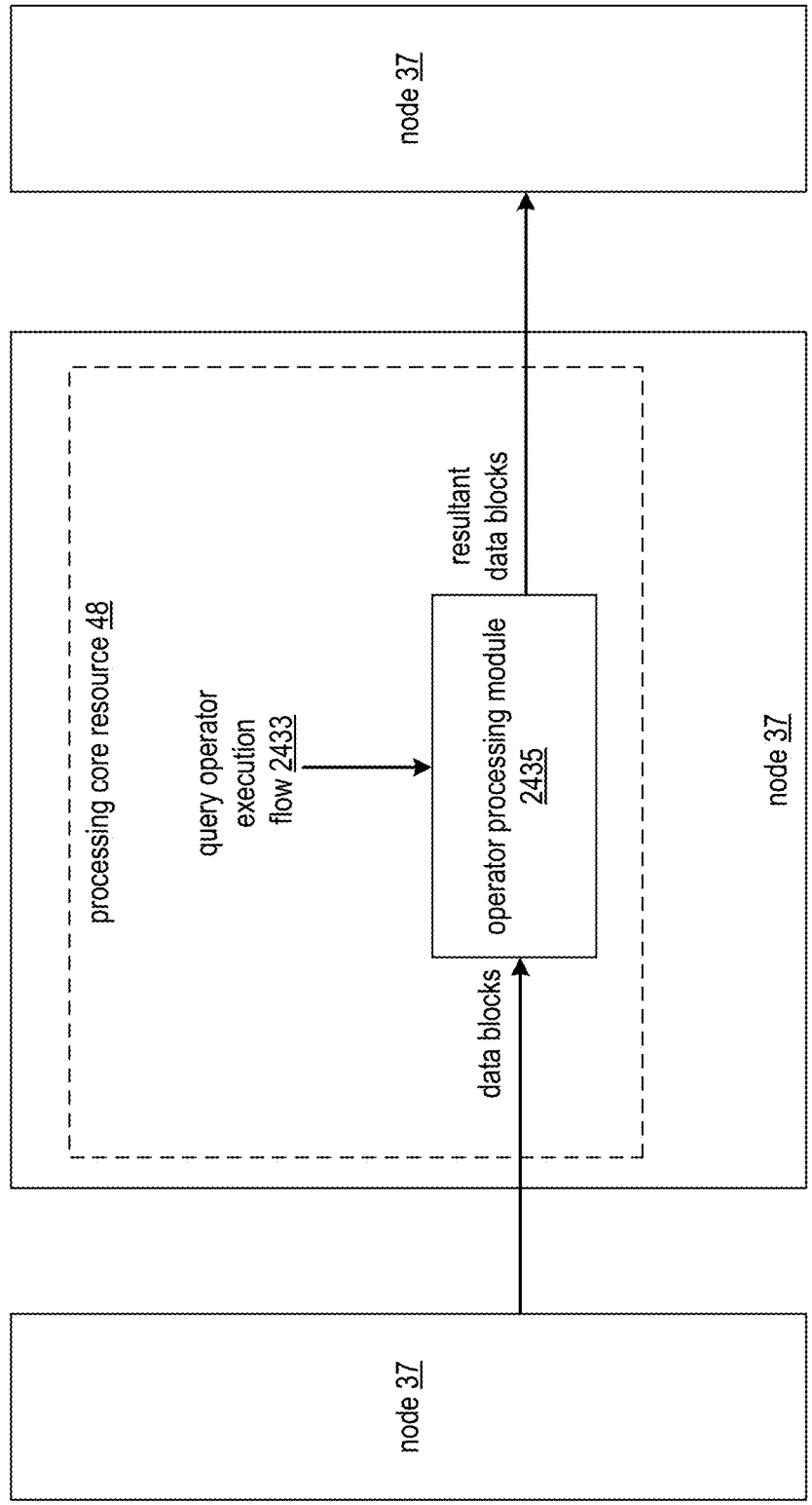
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing an operator processing module 2435. The operator processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-n, for example, of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented via multiple processing core resources 48 and/or via one or more other processing modules of the node 37.

Figure 24C:
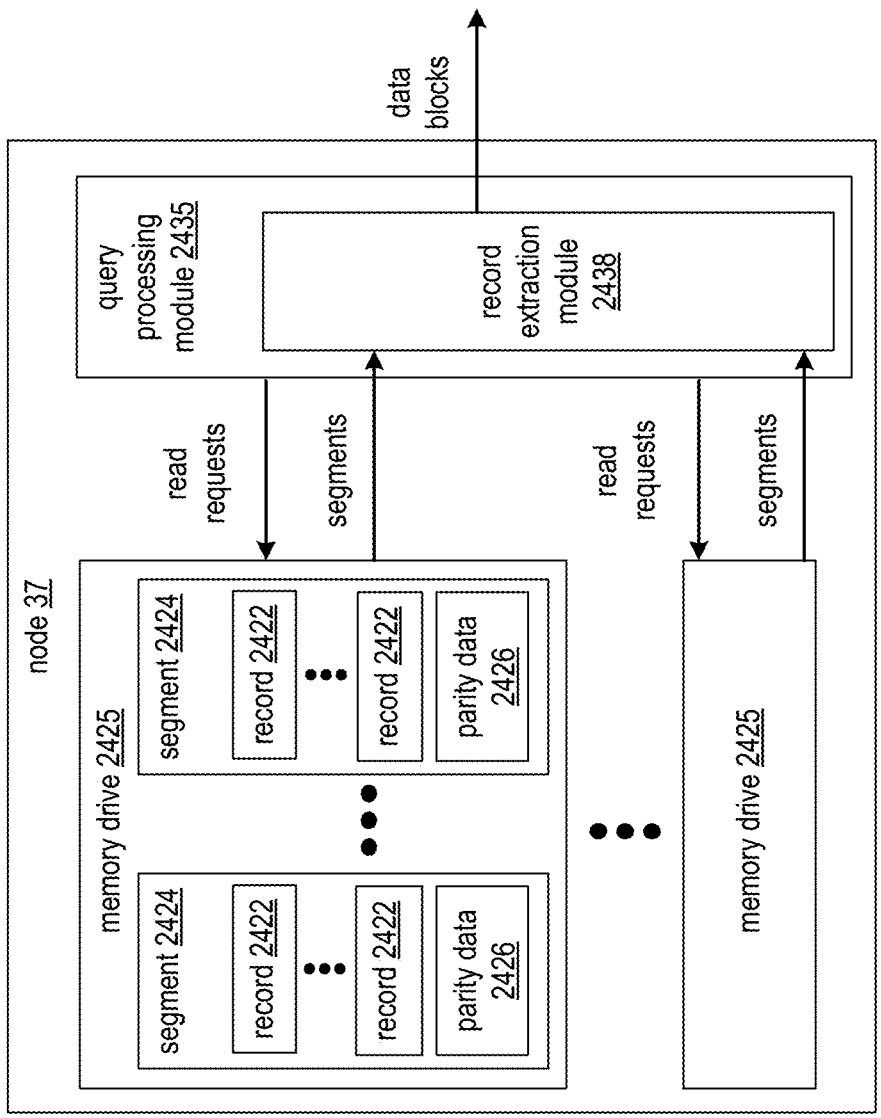

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24D:
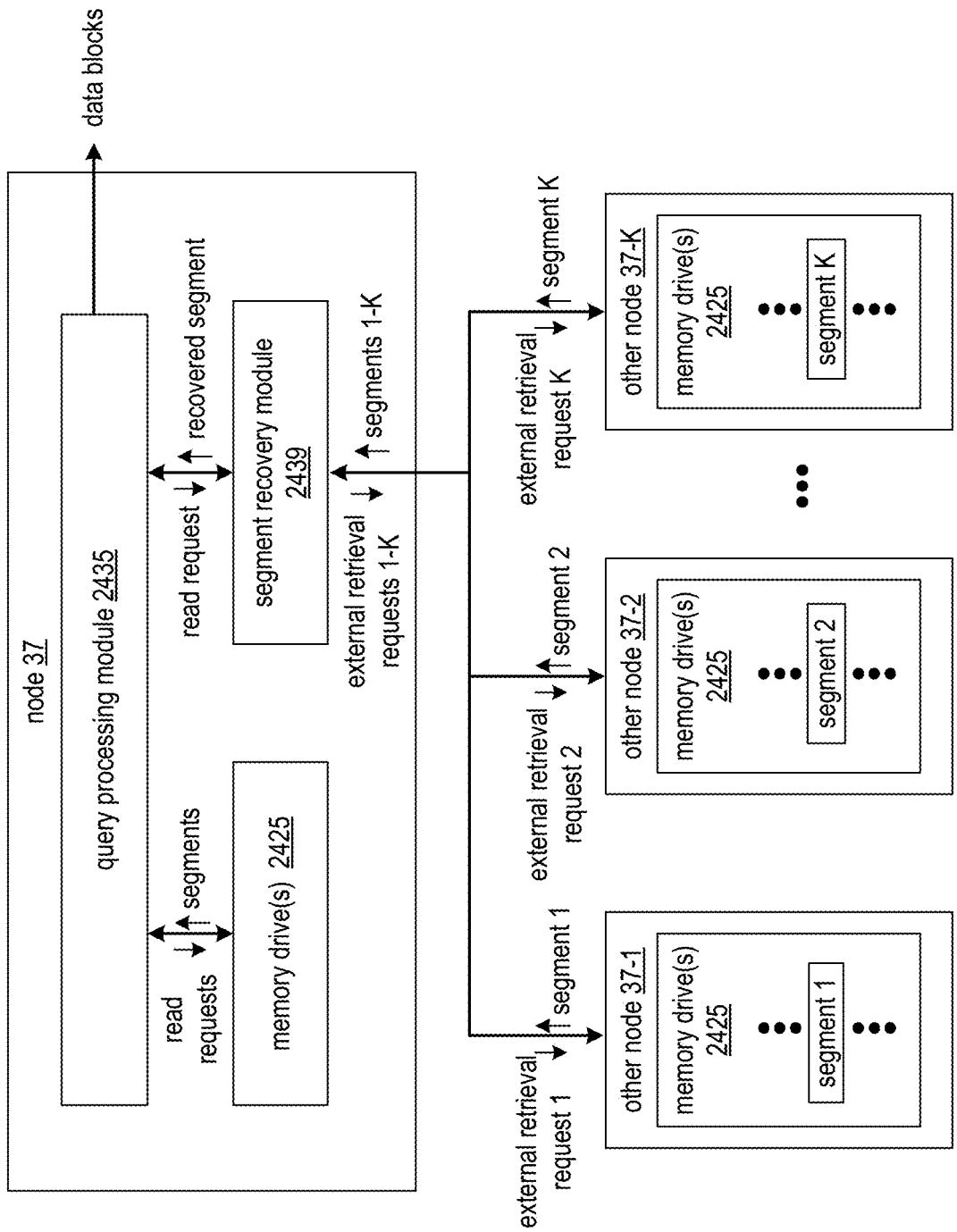

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the JO level can be generated, for example, based on being mutually agreed upon by all nodes 37 at the JO level via a consensus protocol executed between all nodes at the JO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
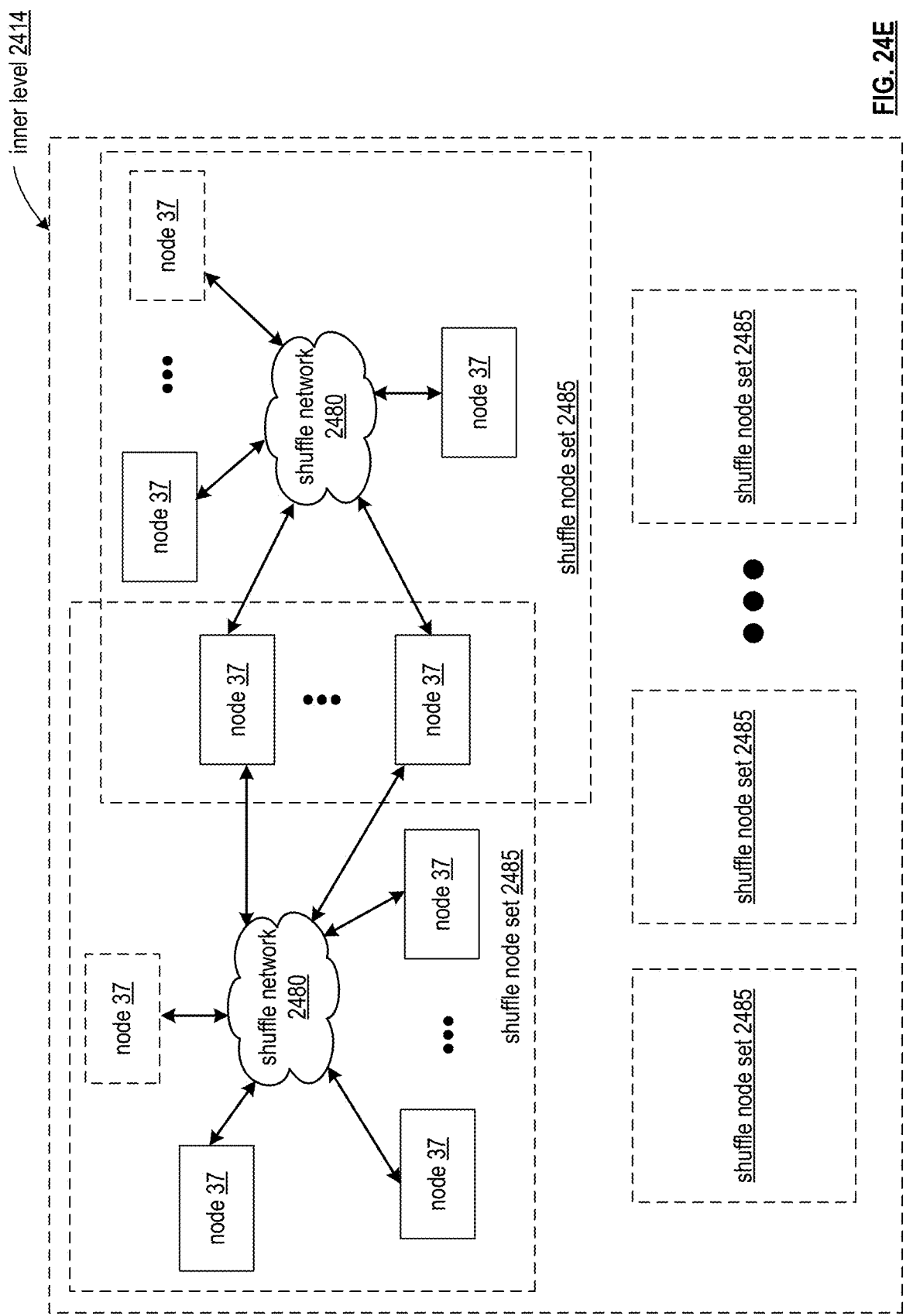
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
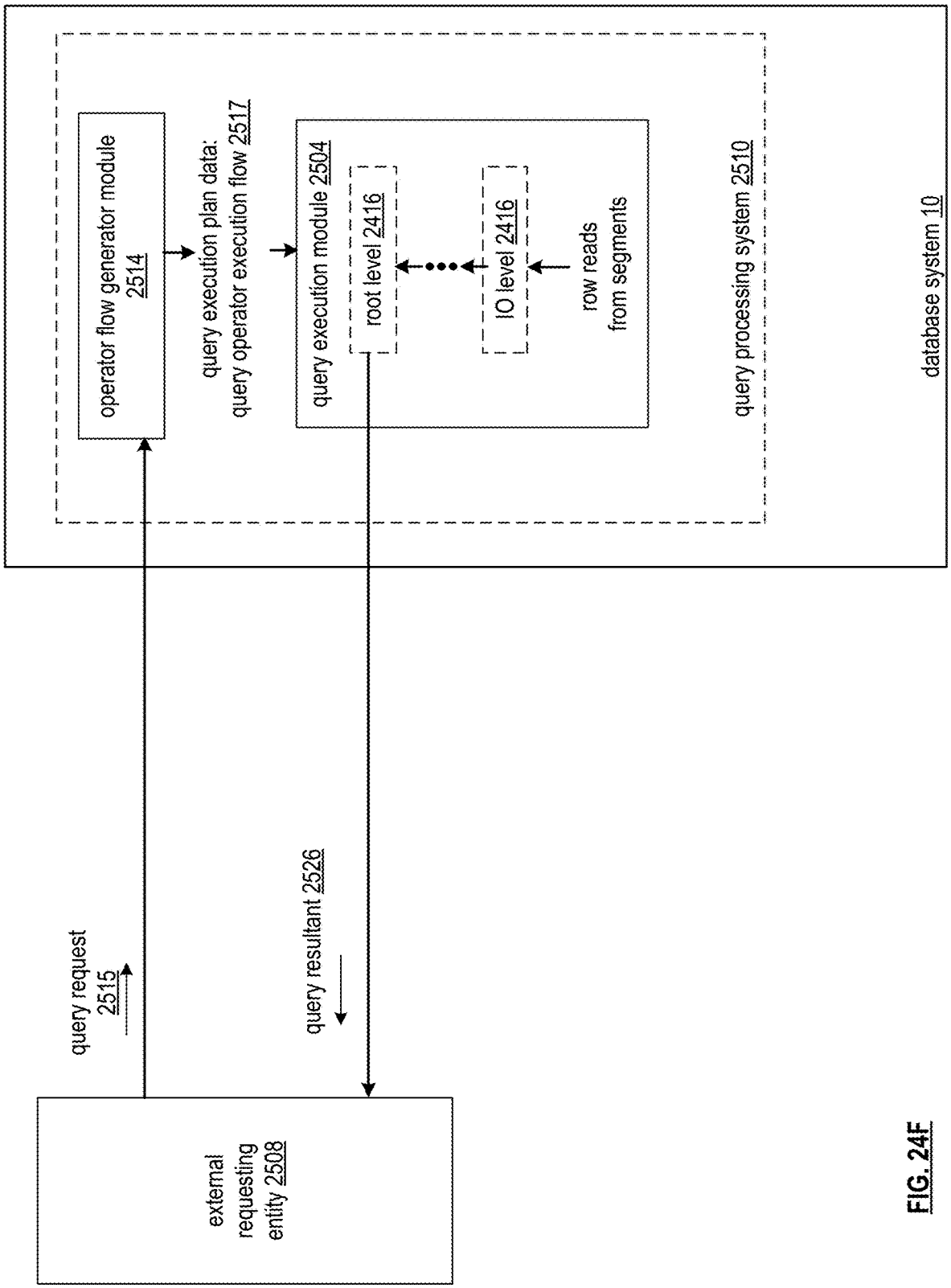
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
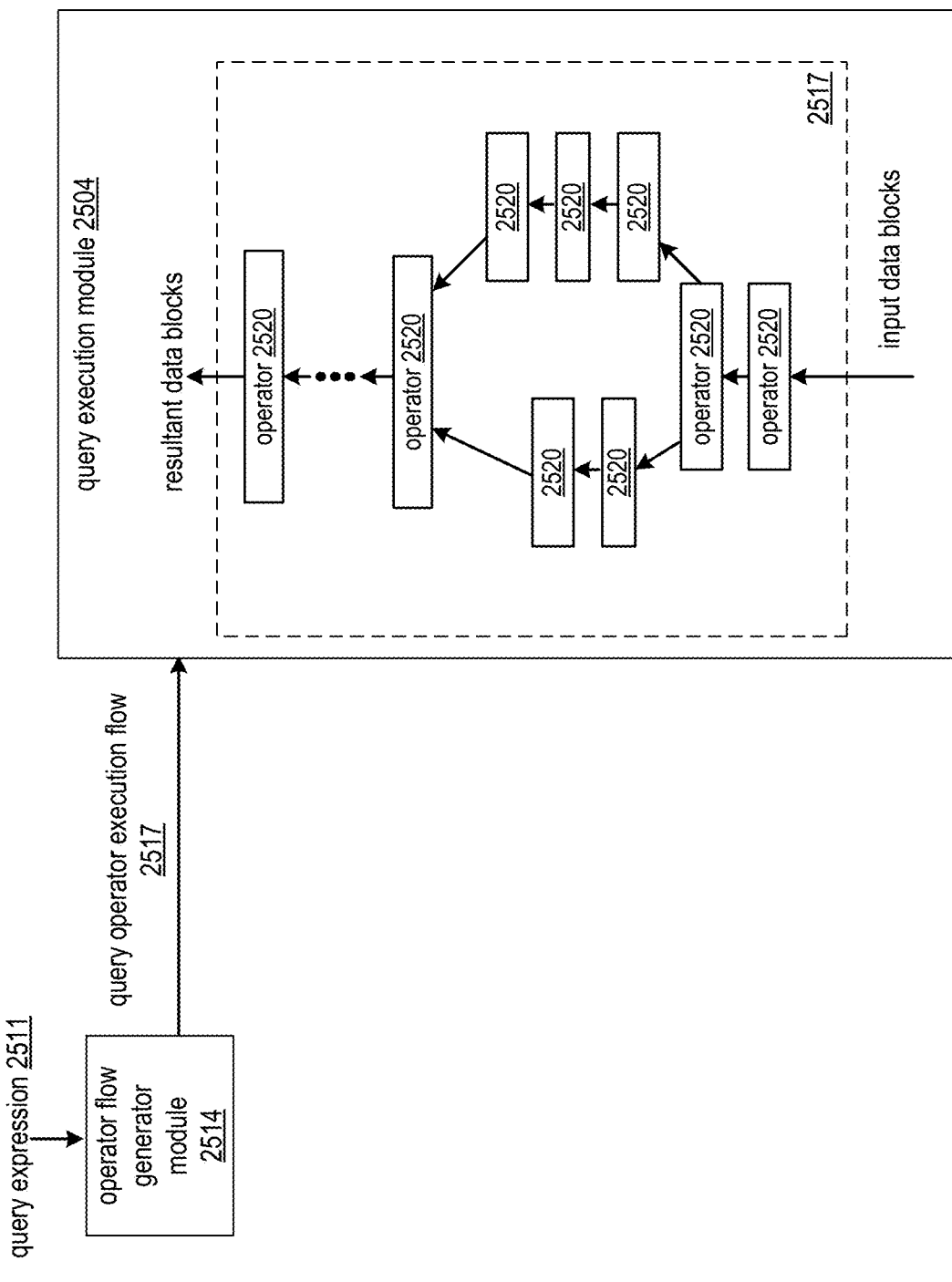
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Figure 24H:
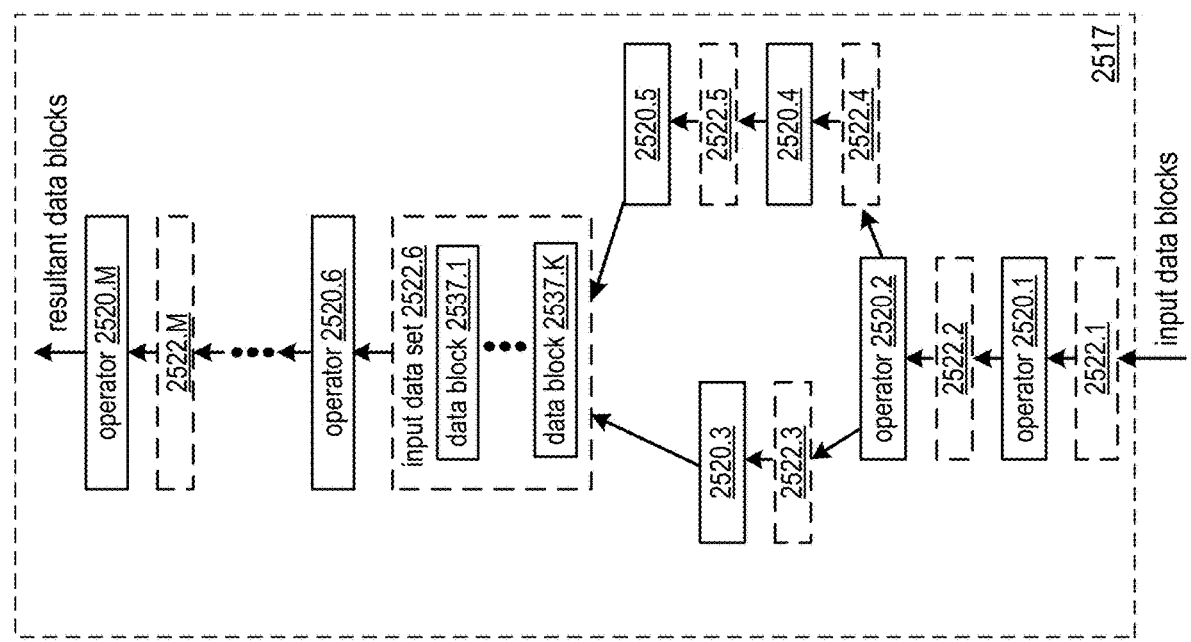
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.*i*+1 of the common query operator execution flow 2433 of the one or more other nodes in a same shuffle node set based on being serially next in the sequential ordering.

In some cases, in addition to a particular node sending this output generated via a node's execution of a particular operator 2520.*i* to one or more other nodes to be input data set 2522 the next operator 2520.*i*+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
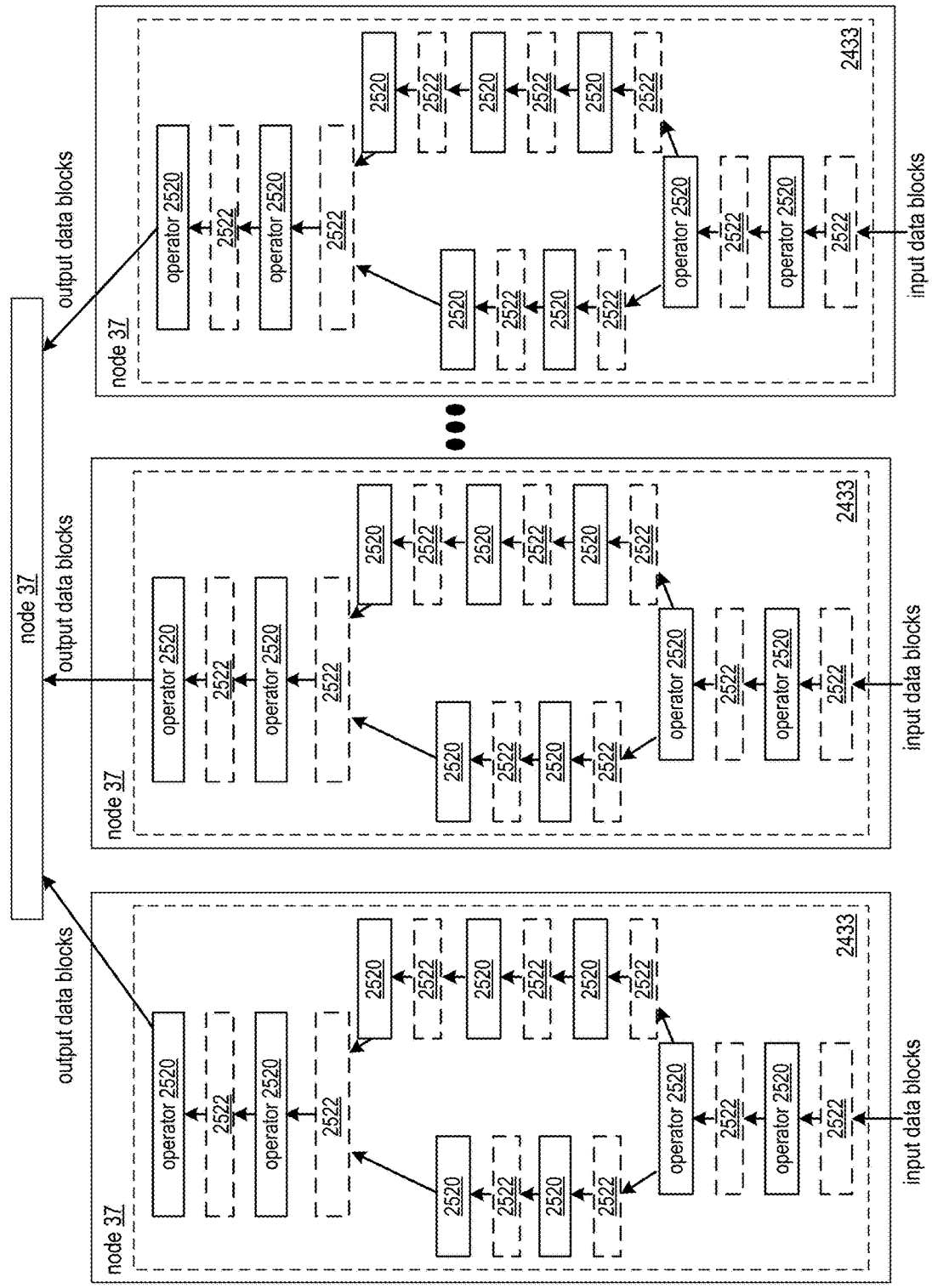
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
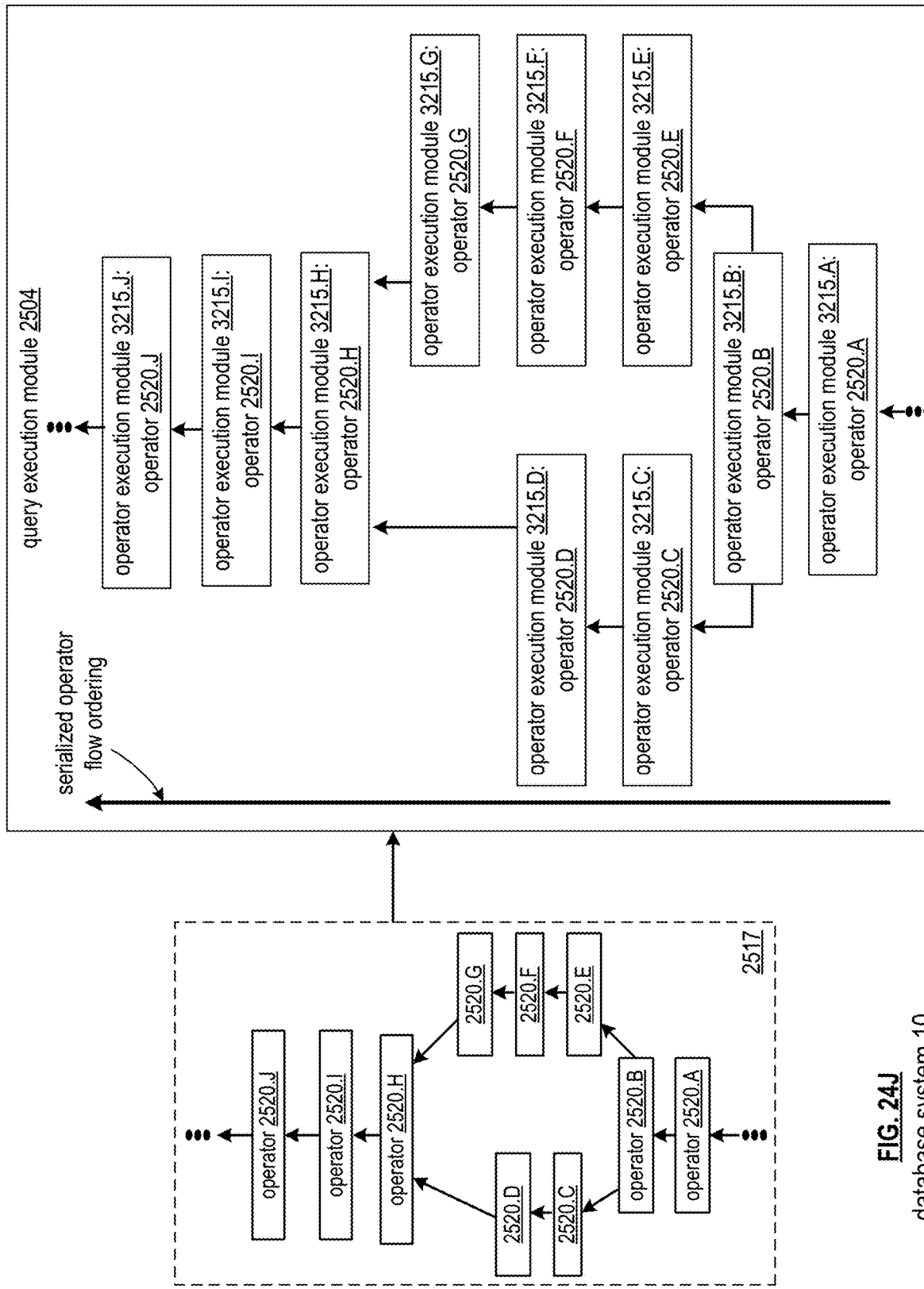
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 32A can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
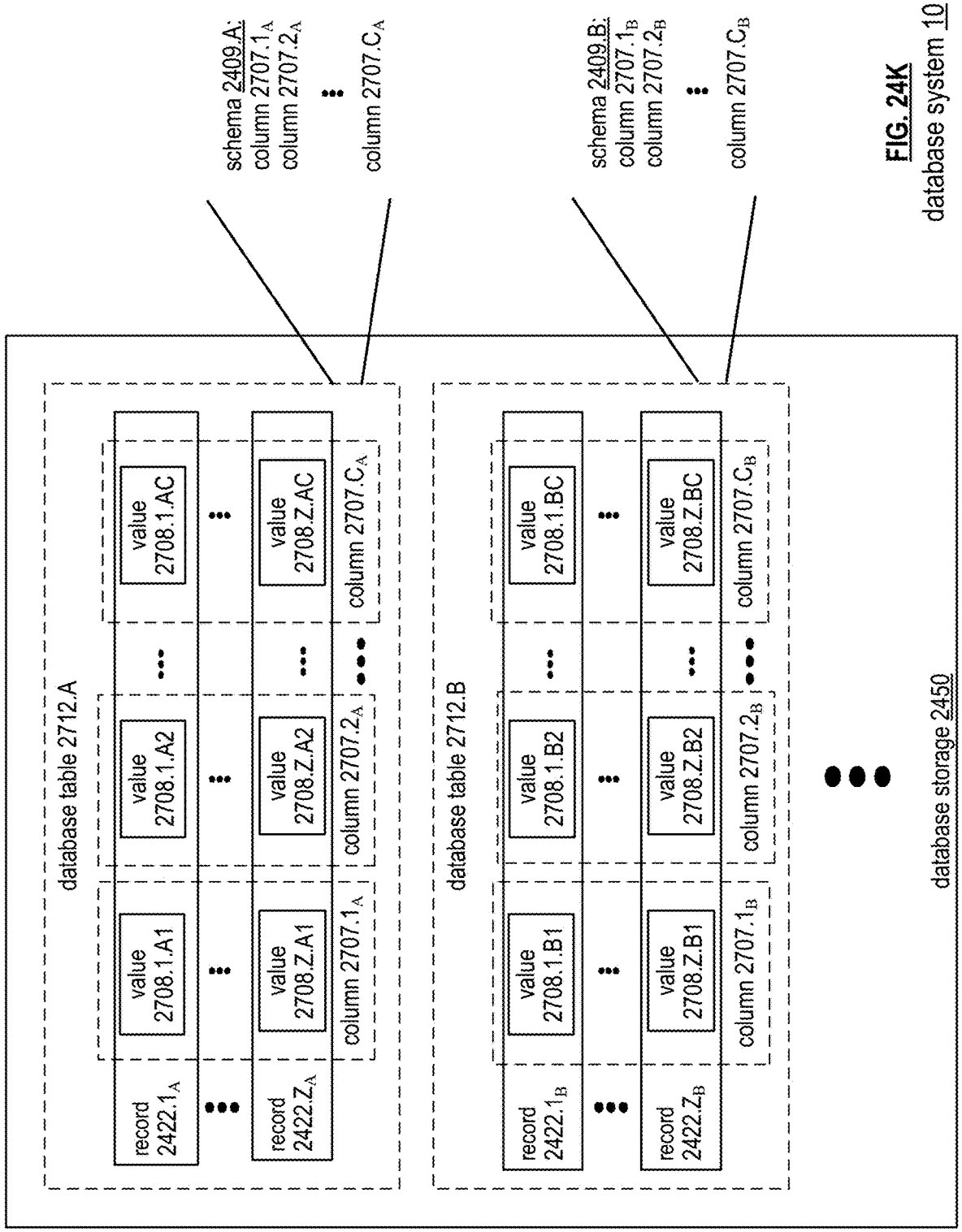
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
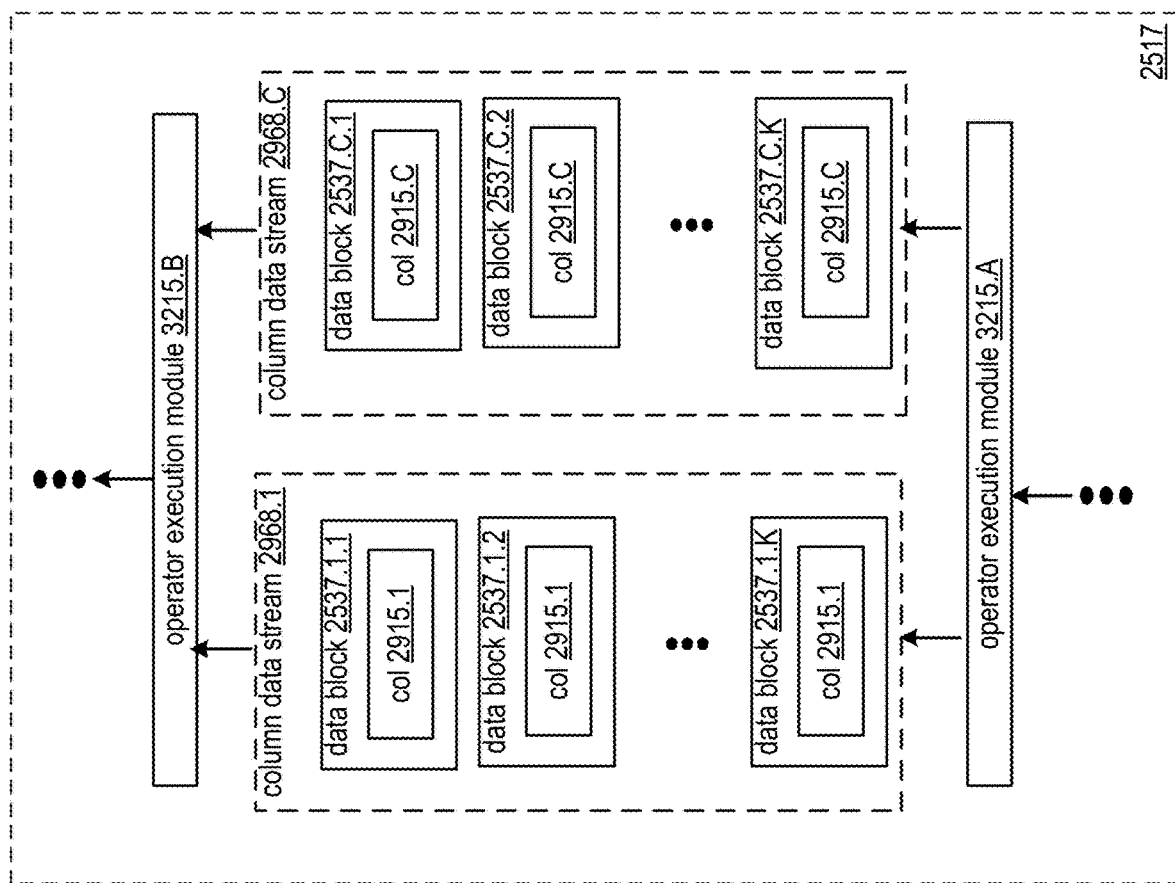
FIG. 24L is a schematic block diagram of a query execution module that implements a plurality of column data streams in accordance with various embodiments.
Figure 24M:
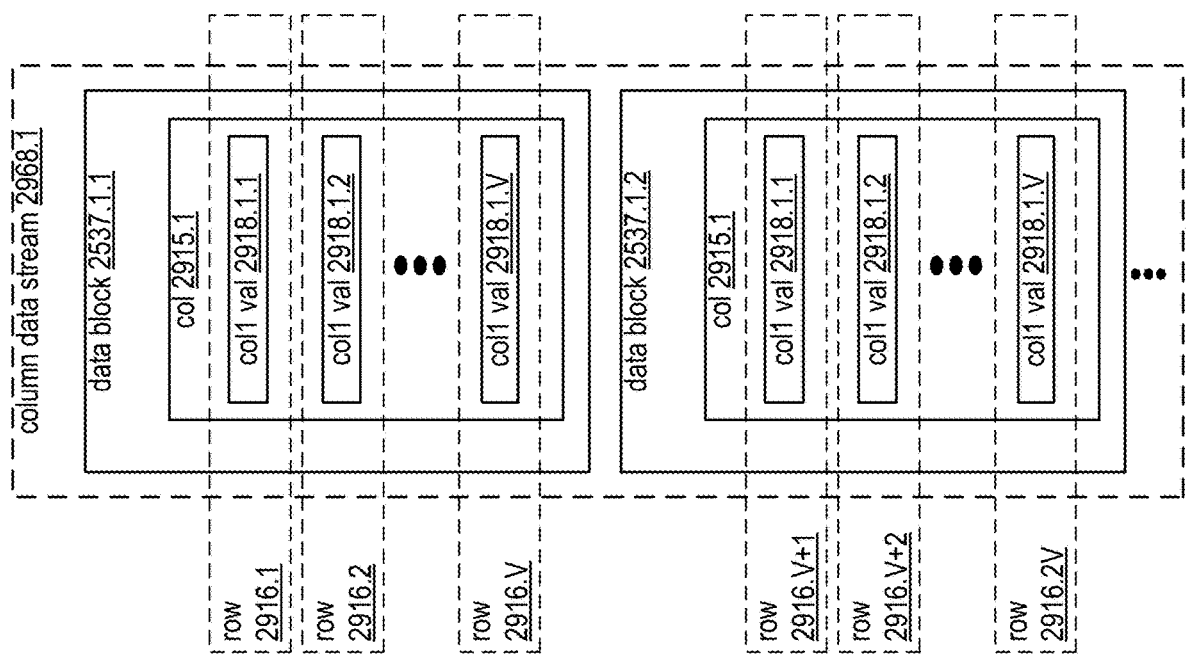
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
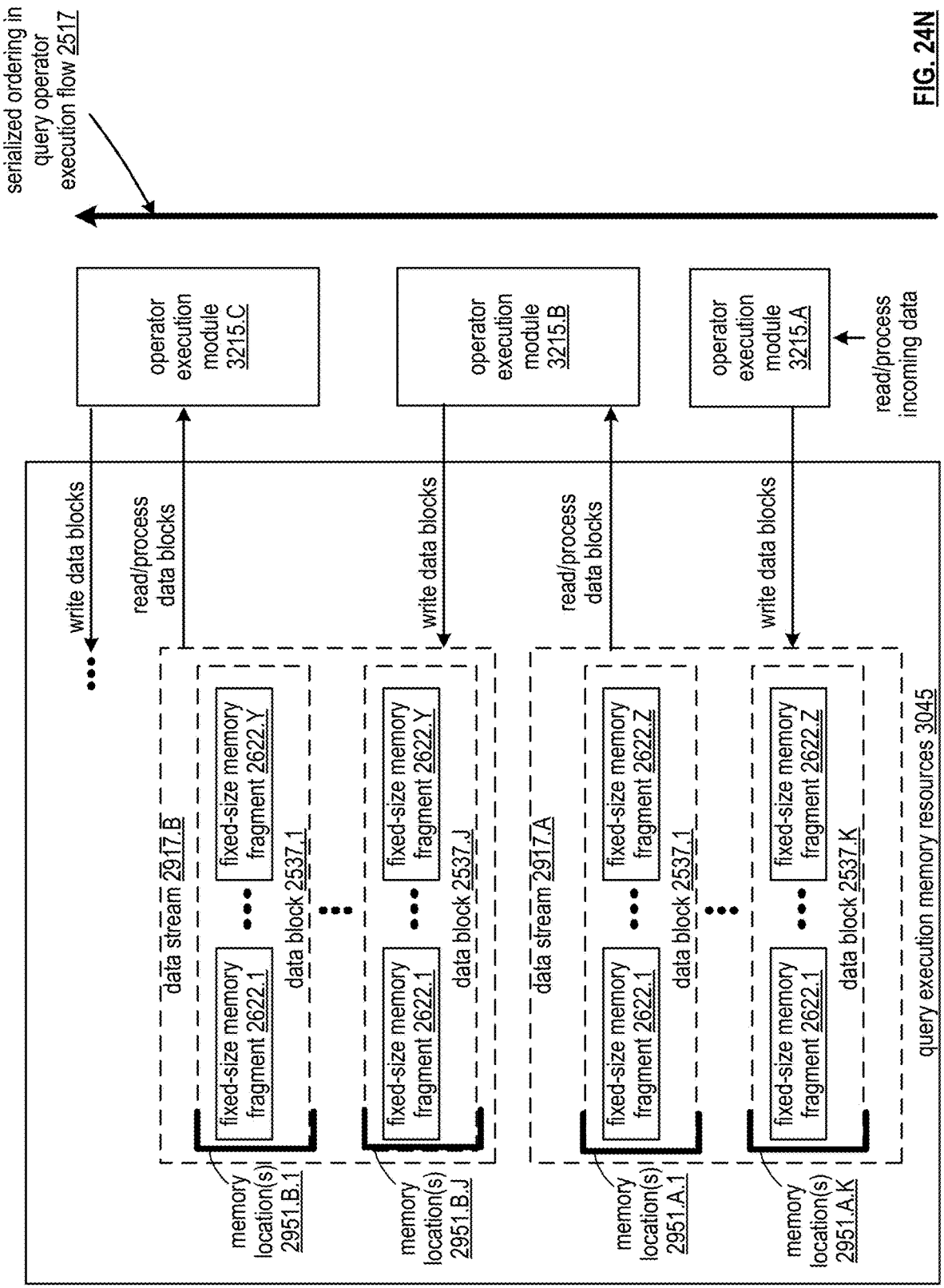
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations to filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 canbe read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

FIGS. 25A-25F illustrate embodiments of a database system 10 operable to execute queries indicating join expressions based on implementing corresponding join processes via one or more join operators. Some or all features and/or functionality of FIGS. 25A-25F can be utilized to implement the database system 10 of FIGS. 24A-24N when executing queries indicating join expressions. Some or all features and/or functionality of FIGS. 25A-25F can be utilized to implement any embodiment of the database system 10 described herein.

Figure 25A:
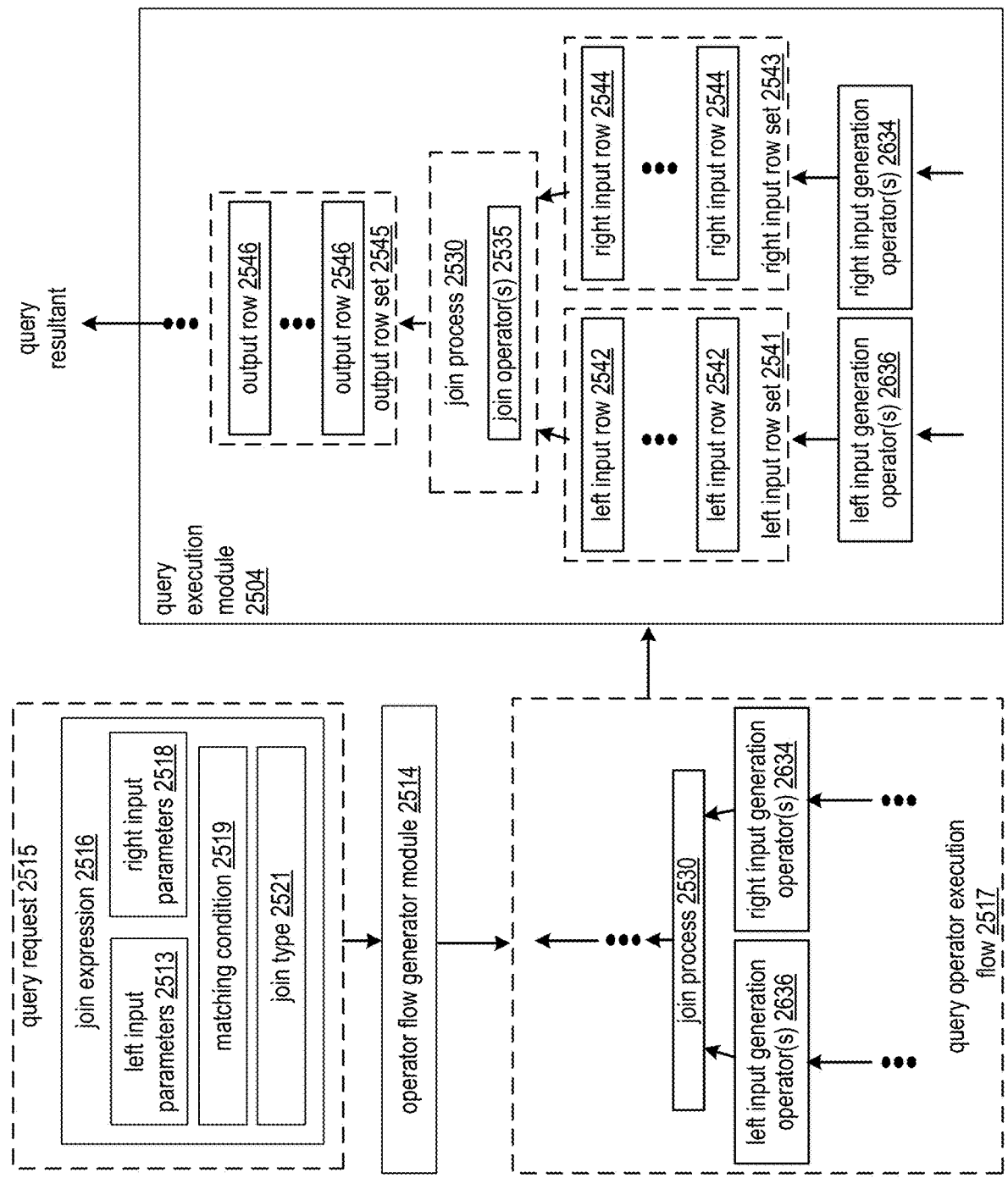
FIG. 25A is a schematic block diagram of a database system executing a join process based on a join expression of a query request in accordance with various embodiments.

FIG. 25A illustrates an example of processing a query request 2515 that indicates a join expression 2516. The join expression 2516 can indicate that columns from one or more tables, for example, indicated by left input parameters 2513 and/or right input parameters 2518, be combined into a new table based on particular criteria, such as matching condition 2519 and/or a join type 2521 of the join operation. For example, the join expression 2516 can be implemented as a SQL JOIN clause, or any other type of join operation in any query language.

The join expression 2516 can indicate left input parameters 2513 and/or right input parameters 2518, denoting how the left input rows and/or right input rows be selected and/or generated for processing, such as which columns of which tables be selected. The left input and right input are optionally not distinguished as left and right, for example, where the join expression 2516 simply denotes input values for two input row sets. The join expression can optionally indicate performance of a join across three or more sets of rows, and/or multiple join expressions can be indicated to denote performance of joins across three or more sets of rows. In the case of a self-join, the join expression can optionally indicate performance of a join across a single set of input rows.

The join expression 2516 can indicate a matching condition 2519 denoting what condition constitutes a left input row being matched with a right input row in generating output of the join operation, which can be based on characteristics of the left input row and/or the right input row, such as a function of values of one or more columns of the left input row and/or the right input row. For example, the matching condition 2519 requires equality between a value of a first column value of the left input rows and a second column value of the right input rows. The matching condition 2519 can indicate any conditional expression between values of the left input rows and right input rows, which can require equality between values, inequality between values, one value being less than another value, one value being greater than another value, one value being less than or equal to another value, one value being greater than or equal to another value, one value being a substring of another value, one value being an array element of an array, or other criteria. In some embodiments, the matching condition 2519 indicates all left input rows be matched with all right input rows. Two values and/or two corresponding rows can meet matching condition 2519 based on comparing favorably to one another and/or based on comparing favorably to the matching condition 2519.

The join expression 2516 can indicate a join type 2521 indicating the type of join to be performed to produce the output rows. For example, the join type 2521 can indicate the join be performed as a one of: a full outer join, a left outer join, a right outer join, an inner join, a cross join, a cartesian product, a self-join, an equi-join, a natural join, a hash join, or any other type of join, such as any SQL join type and/or any relational algebra join operation.

The query request 2515 can further indicate other portions of a corresponding query expression indicating performance of other operators, for example, to define the left input rows and/or the right input rows, and/or to further process output of the join expression.

The operator flow generator module 2514 can generate the query operator execution flow 2517 to indicate performance of a join process 2530 via one or more corresponding operators. The operators of the join process 2530 can be configured based on the matching condition 2519 and/or the join type 2521. The join process can be implemented via one or more serialized operators and/or multiple parallelized branches of operators 2520 configured to execute the corresponding join expression.

The operator flow generator module 2514 can generate the query operator execution flow 2517 to indicate performance of the join process 2530 upon output data blocks generated via one or more left input generation operators 2636 and one or more right input generation operators 2634. For example, the left input generation operators 2636 include one or more serialized operators and/or multiple parallelized branches of operators 2520 utilized to retrieve a set of rows from memory, for example, to perform IO operations, to filter the set of rows, to manipulate and/or transform values of the set of rows to generate new values of a new set of rows for performing the join, or otherwise retrieve and/or generate the left input rows, in accordance with the left input parameters 2513. Similarly, the right input generation operators 2634 include one or more serialized operators and/or multiple parallelized branches of operators utilized to retrieve a set of rows from memory, for example, via IO operators, to filter the set of rows, to manipulate and/or transform values of the set of rows to generate new values of a new set of rows for performing the join, or otherwise retrieve and/or generate the right input rows, in accordance with the right input parameters 2518. The left input generation operators 2636 and right input generation operators 2634 can optionally be distinct and performed in parallel to generate respective left and right input row sets separately. Alternatively, one or more of the left input generation operators 2636 and right input generation operators 2634 can optionally be shared operators between left input generation operators 2636 and right input generation operators 2634 to aid in generating both the left and right input row sets.

The query execution module 2504 can be implemented to execute the query operator execution flow 2517 to facilitate performance of the corresponding join expression 2516. This can include executing the left input generation operators 2636 to generate a left input row set 2541 that includes a plurality of left input rows 2542 determined in accordance with the left input parameters 2513, and/or executing the right input generation operators 2634 to generate a right input row set 2543 that includes a plurality of right input rows 2544 determined in accordance with the right input parameters 2518. The plurality of left input rows 2542 of the left input row set 2541 can be generated via the left input generation operators 2636 as a stream of data blocks sent to the join process 2530 for processing, and/or the plurality of right input rows 2544 of the right input row set 2543 can be generated via the right input generation operators 2634 as a stream of data blocks sent to the join process 2530 for processing.

The join process 2530 can implement one or more join operators 2535 to process the left input row set 2541 and the right input row set 2543 to generate an output row set 2545 that includes a plurality of output rows 2546. The one or more join operators 2535 can be implemented as one or more operators 2520 configured to execute some or all of the corresponding join process. The output rows 2546 of the output row set 2545 can be generated via the join process 2530 as a stream of data blocks emitted as a query resultant of the query request 2515 and/or sent to other operators serially after the join process 2530 for further processing.

Each output rows 2546 can be generated based on matching a given left input row 2542 with a given right input row 2544 based on the matching condition 2519 and/or the join type 2521, where one or more particular columns of this left input row are combined with one or more particular columns of this given right input row 2544 as specified in the left input parameters 2513 and/or the right input parameters 2518 of the join expression 2516. A given left input row 2542 can be included in no output rows based on matching with no right input rows 2544. A given left input row 2542 can be included in one or more output rows based on matching with one or more right input rows 2544 and/or being padded with null values as the right column values. A given right input row 2544 can be included in no output rows based on matching with no left input rows 2542. A given right input row 2544 can be included in one or more output rows based on matching with one or more left input rows 2542 and/or being padded with null values as the left column values.

The query execution module 2504 can execute the query operator execution flow 2517 via a plurality of nodes 37 of a query execution plan 2405, for example, in accordance with nodes 37 participating across different levels of the plan. For example, the left input generation operators 2636 and/or the right input generation operators 2634 are implemented via nodes at a first one or more levels of the query execution plan 2405, such as an IO level and/or one or more inner levels directly above the IO level.

The left input generation operators 2636 and the right input generation operators 2634 can be implemented via a common set of nodes at these one or more levels. Alternatively some or all of the left input generation operators 2636 are processed via a first set of nodes of these one or more levels, and the right input generation operators 2634 are processed via a second set of nodes that have a non-null difference with and/or that are mutually exclusive with the first set of nodes.

The join process 2530 can be implemented via a nodes at a second one or more levels of the query execution plan 2405, such as one or more inner levels directly above the first one or more levels, and/or the root level. For example, one or more nodes at the second one or more levels implementing the join process 2530 receive left input rows 2542 and/or right input rows 2544 for processing from child nodes implementing the left input generation operators 2636 and/or child nodes implementing the right input generation operators 2634. The one or more nodes implementing the join process 2530 at the second one or more levels can optionally belong to a same shuffle node set 2485, and can laterally exchange left input rows and/or right input rows with each other via one or more shuffle operators and/or broadcast operators via a corresponding shuffle network 2480.

Figure 25B:
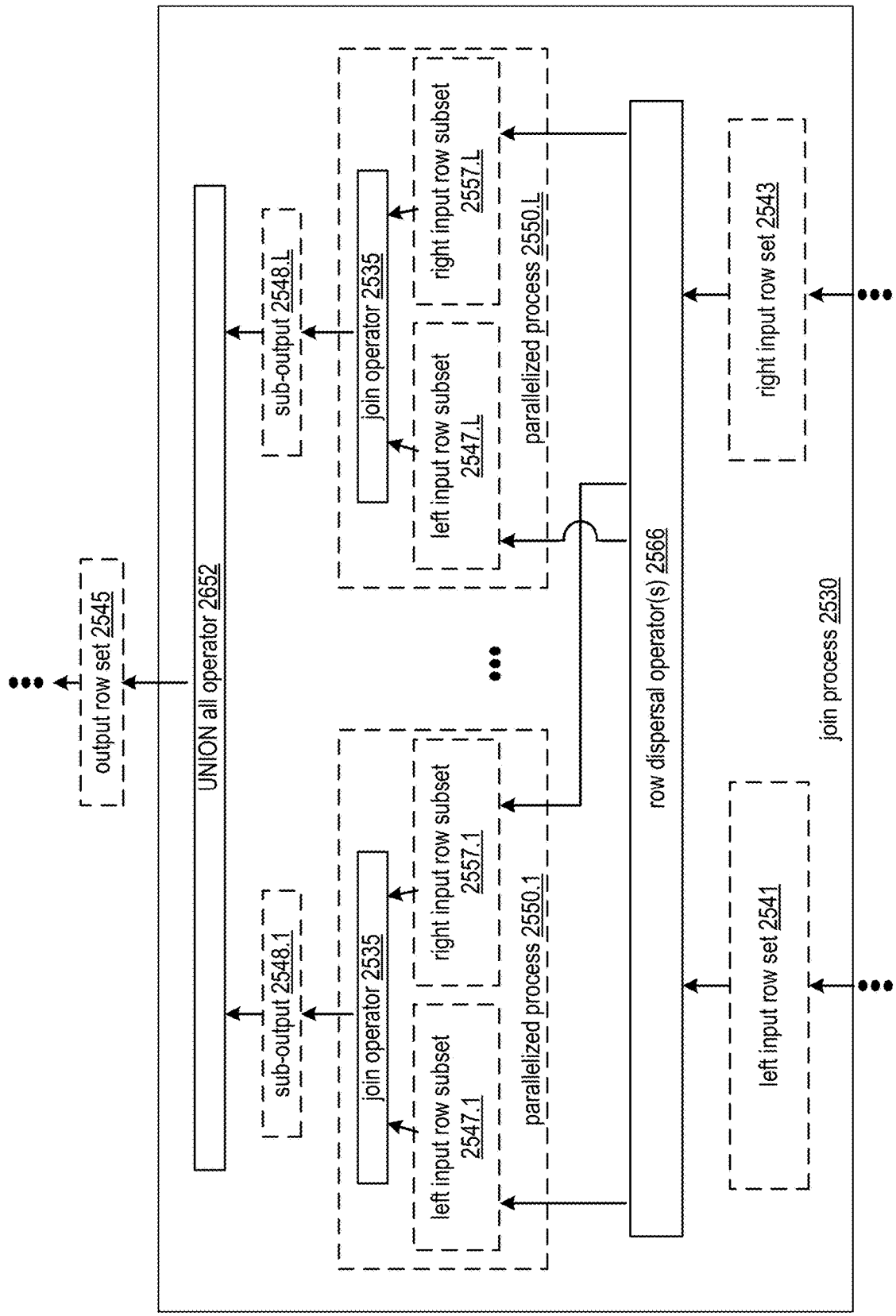
FIGS. 25B-25E are schematic block diagrams of example join processes executed via multiple parallel processes in accordance with various embodiments.

FIG. 25B illustrates an embodiment of a query execution module 2504 executing a join process 2530 via a plurality of parallelized processes 2550.1-2550.L Some or all features and/or functionality of the query execution module 2504 can be utilized to implement the query execution module 2504 of FIG. 25A, and/or any other embodiment of the query execution module 2504 described herein. In other embodiments, the query execution module 2504 of FIG. 25A implements the join process 2530 via a single join operator of a single processes rather than the plurality of parallelized processes 2550.

In some embodiments, the plurality of parallelized processes 2550.1-2550.L are implemented via a corresponding plurality of nodes 37.1-37.L of a same level, such as a given inner level, of a query execution plan 2405 executing the given query. In some embodiments, the plurality of parallelized processes 2550.1-2550.L are implemented via a corresponding plurality of processing core resources 48, such as multiple virtual machine cores, on a same given node 37 and/or across multiple parallelized nodes 37. In some embodiments, the plurality of parallelized processes 2550.1-2550.L canbe implemented as a parallelized set of operator instances 2520 in parallel tracks of a given query operator execution flow 2517. The plurality of parallelized processes 2550.1-2550.L can be implemented as a set via any other set of parallelized and/or distinct memory and/or processing resources.

Each parallelized process 2550 can be responsible for generating its own sub-output 2548 based on processing a corresponding left input row subset 2547 of the left input row set 2541 and processing a corresponding right input row subset 2557. As discussed in further detail herein, each right input row subset 2557 can be a proper subset of the full right input row set 2543 and/or can include all of the right input row set 2543. Alternatively or in addition, each left input row subset 2547 can be a proper subset of the full left input row set 2541 and/or can include all of the left input row set 2541.

The dispersal of the left input row set 2543 into respective left input row subsets 2547.1-2547.L can be performed via one or more row dispersal operators 2566, such as one or more multiplexer operators, one or more tee operators, and/or one or more shuffle operators.

Figure 25C:
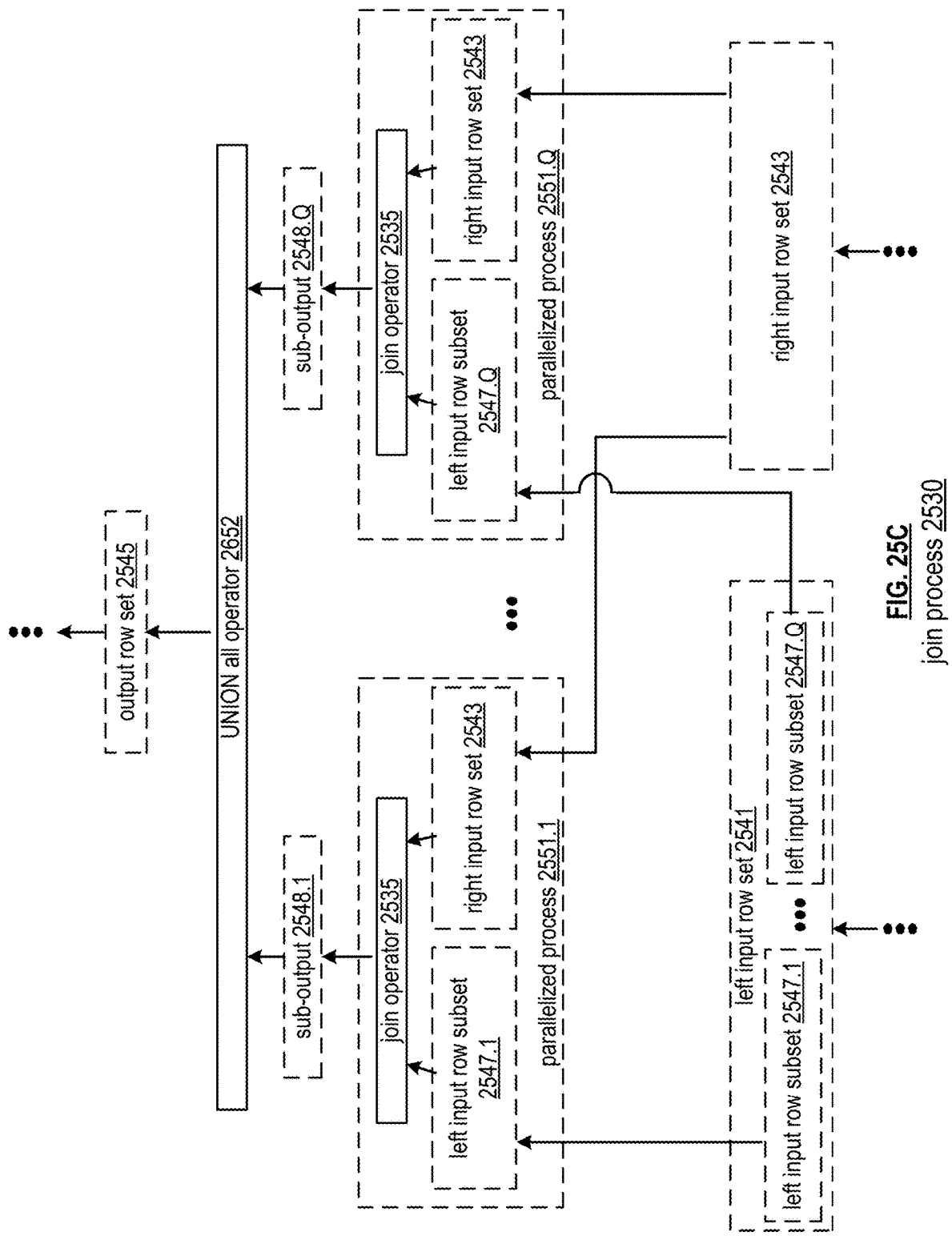

When implemented as a multiplexer operator, a row dispersal operator 2566 can be operable to emit different subsets of a set of incoming rows of an input row set, such as the right input row set 2543 and/or the left input row set 2541, to different parallelized processes for processing, for example, via respective parent operators. Each subset of rows sent to a given parallelized process 2550 can be is mutually exclusive from subsets of rows sent to other parallelized processes 2550, and/or the plurality of subsets of rows sent to the plurality of parallelized process 2550.1-2550.L are collectively exhaustive with respect to the input row set. This can be utilized to facilitate partitioning of a set of left input rows for processing across parallelized processes as illustrated in FIG. 25C.

When implemented as a tee operator, a row dispersal operator 2566 can be operable to emit all of a set of incoming rows of input row set to each different parallelized processes 2550 of the set of parallelized processes 2550.1-2550.L for processing, such as to respective parent operators. Each subset of rows sent to a given parallelized process 2550 is equivalent to that sent to other parallelized processes 2550, and/or the plurality of subsets of rows sent to the plurality of patent parallelized processes 2550 are equivalent to the input row set. This can be utilized to facilitate sharing of all of a same set of right input rows across all parallelized processes as illustrated in FIG. 25C.

When implemented as a set of shuffle operators, a respective set of row dispersal operators 2566 can be operable to share incoming rows with other operators to render all corresponding parallelized processes 2550 receiving all rows for processing, despite each shuffle operator receiving only one input set of rows itself. For example, each parallelized process implements its own shuffle operator to enable this sharing of rows. This can be utilized to facilitate sharing of all of a same set of right input rows across all parallelized processes as illustrated in FIG. 25C.

Each row in the left input row set 2541 can be included in exactly one of the respective left input row subsets 2547, can be included in more than one but less than all of the respective left input row subsets 2547, and/or can be included in every respective left input row subset 2547. Each row in the right input row set 2543 can be included in exactly one of the respective left input row subsets 2557, can be included in more than one but less than all of the respective left input row subsets 2557, and/or can be included in every respective left input row subset 2557. The dispersal and respective processing by the parallelized processing can guarantee that the union outputted via union operator 2652 does not include duplicate rows that should not be included in the output for query correctness and/or is not missing any rows that should be included in the output for query correctness.

FIG. 25C illustrates an embodiment of execution of a join process 2530 via a plurality of parallelized processes 2551.1-2551.Q. Some or all features and/or functionality of FIG. 25C can implement the join process 2530 of FIG. 25B, FIG. 25A, and/or any other embodiment of join process 2530 described herein.

The plurality of parallelized processes 2551.1-2551.Q can implement the plurality of parallel processes 2550.1-2550.L of FIG. 25B, where a given process 2551 of FIG. 25C implements some or all of a given process 2550 of FIG. 25B. Alternatively or in addition, a given plurality of parallelized processes 2551.1-2551.Q can be a plurality of inner, sub-processes of a given parallelized process 2550, where some or all of the plurality of parallel processes 2550.1-2550.L implement their own plurality of inner parallelized sub-processes 2551.1-2551.Q.

Each parallelized process 2551 can be responsible for generating its own sub-output 2548 based on processing a corresponding left input row subset 2547 of the left input row set 2541, and by further processing all of the right input row set. The full output row set 2545 can be generated by applying a UNION all operator 2652 implementing a union across all L sets of sub-output 2548, where all output rows 2546 of all sub-outputs 2548 are thus included in the output row set 2545. The output rows 2546 of a given sub-output 2548 can be generated via the join operator 2535 of the corresponding parallelized process 2555 as a stream of data blocks sent to the UNION all operator 2652.

In some embodiments, each parallelized process 2551 only receives the left input rows 2542 generated by its own one or more child nodes, where each of these child nodes only sends its output data blocks to one parent. The left input row set 2541 can otherwise be segregated into the set of left input row subsets 2547.1-2547.Q, each designated for a corresponding one of the set of parallelized processes 2551.1-2551.Q. The plurality of left input row subsets 2547.1-2547.Q can be mutually exclusive and collectively exhaustive with respect to the left input row set 2541, where each left input row 2542 is received and processed by exactly one parallelized process 2551.

In some embodiments, the right input row set 2543 is generated via another set of nodes that is the same as, overlapping with, and/or distinct from the set of nodes that generate the left input row subsets 2547.1-2547.L. For example, similar to the nodes generating left input row subsets 2547, Q different nodes and/or Q different subsets of nodes that each include multiple nodes generate a corresponding subset of right input rows, where these subsets are mutually exclusive and collectively exhaustive with respect to the right input row set 2543. Unlike the left input rows, all right input rows 2544 can be received by all parallelized processes 2551.1, for example, based on each node of this other set of nodes sending its output data blocks to all L nodes implementing the Q parallelized processes 2551, rather than a single parent. Alternatively, the right input rows 2544 generated by a given node can be sent by the node to one parent implementing a corresponding one of the plurality of parallelized processes 2551.1-2551.Q, where the Q nodes perform a shuffle and/or broadcast process to share received rows of the right input row set 2543 with one another via a shuffle network 2480 to facilitate all Q nodes receiving all of the right input rows 2544. Each right input row 2544 is otherwise received and processed by every parallelized process 2551.

This mechanism can be employed for correctly implementing inner joins and/or left outer joins. In some embodiments, further adaptation of this join process 2530 is required to facilitate performance of full outer joins and/or right outer joins, as a given parallel process cannot ascertain whether a given right row matches with a left row of some or the left input row subset, or should be padded with nulls based on not matching with any left rows.

In some embodiments, to implement a right outer join, the right and left input rows of a right outer join are designated in reverse, enabling the right outer join to be correctly generated based on instead segregating the right input rows of the right outer join across all parallelized processes 2551, and instead processing all left input rows of the right outer join by all parallelized processes 2551.

The left input row set that is segregated across all parallelized processes 2551 vs. the right input row set processed via every parallelized processes 2551 can be selected, for example, based on an optimization process performed when generating the query operator execution flow 2517. For example, for a join specified as being performed upon two sets of input rows, while the input row set segregated amongst different parallelized processes 2551 and the input row set processed via every parallelized processes 2551 could be interchangeably selected, an intelligent selection is employed to optimize processing via the parallelized processes. For example, the input row set that is estimated and/or known to require smaller memory space due to column value types and/or number of input rows meeting the respective parameters is optionally designated as the right input row set 2543, and the larger input row set that is estimated and/or known to require larger memory space is designated as the left input row set 2541, for example, to reduce the full set of right input rows required to be processed by a given parallelized process. In some cases, this optimization is performed even in the case of a left outer join or right outer join, where, if the right hand side designated in the query expression is in fact estimated to be larger than the left hand side, the "left" input row set 2541 that is segregated across all parallelized processes 2551 is selected to instead correspond to the right hand side designated by the query expression, and the "right" input row set 2543 that is segregated across all parallelized processes 2551 is selected to instead correspond to the left hand side designated by the query expression. In other embodiments, the vice versa scenario is applied, where the larger row set is designated as the right input row set 2543 processed by every parallelized process, and where the smaller row set is designated as the left input row set 2541 segregated into subsets each for processing by only one parallelized process.

Figure 25D:
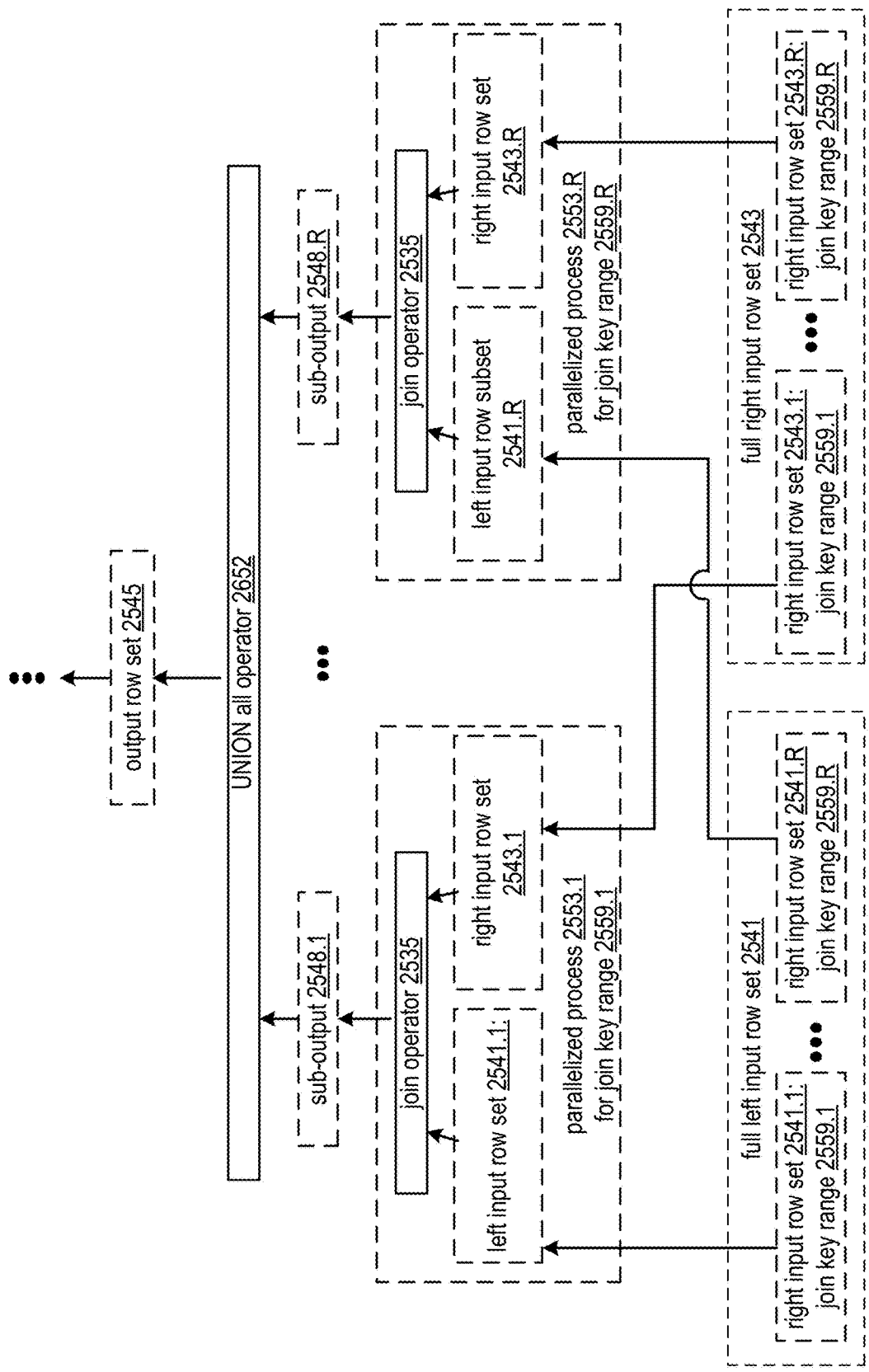

FIG. 25D illustrates an embodiment of execution of a join process 2530 via a plurality of parallelized processes 2553.1-2553.R. Some or all features and/or functionality of FIG. 25D can implement the join process 2530 of FIG. 25B, FIG. 25A, and/or any other embodiment of join process 2530 described herein.

The plurality of parallelized processes 2553.1-2553.R can implement the plurality of parallel processes 2550.1-2550.L of FIG. 25B, where a given process 2553 of FIG. 25D implements some or all of a given process 2550 of FIG. 25B. Alternatively or in addition, a given plurality of parallelized processes 2553.1-2553.R can be a plurality of inner, sub-processes of a given parallelized process 2550, where some or all of the plurality of parallel processes 2550.1-2550.L implement their own plurality of inner parallelized sub-processes 2553.1-2553.R.

Each parallelized process 2553 can be responsible for generating its own sub-output 2548 based on processing a corresponding one of the plurality of subsets of the full left input row set 2541, denoted as left input row sets 2541.1-2541.R, and by further processing a corresponding one of the plurality of subsets of the full right input row set 2543, denoted as right input row sets 2543.1-2543.R.

The left input row sets 2541.1-2541.R can be mutually exclusive and collectively exhaustive with respect to the full left input row set 2541, and can be partitioned by the join key of respective left input rows into a corresponding one of a set of join key ranges 2559.1-2559.R. For example, the join key of a left row is the value of one or more columns compared with values of right rows to determine whether the left row matches with any right rows. Thus, a given left input row sets 2541 from the full set is guaranteed to include all, and only, ones of the rows from the full set that fall within the respective join key range 2559.

Similarly, the right input row sets 2543.1-2543.R can be mutually exclusive and collectively exhaustive with respect to the full left input row set 2543, and also can be partitioned by the join key of respective right input rows into a corresponding one of a set of join key ranges 2559.1-2559.R, which can be identical ranges utilized to partition the left input rows into their respective sets 2541.1-2541.R. For example, the join key of a right row is the value of one or more columns compared with values of right rows to determine whether the left row matches with any right rows.

A given join key range 2559 can specify a single value, a set of continuous values, any set of multiple non-continuous values, and/or another portion of the domain of all possible join keys that is non-overlapping with other join key ranges. Applying the same set of join key ranges 2559.1-2559.R to route both left and right incoming rows to a parallelized process processing all rows having join keys in the respective range guarantees that any two rows in a matching pair of rows to be identified via the join will be processed by the same parallelized process 2553, and will thus be identified in the join process correctly. Thus, each parallelized process 2553 is guaranteed not to be missing any potential matches, and the output emitted by the union ALL operator can be therefore guaranteed to be correct.

In some cases, the value of null is implemented via own join key range 2559, is included in a given join key range 2559 with other non-null values, or is not included any join key ranges 2559 based on being filtered out and/or assigned to parallelized processes in a different manner.

Figure 25E:
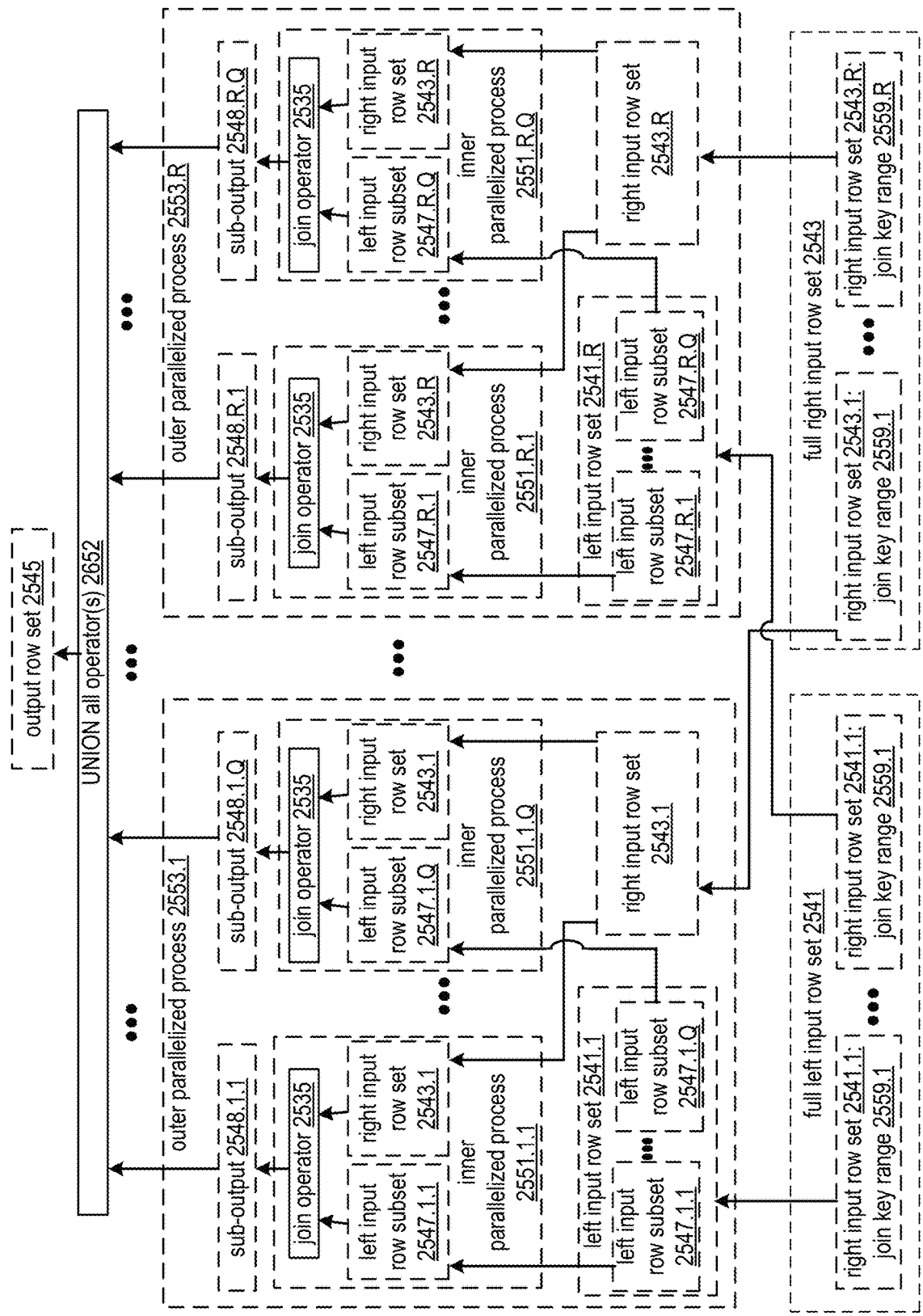

FIG. 25E illustrates an embodiment where the mechanisms of parallelization of both FIGS. 25C and 25D are combined to implement a join process. Some or all features and/or functionality of FIG. 25E can implement the join process 2530 of FIG. 25B, FIG. 25A, and/or any other embodiment of join process 2530 described herein.

The plurality of parallelized processes 2553.1-2553.R of FIG. 25D can be implemented as a plurality of outer parallelized processes, each performing its own set of inner parallelized processes implemented via the parallelized processes 2551.1-2551.Q of FIG. 25C. The number Q of inner parallelized processes 2551 implemented via a given outer parallelized process 2553 can be the same or different for different outer parallelized processes 2553.

The plurality of outer parallelized processes 2553.1-2553.R and/or the plurality of inner parallelized processes 2551.1-2551.Q across all of the plurality of outer parallelized processes 2553.1-2553.R can implement the plurality of parallel processes 2550.1-2550.L of FIG. 25B, where a given process 2553 and/or 2551 of FIG. 25E implements some or all of a given process 2550 of FIG. 25B. Alternatively or in addition, a given plurality of parallelized processes 2553.1-2553.R canbe a plurality of inner, sub-processes of a given parallelized process 2550, where some or all of the plurality of parallel processes 2550.1-2550.L implement their own plurality of inner parallelized sub-processes 2553.1-2553.R, which each in turn implement their own plurality of parallelized processes 2551.1-2551.Q.

This embodiment can be preferred in reducing the size of hash map 2555 stored via each parallelized instance by leveraging partitioning via join key range, while further parallelization of the left input set of a given join key range further improves performance of implementing the join process for a given join key range 2559. Other embodiments only implement one of the forms of parallelization, or neither, in performing join processes 2530.

Figure 25F:
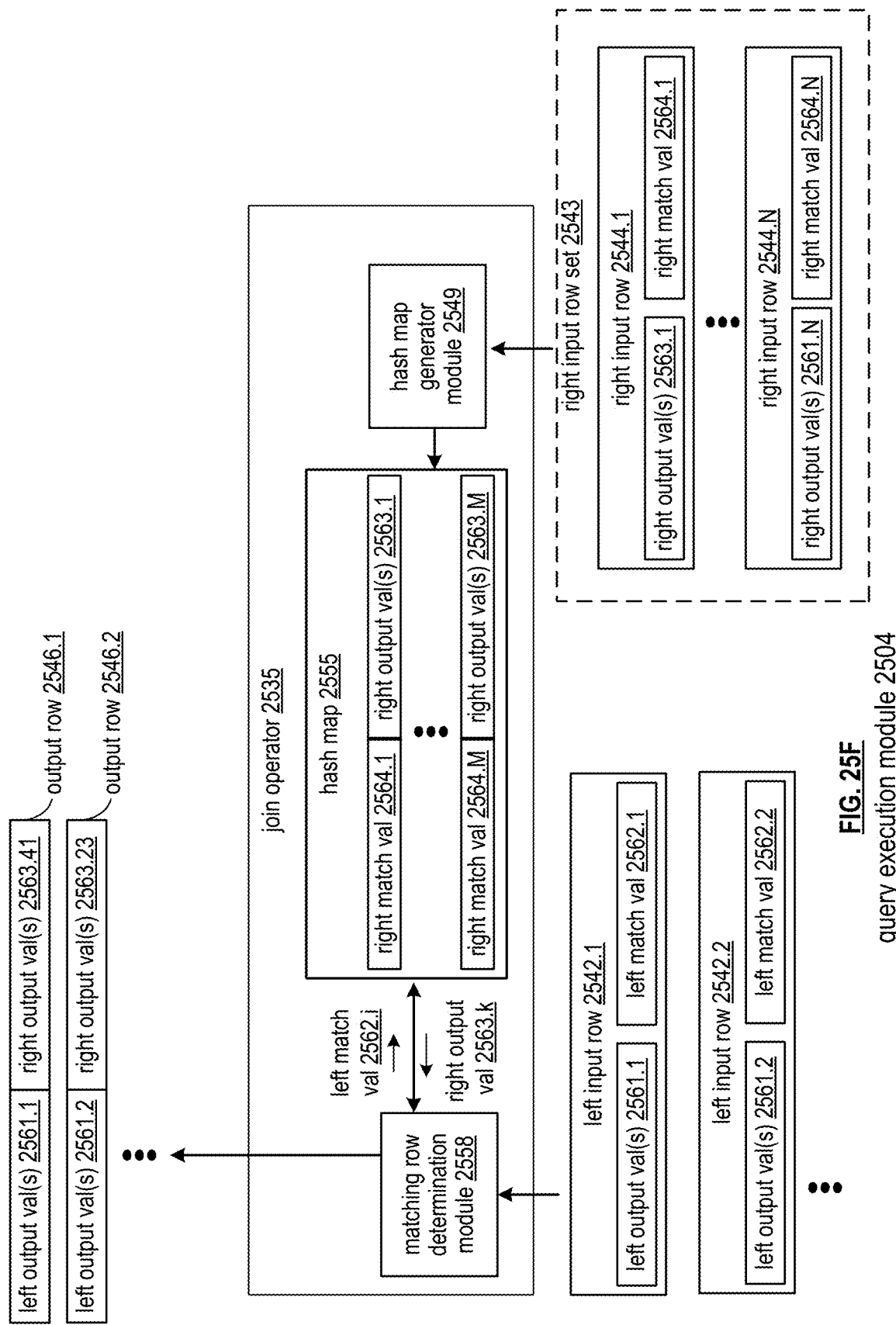
FIG. 25F is a schematic block diagram of a query execution module executing a join operator based on utilizing a hasp map generated from right input rows in accordance with various embodiments.

FIG. 25F illustrates an embodiment of a query execution module 2504 executing a join operator 2535. The embodiment of implementing the join operator 2535 of FIG. 25F can be utilized to implement the join process 2530 of FIG. 25A and/or can be utilized to implement the join operator 2535 executed via each of a set of parallelized processes 2550 of FIG. 25B, and/or via each of a set of parallelized processes 2551 and/or 2553 of FIG. 25D, 25D, and/or 25E.

The join operator can process all right input rows 2544.1-2544.N of a right input row set 2543, and can process some or all left input rows 2542, such as only left input rows of a corresponding left input row subset 2547. The right input rows 2544 and/or left input rows can be received as one or more streams of data blocks.

A plurality of left input rows 2542 can have a respective plurality of columns each having its own column value. One or more of these column values can be implemented as left output values 2561, designated for output in output rows 2546, where these left output values 2561, if outputted, are padded with nulls or combined with corresponding right rows when matching condition 2519 is met. One or more of these column values can be implemented as left match values 2562, designated for use in determining whether the given row matches with one or more right input rows. The left match values 2562 can implement the join keys discussed previously that are optionally utilized to partition incoming rows into distinct parallelized portions for processing as discussed in conjunction with FIGS. 25D and 25E. These left match values 2562 can be distinct columns from the columns that include left output values 2561, where these columns are utilized to identify matches only as required by the matching condition 2519, but are not to be emitted as output in output rows 2546. Alternatively, some or all of these left match values 2562 can same columns as one or more columns that include left output values 2561, where these columns are utilized to not only identify matches as required by the matching condition 2519, but are further emitted as output in output rows 2546.

In some cases, the left input rows 2542 utilize a single column whose values implement both the left output values 2561 and the left match values 2562. In other cases, the left input rows 2542 can utilize multiple columns, where a first subset of these columns implement one or more left output values 2561, where a second subset of these columns implement one or more left match values 2562, and where the first subset and the second subset are optionally equivalent, optionally have a non-null intersection and/or a non-null difference, and/or optionally are mutually exclusive. Different columns of the left input rows can optionally be received and processed in different column streams, for example, via a distinct set of processes operating in parallel with or without coordination.

Similarly to the left input rows, the plurality of right input rows 2544 can have a respective plurality of columns each having its own column value. One or more of these column values can be implemented as right output values 2563, designated for output in output rows 2546, where these left output values 2561, if outputted, are padded with nulls or combined with corresponding left rows when matching condition 2519 is met. One or more of these column values can be implemented as left match values 2564, designated for use in determining whether the given row matches with one or more left input rows. The right match values 2564 can implement the join keys discussed previously that are optionally utilized to partition incoming rows into distinct parallelized portions for processing as discussed in conjunction with FIGS. 25D and 25E. These right match values 2564 can be distinct columns from the columns that include right output values 2563, where these columns are utilized to identify matches only as required by the matching condition 2519, but are not to be emitted as output in output rows 2546. Alternatively, some or all of these right match values 2564 can be implemented via same columns as one or more columns that include left output values 2561, where these columns are utilized to not only identify matches as required by the matching condition 2519, but are further emitted as output in output rows 2546.

In some cases, the right input rows 2544 utilize a single column whose values implement both the left output values 2561 and the left match values 2564. In other cases, the right input rows 2544 can utilize multiple columns, where a first subset of these columns implement one or more right output values 2563, where a second subset of these columns implement one or more right match values 2564, and where the first subset and the second subset are optionally equivalent, optionally have a non-null intersection and/or a non-null difference, and/or optionally are mutually exclusive. Different columns of the right input rows can optionally be received and processed in different column streams, for example, via a distinct set of processes operating in parallel with or without coordination.

Some or all of the set of columns of the left input rows can be the same as or distinct from some or all of the set of columns of the right input rows. For example, the left input rows and right input rows come from different tables, and include different columns of different tables. As another example, the left input rows and right input rows come from different tables each having a column with shared information, such as a particular type of data relating the different tables, where this column in a first table from which the left input rows are retrieved is used as the left match value 2562, and where this column in a second table from which the right input rows are retrieved is used as the right match value 2564. As another example, the left input rows and right input rows come from a same table, for example, where the left input row set 2541 and right input row set 2543 are optionally equivalent sets of rows upon which a self-join is performed.

The join operator 2535 can utilize a hash map 2555 generated from the right input row set 2543, mapping right match values 2564 to respective right output values 2563. For example, the raw right match values 2564 and/or other values generated from, hashed from, and/or determined based on the raw right match values 2564, are stored as keys of the hash map. In the case where the right match value 2564 for a given right input row includes multiple values of multiple columns, the key can optionally be generated from and/or can otherwise denote the given set of values.

These keys can be implemented as, and/or can be generated as a deterministic function of such as a hash function of, join keys of incoming rows that utilized to identify whether the join's matching condition is satisfied. The join keys stored in a given hash map can correspond to join keys of a plurality of possible keys for the join, and/or only the join keys in the join key range 2559 that this hash map is generated for, where the given input row set 2541 utilized to generate the hash map 2555 is one of a plurality of distinct input row sets 2541.1-2541.R for a respective join key range 2559 of the plurality of distinct join key ranges 2559.1-2559.R.

The right match values 2564 in entries the hash map 2555 as corresponding keys of the hash map 2555 can each denote respective right output values 2563, for example, based on being mapped to row numbers and/or pointers to the respective row for the respective right output values 2563. Rather than the hash map storing the raw right output values 2563 themselves in its entries, these values can be denoted as row numbers and/or pointers mapped to a given key (e.g. given right match value 2564), denoting the storage location of the respective one or more right output values 2563 of a respective row, such as its ordering in a list of rows, an offset and/or other location information for this respective row in a corresponding column stream stored in query execution memory resources.

In some embodiments, the join operator 2535 be implemented as a hash join, and/or the join operator 2535 can utilize the hash map 2555 generated from the right input row set 2543 based on being implemented as a hash join.

The number of entries M of the hash map 2555 is optionally strictly less than the number of right input rows N based on one or more right input rows 2544 having a same right match value 2564 and/or otherwise mapping to the same key generated from their right match values. These right match values 2564 can thus be mapped to multiple corresponding right output values 2563 of multiple corresponding right input rows 2544. The number of entries M of the hash map 2555 is optionally equal to N in other cases based on no pairs of right input rows 2544 sharing a same right match value 2564 and/or otherwise not mapping to the same key generated from their right match values.

The join operator 2535 can generate this hash map 2555 from the right input row set 2543 via a hash map generator module 2549. Alternatively, the join operator can receive this hash map and/or access this hash map in memory. In embodiments where multiple parallelized processes 2550 are employed, each parallelized processes 2550 optionally generates its own hash map 2555 from the full set of right input rows 2544 of right input row set 2543. Alternatively, as the hash map 2555 is equivalent for all parallelized processes 2550, the hash map 2555 is generated once, and is then sent to all parallelized processes and/or is then stored in memory accessible by all parallelized processes.

The join operator 2535 can implement a matching row determination module 2558 to utilize this hash map 2555 to determine whether a given left input row 2542 matches with a given right input row 2543 as defined by matching condition 2519. For example, the matching condition 2519 requires equality of the column that includes left match values 2562 with the column that includes right match values 2564, or indicates another required relation between one or more columns that includes one or more corresponding left match values 2562 with one or more columns that include one or more right match values 2564. For a given incoming left input row 2542.i, the matching row determination module 2558 can access hash map 2555 to determine whether this given left input row's left match value 2562 matches with any of the right match values 2564, for example, based on the left match value being equal to and/or hashing to a given key and/or otherwise being determined to match with this key as required by matching condition 2519. In the case where a match is identified as a right input row 2544k, the right output value 2563 is retrieved and/or otherwise determined based on the hash map 2555, and the respective output row 2546 is generated to include the new row generated to include both the one or more left output values 2561.i of the left input row 2542.i, as well as the right output values 2563.k of the identified matching right input row 2544k.

In this example, a first output value includes left output value 2561.1 and right output value 2563.41 based on the left match value 2562.1 of left input row 2542.1 being determined to be equal to, or otherwise match with as defined by the matching condition 2519, the right match value 2564.41 of the right input row 2542.41. Similarly, a second output value includes left output value 2561.2 and right output value 2563.23 based on the left match value 2562.2 of left input row 2542.2 being determined to be equal to, or otherwise match with as defined by the matching condition 2519, the right match value 2564.23 of the right input row 2542.23.

While not illustrated, in some cases, one or left match values 2562 of one or more left input rows 2542 are determined match with no right match values 2564 of any right input rows 2544, for example, based on matching row determination module 2558 searching the hash map for these raw and/or processed left match values 2562 and determining no key is included in the hash map, or otherwise determining no right match value 2564 is equal to, or otherwise matches with as defined by the matching condition 2519, the given left match value 2562. The respective left output values of these left input rows 2542 can be padded with null values in output rows 2546, for example, in the case where the join type is a full outer join or a left outer join. Alternatively, the respective left output values of these left input rows 2542 are not emitted in respective output rows 2546, for example, in the case where the join type is an inner join or a right outer join.

While not illustrated, in some cases, one or left match values 2562 of one or more left input rows 2542 are determined match with right match values 2564 of multiple right input rows 2544, for example, based on matching row determination module 2558 searching the hash map for these raw and/or processed left match values 2562 and determining a key is included in the hash map 2555 that maps to multiple right output values 2563 of multiple right input rows 2544. The respective left output values of these left input rows 2542 can be emitted in multiple corresponding output rows 2546, where each of these multiple corresponding output rows 2546 includes the right output values 2563 of a given one of the multiple right input rows 2544. For example, if the left match values 2562 of a given left input rows 2542 matches with right match values 2564 of three right input rows 2544, the left match values 2562 is emitted in three output rows 2546, each including the respective one or more right output values of a given one of the three right input rows 2544.

While not illustrated, in some cases, after processing the left input rows, one or more or right match values 2562 of one or more right input rows 2544 are determined not to have matched with any left match values 2562 of any of the received left input rows 2542, for example, based on matching row determination module 2558 never accessing these entries having these keys in the hash map when identifying matches for the left input rows. For example, execution of the join operator 2535 implementing a full outer join or a right join includes tracking the right input rows 2544 having matches, and all other remaining rows of the hash map are determined to not have had matches, and thus never had their output values 2563 emitted. In the case of a full outer join or a right join, the output values 2563 of these remaining, unmatched rows can be emitted as output rows 2546 padded with null values.

FIGS. 26A-26E illustrate embodiments of a database system 10 operable to execute queries indicating join expressions and row output maximum limits based on executing limit-adapted join processes to generate limit-based output row sets. Some or all features and/or functionality of FIGS. 26A-26E can be utilized to implement the join processes of FIGS. 25A-25F and/or can be utilized to implement database system 10 of FIGS. 24A-24N when executing queries indicating join expressions. Some or all features and/or functionality of FIGS. 26A-26E can be utilized to implement any embodiment of the database system 10 described herein.

Hash joins, such as execution of join operators 2535 utilizing hash map 2555, can require that the right hand side, such as the right input row set 2543, must EOF or otherwise all be received before the join operator emits any output rows. For example, as the join requires emitting values matching left input rows using the hash map, the building of the hash map 2555 must be complete to guarantee all respective matches for a given left input row are identified and reflected in respective output. This induced limitation by nature of implementing a hash join can create a bottleneck in query execution and/or can render the corresponding join operator as not pipelining well.

Some queries processed by database system 10 can be implemented as limit queries and/or can otherwise impose a maximum limit on the number of output rows that are emitted. Once this maximum limit number of output rows is reached, the query can terminate.

Without adapting a join process based on such a limit, for such limit queries involving a join, such as a SQL query expression that includes "SELECT*FROM massiveTableA INNER JOIN massiveTableB ON . . . LIMIT 10" where a massiveTableA and massiveTableB are thus implemented as left input row set 2541 and right input row set 2543, lot of "extra" work can be required (e.g. building a hash map 2555 for all of massiveTableB) to ultimately output a tiny number of rows.

When a limit is implemented, for example, with a small limit value that is lower than a threshold limit value and/or smaller than a threshold percentage of the known and/or expected number of rows in the right input row set and/or the left input row set, a transformation can be applied to split a corresponding join into two separate joins that together will produce the same results as the original join. One join can be implemented to do significantly less work than the original join and can be expected to therefore output results much quicker, hopefully triggering the top limit quickly and allowing the query to finish. This processing of query expression by implementing a limit-adapted join process as presented in conjunction with FIGS. 26A-26E can improve the technology of database systems by improving efficiency of query executions that require performance of query expressions that include join expressions and impose an output maximum row limit.

Figure 26A:
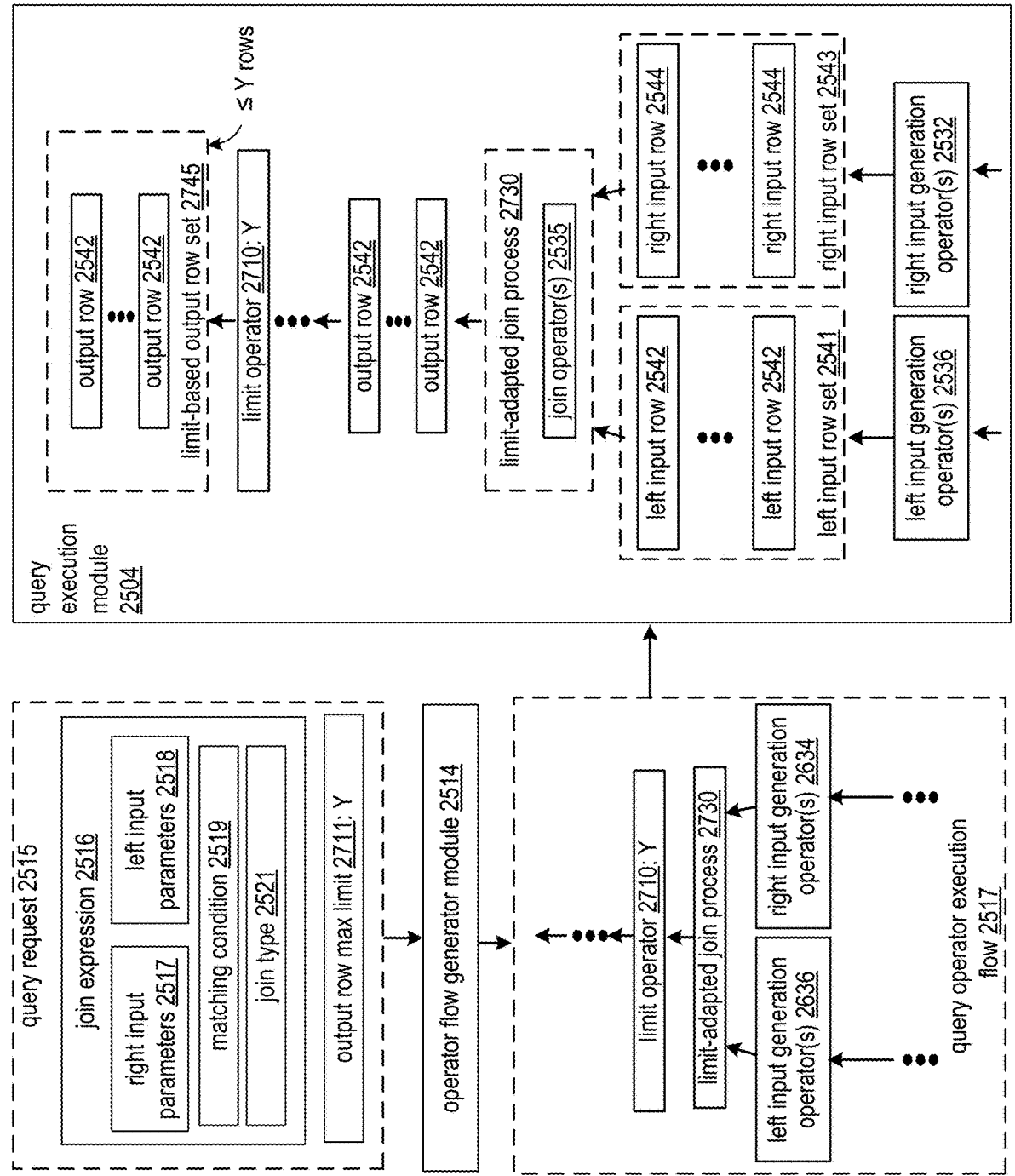
FIG. 26A is a schematic block diagram of a database system executing a limit-adapted join process based on a limit applied to a join expression of a query request in accordance with various embodiments.

FIG. 26A illustrates an embodiment of executing a query that indicates performance of a join expression 2516 and further indicates an output row maximum limit 2711, having a value of Y in this example. The performance of the join expression 2516 can include executing a limit-adapted join process 2730 via one or more join operators 2535. Some or all features and/or functionality of the implementation of the limit-adapted join process 2730 of FIG. 26A can be utilized to implement the join operator 2535 of FIG. 25C, and/or to implement any other embodiment of join operator 2535 and/or join process 2530 described herein.

The query operator execution flow 2517 can indicate performance of a limit-adapted join process 2730, which can be adapted from any embodiment of join process 2530 described herein. The output of the limit-adapted join process 2730 can be processed by a limit operator 2710.

Executing the query operator execution flow 2517 can include performing the limit-adapted join process 2730 via execution of one or more join operators 2535. The output rows 2546 emitted by the limit-adapted join process 2730 can be processed by limit operator 2710, which can emit these output rows 2546 accordingly until the output row max limit 2711 is reached, or until all output rows are generated and emitted by the limit-adapted join process 2730. For example, the limit operator 2710 emits a limit-based output row set 2745, which can be guarantees to include less than or equal to Y rows. The limit-based output row set 2745 only includes less than Y rows when full execution of the limit-adapted join process 2730 emits less than Y rows, or when additional operators such as subsequent filtering limits the output rows to less than Y rows. Once the limit operator 2710 emits Y rows, no further rows are emitted, and/or the query execution can automatically terminate, even if limit-adapted join process 2730 has not finished processing and/or outputting all rows.

Figure 26B:
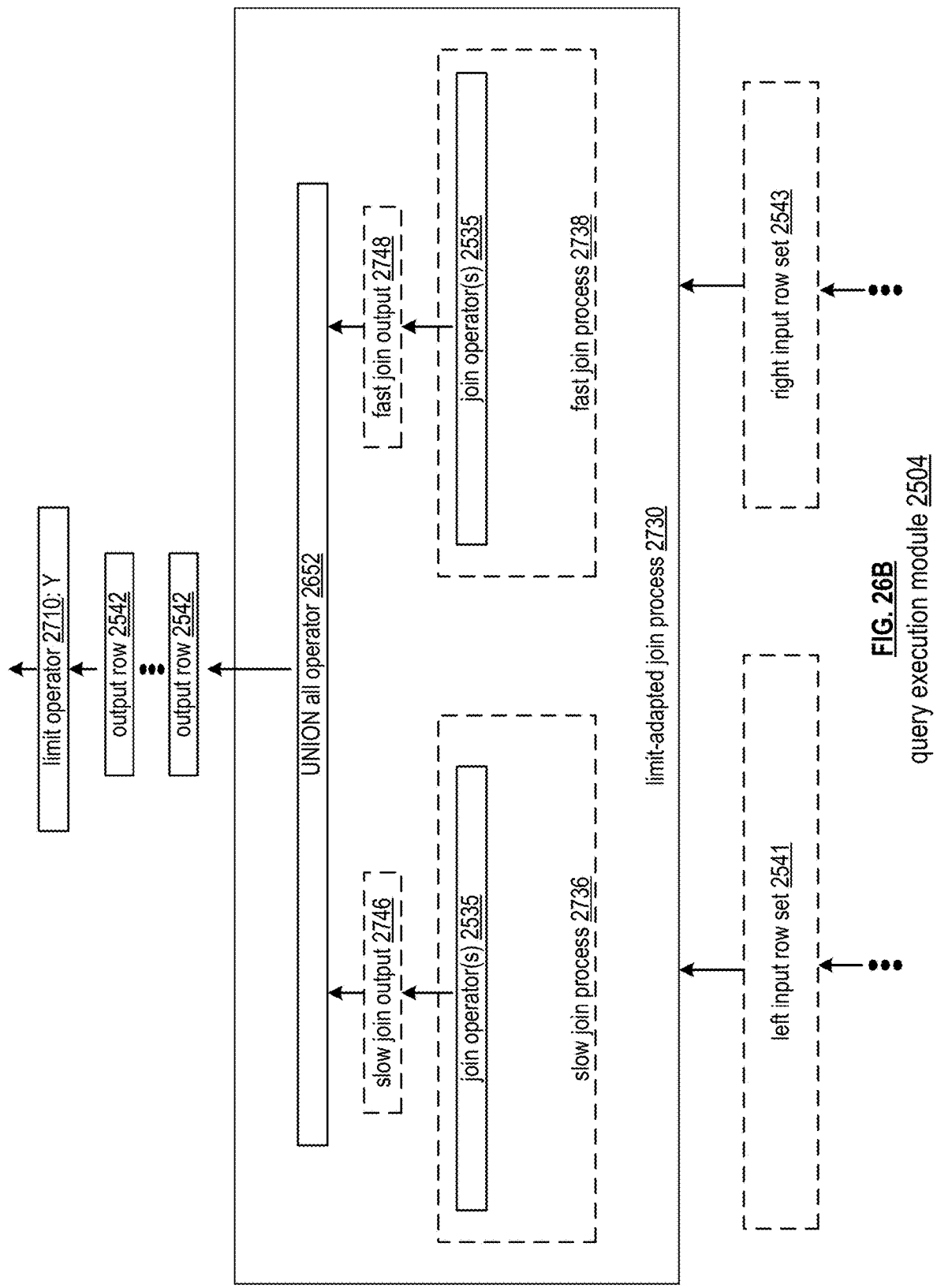
FIG. 26B is a schematic block diagram of a query execution module executing a limit-adapted join process that includes a slow join process executed in parallel with a fast join process in accordance with various embodiments.

FIG. 26B illustrates an embodiment of a limit-adapted join process 2730 that implements a corresponding join operation via a slow join process 2736 and a fast join process 2738 that each implement at least one join operator 2535. Some or all features and/or functionality of the limit-adapted join process 2730 can be utilized to implement the limit-adapted join process 2730 of FIG. 26A, any other embodiment of the limit-adapted join process described herein, and/or any embodiment of join process 2530 and/or join operator 2535 described herein. Slow join process 2736 and/or fast join process 2738 can be implemented via any features and/or functionality of a join process 2530 and/or of execution of one or more join operators 2535 described herein.

The fast join process can be implemented to emit some or all of its output rows of fast join output 2748 output more quickly than the slow join process emits output rows of its slow join output 2746. A UNION all operator 2652 can be applied to the slow join output 2746 and the fast join output 2748 to emit the corresponding output of the join process. In other embodiments, more than two join processes are implemented, for example, configured to generate output at three or more different respective speeds.

In particular, the slow join process 2736 and fast join process 2738 can be configured such that the union of the respective fast join output and the slow join output, if completed, is equivalent to that of a corresponding join process being implemented, despite the given join process being split into two processes. The union of the output of slow join process 2736 and fast join process 2738 can otherwise be configured and/or guaranteed to be semantically equivalent to the join expression 2516 of the given query.

In some embodiments, the slow join process 2736 is implemented via a first set of processing resources and the fast join process 2738 is implemented via a second set of processing resources distinct from the first set of processing resources. For example, the slow join process 2736 is implemented via a first set of one or more nodes 37 and/or a first set of parallel processes 2550, and the fast join process 2738 is implemented via a second set of one or more nodes 37 and/or a second set of parallel processes 2550, where the first set of one or more nodes 37 and second set of one or more nodes 37 are mutually exclusive, or where the first set of parallel processes 2550 and second set of parallel processes 2550 are mutually exclusive. Alternatively, some or all of the slow join process 2736 and the fast join process 2738 is implemented via shared resources, such as a same one or more nodes 37 and/or a same one or more parallelized processes 2550.

In some embodiments, the limit-adapted join process 2730 of FIG. 26B implements a given join operator 2535 executed via a given parallelized process 2550 and/or executed via a given node 37. For example, a given parallelized process 2550 implements the slow join process 2736, the fast join process 2738, and/or the UNION all operator 2652 upon its respective input, where the emitted output rows across multiple parallelized processes 2550 each implementing this limit-adapted join process for their respective input undergo a further UNION all operator 2652 as discussed in conjunction with FIG. 26B.

In some embodiments, placing the fast join process on the right hand side of the UNION all can be favorable based on a scheduler implemented by the query execution module 2504 generally avoid running operators for the "slow join" until the "fast join" finishes.

Figure 26C:
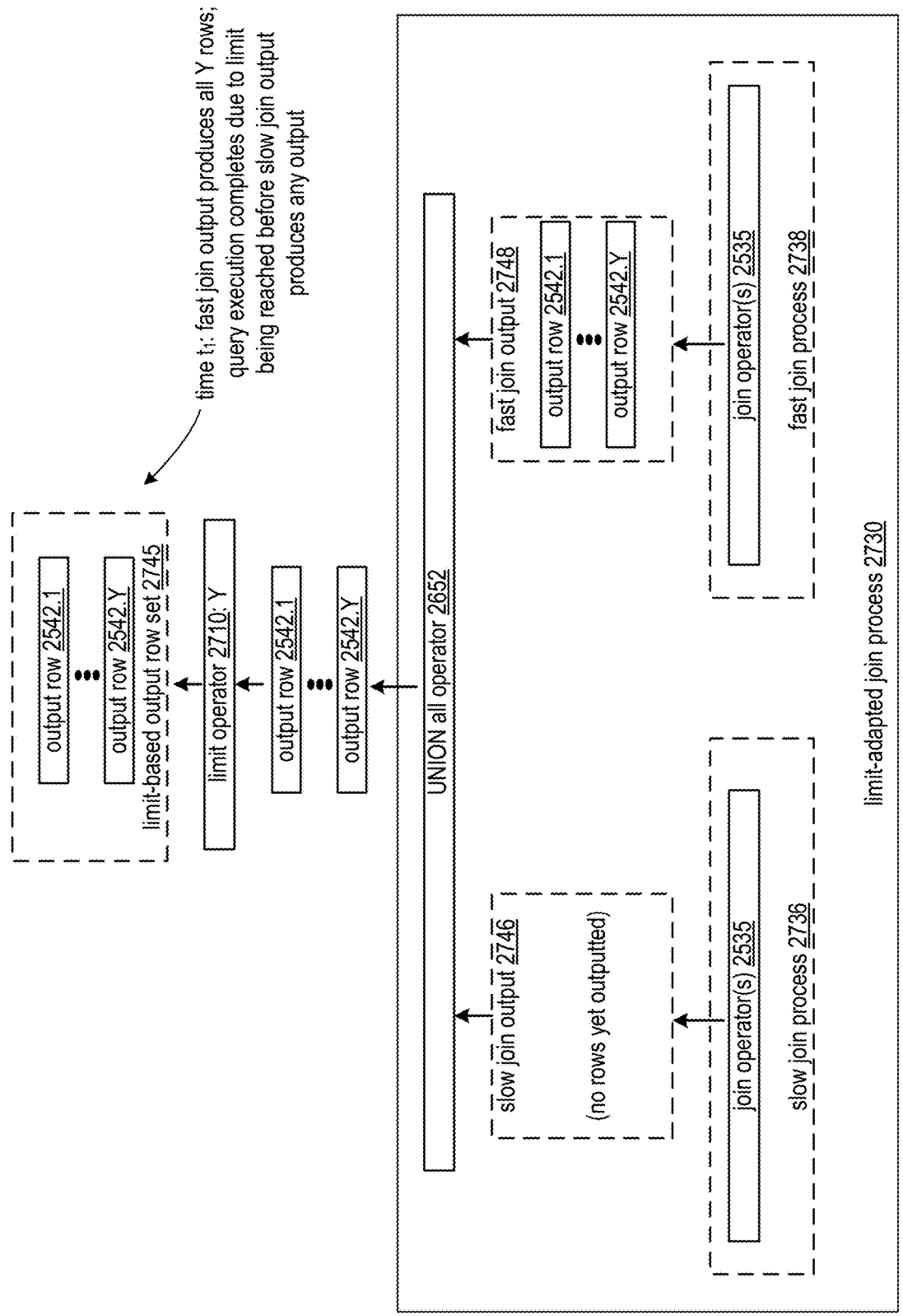
FIG. 26C is a schematic block diagram of a query execution module executing a limit-adapted join process where all of a limit-based output row set is produced via a fast join process in accordance with various embodiments.

FIG. 26C illustrates an example embodiment of executing a limit-adapted join process of FIG. 26B where the limit operator 2710 emits limit-based output row set 2745 to include output emitted by only the fast join process 2738. Some or all features and/or functionality of the limit-adapted join process 2730 of FIG. 26C can be utilized to implement any other embodiment of the limit-adapted join process 2730, join process 2530, and/or join operator 2535 described herein.

In this example, the fast join process 2738 generates and emits at least Y output rows 2546 of the fast join output 2748 in a stream of data blocks before slow join process 2736 emits any output rows of slow join output 2746. Upon emitting the first Y output rows it receives 2542.1-2542.Y by the limit operator 2710 at a time $t_1$ after some time to that the limit-adapted join process 2730 was initiated, completion of the query is triggered, where all output rows of the limit-based output row set 2745 were emitted by the fast join process. This example illustrates how the query can be completed faster than if no limit-adapted join process 2730 were implemented, particular where performing a corresponding single join process would be as slow as, or slower than, the slow join process 2736.

In other cases, at least some of the limit-based output row set 2745 includes output rows of slow join output 2746, for example, based on the slow join process 2736 ultimately beginning to emit rows before the limit Y is reached. In such cases, the limit-based output row set 2745 can include more rows from the fast join output than from the slow join output, such as substantially more rows from the fast join output, based on the fast join output beginning to emit its output slower than the slow join process.

Figure 26D:
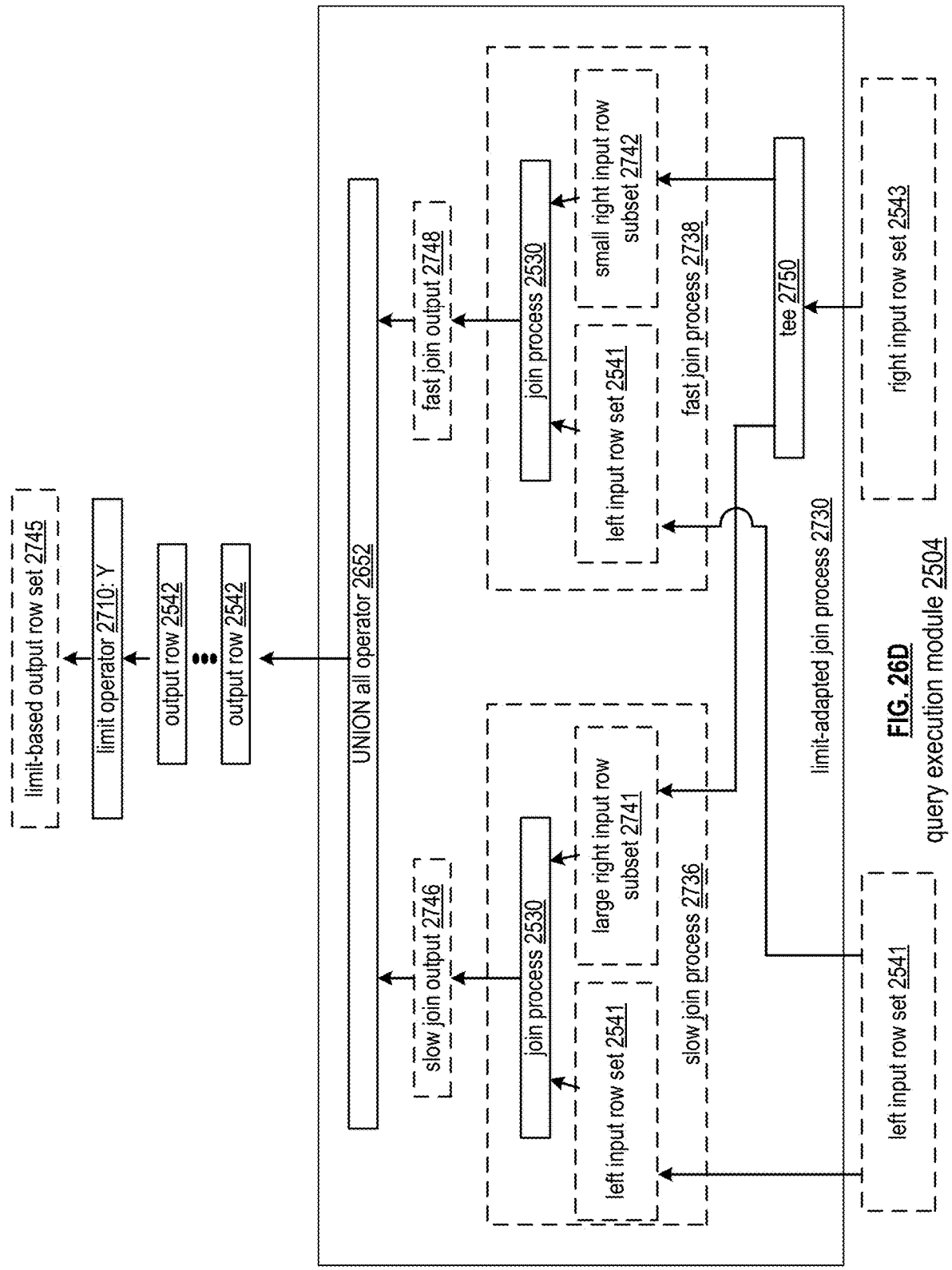
FIG. 26D is a schematic block diagram of a query execution module executing a limit-adapted join process that includes a slow join process performed upon a large right input row subset and a fast join process performed upon a small right input row subset in accordance with various embodiments.

FIG. 26D illustrates an example embodiment of implementing limit-adapted join process 2730. Some or all features and/or functionality of the limit-adapted join process 2730 of FIG. 26D can be utilized to implement the limit-adapted join process 2730 of FIG. 26B and/or any other embodiment of the limit-adapted join process 2730, join process 2530, and/or join operator 2535 described herein.

The limit-adapted join process 2730 can implement a tee 2750 to divide the right input row set 2543 into a small right input row subset 2742 and a large right input row subset 2741. The small right input row subset 2742 and the large right input row subset 2741 can be mutually exclusive and collectively exhaustive with respect to the right input row set 2543. A number and/or proportion of rows designated for the small right input row subset 2742 and a large right input row subset 2741 can be predetermined, selected as a function of Y, selected as a function of a known and/or expected size of the right input row set, selected as a function of a known and/or expected processing time for building a hash map 2555 from a given set of rows, and/or can be based on other factors. A number and/or proportion of rows designated for the small right input row subset 2742 and a large right input row subset 2741 can be the same or different for different queries and/or for different limit values.

The fast join process 2738 can perform its respective join process utilizing the small right input row subset 2742 and the full left input row set 2541. The slow join process 2736 can perform its respective join process utilizing the large right input row subset 2741 and this same full left input row set 2541. For example, the tee 2750 sends right input rows of large right input row subset 2741 for processing via the slow join process 2738, and/or the tee 2750 sends right input rows of small right input row subset 2742 for processing via the fast join process 2738. The left input row set 2541 can be sent for processing via both the slow join process 2738 and the fast join process 2738, for example, based on first being duplicated, for example, instead of utilizing a tee operator.

The fast join process 2738 can begin emitting output rows before the slow join process based on the small right input row subset 2742 including fewer rows than the large right input row subset 2741. For example, the fast join process 2738 can begin emitting output rows before the slow join process based on a first hash map 2555 being built from the small right input row subset 2742 being completed prior to a second hash map 2555 being built from the large right input row subset 2741, due to the small right input row subset 2742 including fewer rows than the large right input row subset 2741. In particular, fast join process 2738 can begin emitting output rows only once the building of the first hash map 2555 from the small right input row subset 2742 is completed, which can occur at a time before completion of building of the second hash map 2555 from the large right input row subset 2741, where the slow join process 2736 only begins emitting output rows once the building of this second hash map 2555 is completed, and thus begins emitting output rows after the fast join process 2738 begins emitting output rows.

In some embodiments, if the left input row set 2541 is non-deterministic, such as including an unknown number of rows, the operator flow generator module 2514 does not denote use of this limit-adapted join process 2730, and optionally instead denotes use of a single corresponding join process 2530.

Figure 26E:
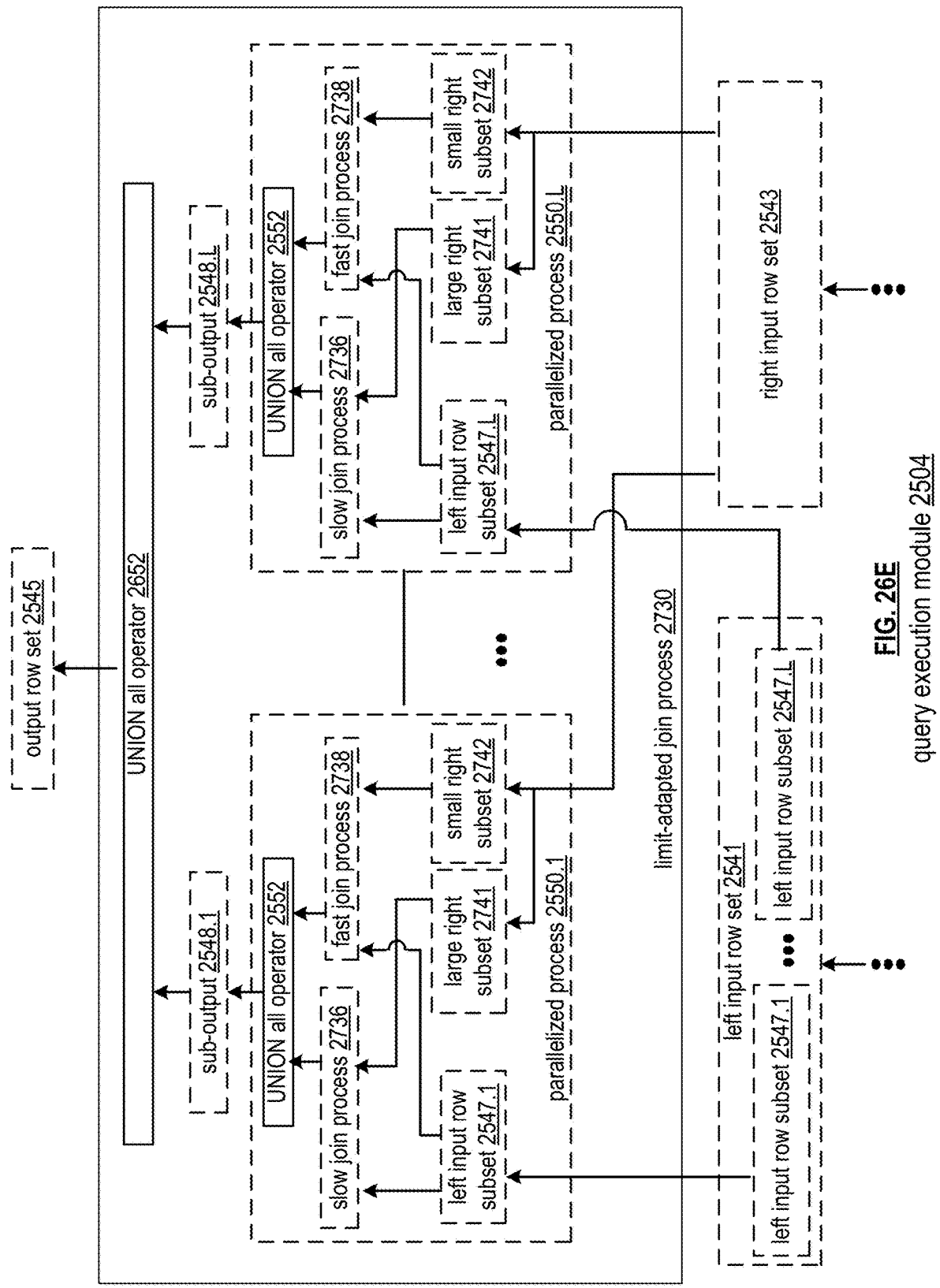
FIG. 26E is a schematic block diagram of a query execution module executing a limit-adapted join process via a plurality of parallelized processes in accordance with various embodiments.

FIG. 26E illustrates an embodiment where the limit-adapted join process 2730 is implemented via a plurality of parallelized processes 2550.1-2550.L. Some or all of the features and/or functionality of the parallelized processes 2550.1-2550.L of FIG. 26E can implement the parallelized processes 2550.1-2550.L of FIG. 25B. Some or all features and/or functionality of the limit-adapted join process 2730 of FIGS. 26B-26D can be implemented via a corresponding parallelized processes 2550, for example, utilizing its given left input row subset 2547 as discussed previously.

In other embodiments, rather than each parallelized processes 2550 implementing both the fast join process 2738 and the slow join process 2736 themselves, a first subset of the set of parallelized processes 2550 collectively implement the slow join process 2736 by each processing only the large right input row set 2741, and a second subset of the set of parallelized processes 2550 collectively implement the fast join process 2738 by each processing only the small right input row set 2742. The first subset of the set of parallelized processes can be configured to be larger than, smaller than, similar in size to, and or a same size as the second subset of the set of parallelized processes, for example, where relative sizes are configured to further optimize processing time of the query. Left input row subsets designated for parallel processes of the first subset of the set of parallelized processes can be configured to be larger than, smaller than, similar in size to, and or a same size as other left input row subsets designated for the second subset of the set of parallelized processes, for example, where relative sizes are configured to further optimize processing time of the query.

Figure 26F:
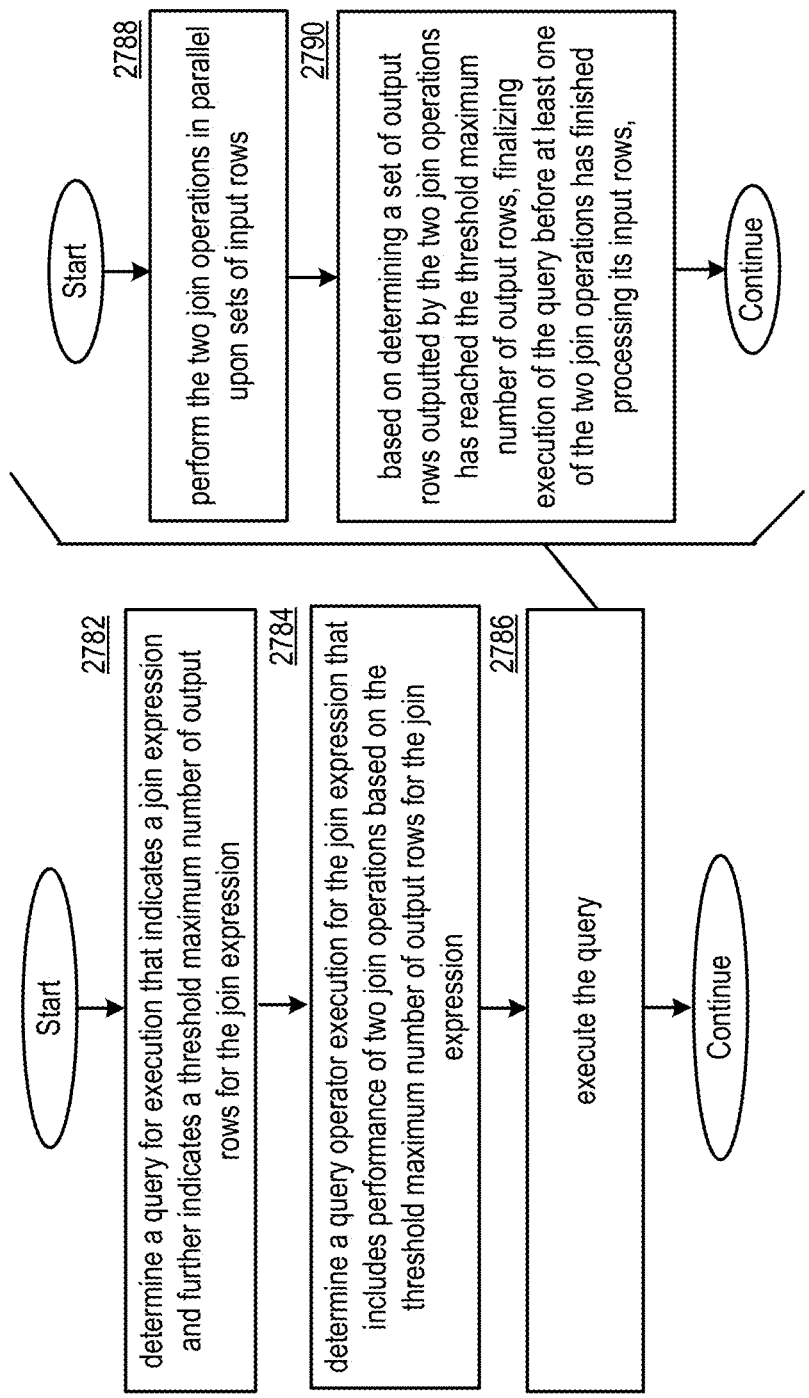
FIG. 26F is a logic diagram illustrating a method for execution in accordance with various embodiments.

FIG. 26F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26F. In particular, a node 37 can utilize the query processing module 2435 to execute some or all of the steps of FIG. 26F, where multiple nodes 37 implement their own query processing modules 2435 to independently execute the steps of FIG. 26F, for example, to facilitate execution of a query as participants in a query execution plan 2405. Some or all of the method of FIG. 26F can be performed by the query processing system 2510, for example, by utilizing an operator flow generator module 2514 and/or a query execution module 2504. In particular, some or all of the method of FIG. 26F can be performed via one or more operator executions of one or more limit operators 2710 and/or one or more join operators 2535 of at least one join process 2530, such as a limit-adapted join process 2730 and/or a fast join process 2738 and a slow join process 2736. Some or all of the steps of FIG. 26F can optionally be performed by any other processing module of the database system 10. Some or all of the steps of FIG. 26F can be performed to implement some or all of the functionality of the database system 10 as described in conjunction with FIGS. 25A-26E, for example, by implementing some or all of the functionality of the query processing system 2510 as described in conjunction with FIGS. 25A-25E. Some or all of the steps of FIG. 26F can be performed to implement some or all of the functionality regarding execution of a query via the plurality of nodes in the query execution plan 2405 as described in conjunction with some or all of FIGS. 24A-24I. Some or all steps of FIG. 26F can be performed by database system 10 in accordance with other embodiments of the database system 10 and/or nodes 37 discussed herein. Some or all steps of FIG. 26F can be performed in conjunction with one or more steps of FIG. 26G, and/or of any other method described herein.

Step 2782 includes determining a query for execution that indicates a join expression and further indicates a threshold maximum number of output rows, such as an output row max limit 2711, for the join expression. Step 2784 includes determining a query operator execution for the join expression that includes performance of two join operations based on the threshold maximum number of output rows for the join expression. Step 2786 includes executing the query.

Performing step 2786 can include performing one or more of steps 2788 and/or 2790. Step 2788 includes performing the two join operations in parallel upon sets of input rows. Step 2790 includes finalizing execution of the query before at least one of the two join operations has finished processing its input rows, for example, based on determining a set of output rows outputted by the two join operations has reached the threshold maximum number of output rows.

In various examples, finalizing execution of the query includes outputting a query resultant that includes the determined set of output rows.

In various examples, a second one of the two join operations is configured to emit output rows faster than a first one of the two join operations, and/or where all of the set of output rows are outputted by the second one of the two join operations based on the first one of the two join operations not yet outputting any rows when the execution of the query is finalized.

In various examples, the method includes sending all of a plurality of left input rows for the join expression to both of the two join operations for processing; sending a first proper subset of a plurality of right input rows of the join expression to the first one of the two join operations for processing in conjunction with all of the plurality of left input rows; and/or sending a second proper subset of the plurality of right input rows of the join expression to the second one of the two join operations for processing in conjunction with all of the plurality of left input rows. In various examples, the first proper subset and the second proper subset rows are mutually exclusive and collectively exhaustive with respect to the plurality of right input rows, and/or the second one of the two join operations is configured to emit output rows faster than the first one of the two join operations based on the first proper subset including a greater number of right input rows than the second proper subset. In various examples, a number of rows included in the second proper subset rows is based on the threshold maximum number of output rows indicated by the query.

In various examples, performance of the first one of the two join operations includes generating a first hash map from the first proper subset of the plurality of right input rows. In various examples, performance of the first one of the two join operations further includes, for each left input row of the plurality of left input rows processed by the first one of the two join operations: determining whether any of the first proper subset of the plurality of right input rows matches with the each left input row based on the first hash map. In various examples, when one of the first proper subset of the plurality of right input rows is identified as matching with the each left input row, the method can further include emitting a value of the one of the first proper subset of the plurality of right input rows in conjunction emitting the each left input row. In various examples, performance of the second one of the two join operations includes generating a second hash map from the second proper subset of the plurality of right input rows. In various examples, the method can further include, for each left input row of the plurality of left input rows processed by the second one of the two join operations, determining whether any of the second proper subset of the plurality of right input rows matches with the each left input row based on the second hash map; and/or, when one of the second proper subset of the plurality of right input rows is identified as matching with the each left input row, emitting a value of the one of the second proper subset of the plurality of right input rows in conjunction emitting the each left input row.

In various examples one node of a plurality of nodes of a query execution plan executes the join expression by performing both of the two join operations in parallel upon sets of input rows. In various examples, a same or different node of the plurality of nodes performs a limit operator to determine a set of output rows generated by performing the two join operations in parallel reaches the threshold maximum number of rows.

In various examples, a plurality of nodes of a query execution plan execute the query based on each performing at least one of the two join operations.

In various examples, a plurality of nodes of a query execution plan execute the query. In various examples, a first proper subset of the plurality of nodes perform the first one of the two join operations. In various examples, a second proper subset of the plurality of nodes perform the second one of the two join operations. In various examples, the first proper subset of the plurality of nodes and the second proper subset of the plurality of nodes are mutually exclusive. In various examples, the first proper subset of the plurality of nodes generate a first hash map for the first proper subset of the plurality of right input rows via a first shuffle operation amongst the first proper subset of the plurality of nodes. In various examples, the second proper subset of the plurality of nodes generate a second hash map for the second proper subset of the plurality of right input rows via a second shuffle operation amongst the second proper subset of the plurality of nodes.

In various examples, the threshold maximum number of output rows for the join expression is indicated by a limit expression for the join expression.

In various examples, the query operator execution flow for the join expression is generated to includes performance of two join operations based on determining a number of rows in a plurality of left input rows for the join expression is deterministic. In various examples, the method further includes determining a second query for execution that indicates a second join expression and further indicates another threshold maximum number of output rows for the second join expression; and/or determining a second query operator execution for the second join expression that includes performance of a single join operation instead of the two join operations based on the determining a number of rows in another plurality of left input rows for the second join expression is non-deterministic.

In various embodiments, any one of more of the various examples listed above are implemented in conjunction with performing some or all steps of FIG. 26F. In various embodiments, any set of the various examples listed above can implemented in tandem, for example, in conjunction with performing some or all steps of FIG. 26F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26F, for example, in conjunction with further implementing any one or more of the various examples described above.

In various embodiments, the operational instructions, when executed by the at least one processor, cause the database system to: determine a query for execution that indicates a join expression and further indicates a threshold maximum number of output rows for the join expression; determining a query operator execution for the join expression that includes performance of two join operations based on the threshold maximum number of output rows for the join expression, where a union of output of the two join operations is semantically equivalent to an output of the join expression; and/or executing the query. The database system can execute the query based on: performing the two join operations in parallel upon sets of input rows; and/or finalizing execution of the query before at least one of the two join operations has finished processing its input rows based on determining a set of output rows outputted by the two join operations has reached the threshold maximum number of output rows.

FIGS. 27A-27H illustrate embodiments of a database system 10 operable to execute queries indicating join expressions and at least one other operation based on executing optimized join processes to generate output row sets. Some or all features and/or functionality of FIGS. 27A-27H can be utilized to implement the join processes of FIGS. 25A-25F, can be utilized to implement the limit-adapted join process of FIGS. 26A-26E, and/or can be utilized to implement database system 10 of FIGS. 24A-24N when executing queries indicating join expressions. Some or all features and/or functionality of FIGS. 27A-27H can be utilized to implement any embodiment of the database system 10 described herein.

As discussed in conjunction with FIGS. 26A-26E, a given join expression can be split into multiple, parallelizable steps that include separate join operations. This mechanism of splitting steps of a join into multiple join processes can result in optimizing the corresponding process, for example, when performing a limit-adapted join process based on the join being performed before a limit operation as discussed in conjunction with FIGS. 26A-26E. Alternatively or in addition, mechanism of splitting steps of a join into multiple join processes can optimize query executions in other circumstances, even when under a limit operation. For example, this functionality can optimize execution of join operations in the case where the join is applied before an OFFSET operation, and/or other operation specifying a min or maximum number of rows to return, a number of rows to skip prior to returning rows, and/or other information denoting which rows satisfying the predicate be returned.

Additionally, as different types of joins can be applied, the optimization of a join expression can be different for different types of join, based on their respective differences in definition inducing different required functionality when producing output rows. In some embodiments, the query operator execution flow can select different types of flows to be applied depending on the join type of the given expression to optimize the performance of the join, for example, in the case where a limit is applied to the join and/or where an offset operation is applied to output of the join operation.

FIG. 27A illustrates an embodiment of executing a query that indicates performance of a join expression 2516 and further at least one other operation 2611 to be performed on corresponding output of the join expression. A corresponding optimized join process can be included in a query operator execution flow 2517 generated for the query, and this optimized join process 2630 can be executed via a query execution module 2504 in conjunction with executing the query. The output rows generated by the optimized join process can be applied as input to the other operation 2611. To generate an output row set. Some or all features and/or functionality of the implementation of optimized join process 2630 of FIG. 27A can be implemented via some or all features and/or functionality of the limit-adapted join process 2730 of FIG. 26A (e.g. where the other operation 2611 is a limit operator 2710 specifying the maximum number of rows Y and/or where the other operation 2611 is an offset operator specifying the number of rows Y as rows to be skipped), and/or via any other embodiment of join operator 2535 and/or join process 2530 described herein.

Figure 27B:
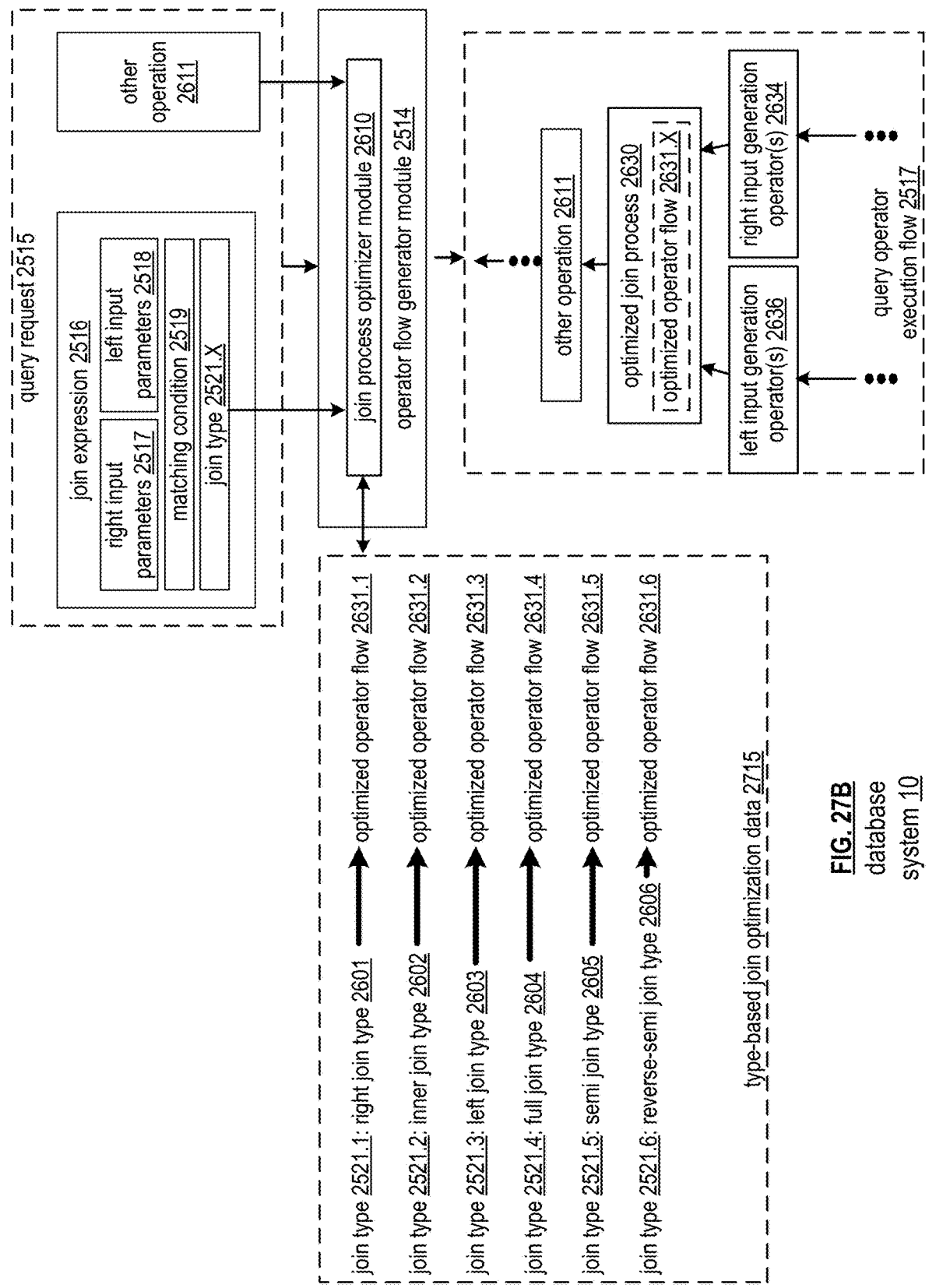
FIG. 27B is a schematic block diagram of an operator flow generator module that selects an optimized join process to be included in a query operator execution flow for execution based on a join type of a query request in accordance with various embodiments.

FIG. 27B illustrates an embodiment of an operator flow generator module that implements a join process optimizer module to select an optimized operator flow 2631 based on the join type 2521 of the join expression and/or based on the other operation (e.g. the optimized join process is configured based on the join type, and/or further based on the other operation being a limit of offset applied to the output).

Type-based join optimization data 2715 can include each of a plurality of optimized operator flows 2631 that be applied for each corresponding one of a plurality of join types, for example. The type-based join optimization data 2715 can be determined based on being received, being stored in memory resources, being automatically generated and/or learned over time, being configured via user input, for example, by a user requesting the query and/or an administrator of database system 10, and/or can otherwise be determined.

The type-based join optimization data 2715 can include different optimized operators flows 2631 for a set of join types that includes some or all of: a right join type 2601; an inner joint type 2602; a left join type 2603; a full join type 2604; a semi join type 2605; a reverse-semi join type 2606; and/or any other join type such as an outer join type, an anti join type, and/or other join types described herein.

The operator flow generator module 2514 can configure the query operator execution flow 2517 to include a selected optimized operator flow 2631.X from a plurality of optimized operator flows 2631, for example, based on the given join type 25621.X. In particular, the optimized operator flow 2631.1 can be selected based on the join type 2521 in the query expression denoting the right join type 2601; the optimized operator flow 2631.2 can be selected based on the join type 2521 in the query expression denoting the inner join type 2602; etc. The selected operator flow 2631 can be implemented as some or all of the optimized join process 2630. The output of the selected operator flow 2631 can be semantically equivalent to the corresponding type of join as denoted in the join expression 2516, guaranteeing query correctness, while being likely and/or guaranteed to generate the correct output in a more optimal fashion (e.g. faster, with less memory resources, with less processing resources, etc.).

FIGS. 27C-27H illustrate example embodiments of optimized operator flows 2631 for different join types. Same and/or semantically equivalent optimized operator flows 2631 as the example optimized operator flows 2630 of FIGS. 27C-27H can be selected and executed via optimized join process 2630 in conjunction with executing a query expression of the given type.

The optimized operator flows 2631 canbe implemented to generate output utilized as input to other operator 2611 in corresponding query operator execution flow 2517. The other operator 2611 can optionally be implemented as a limit operator denoting a maximum of N rows be emitted as depicted in the examples of FIGS. 27C-27H, where the 'Limit N' can be implemented as limit operator 2710, where N is the value of Y. In such cases, some or all features and/or functionality of the some or all optimized operator flows 2631 can implement embodiments of the limit-adapted join process 2730 of FIGS. 26A-26E, for example, when applying limits to corresponding types of joins. Other types of operators can implement the other operator 2611 in other embodiments.

Some or all of the parallelized joins of the optimized operator flows 2631 of FIGS. 27C-27H can be implemented as a set of outer parallelized processes 2553 and/or as a set of inner parallelized processes 2551. As a particular example, parallelized joins of a given optimized operator flows 2631 of FIGS. 27C-27H are implemented as a set of inner parallelized processes 2551, while the set of outer parallelized processes 2553 each implement their own parallelized portion of the optimized operator flows 2631 on the full right input row set 2543 and corresponding left input row subset 2547. Some or all of the two or more joins of the optimized operator flows 2631 of FIGS. 27C-27H can be implemented via at least one fast join process 2738 and at least one slow join process 2736. For example, other join processes discussed herein implemented via multiple join operators in series and/or in parallel can be implemented for a given join type via some or all features and/or functionality of an optimized operator flow 2631.

The 'RHS' of example optimized operator flows 2631 of FIGS. 27C-27H can be implemented as right input row set 2543. The 'LHS' of example optimized operator flows 2631 of FIGS. 27C-27H canbe implemented as left input row set 2541, and/or a corresponding one of the plurality of left input row subsets 2547.1-2547.L. The 'UNION all' of example optimized operator flows 2631 of FIGS. 27C-27H can be implemented as UNION all operator 2652. The 'Tee' of example optimized operator flows 2631 of FIGS. 27C-27H can be implemented as Tee operator 2750. The 'Limit X' of example optimized operator of the flows 2631 of FIGS. 27C-27H can be implemented to generate a small right subset 2742 having X rows right input row set 2543 (e.g. the first X rows of the right input row set 2543 received, where X denotes the small number), and/or the 'Offset X' of example optimized operator flows 2631 of FIGS. 27C-27H can be implemented to generate a large right subset 2741 having the remaining rows of the right input row set 2543 (e.g. all rows of the right input row set 2543 after the first X rows received). Any embodiment of a 'JOIN' can be implemented via a join operator 2535 and/or join process 2535 of the corresponding type.

Figure 27C:
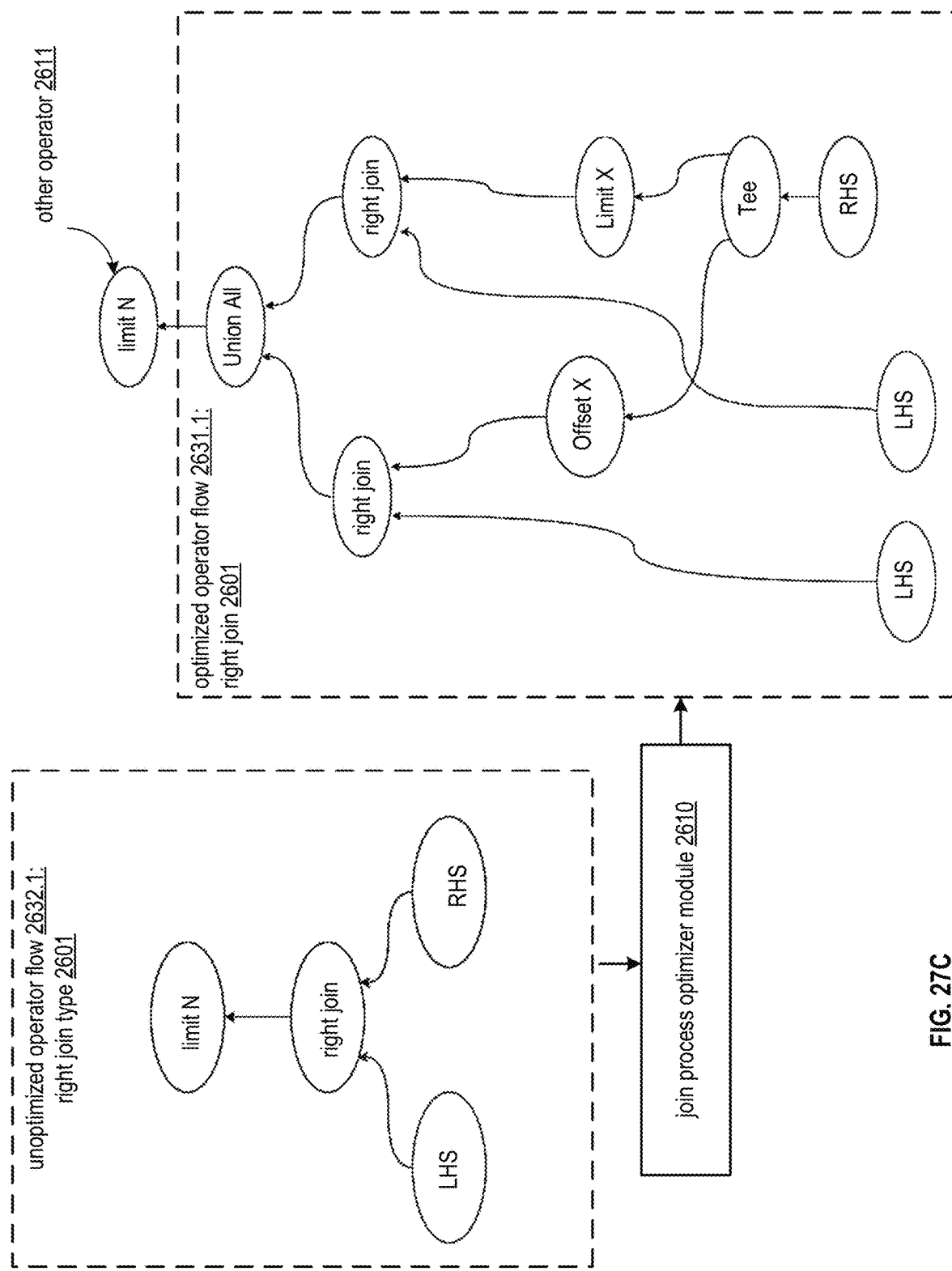
FIG. 27C illustrates an optimized operator flow generated via a join process optimizer module optimizing an unoptimized operator flow correspond to a right join type in accordance with various embodiments.

FIG. 27C illustrates an example optimized operator flow 2631.1 implementing a right join 2601. The optimized operator flow 2631.1 can be selected for execution as optimized join process 2630 to implement a corresponding unoptimized operator flow 2632.1 for the right join 2601 denoted by join expression 2516. The multiple joins can be implemented as right joins that output rows from their respective input in accordance with the requirements of a right join (e.g. return the inner join and also all rows from the right input that don't match with any left input). The optimized operator flow 2631.1 for the right join can be semantically equivalent to the unoptimized operator flow 2632.1 for the right join. The optimized operator flow 2631.1 for the right join can optionally implement the limit-adapted join process 2730 of FIG. 26D for a right join type, where each join process 2530 of FIG. 26D is implement as a right join operator.

Figure 27D:
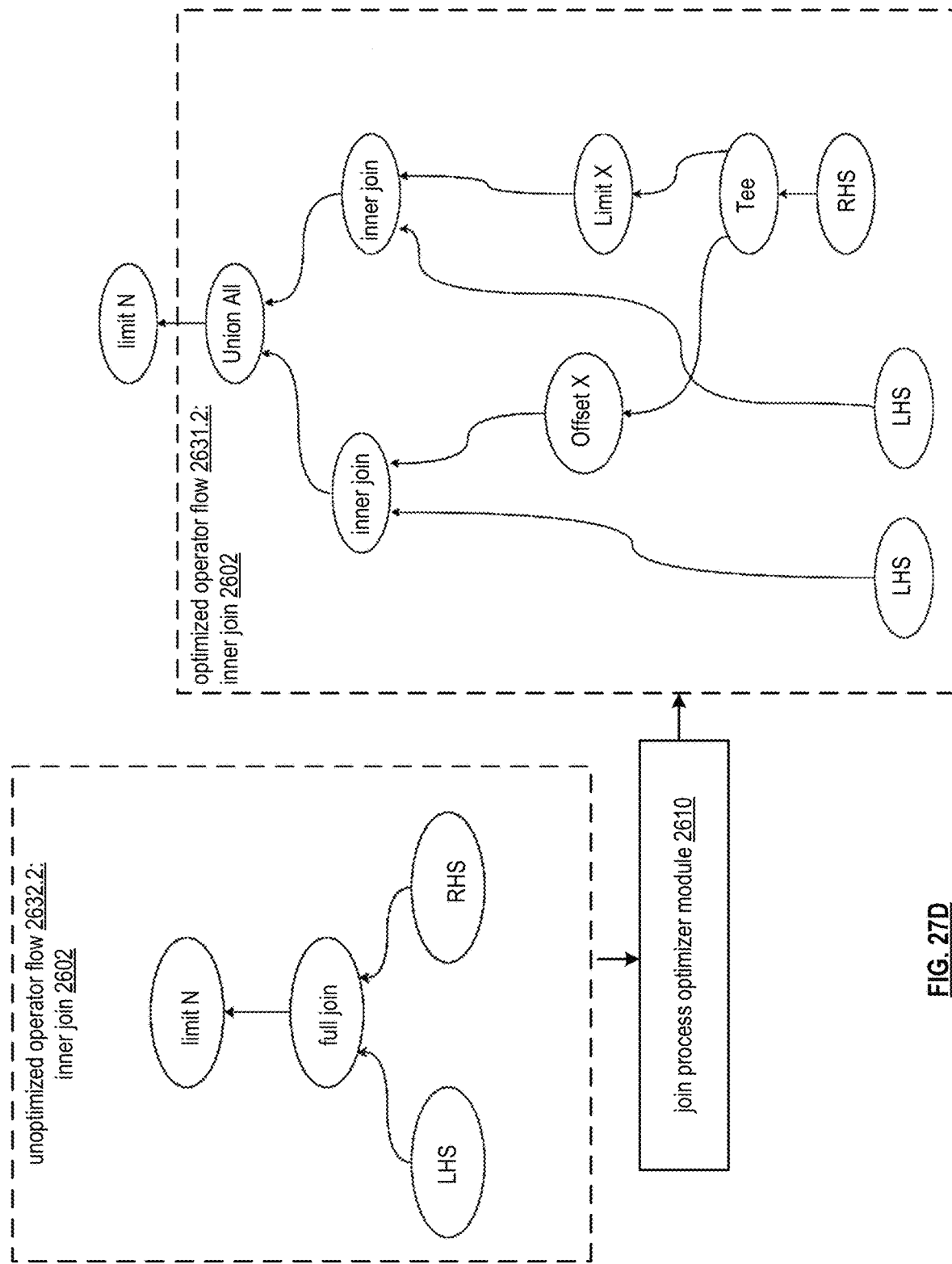
FIG. 27D illustrates an optimized operator flow generated via a join process optimizer module optimizing an unoptimized operator flow correspond to an inner join type in accordance with various embodiments.

FIG. 27D illustrates an example optimized operator flow 2631.2 implementing an inner join 2602. The optimized operator flow 2631.2 can be selected for execution as optimized join process 2630 to implement a corresponding unoptimized operator flow 2632.2 for the inner join 2602 denoted by join expression 2516. The multiple joins can be implemented as inner joins that output rows from their respective input in accordance with the requirements of an inner join (e.g. return only pairs from the right and left input that meet the matching condition). The optimized operator flow 2631.2 for the inner join can be semantically equivalent to the unoptimized operator flow 2632.2 for the inner join. The optimized operator flow 2631.2 for the inner join can optionally implement the limit-adapted join process 2730 of FIG. 26D for an inner join type, where each join process 2530 of FIG. 26D is implement as an inner join operator.

Figure 27E:
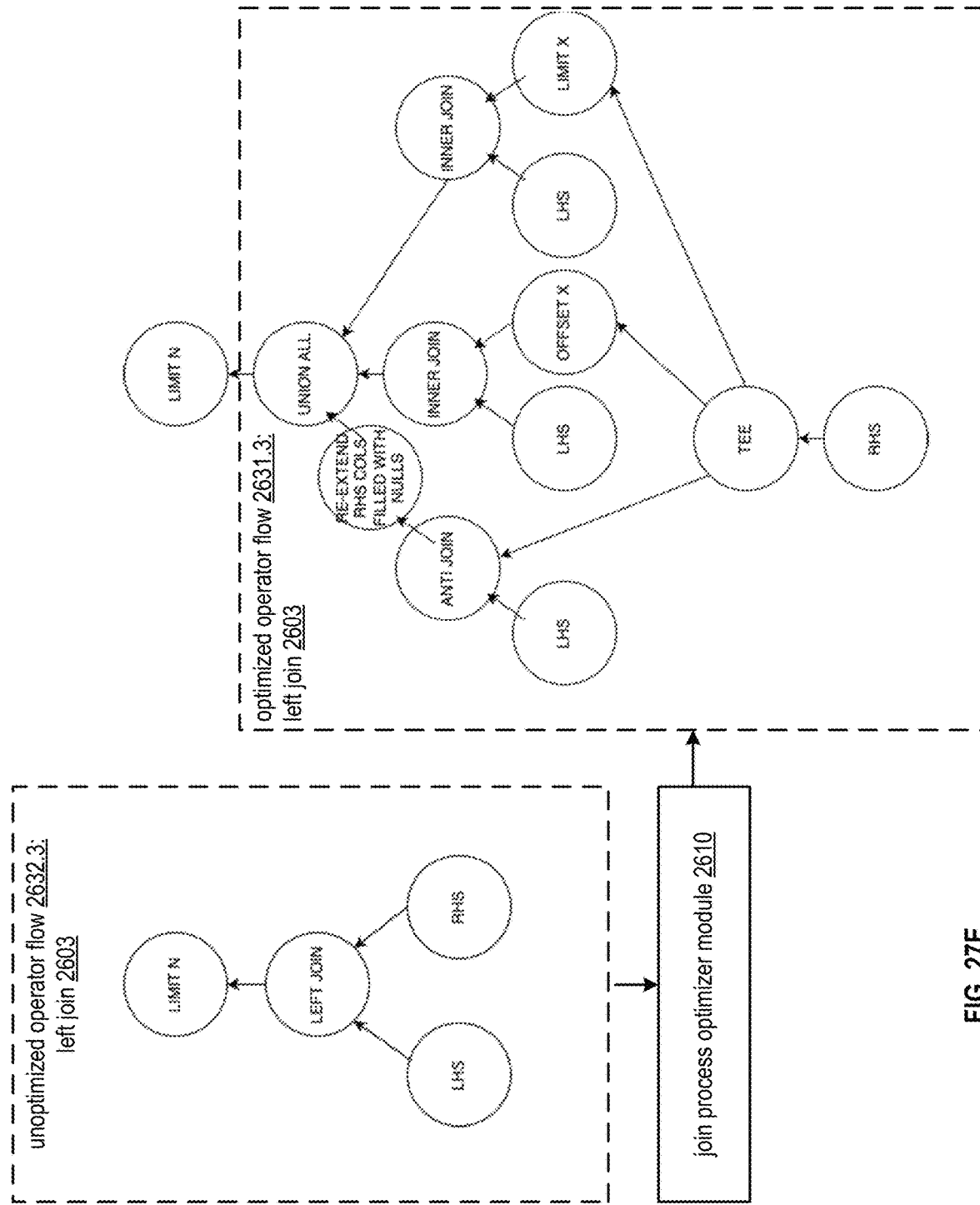
FIG. 27E illustrates an optimized operator flow generated via a join process optimizer module optimizing an unoptimized operator flow correspond to a left join type in accordance with various embodiments.

FIG. 27E illustrates an example optimized operator flow 2631.3 implementing a left join 2603. The optimized operator flow 2631.3 can be selected for execution as optimized join process 2630 to implement a corresponding unoptimized operator flow 2632.3 for the left join 2603 denoted by join expression 2516. The optimized operator flow 2631.3 for the left join can be semantically equivalent to the unoptimized operator flow 2632.3 for the left join. The optimized operator flow 2631.3 for the left join can be adapted from the limit-adapted join process 2730 of FIG. 26D to adapt to the requirements of the left join type, where the two join processes 2530 of FIG. 26D are implemented as inner joins, and where an additional parallel join process 2530 of FIG. 26D is implemented as an anti join operator having its output re-extend right hand side columns filled with nulls.

In particular, like the RIGHT and INNER join optimizations, the optimization for the LEFT join case can also involve splitting the join into two joins. LEFT joins return matching INNER rows and left-hand side/LEFT rows that do not match. The split joins can be both type INNER as illustrated in FIG. 27E, and can thus both return the INNER matches. An extra ANTI join can execute in parallel to return all LHS rows that do not match. In other words, {{ANTI(lhs, rhs)=LEFT non-matches of LEFT(lhs, rhs)}}. Since ANTI joins throw out the RHS columns, a LEFT outer non-match result can be emulated via extending columns off the output of the ANTI join. These columns assume the names of the RHS columns and are filled with NULLs, effectively padding the ANTI join's output. The optimized plan 2531.3 can thus properly emulate a single LEFT join.

Figure 27F:
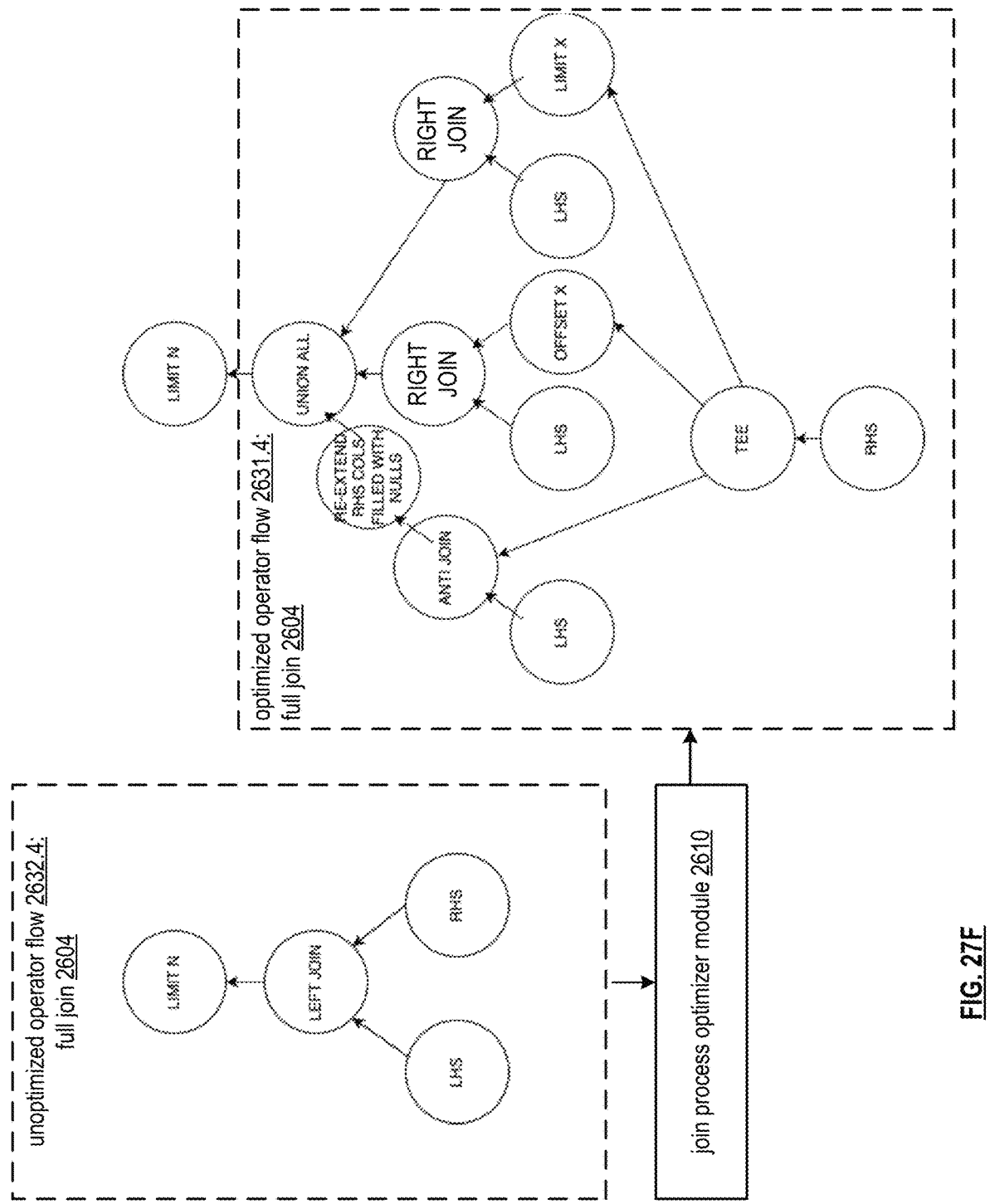
FIG. 27F illustrates an optimized operator flow generated via a join process optimizer module optimizing an unoptimized operator flow correspond to a full join type in accordance with various embodiments.

FIG. 27F illustrates an example optimized operator flow 2631.4 implementing a full join 2604. The optimized operator flow 2631.4 can be selected for execution as optimized join process 2630 to implement a corresponding unoptimized operator flow 2632.4 for the full join 26034 denoted by join expression 2516. The optimized operator flow 2631.4 for the full join can be semantically equivalent to the unoptimized operator flow 2632.4 for the full join. The optimized operator flow 2631.4 for the full join can be adapted from the limit-adapted join process 2730 of FIG. 26D to adapt to the requirements of the full join type, where the two join processes 2530 of FIG. 26D are implemented as right joins, and where an additional parallel join process 2530 of FIG. 26D is implemented as an anti join operator having its output re-extend right hand side columns filled with nulls.

In particular, the FULL optimization can be implemented similarly to the LEFT optimization, where the joins that are split in two are instead of type RIGHT rather than type INNER. FULL joins return matching INNER rows, left-hand side/LEFT rows that do not match, and right-hand side/RIGHT rows that do not match. The split joins can be both of type RIGHT, and can thus return the INNER matches as well as the right-hand side/RIGHT rows that do not match. An extra ANTI join can execute in parallel in a same or similar fashion as the LEFT join's optimization. The optimized plan can properly emulate a single FULL join.

Figure 27G:
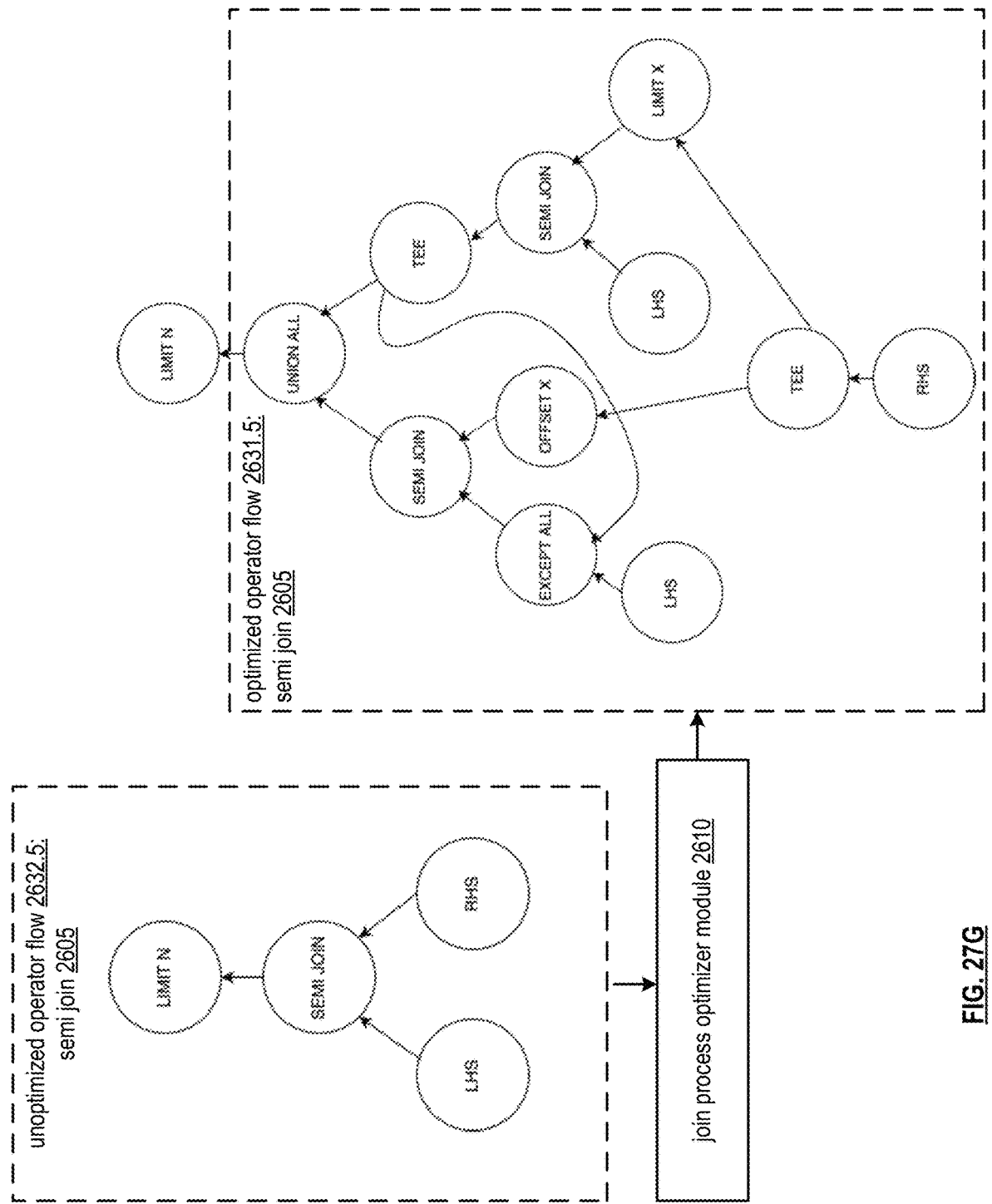
FIG. 27G illustrates an optimized operator flow generated via a join process optimizer module optimizing an unoptimized operator flow correspond to a semi join type in accordance with various embodiments.

FIG. 27G illustrates an example optimized operator flow 2631.5 implementing a semi join 2605. The optimized operator flow 2631.5 can be selected for execution as optimized join process 2630 to implement a corresponding unoptimized operator flow 2632.5 for the semi join 2605 denoted by join expression 2516. The optimized operator flow 2631.5 for the semi join can be semantically equivalent to the unoptimized operator flow 2632.5 for the semi join. The optimized operator flow 2631.5 for the semi join can be adapted from the limit-adapted join process 2730 of FIG. 26D to adapt to the requirements of the semi join type, where the two join processes 2530 of FIG. 26D are implemented as semi joins, and where an Except All operator is applied to the output of one (e.g. the faster) join process 2530 of FIG. 26D to generate the left input rows for the other (e.g. the slower) join process 2530 of FIG. 26D. Thus, this can induce serialization to the two join processes of FIG. 26D, as the slower join process cannot be performed until the faster join process is complete. In some cases, waiting to begin the second join process is not relevant, and does not induce slower processing, in cases where all required rows (e.g. the Y rows needed to satisfy the limit) are emitted in performing the faster join process.

In particular, the SEMI join can be split into two separate joins. The first SEMI join can behave in a similar fashion as in the INNER optimization. The second SEMI can be defined as: SEMI((LHS—limited SEMI rows), offsetted RHS). In other words, the limited SEMI is performed first. If that isn't enough rows to satisfy the limit, the second SEMI will look at all the LHS rows that haven't found a match so far with the rest of the RHS to try to find any remaining matches. This difference can be computed with an EXCEPT ALL operator.

In another example embodiment of the optimized operator flow 2631.5 for the semi join, the all of the SEMI joins of FIG. 2631.5 can be instead implemented as REVERSE SEMIs. The plan can be transformed as in the REVERSE SEMI case. This can be an optimal solution when the cardinality or data volume is about the same on both sides. If one side is much larger than the other, this option is optionally not selected.

In another example embodiment of the optimized operator flow 2631.5 for the semi join, a 'local shuffle' operator instance is created can split data on 1 node (e.g. 50/50 split into two parent streams). Like a shuffle, each stream can guarantee all equal values in its columns that are 'keys' musts end up in the same stream. This new operator can split up the data instead of limiting/offsetting. With the guarantee that all of the same value show up in the same stream, the SEMIs can be split in two and the UNION ALL can be applied to their results to get the same result as the original SEMI, for example, in a same or similar fashion as in the INNER case.

In another example embodiment of the optimized operator flow 2631.5 for the semi join, aversion of SEMI join can be created that outputs 2 streams: the first is for matches, the second is for non-matches. This can eliminate the need for an EXCEPT ALL of FIG. 27G. The no non-matches from the 1st, limited SEMI join canbe fed directly into the 2nd SEMI join.

Figure 27H:
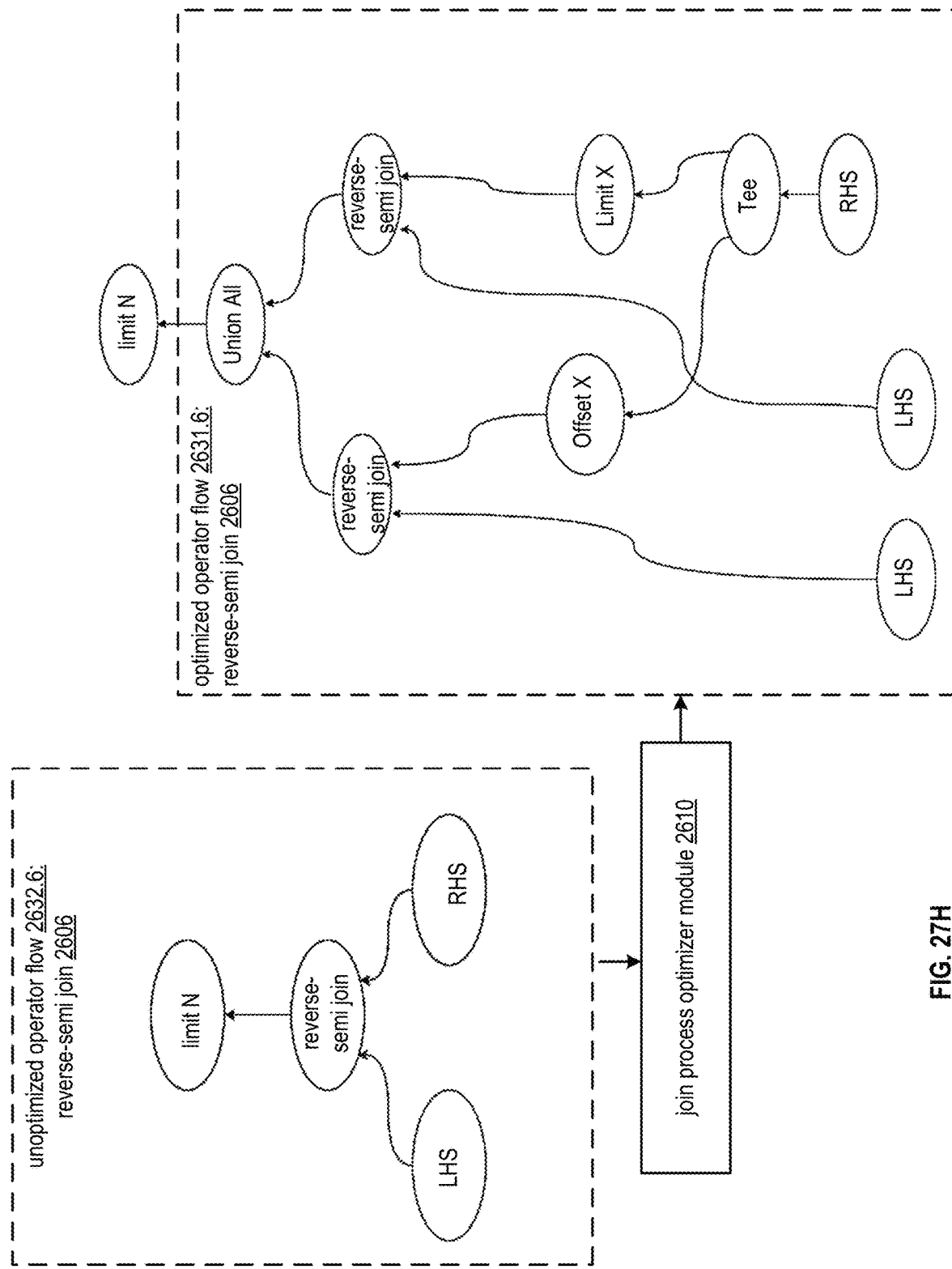
FIG. 27H illustrates an optimized operator flow generated via a join process optimizer module optimizing an unoptimized operator flow correspond to a reverse-semi join type in accordance with various embodiments.
Figure 271:
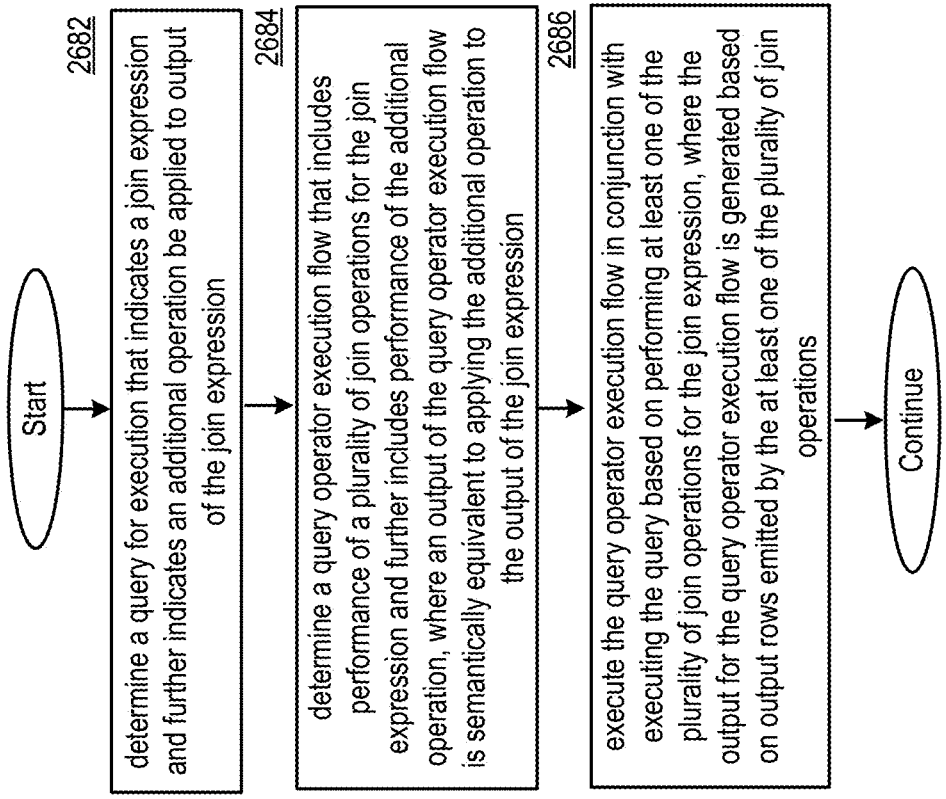

FIG. 27H illustrates an example optimized operator flow 2631.6 implementing a reverse-semi join 2606. The optimized operator flow 2631.6 can be selected for execution as optimized join process 2630 to implement a corresponding unoptimized operator flow 2632.6 for the reverse-semi join 2606 denoted by join expression 2516.6. The multiple joins can be implemented as reverse semi joins that output rows from their respective input in accordance with the requirements of a reverse-semi join. The optimized operator flow 2631.6 for the reverse-semi join can be semantically equivalent to the unoptimized operator flow 2632.6 for the reverse-semi join. The optimized operator flow 2631.6 for the reverse-semi join can optionally implement the limit-adapted join process 2730 of FIG. 26D for a reverse-semi join type, where each join process 2530 of FIG. 26D is implement as a reverse-semi join operator. This can implement the reverse-semi join functionality of behaving similarly to SEMI joins, but having ordering of the children flipped such that the right hand side contains the full set of rows to check for existence in the other (left) side.

In some embodiments, some or all of this functionality of FIGS. 27A-27H can be utilized in embodiments where a check is implemented that confirms that a query only needs the OUTER results of an OUTER join (e.g. LEFT, RIGHT, FULL) and the INNER results that match are completely discarded. In such cases, flows for LEFT and FULL described above can be adapted to only calculate OUTER results. For example, a LEFT join that does not use its INNER results could be fully replaced with the ANTI join and NULL padding extend as described in conjunction with performing the LEFT optimization.

FIG. 27I illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27I. In particular, a node 37 can utilize the query processing module 2435 to execute some or all of the steps of FIG. 27I, where multiple nodes 37 implement their own query processing modules 2435 to independently execute the steps of FIG. 27I, for example, to facilitate execution of a query as participants in a query execution plan 2405. Some or all of the method of FIG. 27I can be performed by the query processing system 2510, for example, by utilizing an operator flow generator module 2514 and/or a query execution module 2504. In particular, some or all of the method of FIG. 27I can be performed via one or more operator executions of one or more limit operators 2710 and/or one or more join operators 2535 of at least one join process 2530, such as a limit-adapted join process 2730. Some or all of the steps of FIG. 27I can optionally be performed by any other processing module of the database system 10. Some or all of the steps of FIG. 27I can be performed to implement some or all of the functionality of the database system 10 as described in conjunction with FIGS. 27A-27H, for example, by implementing some or all of the functionality of the query processing system 2510 as described in conjunction with FIGS. 25A-26F. Some or all of the steps of FIG. 27I can be performed to implement some or all of the functionality regarding execution of a query via the plurality of nodes in the query execution plan 2405 as described in conjunction with some or all of FIGS. 24A-24I. Some or all steps of FIG. 27I can be performed by database system 10 in accordance with other embodiments of the database system 10 and/or nodes 37 discussed herein. Some or all steps of FIG. 27I can be performed in conjunction with one or more steps of FIG. 26F, and/or of any other method described herein.

Step 2682 includes determining a query for execution that indicates a join expression and further indicates an additional operation be applied to output of the join expression. Step 2684 includes determining a query operator execution flow that includes performance of a plurality of join operations for the join expression and further includes performance of the additional operation. In various examples, an output of the query operator execution flow is semantically equivalent to applying the additional operation to the output of the join expression. Step 2688 includes executing the query operator execution flow in conjunction with executing the query based on performing at least one of the plurality of join operations for the join expression. In various examples, the output for the query operator execution flow is generated based on output rows emitted by the at least one of the plurality of join operations.

In various examples, the query operator execution flow that includes performance of the plurality of join operations is selected based on an optimization for performing the join expression and the additional operation.

In various examples, the query operator execution flow is selected based on selecting one optimization strategy from a plurality of optimizations strategies based on at least one of: a join type of the join expression, or a type of the additional operation.

In various examples, the query operator execution flow is selected based on selecting the one optimization strategy from the plurality of optimizations strategies based on the one optimization strategy corresponding to the join type of the join expression, wherein the type of the join expression is one of a plurality of join types, and wherein the plurality of optimizations strategies correspond to the plurality of join types.

In various examples, the plurality of join types includes at least two of: an inner join type; a right join type; a reverse-semi join type; a left join type; a full join type; or a semi join type. In various examples, the join type of the join expression is one of: the inner join type; the right join type; the reverse-semi join type; the left join type; the full join type; or the semi join type.

In various examples, the output for the query operator execution flow is generated based on the output rows emitted by only a proper subset of the plurality of join operations.

In various examples, the additional operation an offset operation applied to the output of the join expression.

In various examples, the additional operation is a limit applied to the output of the join expression. In various examples, the limit indicates a threshold maximum number of output rows for the join expression. In various examples, executing the query further includes finalizing execution of the query once the output rows emitted by the at least one of the plurality of join operations includes the threshold maximum number of output rows.

In various examples, the execution of the query is finalized before all of the plurality of join operations have finished processing their input rows based on the threshold maximum number of output rows for the join expression being reached prior to at least one of: one or more of the plurality of join operations finishing processing of all of its input rows; or one or more of the plurality of join operations beginning processing of any of its input rows.

In various examples, the join expression is a reverse semi join expression. In various examples, the plurality of join operations includes a first reverse semi join and a second reverse semi join based on the join expression being the reverse semi join expression. In various examples, the at least one of the plurality of join operations exactly one of, or both of: the first reverse semi join or the second reverse semi join.

In various examples, the join expression is a left join expression. In various examples, the plurality of join operations includes a first inner join, a second inner join, and an anti-join based on the join expression being the left join expression. In various examples, the at least one of the plurality of join operations includes exactly one of, exactly two of, or all of: the first inner join, the second inner join, or the anti-join.

In various examples, the join expression is a semi join expression. In various examples, the plurality of join operations includes a first semi join and a second semi join based on the join expression being the semi join expression. In various examples, the at least one of the plurality of join operations includes exactly one of, or both of: the first semi join or the second semi join.

In various examples executing the query operator execution flow is further based on: sending all of a plurality of left input rows for the join expression to all of the plurality of join operations for processing as left input rows by each of the plurality of join operations; segregating a plurality of right input rows of the join expression into a plurality of proper subsets of the plurality of right input rows, where the plurality of proper subsets are mutually exclusive and collectively exhaustive with respect to the plurality of right input rows, and/or where a number of proper subsets of the plurality of proper subsets is equal to a number of join operations in the plurality of join operations; and/or sending each plurality of proper subsets of the plurality of right input rows to a corresponding one of the plurality of join operations for processing as right input rows by the corresponding one of the plurality of join operations.

In various examples, one of the plurality of join operations is configured to emit output rows faster than other ones of the plurality of join operations based on the plurality of join operations being configured to be performed in parallel in the query operator execution flow, and/or further based on a first proper subset of the plurality of proper subsets processed by the one of the plurality of join operations being smaller than all other proper subsets of the plurality of proper subsets processed by other ones of the plurality of join operations.

In various examples, one of the plurality of join operations is configured to emit output rows faster than other ones of the plurality of join operations based on a first one of the plurality of join operations being configured to be completed before a second one of the plurality of join operations in in the query operator execution flow begins based on input to the second one of the plurality of join operations being based on output of the first one of the plurality of join operations. In various examples, one of: the second one of the plurality of join operations begins processing after the first one of the plurality of join operations based on the output of the query operator execution flow not yet being finalized when the first one of the plurality of join operations is completed; or the second one of the plurality of join operations is not processed based on the output of the query operator execution flow being finalized prior to the first one of the plurality of join operations being completed.

In various examples, the query operator execution flow is a sub-flow of a full query operator execution flow for the query that includes at least one of: at least one operator serially before the sub-flow that emits input rows for processing via the query operator execution flow; or at least one operator serially after the sub-flow that processes output rows emitted via the sub-flow.

In various embodiments, any one of more of the various examples listed above are implemented in conjunction with performing some or all steps of FIG. 27I. In various embodiments, any set of the various examples listed above can be implemented in tandem, for example, in conjunction with performing some or all steps of FIG. 27I.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27I described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27I, for example, in conjunction with further implementing any one or more of the various examples described above.

In various embodiments, the operational instructions, when executed by the at least one processor, cause the database system to: determine a query for execution that indicates a join expression and further indicates an additional operation be applied to output of the join expression; determine a query operator execution flow that includes performance of a plurality of join operations for the join expression and further includes performance of the additional operation, where an output of the query operator execution flow is semantically equivalent to applying the additional operation to the output of the join expression; and/or execute the query operator execution flow in conjunction with executing the query based on performing at least one of the plurality of join operations for the join expression, where the output for the query operator execution flow is generated based on output rows emitted by the at least one of the plurality of join operations.

FIGS. 28A-28E illustrate embodiments of a database system 10 operable to execute queries via implementing at least one row dispersal operator that disperses rows amongst a plurality of parallelized processes for execution by a corresponding set of load operators, for example, in accordance with performing load aware shuffle operations. Some or all features and/or functionality of FIGS. 28A-28E can be utilized to implement the join processes of some or all of FIGS. 25A-27H, and/or can be utilized to implement database system 10 of FIGS. 24A-24N when executing queries indicating parallelized processing of different portions of data (e.g. in accordance with a random dispersal) via any type of load operator. Some or all features and/or functionality of FIGS. 28A-28E can be utilized to implement any embodiment of the database system 10 described herein.

Row dispersal can be implemented via performing a random shuffle to send incoming blocks or incoming rows to a random and/or round-robin-ed peer in order to place a relatively equal amount of data/work on each corresponding parallelized process. A corresponding row dispersal operator 2566 can be perform this dispersal in corresponding query operator execution flows 2517, for example, via placement in the flow IO operators that read the corresponding full set of rows to be shuffled and/or below a parallelize serially before a set of load operators operable to process corresponding, random subsets of this full set of rows. For example, the row dispersal operator 2566 can be implemented as a shuffle operator as described herein, and/or can optionally implement any row and/or data shuffling via a shuffle node set 2485 via a shuffle network 2480. The set of parallelized load operators can be implemented as join operators, blocking operators, filtering operators, any operator 2520 described herein, and/or any other operator that processes a plurality of rows, for example, in a stream to generate a stream of output, and/or parallel with other processes to ultimately have their outputs UNION-ed together. In particular, union-ing the output of the set of parallelized load operators each processing a corresponding subset of rows from a full row set can be semantically equivalent to a single load operator processing the full row set, where this divided, parallelized processing is utilized to render higher processing efficiency, for example, based on each parallelized process needing to process fewer rows and/or based on different sets of parallelized resources implementing each load operator.

In some embodiments, the random shuffling implemented by row dispersal operator 2566 is implemented to evenly distribute data. In some embodiments, random shuffling is implemented after IO operators, for example, when estimated table row cardinality is low. Alternatively or in addition, random shuffling can be implemented before load operators, for example unconditionally, because the absence of partitioning does not necessarily indicate an absence of data skew)

However, this can add a significant networking penalty for queries where the total data volume is large. If each node has a relatively equal amount of data, which can be roughly equivalent to the total amount of work to do on a node, then optionally no data redistribution needs to occur. If random shuffle operators are able to detect this scenario and keep local data on the local node while still distributing data when an imbalance is detected, then load balancing across nodes can be achieved with minimal networking cost.

In some embodiments, each node and each shuffle operation within a node (e.g. operator execution module 3215 executing the corresponding node's row dispersal operator) has very limited knowledge of the state of every other node, and/or how much data is present on a given node. One embodiment of implementing load aware shuffles assumes that each peer has a roughly equal amount of local work to do (if it has any work at all), and will not distribute any data until a peer signals that it has no more local work by sending a corresponding signal/notification, such as an end of file (EOF) signal.

For each incoming block, the row dispersal operator 2566 can implement this load aware shuffle based on assigning a set of rows to a given peer (possibly itself) of a full set of peers (e.g. the set of nodes in a corresponding shuffle node set, and/or any set of parallelized processes 2550.1-2550.L implementing a corresponding set of load operators 2835) for processing by this given peer. Sending a given set of rows can include forwarding an entire block that includes a corresponding plurality of rows to a peer, or otherwise sending/assigning a corresponding one or more rows to the selected peer for processing via its load operator.

In some embodiments, the assigning of the set of rows to a given peer can be based on a weighted probability. The set of potential peers to which a given data block can be forwarded/assigned in accordance with a load aware random shuffle can corresponding to only the available peers (e.g. a set that corresponds to the union of itself, and all peers that have sent an eof signal or are otherwise determined to be available. As a particular example of computing the weighted probabilities, the probability of keeping a data block local (e.g. assignment to itself for processing) can be (total num peers –#peers that have sent an eof)/total num peers (e.g. the number of unavailable peers divided by the total number of peers). Alternatively or in addition, the probability of sending a block to any eof peer (e.g. any given available peer) can optionally be simply 1/total num peers. This weighting towards keeping data local can be favorable in preventing biasing data towards peers that have sent eofs, or have otherwise been deemed available.

For example, consider the case where there are 10 peers (e.g. L=10). Peer 1 has sent an eof signal, and each other peer processes 10 blocks. Each of the other 9 peers will keep 9/10 of their data blocks local while sending 1/10 to peer 0. This results in 9 blocks residing on all 10 peers with only 9/90 total blocks being sent across the network. With other embodiments where a round robin and/or uniformly random shuffle is utilized to disperse data blocks, there would still be 9 blocks on each peer, but 81/90 blocks would have been sent over the network.

Figure 28A:
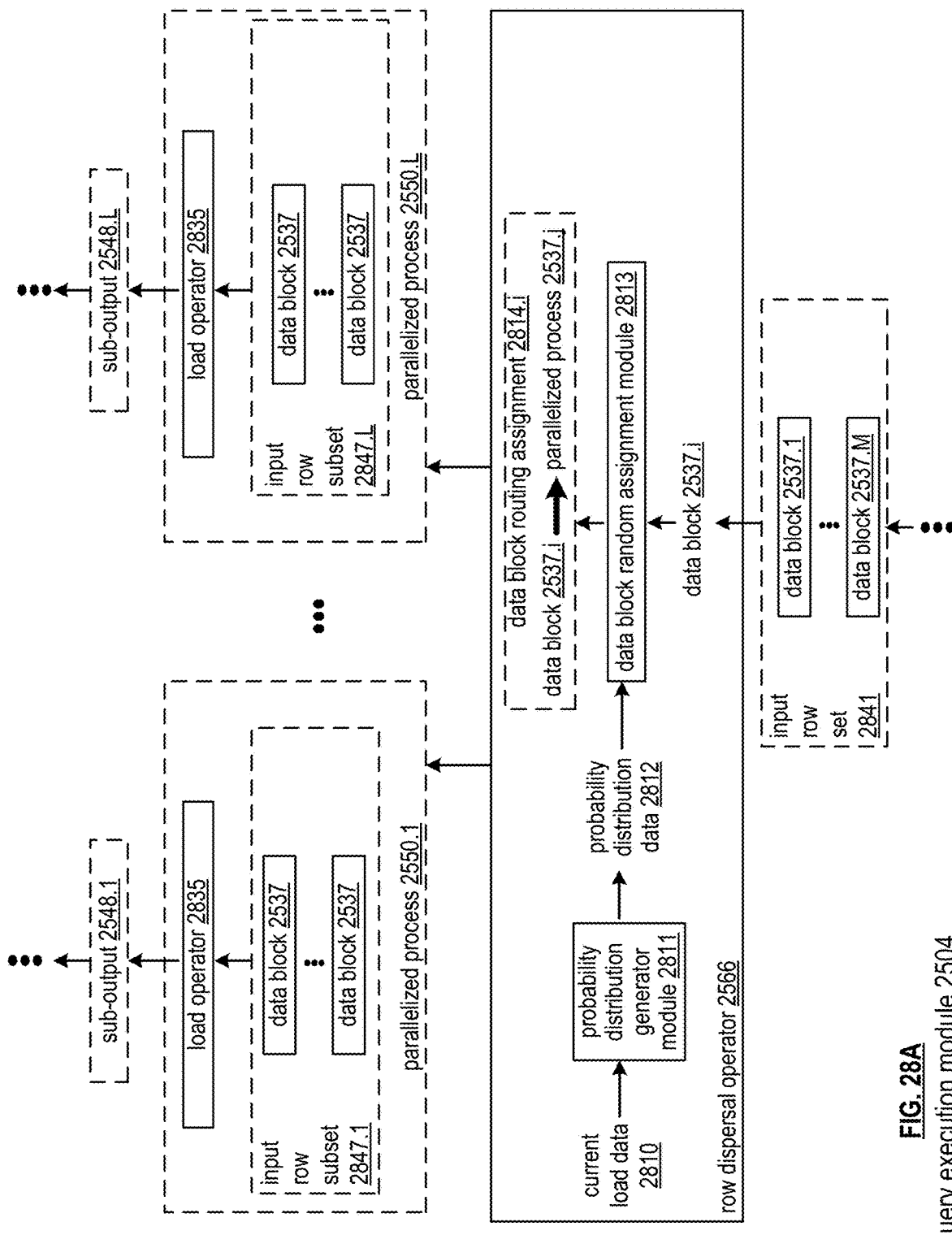
FIG. 28A is a schematic block diagram of a query execution module executing a row dispersal operator based on current load data in accordance with various embodiments.

FIG. 28A illustrates an embodiment of a row dispersal operator 2566 that selects generates a plurality of input row subsets 2847.1-2847.L to be processed via a plurality of parallelized processes 2550.1-2550.L. Some or all features and/or functionality of the row dispersal operator 2566 can implement the row dispersal operator 2566 of FIG. 25B and/or any embodiment of row dispersal and/or shuffling discussed herein.

Each of the plurality of input row subsets 2847.1-2847.L can include sets of rows in the form of one more of entire data blocks assigned for inclusion in the given input row subset 2847 for processing by the load operator of the corresponding parallelized process, where each data block includes one or more column values for each of a plurality of rows, such as column values for one or more columns. The data blocks 2537 of FIG. 28A can be implemented via some or all features and/or functionality of data blocks 2537 of one or more of FIGS. 24L-24N.

The plurality of input row subsets 2847.1-2847.L can be mutually exclusive and collectively exhaustive with respect to an input row set 2841. For example, each row, and/or each full data block 2537, canbe sent to exactly one parallelized process for processing.

In some embodiments, the plurality of input row subsets 2847.1-2847.L can be implemented as the left input row subsets 2547.1-2547.L and/or right input row subsets 2557.1-2557.L sent to parallelized processes 2550 as discussed in conjunction with FIG. 25B, where the input row set 2841 includes left input row set 2541 and/or right input row set 2543, and/or where the load operator 2835 is implemented via join operator 2535. For example, the row dispersal operator 2566 and/or plurality of parallelized processes 2550.1-2550.L of FIG. 28A can optionally implement some or all of the features and/or functionality of performing joins via a plurality of parallelized processes 2550.1-2550.L, such as a plurality of outer parallelized processes 2553.1-2553.R in the case where the respective query operator execution flow of FIG. 28A implements some or all of a join process 2530.

Determining which parallelized process 2550.1-2550.L processes a given row can be based on implementing a data block random assignment module that selects a random and/or pseudorandom parallelized process 2537.j to process a given data block 2537.i in a corresponding data block routing assignment 2814.i.

In some embodiments, some or all functionality of row dispersal operator 2556 of FIG. 28A can be implemented via a corresponding operator execution module 3515 executing the row dispersal operator 2556, for example, as discussed in conjunction with FIG. 24J.

As discussed previously, while in some embodiments the data block routing assignment 2814.i can be generated by data block random assignment module 2813 in accordance with a round-robin and/or random selection in accordance with a uniform distribution to disperse the incoming rows evenly, in other embodiments as illustrated in conjunction with FIGS. 28A-28E, the data block random assignment module 2813 can generate data block routing assignment 2814 for each incoming data block 2537 by applying probability distribution data 2812, which may denote a non-uniform probability distribution where probabilities of assigning data block to different parallelized processes is optionally non-equal.

In particular, a probability distribution generator module 2611 can generate the probability distribution data based on current load data 2810, for example, denoting which parallelized processes are available to process data blocks (e.g. where load operator has finished processing all of its their incoming data blocks or is otherwise available). The probability distribution data 2812 can be updated over time as the current load data 2810 is updated based on changing availability of load operators of various parallelized processes, where the probability distribution data 2812 is optionally different for some or all incoming data blocks 2537.

Figure 28B:
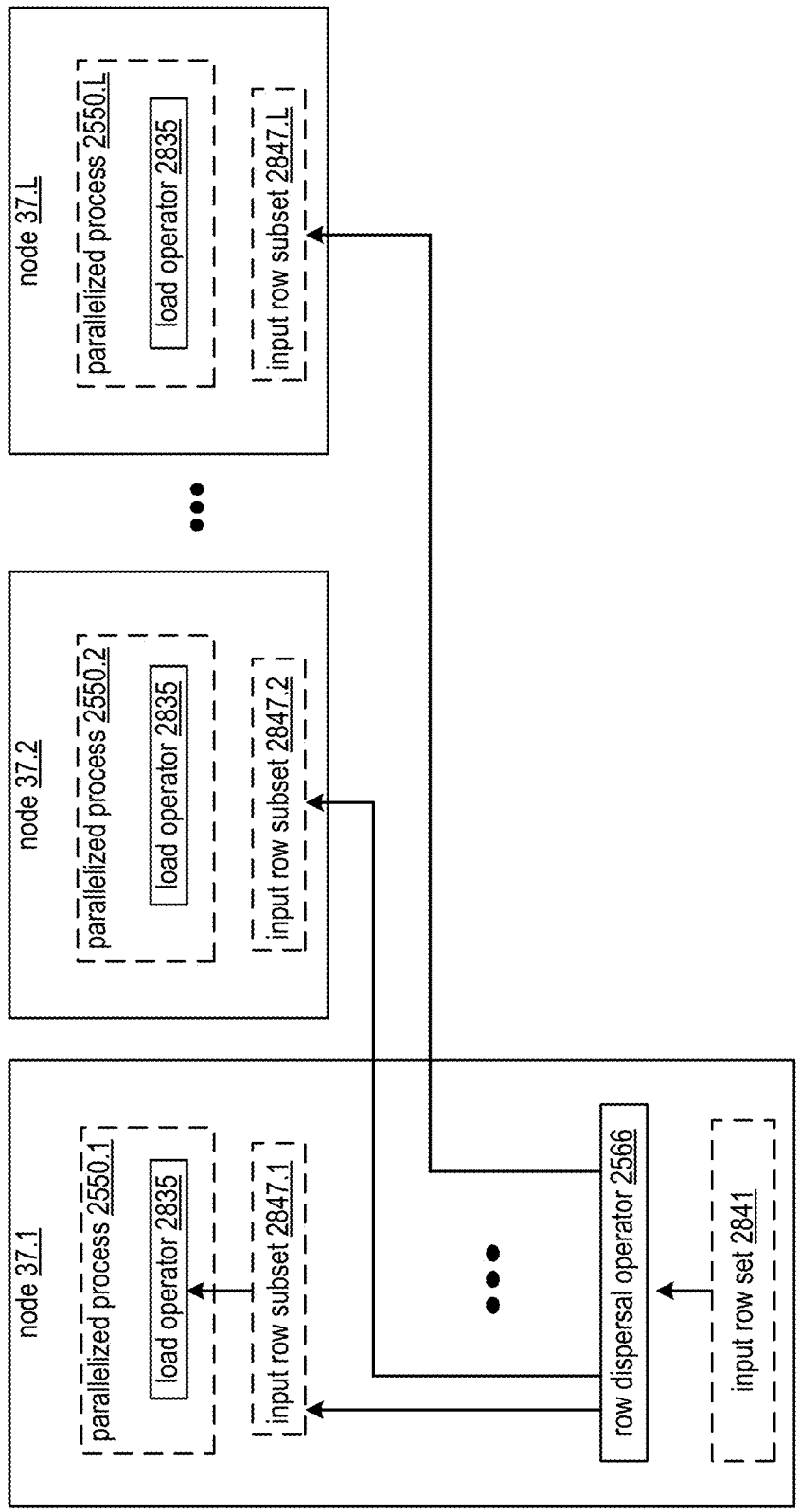
FIG. 28B is a schematic block diagram of a node dispersing data blocks across a set of nodes via a row dispersal operator in accordance with various embodiments.

FIG. 28B illustrates an embodiment where the plurality of parallelized processes implemented via a corresponding plurality of nodes 37.1-37.L. A given row dispersal operator 2566 can be implemented by a given one of these nodes 37.1 that implements parallelized process 2550.1 of the set of parallelized processes 2550.1-2550.L. Thus, the row dispersal operator 2566 of a given node 37.1 assigns some of its input row set 2841 for inclusion in the input row subset 2847.1 designated for processing by the parallelized process 2550.1 of this given node 37.1.

Some or all features and/or functionality of the row dispersal module 2566 and/or parallelized processes 2550.1-2550.L of FIG. 28B can implement the row dispersal module 2566 of FIG. 28A and/or any other embodiment of the row dispersal module described herein.

As used herein, assignment of processing of a data block by "itself" or "self" or "locally" can correspond to this case where the same processing resources (e.g. the same node) are utilized to process this given data block (e.g. rather than sending it to another node for processing). As used herein, the given input row set 2841 dispersed by a row dispersal operator 2566 executed by a given node 37 can be "local" to the given node 37, for example, based on the given node accessing the data blocks in its own memory resources (e.g. its own memory drives 2425) and/or based on the given node receiving/being forwarded these data block (e.g. from child IO nodes of a corresponding query execution plan 2405).

The set of nodes 37.1-37.L can be implemented via some or all features and/or functionality of a shuffle node set 2485 of FIG. 24E, for example, where the forwarding/sending of data blocks from node 37.1 to other nodes 37.2-37.L to other nodes is via communication resources, processing resources, and/or memory resources of a shuffle network 2480 of FIG. 24E. Some or all features and/or functionality of the load aware shuffling performed via the implementation of row dispersal module 2566 of FIGS. 28A-28E can implement any shuffle row sets 2485, any shuffle networks 2480, and/or any shuffling of rows described herein.

As described in further detail herein, the input row subset 2847.1 generated by node 37.1 can be expected and/or guaranteed to be larger than other input row subsets 2847.2-2847.L designated for processing by the other nodes 37.2-37.L, for example, based on the weighted probability for assignment of a given data block to the node itself being guaranteed to be greater than or equal to assignment of the given data block to other nodes, for example, for all incoming data blocks.

Figure 28C:
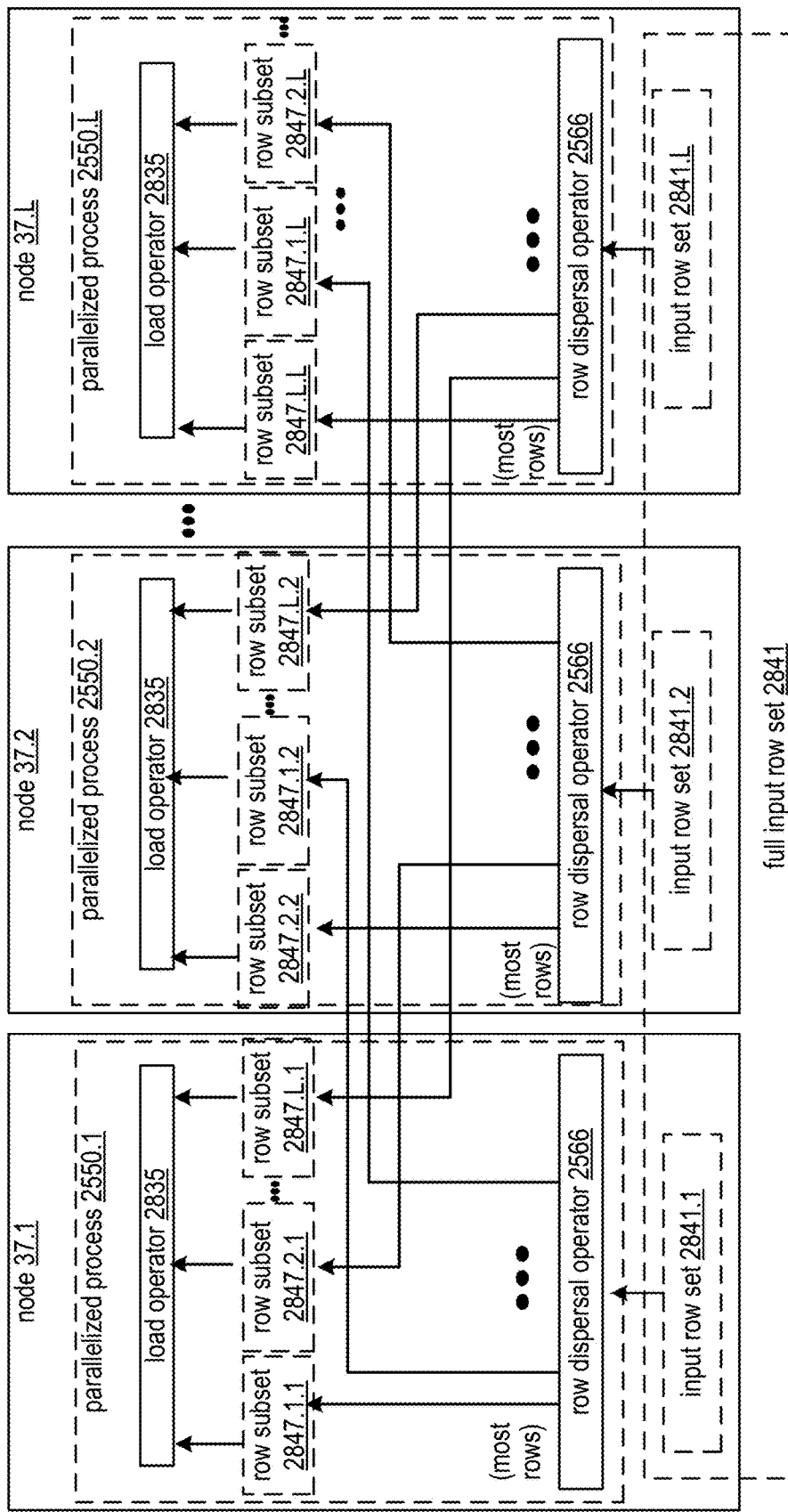
FIG. 28C is a schematic block diagram of a set of nodes node dispersing data blocks amongst each other via each implementing row dispersal operators in accordance with various embodiments.

FIG. 28C illustrates an embodiment where all nodes 37 in this set of nodes 37.1-37.L similarly implement this functionality themselves, for example, in accordance with all being members of a same shuffle node set collectively shuffling rows as discussed herein. Each node's row dispersal operator 2566 can process its own respective (e.g. local) one of a plurality of input row sets 2841.1-2841.L, which can be each be considered subset of a full input row set 2841 that collectively constitute this full input row set 2841, e.g. of a corresponding process such as a join process or other process that is divided across the parallelized processing resources 2550.1-2550.L via first performing a shuffle of inputs across these parallelized processing resources.

Some or all features and/or functionality of the set of nodes 37 of FIG. 28C can implement the row dispersal module 2566 of FIG. 28B and/or any other embodiment of the row dispersal module described herein.

The row subset generated by a given row dispersal operator 2566 designated for itself can be expected and/or guaranteed to be larger (e.g. have more rows/data blocks than) any other of its row subsets. This row subset generated by a given row dispersal operator 2566 designated for itself can thus be expected and/or guaranteed to constitute plurality of its input row set, and/or in some cases, optionally a majority of its input row set (e.g. have more rows/data blocks than all other row subsets combined)

As illustrated in FIG. 28C, as all nodes 37 collectively perform both the row dispersal and loading in parallel with other nodes, the parallelized processes 2550.1-2550.L of FIGS. 28A-28E and/or other parallelized processes described herein can optionally be considered to include both the performance of load operator 2835 and the row dispersal operator 2566 (e.g. despite the fact that the shuffling can thus introduce dependencies between the parallelized processes of the different nodes, rather than these parallelized processes being performed entirely independently of the parallelized processes of other nodes). For example, the row dispersal operator(s) of FIG. 25B can be implemented via such parallelized performance of row dispersal via a plurality of row dispersal operators executing upon different portions of the data as illustrated in conjunction with FIG. 28C.

Alternatively or in addition, the row dispersal module 2566 of a given node 37 and/or corresponding load operator 2835 of a corresponding parallelized process 2550 of the given node 37 can be implemented as and/or considered a same operator optionally implemented via a same operator execution module 3515. Alternatively or in addition, the parallelized processes 2550.1-2550.L (and/or a corresponding set of operator execution modules 3515.1-3515.L, each implementing the corresponding load operator and/or optionally the corresponding row dispersal module 2566 of the given node 37) can be considered lateral operators and/or peer operators, for example, based on collectively sharing/shuffling their data blocks as illustrated in FIG. 28C.

Figure 28D:
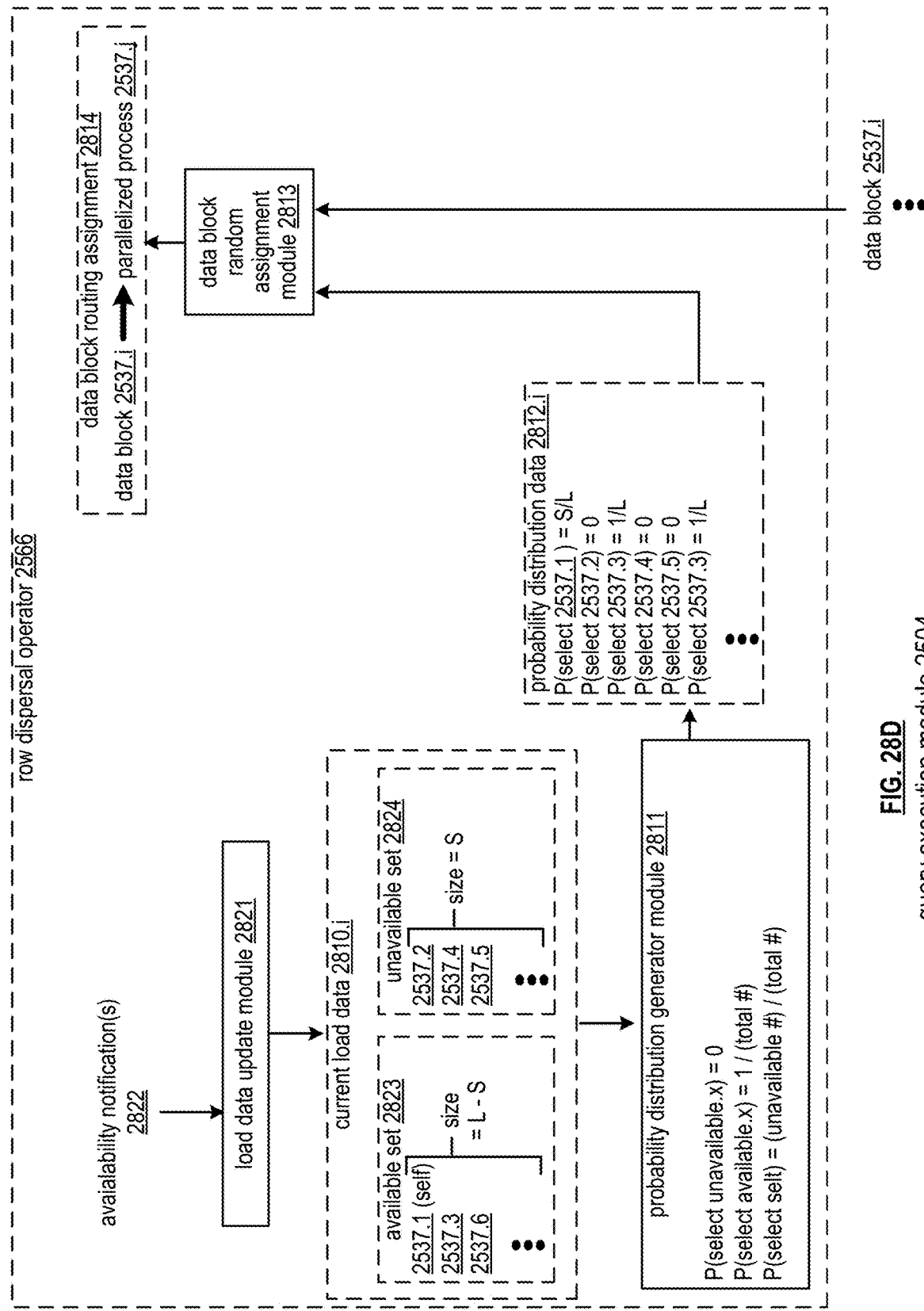
FIG. 28D is a schematic block diagram of a query execution module executing a row dispersal operator based on updating current load data in accordance with various embodiments.

FIG. 28D illustrates an embodiment of row dispersal module 2566 implementing an example probability distribution generator module based on example current load data 2810.$i$ (e.g. the most recent version of the current load data 2810 utilized to generate the corresponding data block). Some or all features and/or functionality of the row dispersal module 2566 of FIG. 28D can implement the row dispersal module 2566 of FIG. 28A and/or any other embodiment of the row dispersal module described herein.

Current load data 2810 at a given time can indicate which parallelized processes 2537 (e.g. corresponding nodes 37) are available vs. unavailable. In some embodiments, the load data update module 2821 can update nodes as being unavailable to available based on receiving availability notifications 2822 from the respective parallelized processes 2537 (e.g. via corresponding operator execution modules 3515 via corresponding nodes 37, for example, via communication resources of shuffle network 2480 and/or other communication resources). The availability notifications 2822 can be implemented as EOF signals or other types of notifications denoting availability. In such cases, a given process can be presumed to be unavailable until availability notification 2822 is received. Alternatively, other information (e.g. rather than receiving data from the other processes directly) can be utilized to estimate/determine whether other processes 2537 are available (e.g. estimated load, estimated amount of time to process the load, prior measurements from other query processing, etc.).

In this example, unavailable set 2824 includes S processes that includes at least the set of processes 2537.2, 2537.4, and/or 2537.5, and the available set 2823 includes L-S processes that includes at least the set of processes 2537.1 (i.e. itself), 2537.3, and/or 2537.6.

Probability distribution generator module 2811 can denote a predetermined means of assigning probabilities/weights to different nodes in generating corresponding probability distribution data 2812 as a function of their availability denoted in current load data. In this example, the probability distribution generator module 2811 is configured to: assign a probability of selection with a value of zero for each unavailable process; assign a probability of selection with a value of 1/total #processes (e.g. 1/L) for each available process; and/or assign a probability of selection with a value of (total ## processes−available #processes)/total #processes (e.g. S/L) to the given process itself.

Other schemes of assigning weights can be used in other embodiments. In some embodiments, the scheme can be selected based on: meeting network usage requirements (e.g. to minimize network usage induced by passing large numbers of rows between nodes); meeting data skew removal requirements (e.g. to ensure that sufficient shuffling is performed to remove data skew/handle low cardinality cases); and/or meeting even processing distribution requirements (e.g. to ensure that all nodes have relatively even load, and/or optionally uneven loads in the cases where some nodes process their data more quickly to ensure that nodes process their data in relatively similar amounts of time and/or are not waiting for data while other nodes are overloaded).

The data block random assignment module 2813 can select the parallelized process 2537.*j* based on applying the most recent probability distribution data 2812. This can include performing a weighted round robin process for multiple incoming data blocks, utilizing a random number generator and/or selecting the parallelized process 2537.*j* based on a randomly generated numeric value falling within a range assigned to the parallelized process 2537.*j* having a size proportional and/or as an increasing function of its assigned weight/probability, and/or other means of applying the probability distribution data 2812.

As the current load data updates overtime, the probability distribution generator module 2811 can be utilized to process new versions of the current load data to update the probability distribution data accordingly, for example, in accordance with the predetermined scheme by which the probability distribution generator module 2811 is configured to assign these weights/probabilities.

While not illustrated in FIG. 28D, in some embodiments, the load update module 2821 can optionally further utilize the data block routing assignment data 2814 to designate parallelized processes to which data blocks are assigned as being unavailable (e.g. as they are now processing the given data block). In such cases, the data block is deemed unavailable until an availability notification 2822 is again received from the node denoting it is again available (e.g. that is has finished processing of the given data block) and/or until a predetermined time window corresponding to an estimated time to process the data block has elapsed.

Note that while the current load data is designated as 2810.*i* in the example of FIG. 28D, the current load data is optionally not updated for every incoming data block, where a same version of current load data is optionally utilized to generate data block routing assignment data for multiple consecutive data blocks, for example, based on the current load data not changing during this longer time window.

The examples embodiments of determining probability distributions and dispersing data blocks accordingly as discussed in FIGS. 28A-28D assumes that each peer is accomplishing approximately the same amount of work in the same amount of time. However, in the case where one peer is processing the same amount of data faster and the shuffle eofs earlier, this could result in memory being skewed towards that peer. In some embodiments, this may be acceptable if the peer continues to accomplish work faster, but may not be desirable if the goal is to evenly distribute memory rather than distributing the amount of work a node has to do at that point in the query. In other embodiments, to evenly distribute memory while handling this case, the nodes implementing row dispersal operators can be operable to periodically broadcast the number of blocks that have been sent to their local parent operator. In such embodiments, each node implementing row dispersal operators can recalculate the probability of selecting any target peer for incoming blocks based on the block counts broadcasted by its peers.

Figure 28E:
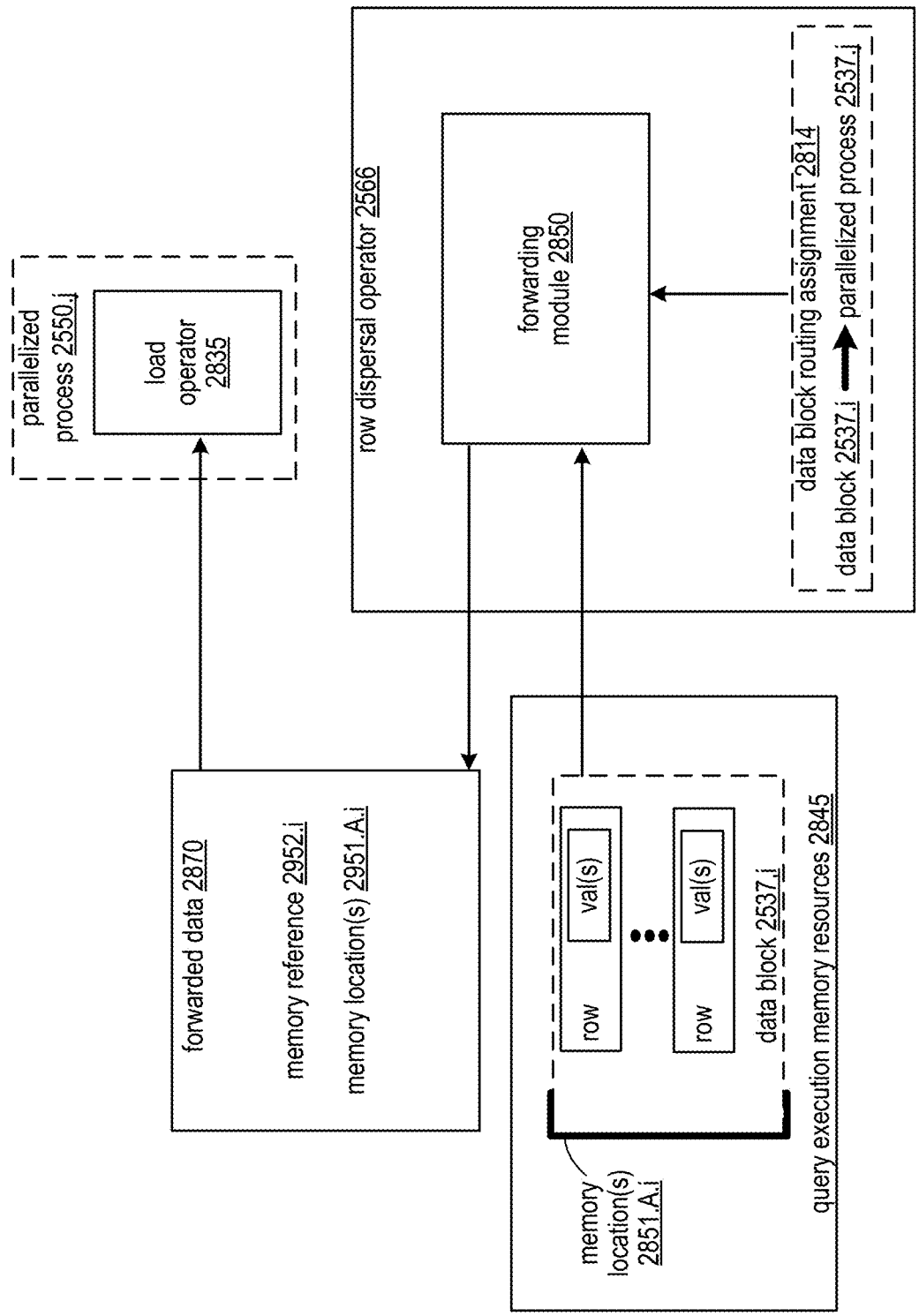
FIG. 28E is a schematic block diagram of a query execution module executing a row dispersal operator that implements a row forwarding module in accordance with various embodiments.

FIG. 28E illustrates an embodiment of a row dispersal operator that implements a forwarding module 2850 that assigns a given data block 2537.*i* to a given parallelized process 2550.*j* based on passing a memory reference 2952 denoting a memory location of the given data block 2537.*i* in query execution memory resources 2845 in forwarded data 2870 communicated to the parallelized process 2537.*j* (e.g. to implement "forwarding" the data block to the parallelized process 2537.*j*). Some or all features and/or functionality of FIG. 28E can implement the row dispersal operator 2566 of FIGS. 28A-28D and/or can implement any performance of shuffle operators and/or transfer/shuffling of data between operators described herein.

As discussed in conjunction with FIGS. 28A-28D, the row dispersal operator can assign entire data blocks, rather than individual rows, to processes 2537 for processing. This can be preferred over the case of sending/assigning each individual row to a given process 2537, even in cases where the shuffling is performed in accordance with a round-robin scheme/uniform distribution. In particular, rather than the row dispersal operator processing each row individually, which could require the expensive process of copying all input rows, the full data blocks containing a plurality of rows can be assigned to the processes 2537. This functionality can be particularly ideal by enabling the forwarding of a reference to the data (e.g. a pointer/memory location data to its storage location in memory resources), rather than copying it, which can be significantly faster and/or can require less processing and/or memory resources than copying all the rows. This solution can further be useful in cases where random and/or even shuffling of data blocks across different processes is required to handle data skew/low cardinality, for example, because the number of data blocks can be guaranteed and/or expected to be high enough (and the contents can be known and/or expected to be evenly distributed enough) that the weighted, load based assignment (or optionally the simple round robin based/uniform assignment) of such larger units suffices.

The given data block 2537.*i* can be stored in query execution memory resources 2845, for example, based on being stored in a corresponding column stream generated via retrieval and/or processing of relational database rows stored in memory as discussed in conjunction with some or all of FIGS. 24K-24N. The query execution memory resources 2845 storing the given data block 2537.*i* can correspond to memory resources of the given node processing this data block as input to its row dispersal module 2566 and/or any memory resources utilized to execute queries that are optionally shared by/accessible by nodes in a same shuffle node set to enable other nodes to access the given memory location, given the memory reference, to process the respective column values as needed.

The forwarded data 2870 can be sent to/communicated to/accessible by the parallelized process 2550 for receipt/access by the parallelized process 2550, for example, based on being sent to the corresponding node via communication resources of shuffle network 2480 and/or based on being stored in memory resources accessible by the node.

In some embodiments, while not depicted in FIG. 28E, the forwarded data 2870 denoting memory reference 2952 can optionally be included in a new data block 2537 of same or different size. The new data block 2537 can optionally include multiple other memory references to other data blocks assigned to the load operator of the given parallelized process for processing. The new data block can be stored in the same or different query execution memory resources 2845 for access by the corresponding process 2537.*j*/the corresponding node, in a different location from the given data block 2537.*i*, for example, as a newly created output data block in a similar fashion as illustrated in FIG. 24N that included memory reference data rather than column values copied from the data block 2537.*i*. The new data block can alternatively be sent/communicated directly to the corresponding process 2537.*j*/the corresponding node via communication resources (e.g. shuffle network 2480).

Some or all block rewarding of FIG. 28E can be implemented via any features and/or functionality of forwarding data blocks, for example, of column streams, disclosed by U.S. Utility application Ser. No. 18/322,688, entitled "PROCESSING MULTI-COLUMN STREAMS DURING QUERY EXECUTION VIA A DATABASE SYSTEM", filed May 24, 2023, which is hereby incorporated herein by reference in its entirety and made part of the present U.S. Utility Patent Application for all purposes.

Figure 28F:
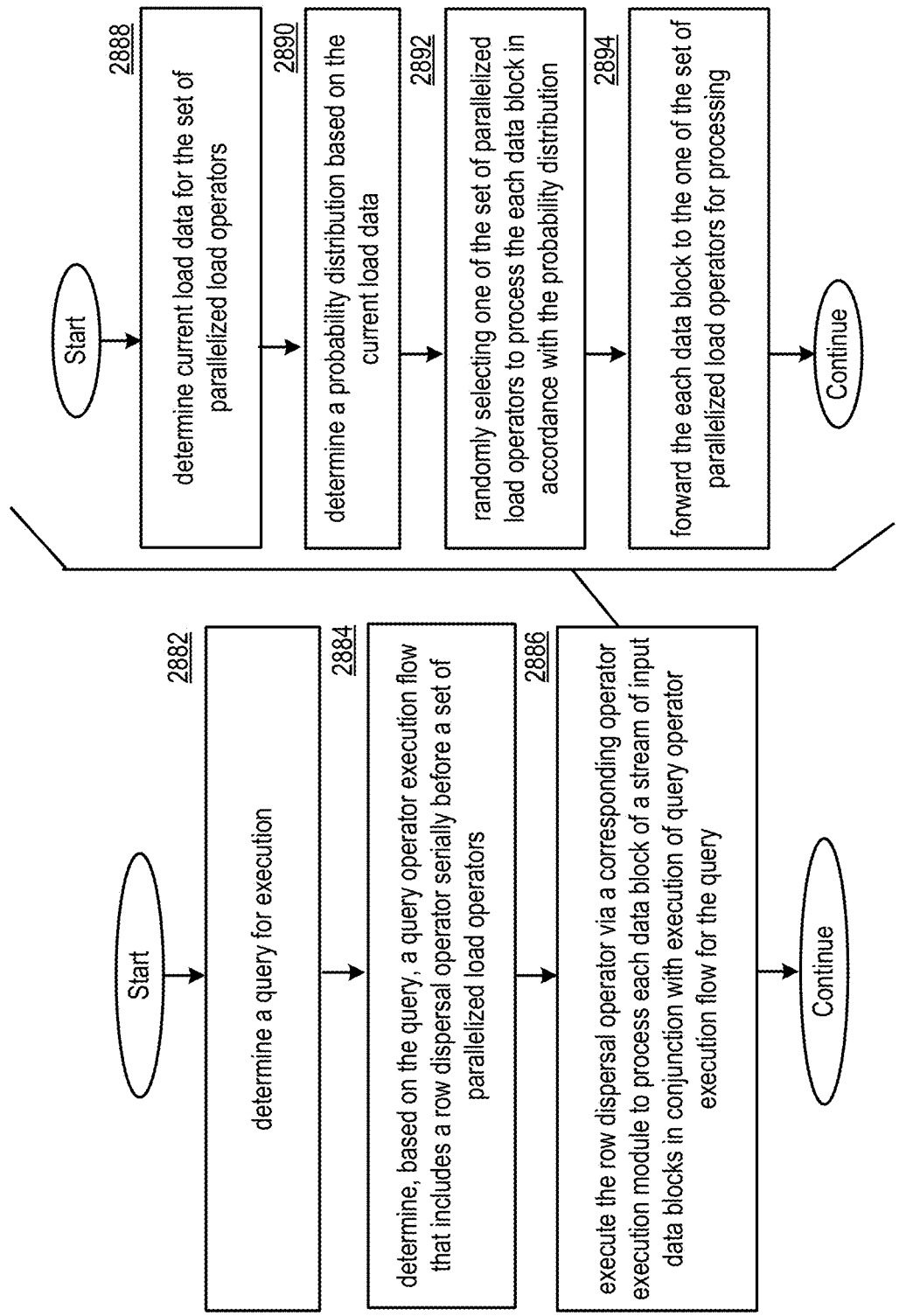
FIG. 28F is a logic diagram illustrating a method for execution in accordance with various embodiments.

FIG. 28F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28F. In particular, a node 37 can utilize the query processing module 2435 to execute some or all of the steps of FIG. 28F, where multiple nodes 37 implement their own query processing modules 2435 to independently execute the steps of FIG. 28F, for example, to facilitate execution of a query as participants in a query execution plan 2405. Some or all of the method of FIG. 28F can be performed by the query processing system 2510, for example, by utilizing an operator flow generator module 2514 and/or a query execution module 2504. In particular, some or all of the method of FIG. 28F can be performed via one or more operator executions of one or more row dispersal operators and/or one or more load operators 2535. Some or all of the steps of FIG. 28F can optionally be performed by any other processing module of the database system 10. Some or all of the steps of FIG. 28F can be performed to implement some or all of the functionality of the database system 10 as described in conjunction with FIGS. 28A-28E, for example, by implementing some or all of the functionality of row dispersal operators in queries executed by query processing system 2510 as described in conjunction with FIGS. 25A-27H. Some or all of the steps of FIG. 28F can be performed to implement some or all of the functionality regarding execution of a query via the plurality of nodes in the query execution plan 2405 as described in conjunction with some or all of FIGS. 24A-24I. Some or all steps of FIG. 28F can be performed by database system 10 in accordance with other embodiments of the database system 10 and/or nodes 37 discussed herein. Some or all steps of FIG. 28F can be performed in conjunction with one or more steps of FIG. 26F, and/or of any other method described herein.

Step 2882 includes determining a query for execution. Step 2884 includes determining, based on the query, a query operator execution flow that includes a row dispersal operator serially before a set of parallelized load operators. Step 2886 includes executing the row dispersal operator via a corresponding operator execution module to process each data block of a stream of input data blocks s in conjunction with execution of query operator execution flow for the query based on, for each data block of the stream of input data blocks. In various examples, executing the row dispersal operator via the corresponding operator execution module renders dispersal of the stream of input data blocks to the set of parallelized load operators for processing by the set of parallelized load operators in conjunction with further execution of the query.

Performing step 2886 can include performing some or all of steps 2888-2894. In various example, some or all of steps 2888-2894 are performed for each data block in conjunction with processing each data block, and/or some or all of steps 2888-2894 can be repeated a plurality of times to process the full stream of input data blocks.

Step 2888 includes determining current load data for the set of parallelized load operators. Step 2890 includes determining a probability distribution based on the current load data. In various examples, the probability distribution indicates, for each of the set of parallelized load operators, a corresponding one of a set of probabilities of selection.

Step 2892 includes randomly selecting one of the set of parallelized load operators to process the each data block in accordance with the probability distribution. Step 2894 includes forwarding the each data block to the one of the set of parallelized load operators for processing.

In various examples, the query operator execution flow is executed via a plurality of nodes of a query execution plan. In various examples, the set of parallelized load operators are executed via a corresponding plurality of peer nodes of the query execution plan.

In various examples, the row dispersal operator is executed via a node of the plurality of nodes. In various examples, the node is one of the plurality of peer nodes of the query execution plan that executes a corresponding one of the set of parallelized load operators.

In various examples, for all data blocks of the stream of input data blocks, the corresponding one of the set of probabilities for the one of the set of parallelized load operators executed by the node is one of: greater than all other probabilities of the set of probabilities, or equal to all other probabilities of the set of probabilities.

In various examples, each other one of the plurality of peer nodes of the query execution plan further execute a corresponding row dispersal operator upon their own corresponding stream of input data blocks, and wherein the node executes the corresponding one of the set of parallelized load operators upon a first set of data blocks from the stream of input datablocks local to the node for which the row dispersal operator of the node selects the corresponding one of the set of parallelized load operators of the node for processing, and further upon a second set of data blocks non-local to the node, for which other corresponding row dispersal operators of other nodes select the corresponding one of the set of parallelized load operators of the node for processing.

In various examples, the probability distribution is a non-uniform distribution based on at least one of the set of probabilities being different from at least one other one of the set of probabilities.

In various examples, the row dispersal operator is executed to process two consecutive data blocks in the stream of input data blocks based on processing a first data block in the two consecutive data blocks based on determining a first probability distribution based on first current load data. In various examples, a first one of the set of parallelized load operators is selected to process the first data block in accordance with the first probability distribution. In various examples, the row dispersal operator is executed to process the two consecutive data blocks in the stream of input data blocks further based on processing a second data block in the two consecutive data blocks based on determining a second probability distribution based on second current load data. In various examples, a second one of the set of parallelized load operators is selected to process the second data block in accordance with the second probability distribution. In various examples, a second set of probabilities of the second probability distribution is different from a first set of probabilities of the first probability distribution based on the second current load data being different from the first current load data.

In various examples, determining the current load data for the set of parallelized load operators is based on determining a subset of parallelized load operators of the set of parallelized load operators that have completed processing of previously received data blocks in the stream of input data blocks.

In various examples, determining the subset of parallelized load operators is based on receiving a signal, denoting the completed processing, sent by operator execution modules implementing the ones of the set of parallelized load operators.

In various examples, the set of probabilities of selection include probabilities of zero assigned to all of the parallelized load operators in a set difference between the set of parallelized load operators and the subset of parallelized load operators. In various examples, a subset of probabilities in the set of probabilities corresponding to the subset of parallelized load operators sum to one.

In various examples, the set of probabilities of selection include a first non-zero probability assigned to a first one of the subset of parallelized load operators. In various examples, the set of probabilities of selection include a second non-zero probability assigned to all remaining ones of the subset of parallelized load operators. In various examples, the second non-zero probability is less than or equal to the first non-zero probability.

In various examples, each data blocks includes a plurality of column values for a plurality of rows determined based on accessing a set of relational database rows of a relational database system via at least one IO operator of the query operator execution flow.

In various examples, the stream of input data blocks are stored in memory resources, and wherein the each data block is forwarded based on sending a reference to a location of the each data block in the column stream to the one of the set of parallelized load operators. In various examples, the one of the set of parallelized load operators processes the plurality of rows of the each data block based on accessing the plurality of column values for the plurality of rows in the location based on the reference. In various examples, the each data block is forwarded based on otherwise sending/routing the plurality of column values for the plurality of rows to the one of the set of parallelized load operators.

In various embodiments, any one of more of the various examples listed above are implemented in conjunction with performing some or all steps of FIG. 28F. In various embodiments, any set of the various examples listed above can implemented in tandem, for example, in conjunction with performing some or all steps of FIG. 28F.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28F, for example, in conjunction with further implementing any one or more of the various examples described above.

In various embodiments, the operational instructions, when executed by the at least one processor, cause the database system to: determine a query for execution; determine, based on the query, a query operator execution flow that includes a row dispersal operator serially before a set of parallelized load operators; and/or execute the row dispersal operator via a corresponding operator execution module to processes a stream of input data blocks in conjunction with execution of query operator execution flow for the query. Executing the row dispersal operator via a corresponding operator execution module to processes the stream of input data blocks in conjunction with execution of query operator execution flow for the query can be based on, for each data block of the stream of input data blocks: determining current load data for the set of parallelized load operators; determining a probability distribution based on the current load data indicating, for each of the set of parallelized load operators, a corresponding one of a set of probabilities of selection; randomly selecting one of the set of parallelized load operators to process the each data block in accordance with the probability distribution; and/or forwarding the each data block to the one of the set of parallelized load operators for processing.

In various embodiments, a node of a database system includes: at least one processor; and/or a memory that stores operational instructions that, when executed by the at least one processor, causes the node to: execute a row dispersal operator via a corresponding operator execution module to disperse a stream of input data blocks to a set of parallelized load operators in conjunction with execution of a corresponding query based on, for each data block of the stream of input data blocks: determining current load data for a set of parallelized load operators; determining a probability distribution based on the current load data indicating, for each of a set of parallelized load operators executed by a set of peer nodes, a corresponding one of a set of probabilities of selection; randomly selecting one of the set of parallelized load operators to process the each data block in accordance with the probability distribution; and/or forwarding the each data block to the one of the set of parallelized load operators for processing. In various examples, the set of peer nodes includes the node.

FIGS. 29A-29G illustrate embodiments of a database system 10 that generates an execution tracking resultant 2927 in conjunction with executing a corresponding query. Some or all features and/or functionality of FIGS. 29A-29G can implement any embodiments of query execution described herein and/or any embodiments of database system 10 described herein.

In some embodiments, the database system 10 can be implemented to trace the execution of a query in a convenient way. In particular, being able to easily see information about query execution (e.g. number of rows input/output by an operator, how often an operator runs, how long it runs for, etc.) can provide a lot of insight into how the database system is behaving and/or how it can be improved. As a set of particular examples, this type of information can be used to: determine if the cardinality statistics the optimizer is using are accurate; see if data is being shuffled fairly, or if a single node/operator is receiving many more rows than its peers; investigate performance problems by giving a high level picture of where bottlenecks are; and/or provide other insights that can be useful in modifying/improving database system performance (e.g. automatically by database system 10 processing these findings and automatically updating one of more processes/storage procedures/means of generating operator execution flows/means of executing queries, etc. automatically; and/or based on a user, such as an administrator of database system 10, viewing this information and configuring updated functionality of the database system 10 accordingly. The database system 10 can implement this functionality of tracking query execution based on performing low-overhead data collection, such that tracking a query does not significantly change its performance characteristics. The database system 10 can implement this functionality of tracking query execution based on aggregating and presenting the data for use in a useful manner (e.g. when presented to user and/or to the database system 10 for automatic processing in automatically updating its own configuration). This can include performing query profiling by collecting execution information while a query is running using counters, sampling these counters at a configurable interval to create trace data rows, and propagating these rows up to the root operator where they are emitted instead of/in addition to the query's usual schema and/or result set.

Figure 29A:
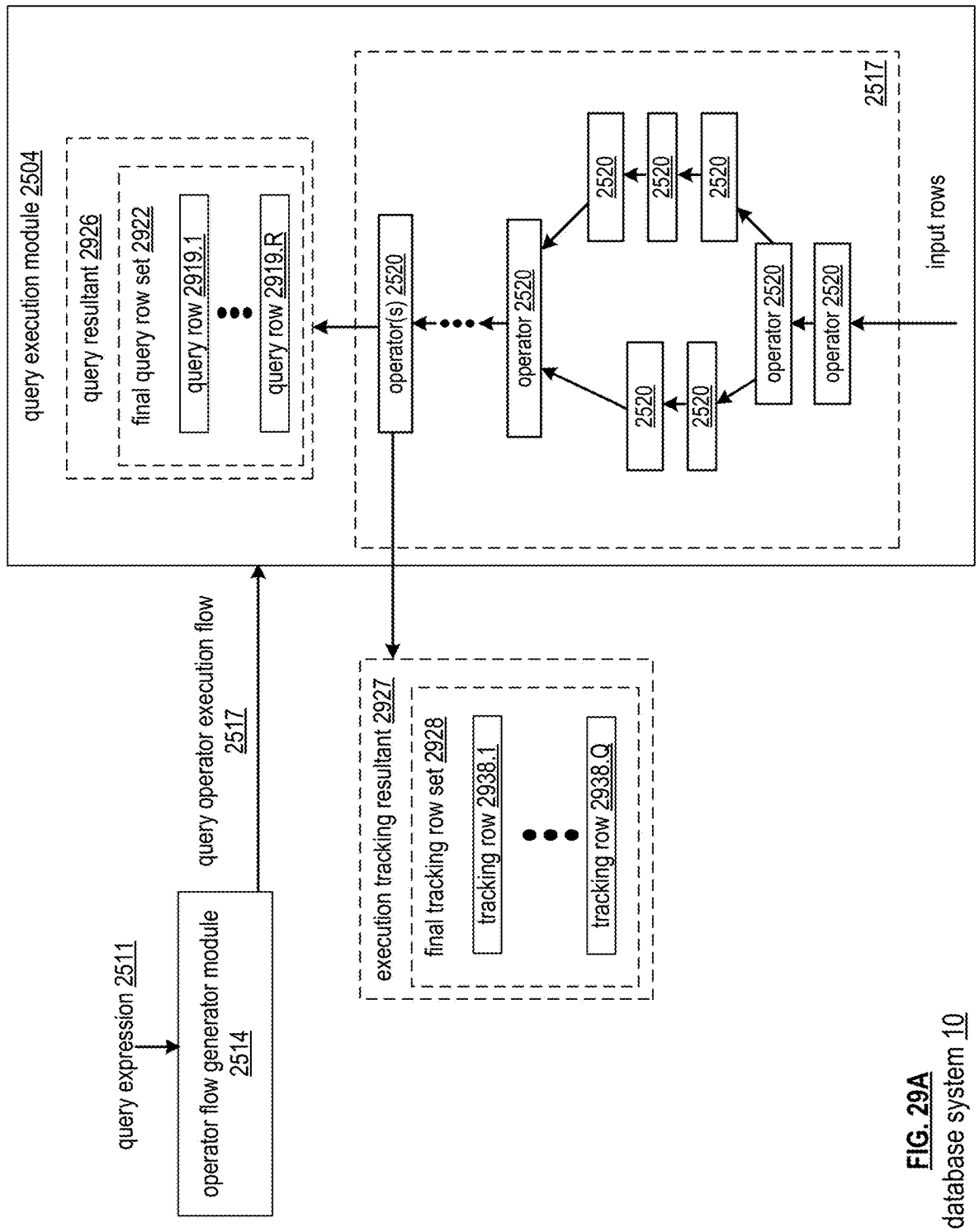
FIG. 29A is a schematic block diagram of a database system that generates an execution tracking resultant that includes a final tracking row set in conjunction with generating a query resultant via execution of a corresponding query in accordance with various embodiments.

FIG. 29A illustrates an embodiments of a database system 10 that executes a query operator execution flow 2517 via a query execution module 2504 to generate a query resultant 2926 that includes a final query row set 2922 that includes a plurality of query rows 2919.1-2919.R. This query resultant 2926 can correspond to any query resultant/result set/query output that includes the set of rows satisfying the requirements/query predicates of the corresponding query as discussed herein (e.g. a SQL result set of the query based on accessing at least one relational database table in storage).

However, alternatively or additionally to emitting this query resultant as output 2926, the query execution module 2504 can be configured to generate and emit an execution tracking resultant 2927, e.g. for use by a system/user in evaluating the queries performance and/or for identifying ways that the system can be improved to render more efficient execution of the same or different query in the future.

The execution tracking resultant 2927 can be formatted as a final tracking row set 2928 that includes a plurality of tracking rows 2938.1-2938.Q generated in conjunction with executing the query operator execution flow 2517. The final tracking row set 2927 can be configured/formatted in a same/similar fashion as the final query result set 2926 (e.g. are both a plurality of rows of a resultant in accordance with SQL and/or are output rows of a query). As a particular example, the final tracking row set 2927 can be emitted as any resultant generated by the query execution module 2504 described herein. Communication of and/or use of the execution tracking resultant 2927 is discussed in further detail in conjunction with FIG. 29G. Some or all features and/or functionality of generation of execution tracking data 2927 by query execution module 2504 in executing a query as illustrated in FIG. 29A can implement the query processing module 2510 of FIG. 24G and/or any other embodiment of database system 10 described herein.

Figure 29B:
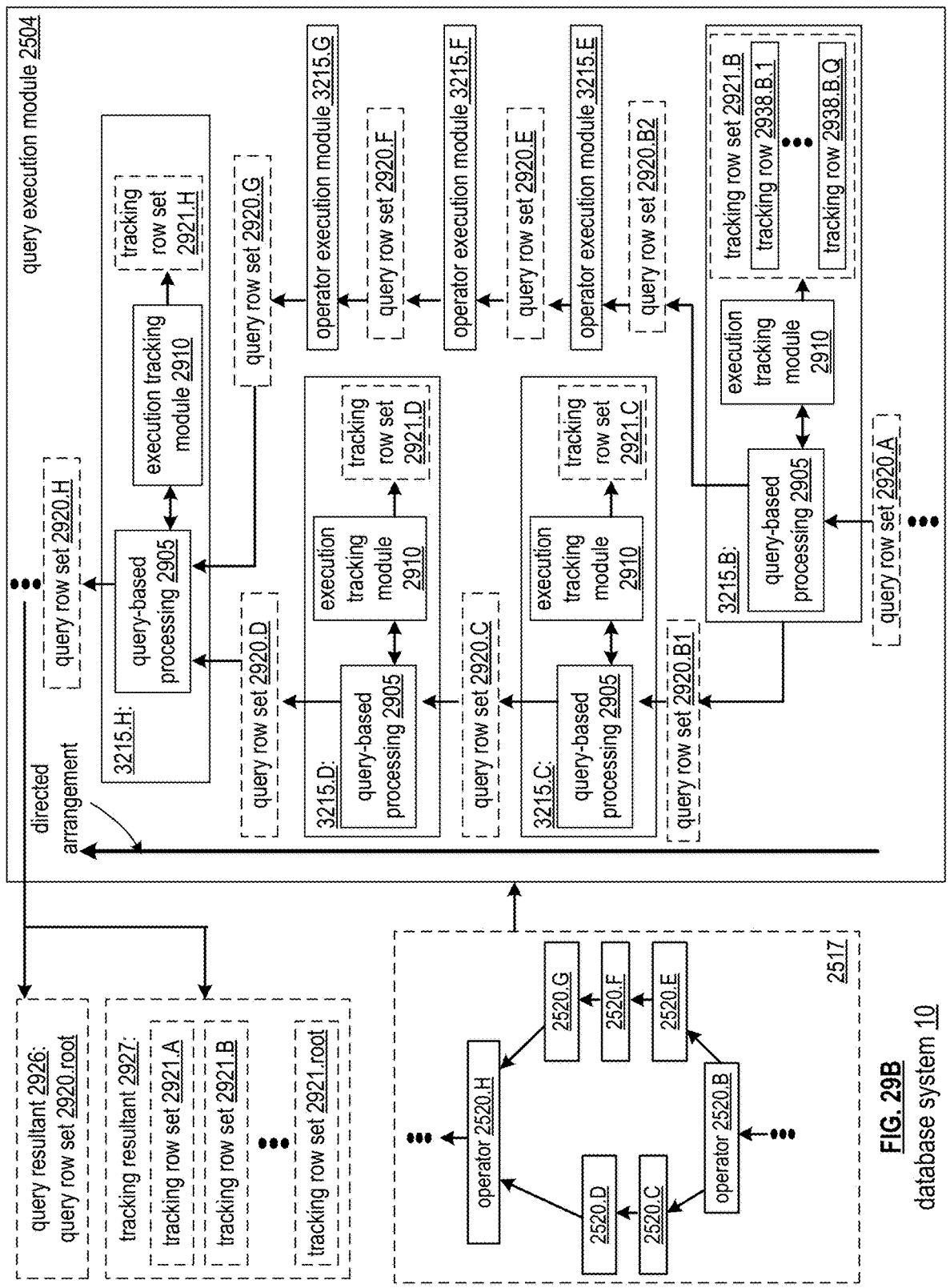
FIG. 29B is a schematic block diagram of a database system that executes a query via a plurality of operator execution modules that each generate both a query row set and a tracking row set in accordance with various embodiments.

FIG. 29B presents an embodiment of query execution module generating a plurality of query row sets 2920 and a plurality of tracking row sets 2921 via a plurality of query execution modules 3215 executing operators 2920 of the query operator execution flow. Some or all features and/or functionality of the execution of a query operator execution flow 2517 via a plurality of operator execution modules of FIG. 29B can implement the plurality of operator execution modules executing the execution of query operator execution flow 2517 of FIG. 24J and/or any other embodiment of database system 10 described herein.

Each operator execution module 3215 can perform query-based processing to generate its query row set 2920 as a set of output query rows generated by processing at least one set of query input rows, for example, generated by child operator execution modules 3215 and/or lateral/peer operator execution modules (e.g. in accordance with a shuffle operator/row dispersal operator). The output in query row set 2920 generated from one or more input query row sets 2920 generated by other operator execution modules can be generated based on processing these input query row sets 2920 in conjunction with the corresponding operator functionality (e.g. filter out rows meeting a query predicate condition; performing a join operation upon right and left input rows; aggregating rows; generating a new column as a function of other columns for each row; perform a set operations such as set intersection, set union, or set difference, and/or other operations in conjunction with query execution.). Some or all of the operator execution modules can correspond to IO operators, where input rows are optionally relational database rows (e.g. records 2422) read from database storage 2540.

Each operator execution module 3215 can further implement an execution tracking module 2910 that generates a tracking row set 2921 for the given operator based on the query-based processing. Any operator execution module 3215 and/or corresponding operator execution 2520 described herein can be implemented to generate a tracking row set 2921 via an execution tracking module 2910.

Some or all of the query rows in query row sets 2920 and/or some or all of the tracking rows in tracking row sets 2920 can be implemented as rows 2916 of one or more column data streams 2968. Some or all of the query rows in query row sets 2920 can have a schema based on and/or indicate row numbers for a corresponding database table from which IO operators read rows.

Tracking resultant 2927 generated by query execution module 2504 can be based on all tracking row sets 2921 generated by all operator execution modules 3215 in conjunction with executing the plurality of operators 2520 of the query operator execution flow 2517. For example, the tracking resultant 2927 includes and/or is based on a set union of all tracking row sets 2921 generated by all operator execution modules 3215. Alternatively or in addition, at least one other aggregation is performed upon some or all tracking row sets 2921, for example, to generate summary data, perform statistical analysis to generate statistical data, to automatically identify poor performance by one or more operators to generate operator performance data and/or operator underperformance data, or otherwise further process the tracking row sets 2921, for example, to make the underlying data more readable/consumable when presented to a user and/or to render automatic reconfiguration of some or all database functionality in future query executions.

Figure 29C:
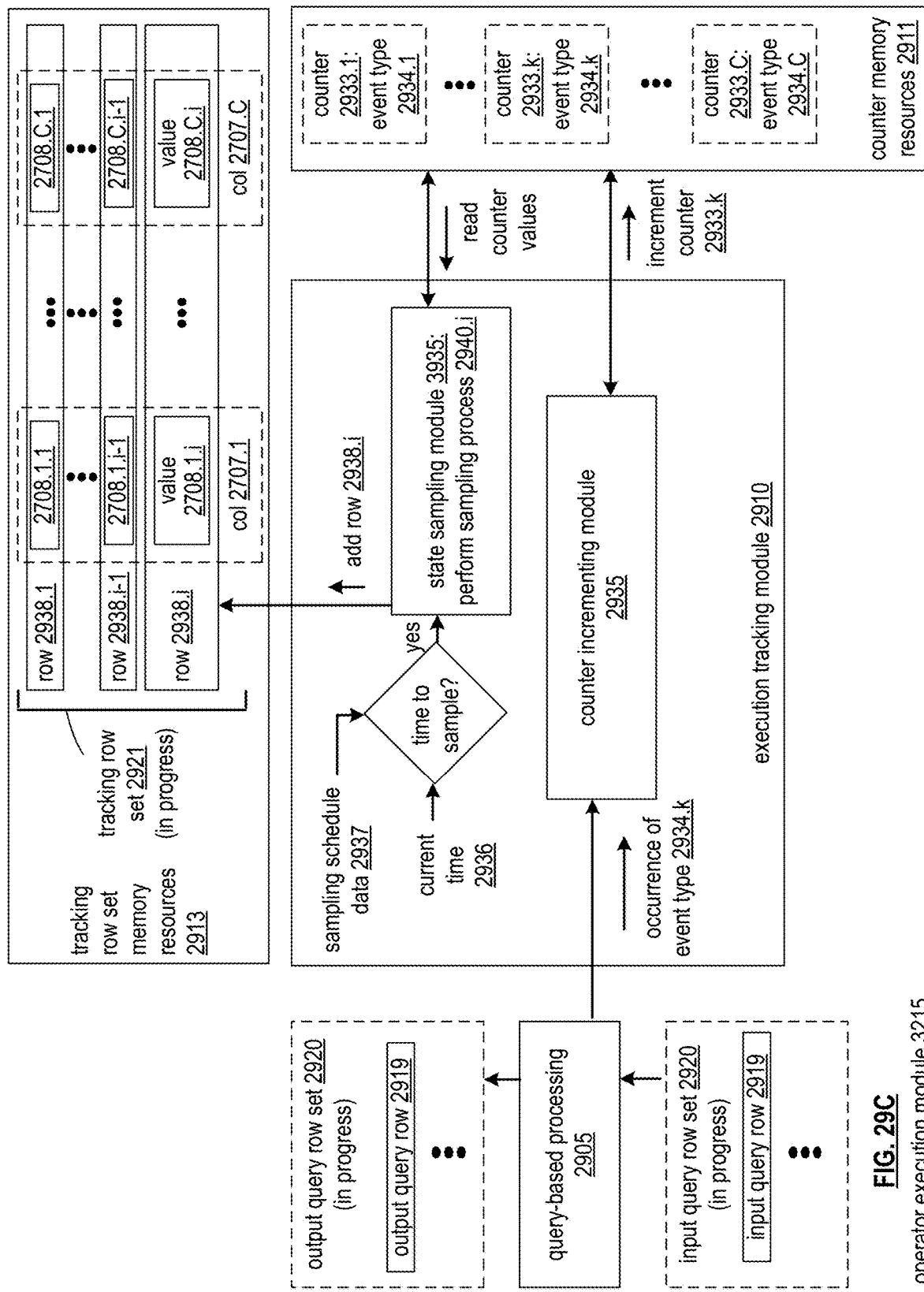
FIG. 29C is a schematic block diagram of an operator execution module that maintains a plurality of counters and samples the plurality of counters to generate a tracking row set in accordance with various embodiments.

FIG. 29C illustrates an embodiment of an execution implemented by a given operator execution module 3215. Some or all features and/or functionality of the operator execution module 3215 of FIG. 29C can implement some or all operator execution modules 3215 of FIG. 29B in executing the corresponding query operator execution flow 2517, and/or can implement some or all operator execution modules 3215 of FIG. 24J.

Execution tracking module 2910 can implement a counter incrementing module 2935 that maintains a plurality of counters 2933.1-2933.C stored in counter memory resources 2911 accessible by the execution tracking module 2910. Each counter 2933 can correspond to a given event type 2934, with a value at a given time denoting a number of occurrences of the corresponding event during execution of the respective operator.

In particular, the counter incrementing module 2935 can monitor the query-based processing 2905 to determine when occurrences of each respective event type 2934 occur, and increment the corresponding counter accordingly. This counter incrementing can thus be triggered by detection of the corresponding events, and can be asynchronous with any predefined schedule and/or can be asynchronous from the counter updates by other operators, as each operator maintains its own counters in this fashion.

The event types 2934 can include any type of event of interest, and can be configurable via user input (e.g. by a user requesting the query for execution and/or an administrator of the database system 10). The event types 2934 can be the same or different for different types of operators, for example, where some event types 2934 are implemented for a particular type of operator based on enumerating instances of a type of functionality specific to the operator (e.g. a set of counters for a set of parents counting every time a row is emitted to the corresponding parent in the case of a row dispersal operator; a counter for every time a value is added to a hash table in the case where a join is implemented; etc.).

any type of event of interest, and can be configurable via user input (e.g. by a user requesting the query for execution and/or an administrator of the database system 10). The set of event types can include a row receival event, where the corresponding counter 2933 denotes the number of input rows in the input row set received/processed so far by the corresponding operator. The set of event types can alternatively or additionally include and/or a row emitting event, where the corresponding counter 2933 denotes the number of output rows in the output row set generated/emitted so far by the corresponding operator.

The set of event types can alternatively or additionally include an active processing event and/or an operator execution event, where the corresponding counter 2933 denotes each time that the operator is executed upon one or more incoming rows and/or each time the corresponding operator begins actively processing. Such an event can be implemented in embodiments where a corresponding node executing multiple operators maintains a schedule of operator executions, where the operator is executed via a plurality of operator executions during execution of the corresponding query upon different sets of one or more input rows received by other operator executions of other operators and/or data block input to the node.

In various embodiments, operators of a given operator execution flow executed by a given node 37 (e.g. as assigned in accordance with query execution plan 2405) are executed via a plurality of operator executions over time as dictated by an operator scheduling module implemented by the corresponding node 37. This can be utilized to determine which operator of the given query be executed upon its pending data blocks, and/or which query of multiple concurrently executing queries have an operator executed. Some or all such executions can occur by a single thread in sequence, or can occur concurrently via multiple parallelized threads. In various embodiments, the execution of some or all of the plurality of operators 2520 upon input data blocks is selected via some or all features and/or functionality of the operator scheduling module 2815, and/or various operators are otherwise executed via a plurality of separate executions over time, as discussed in other functionality regarding operator scheduling module 2815 and the plurality of corresponding of operator executions of each given operator of a node, disclosed by U.S. Utility application Ser. No. 16/720,481, entitled "SELECTING A NORMALIZED FORM FOR CONVERSION OF A QUERY EXPRESSION", filed Dec. 19, 2019, which is hereby incorporated herein by reference in its entirety and made part of the present U.S. Utility Patent Application for all purposes. In such embodiments, a corresponding counter can correspond to an operator execution event, and can be incremented each time a corresponding operator execution of the corresponding is performed.

The set of event types can alternatively or additionally include any other types of events that can provide insight as to how the corresponding query is processing, when/how much data it processes and/or outputs, how often it is executing, and/or other metrics can provide insight into the operator's own performance, its performance relative to other operators and its respective impact on the operator flow and/or corresponding, or other metrics regarding performance of database system 10.

Query execution data can be aggregated locally using this collection of counters. In some embodiments, each operator execution module 3215 can optionally operator contain a tracking handle, which can point to a tracking frame (e.g. points to the counter memory resources 2911). The tracking frame contains the counters 2933, which can optionally be organized into groups. One such example of a group contains counters for rows in, rows out, etc. New tracking events can be declared/configured over time by an administrator/user input. Each thread (e.g. each operator execution module 3215) can keeps track of what corresponding tracking handle is currently active. When a tracking event occurs, corresponding tracking code implementing counter incrementing module can grab the currently active handle (if one exists) and can increment the appropriate counter by the given amount. Since these counters are thread local (e.g. local to the corresponding operator execution module 3215), no synchronization is required, which can render incrementing of the counters extremely efficient.

The values of all of these event tracking counters 2933 can be sampled at a predetermined interval to aggregate the tracking data for the operator accordingly. A state sampling module 2925 implemented by the execution tracking module 2910 can generate new rows 2938 for each of a plurality of sampling processes 2940 in accordance with sampling schedule data 2937 (e.g. denoting the predetermined interval, or other scheduling as to when such sampling processes are performed). This can be based on determining whether the current time corresponds to the next instance of performing sampling process 2940, and/or otherwise determine when to perform each sampling process 2940 in accordance with the sampling schedule data and performing the corresponding sampling process 2940 accordingly via state sampling module 3935.

As sampling processes 2940 are performed, a corresponding tracking row set 2921 can be built over time in tracking row set memory resources 2913 (e.g. over the duration of the operator executing during the corresponding query, such as from the time the input first row is processed to the time the last output row is generated). The corresponding set of rows 2938 can each include values 2708 for each of a plurality of columns 2707.1-2707.C corresponding to the set of counters 2933/the set of event types being tracked via these counters.

Thus, each column's value for a given row can be generated as a function of a corresponding counter value 2933 for a corresponding event type. The rows 2938 can thus collectively profile occurrence of each event over time, and further profile data based on how these events relate to each other (e.g. rate at which event occurred, whether this rate increased or decreased over time during the execution, how the occurrences of these rates relate to each other, for example, denoting cardinality of a column of the dataset based on a proportion of input rows being emitted as output rows in the case where the operator performs filtering, etc.)

Note that the number of columns C in tracking row set 2921 can be different from/unrelated to the number of column in some or all input or output rows generated/passed between operators, and/or can be different from/unrelated to the number of columns in a dataset (e.g. relational database table stored in database storage accessed via IO operators) against which the query is executed. However, these columns 2707 can be implemented in a same or similar fashion as the columns of rows being read from memory and/or generated by operators, can optionally be stored in one or more corresponding column streams 2968, and/or can be implemented in a same format (e.g. a SQL columns where the rows 2938 are implemented as SQL rows).

In some embodiments, a given sampling process 2940 for a given counter 2933 can include the following steps: reading the current value of the counter, for example, without synchronization with other operators/reads of other counters; comparing the current value of the counter to the previous value of the counter; and/or storing the difference between the current and previous values. If this is the first time a counter is being sampled, the previous value can be zero. The current value of the counter can be updated as the new previous value. This process can be repeated for every counter of the set of counters, e.g. in a corresponding tracking handle. Once all of the counters from a trace handle have been sampled, the data is stored in one or more rows, optionally alongside some extra correlation information (e.g. this correlation information is generated via sampling process 2940 or another process).

The sampling process 2940 can optionally be synchronized/somewhat synchronized across all operators, for example, where the predetermined time interval and/or other sampling schedule data 2937 being the same for all nodes, for example, with respect to a common clock and/or same current time data. Alternatively, different nodes initiate the predetermined time schedule upon their execution, which is optionally time-aligned with other sampling by other operator execution modules. In some cases, sampling is performed at different rates/in accordance with a different schedule for some or all different types of operators. The rate of sampling and/or corresponding sampling schedule can be configured for different operators based on user input, based on a predetermined mapping for different operators, and/or other information.

FIGS. 29D and 29E illustrate example embodiments of generating consecutive rows 2938 for a given operator in consecutive state sampling processes 2940 by state sampling module 3935. Some or all features and/or functionality of the state sampling processes 2940 and/or state sampling module 3935 of FIGS. 29D and 29E can implement the state sampling processes 2940 and/or state sampling module 3935 of FIG. 29C.

FIG. 29D illustrates generating of row 2938.$i$ for sampling process 2940.$i$. A difference between the current value 2933.$k$ of each counter and the previous value 2943.$j$ of each counter (e.g. logged in a prior sampling process 2940.$i$−1) is computed and stored as the column value 2708 for the corresponding column. The previous value 2943.$j$ is then updated as the current value for the next sampling process 2940.$i$+1.

Thus, as the sampling process 2940.$i$+1 is performed as illustrated in FIG. 29E, the new current counter value 2933 are compared with these previous counter values 2943 in the same fashion, where these respective differences are again stored in the column values 2708 for the new row 2938.$i$+1.

In other embodiments, the raw counter values are stored in columns rather than these differences. However, storing these differences can be useful in minimizing memory resources for storing the tracking row sets 2921 (e.g. based on implementing smaller datatypes for the integers storing the differences as they are smaller than the raw counter values).

To handle the case where an operator finalized (e.g. finishes processing the last input row and finalized accordingly, at some point after a prior sampling process, where counters may have been updated in this time frame, but before the next sampling process is scheduled); the same data trace data collection process can be run when an operator finalizes to make sure that its tracking data is not lost before the next tracking interval. These tracking events can be sampled at this point, or can optionally be stored until the next sampling occurs, at which point they are handles the same as newly generated trace rows.

Figure 29F:
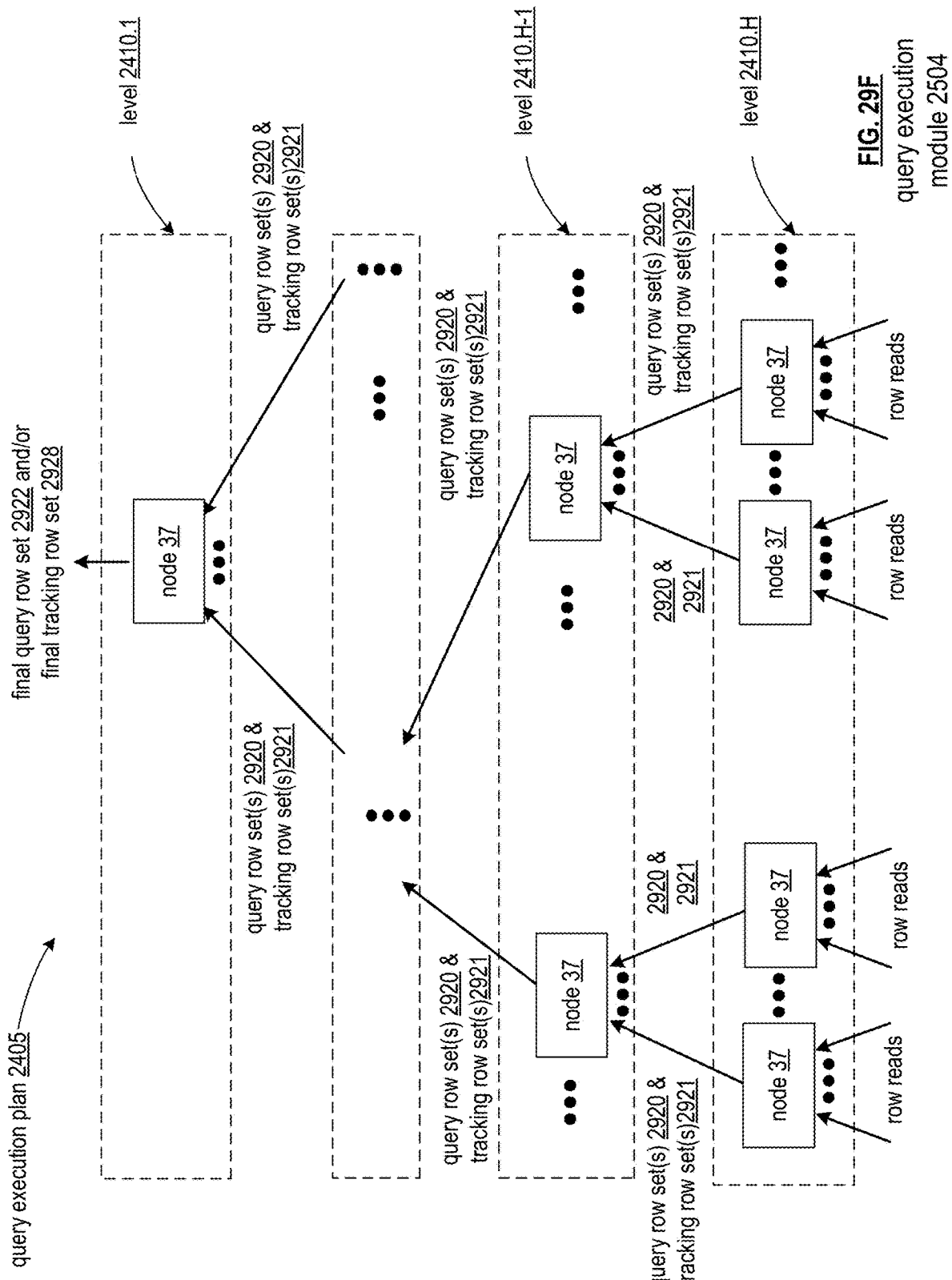
FIG. 29F is a schematic block diagrams of a query execution module that implements execution of a query via a plurality of nodes of a query execution plan that each send both query row sets and tracking row sets to a parent node in accordance with various embodiments.

FIG. 29F illustrates an embodiment of a query execution module 2504 that includes a plurality of nodes 37 executing a corresponding query as members of a query execution plan 2405 each participating at one or more levels of the query execution plan 2405. Some or all features and/or functionality of the query execution module 2504 can implement the query execution module 2504 and/or execution of the respective query illustrated in FIG. 29A and/or 29B. Some or all features and/or functionality of the query execution plan 2405 of FIG. 29F can implement the query execution plan 2405 of FIG. 24A.

In addition to nodes 37 generating and propagating query row sets 2920 to a parent node for processing via its operators (e.g. the one or more operators of a given portion of the query operator execution flow the parent node is responsible for performing), the nodes 37 further generate and propagate tracking row sets 2921 to the parent node. For example, when one or more tracking row set 2921 is generated on a node that is not on the root level, they are sent across the network (e.g. any communication resources implementing the communication between nodes in the query execution plan 2405) to their parent node 37. When the parent node 37 receives the rows, it sends them to its parent node.

Each node can thus propagate its own tracking row sets 2921 union-ed/aggregated with any tracking row sets 2921 received from child nodes (if applicable) to its parent, to render all tracking row sets 2921 ultimately reaching the final, root node 37 generating and emitting final tracking row set 2928 that includes/is based on an aggregation of the tracking row sets 2921 generated by all nodes in the query execution plan 2405. The root node can similarly generate and/or emit the final query row set 2922, which, while based upon row sets generated by all nodes, does not necessarily include/reflect all rows processed across all nodes due to rows being filtered out/manipulated/etc. in accordance with the query execution.

The tracking row sets 2921 generated by a given row can correspond to multiple tracking row sets 2921 generated in conjunction with multiple operators executed by the node, for example, in conjunction with the portion of the flow assigned to the node for processing, for example, in parallel with other nodes performing this same portion of the flow upon their own input.

In some embodiments, the rows 2938 can further include a column identifying the given node and/or the given operator in the flow performed by the given node to differentiate which rows were generated by which operators, and/or this information can otherwise be mapped to/determinable from the given tracking row set 2921 for the given operator/given node.

In some embodiments, while lateral nodes in a same level can send query rows to each other in accordance with a shuffle operator, for example, as members as a shuffle node set. In some embodiments, while such nodes exchange query rows in conjunction with query execution, nodes only send tracking row sets 2921 to parent nodes, and not nodes at the same level. In some embodiments, node only send their received/generated tracking row sets 2921 to exactly one node 37.

In some embodiments, the rows 2938 of tracking row sets 2921 that have been sent to and/or were generated on the top level root node are instead sent to one of the root operator instances on this node. Upon receiving a data block receiving rows 2938, the root operator instance can serialize these rows for output as the final query row set 2922.

This outputting can include sending the row final tracking row set 2928 to a client/requesting entity/etc. The client device can receive the final tracking row set 2925 in the form of a SQL result set for display and/or further processing in conjunction with one or more SQL queries.

Figure 29G:
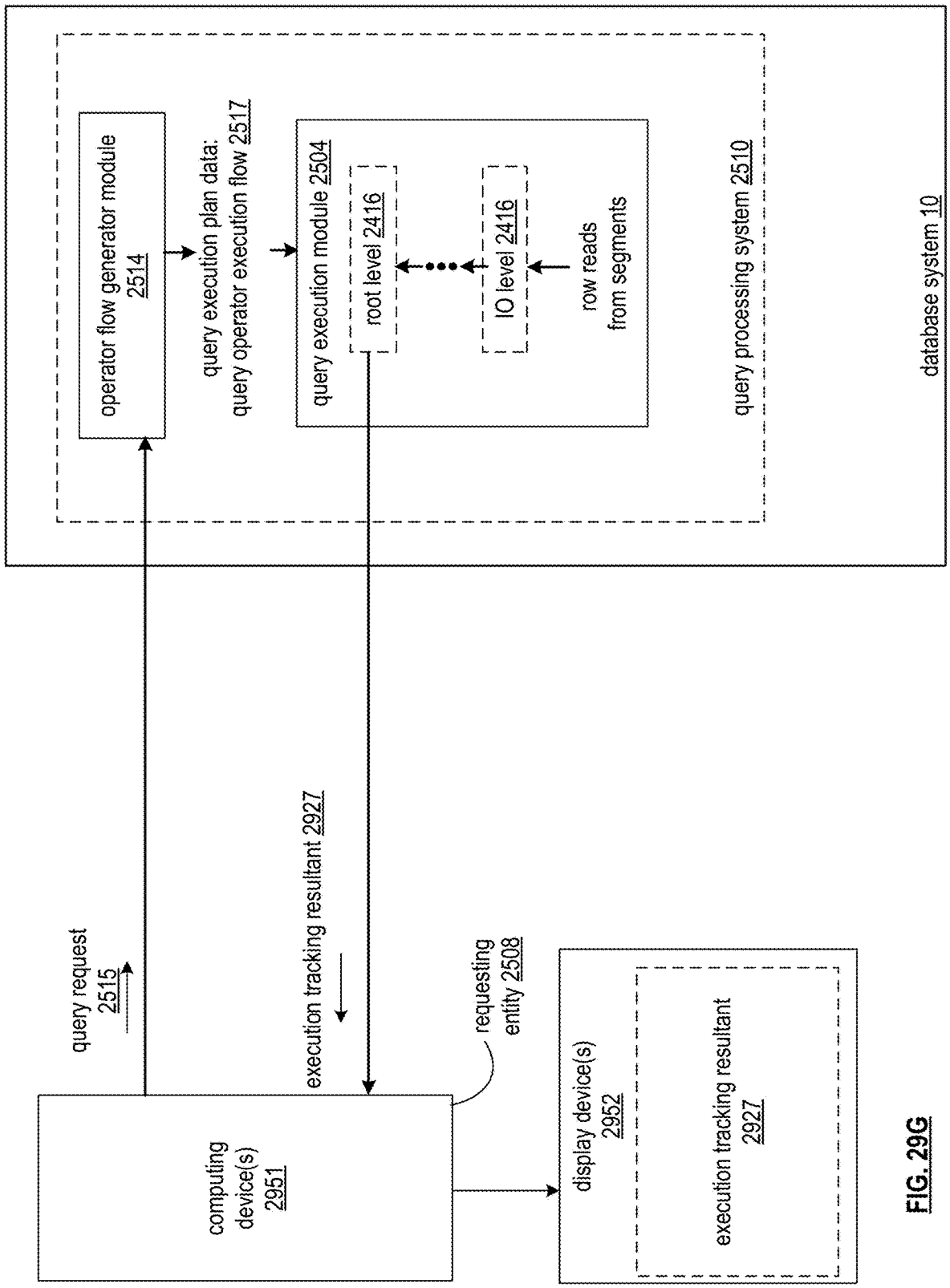
FIG. 29G is a schematic block diagrams of a database system that executes query requests received from a computing device of a requesting entity and sends an execution tracking resultant generated by executing the query request for display by a display device of the requesting entity in accordance with various embodiments.

FIG. 29G illustrates such an embodiment where the query processing system 2510 sends the execution tracking resultant 2927 that includes/is based on final query row set 2928 to a computing device 2951, such as a same computing device that sent the query request 2515 for the given query and/or a different computing device that corresponds to a same requesting entity 2508 that sent the query request. The execution tracking resultant 2927 can be displayed via one or more display devices 2952 of the one or more computing devices 2951.

The requesting entity 2508 can correspond to an external requesting entity (e.g. utilizing the database system as a service, based on being a client/customer of the database system 10 or other user of the database system 10. The requesting entity 2508 can alternatively or additionally correspond to an entity associated with the database system 10 itself (e.g. administrators of the database system, such as engineers/computer scientists/software developers that build/configure/monitor the functionality of the database system 10).

Some or all features and/or functionality of the communication of execution tracking resultant 2927 to a computing device associated with a requesting entity can implement the communication between database system 10 with requesting entity 2508 of FIG. 24F.

Alternatively or in addition to sending the final query row set 2922 to a client device for display, the final query row set 2922 can be stored in the database system as a new relational data table and/or as new rows of an existing relational database table in the database storage 2450, for example, based on leveraging that the final query row set 2922 are in accordance with SQL and/or other relational database structuring. This can include inserting the rows into an existing table via an Insertion-based query execution and/or creating a new table via a CTAS (Create Table As Select) query execution. These rows can be later accessed in subsequent query execution for processing (e.g. aggregation/statistical modeling/machine learning functionality/other query processing to further provide insights into the underlying data regarding how one or more queries/types of queries/type of operators are executed. Alternatively or in addition, further processing in the same query aggregation/statistical modeling/machine learning functionality/other query processing can be performed in conjunction with performing the given query to automatically create summary/statistical/machine learning data for the query row sets 2821 alternatively or in addition to emitting the raw rows (e.g. the raw counter values/differences sampled over time for different operators).

Such processing performed during the query execution and/or retroactively by the database system 10 and/or processing resources of the client device can include summarizing/characterizing the raw counter values/differences sampled over time for various operators to: generate derivative data at a first degree or higher level degrees, or other rate data depicting rate at which corresponding events changes; processing this data over multiple operator instances executed in parallel (e.g. via different parallelized threads of the same node or by different notes) to determine differences/outliers in their processing; processing this data over different nodes to determine cardinality of the dataset as the whole, and/or of different segments processed via different subsets of nodes 37 and/or corresponding different operator instances, for example, based on differences between #input nodes and #output nodes for various filtering operators; processing differences in processing rates between nodes to determine where bottlenecks exist; etc. Timing associated with different instances can optionally be based on an ordering #/timestamp # of rows in a given set 2821, which can be compared to other lists in the case where sampling is time-aligned by time, which can be utilized to determine, for various points in time across the query processing as a whole, the progress made across different nodes/different operators in their respective processing.

In some embodiments, an original result set of the query (i.e. final query row set 2922) is still computed as usual, but is optionally discarded by the root operator instances. This can be useful in testing database processing efficiency via test queries, where the result is not desired, but information as to how the database system executes such queries is useful.

Alternatively or in addition, final query row set 2922 is also sent for display in conjunction with the final query row set 2928, where a requesting entity can view both the query results as well as information regarding the query execution. This can be useful in testing to verify that the query results are correct and/or otherwise evaluate the result set itself. This can be also useful in cases where a user is interested in both the query results themselves as well as the efficiency/other performance information regarding how the query was executed.

Alternatively or in addition, final query row set 2922 is sent to a different device from that to which the final query row set 2928 is sent, where a requesting entity requesting the query views/further processes the final query row set 2922 as requested in their query request. This can be useful in cases to enable users acting as administrators of database system 10/automated processes implemented by the database system 10 to gather/view/aggregate/further process data regarding how various requested queries are performing over time.

In various embodiments, filtering predicates are pushed to the IO level and/or are optionally processed in conjunction with index data stored for various columns. In various embodiments, the selected operator arrangement 3006 of FIG. 30B is a selected arrangement of elements (e.g. filter elements, index elements, and/or source elements) of a corresponding IO pipeline generated via an IO pipeline generator module that implements some or all of the flow generation and/or optimization module 3025, where the disjunction 3013 is thus processed at the IO level via a corresponding IO pipeline having its elements intelligently arranged/selected based on disjunction probability approximation value 3021. Such an IO pipeline can be implemented via any features and/or functionality of the IO pipeline 2835 and/or IO pipeline generator module 2834, and/or other functionality regarding pushing predicates to the IO level, disclosed by U.S. Utility application Ser. No. 17/450,109, entitled "MISSING DATA-BASED INDEXING IN DATABASE SYSTEMS", filed Oct. 6, 2021, which is hereby incorporated herein by reference in its entirety and made part of the present U.S. Utility Patent Application for all purposes. As a particular example, some or all operators 2520 of FIGS. 29B, and/or any other operators 2520 described herein, can be implemented as pipeline elements of an IO pipeline, and/or as a full IO pipeline disclosed by U.S. Utility application Ser. No. 17/450,109, where a full IO pipeline and/or pipeline element of U.S. Utility application Ser. No. 17/450,109 can be implemented via their own operator execution module 3215. In some embodiments, a corresponding JO pipeline and/or pipeline element of by U.S. Utility application Ser. No. 17/450,109 is similarly configured via an operator execution module 3215 of FIG. 29B to have a tracking row set generated for the JO pipeline and/or given pipeline element via execution tracking module 2910 of FIGS. 29B-29E.

Figure 29H:
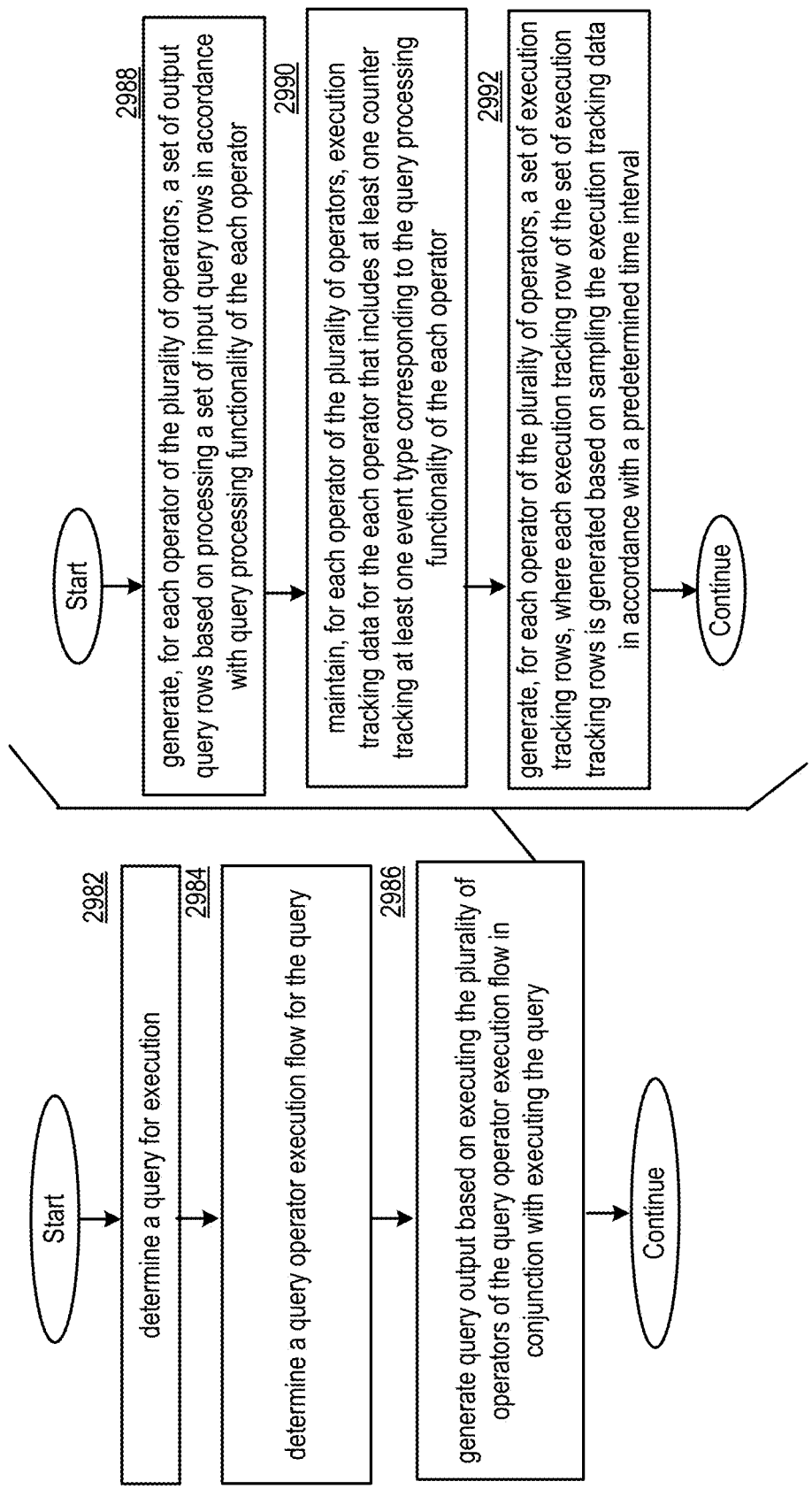
FIG. 29H is a logic diagram illustrating a method for execution in accordance with various embodiments.

FIG. 29H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29H. In particular, a node 37 can utilize the query processing module 2435 to execute some or all of the steps of FIG. 29H, where multiple nodes 37 implement their own query processing modules 2435 to independently execute the steps of FIG. 229H 8F, for example, to facilitate execution of a query as participants in a query execution plan 2405. Some or all of the method of FIG. 29H can be performed by the query processing system 2510, for example, by utilizing an operator flow generator module 2514 and/or a query execution module 2504. In particular, some or all of the method of FIG. 29H can be performed via one or more operator execution modules executing operators of a query operator execution flow that each generate tracking row sets in conjunction with generating query row sets when executing the query. Some or all of the steps of FIG. 29H can optionally be performed by any other processing module of the database system 10.

Some or all of the steps of FIG. 29H can be performed to implement some or all of the functionality of the database system 10 as described in conjunction with FIGS. 29A-29G, for example, by implementing some or all of the functionality of generating an execution tracking resultant. Some or all of the steps of FIG. 29H can be performed to implement some or all of the functionality regarding execution of a query via the plurality of nodes in the query execution plan 2405 as described in conjunction with some or all of FIGS. 24A-24I. Some or all steps of FIG. 29H can be performed by database system 10 in accordance with other embodiments of the database system 10 and/or nodes 37 discussed herein. Some or all steps of FIG. 29H can be performed in conjunction with one or more steps of FIG. 26F, and/or of any other method described herein.

Step 2982 includes determining a query for execution. Step 2984 includes determining a query operator execution flow for the query. In various examples, the query operator execution flow indicates a directed arrangement of a plurality of operators. Step 2986 includes generating query output based on executing the plurality of operators of the query operator execution flow in conjunction with executing the query.

Performing step 2986 can include performing one or more of steps 2988-2992. In various examples, step 2988-2992 are performed for each of the plurality of operators, and/or are repeated multiple times.

Step 2988 includes generating a set of output query rows based on processing a set of input query rows in accordance with query processing functionality of the each operator.

Step 2990 includes maintaining execution tracking data for the each operator that includes at least one counter tracking at least one event type corresponding to the query processing functionality of the each operator. In various examples, the at least one counter is incremented in response to detecting occurrence of the at least one corresponding event type. In various examples, each counter of the at least one counter is incremented every time occurrence of a corresponding event type of the at least one event type is detected, where the each counter is optionally incremented multiple times based on the event type being detected multiple times.

Step 2992 includes generating a set of execution tracking rows. In various examples, each execution tracking row of the set of execution tracking rows is generated based on sampling the execution tracking data in accordance with a predetermined time interval.

In various examples, the query output includes: a final set of rows corresponding to a query resultant of the query; and/or a final set of execution tracking rows generated by at least one final operator in the directed arrangement based on an aggregation of a plurality of sets of execution tracking rows generated by the plurality of operators.

In various examples, the method further includes sending the final set of execution tracking rows to a requesting entity. In various examples, the method further includes receiving the query request from the requesting entity indicating the query for execution. In various examples, the final set of execution tracking rows are displayed via a display device of a client device corresponding to the requesting entity.

In various examples, at least one counter of the execution tracking data for the each operator includes: an input row counter corresponding to a row receival event type, wherein the input row counter denotes a number of input query rows received; and/or an output row counter corresponding to a row emitting event type, wherein the input row counter denotes a number of output query rows emitted.

In various examples, the each operator is executed during a corresponding temporal period. In various examples, the set of input query rows are received as a stream of input rows during the corresponding temporal period. In various examples, the input row counter is incremented as new rows in the stream of input rows are received. In various examples, the set of output query rows are emitted as a stream of output rows during the corresponding temporal period. In various examples, the output row counter is incremented as new rows in the stream of output rows are emitted.

In various examples, the at least one counter includes a set of counters, and wherein the set of execution tracking rows each include a set of column values for a set of columns corresponding to the set of counters.

In various examples, generating the set of execution tracking rows includes generating each execution tracking row of the set of execution tracking rows via performance of a corresponding one of a plurality of sampling processes. In various examples, each subsequent one of the plurality of sampling processes occurs after elapsing of the predetermined time interval from a time that a prior one of the plurality of sampling processes occurred.

In various examples, performing each sampling process of the plurality of sampling processes includes, for each counter in the at least one counter: reading a current value of the each counter; computing a difference value for the each counter between the current value of the each counter with a previous value of the each counter; including the difference value for the each counter as a corresponding column value stored in the each execution tracking row; and/or updating the previous value of the each counter as the current value of the each counter. In various examples, an initial previous value of the each counter is set as zero for use in performing a first sampling process of the plurality of sampling processes.

In various examples, a final execution tracking row of the set of execution tracking rows is generated based on performance of a final one of the plurality of sampling processes. In various examples, the final one of the plurality of sampling processes is performed prior to after elapsing of the predetermined time interval from a time that a penultimate one of the plurality of sampling processes occurred based on the final one of the plurality of sampling processes being triggered by an operator finalization of the each operator based on execution of the each operator being completed.

In various examples, the plurality of operators includes a set of IO operators, a set of intermediate operators, and at least one root level operator. In various examples, each IO operator of the set of IO operators processes the set of input query rows of the each IO operator based on accessing the set of input query rows of the each IO operator as relational database rows stored in database storage resources storing at least one relational database table. In various examples, the each IO operator generates the set of output query rows of the each IO operator for processing by a parent operator serially after the each IO operator. In various examples, the parent operator serially after the each JO operator is one of the set of intermediate operators, and/or the parent operator serially after the each JO operator processes the set of output query rows generated by the each JO operator as rows in its set of input query rows.

In various examples, each intermediate operator of the set of intermediate operators processes the set of input query rows of the each intermediate operator based on the set of input query rows of the each intermediate operator being generated via a set of child operators serially before the each intermediate operator that each generate rows of the set of input query rows as their set of output query rows. In various examples, the each intermediate operator generates the set of output query rows of the each intermediate operator for processing via a parent operator serially after the each intermediate operator, and/or the parent operator serially after the intermediate level operator processes the set of output query rows generated by the each intermediate operator as rows in its set of input query rows.

In various examples, each root operator of the at least one root operators processes the set of input query rows of the each root operator based on receiving the set of input query rows of the each root operator from a set of child operators serially before the each root operator that each generate rows of the set of input query rows of the each root operator as their set of output query rows. In various examples, the each root operator generates the set of output query row as rows in the final set of rows corresponding to the query resultant of the query.

In various examples, the plurality of operators are executed via a plurality of nodes of a query execution plan. In various examples, the query execution plan includes a plurality of levels that each include a subset of the plurality of nodes that includes an IO level, at least one intermediate level, and a root level.

In various examples, 10 operators of the plurality of operators executed by each 10 level node at the 10 level are executed based on processing of relational database rows stored in database storage resources storing at least one relational database table. In various examples, the each 10 level node sends both output query rows and execution tracking rows generated in conjunction with executing its 10 operators to a parent node in a lowest intermediate level of the plurality of levels;

In various examples, intermediate operators executed by each intermediate level node at the 10 level are executed based on processing rows generated by at least one of: at least one child node in a prior level of the plurality of levels, or at least one peer node in a same level of the plurality of levels, and wherein the each intermediate level node sends output query rows generated in conjunction with executing its intermediate operators to one of: at least one parent node in a next level of the plurality of levels; or at least one peer node in a same level of the plurality of levels. In various examples, the each intermediate level node sends a partially aggregated set of execution tracking rows to the parent node in the next level of the plurality of levels. In various examples, the partially aggregated set of execution tracking rows includes execution tracking rows generated in conjunction with the each intermediate level node executing its intermediate operators and further includes execution tracking rows received from the at least one child node in the prior level.

In various examples, root operators executed by a root level node at the root level are based on processing rows generated by at least one child node in a highest intermediate level of the plurality of levels. In various examples, the root level node generates the final set of rows corresponding to the query resultant of the query. In various examples, the root level node further generates a fully aggregated set of execution tracking rows as the final set of execution tracking rows. In various examples, the fully aggregated set of execution tracking rows includes execution tracking rows generated in conjunction with the root level node executing its root operators and further includes execution tracking rows received from the at least one child node in the highest intermediate level.

In various examples, the directed arrangement of a plurality of operators includes at least one set of parallelized operators applied in a plurality of parallelized tracks of the query operator execution flow. In various examples, the at least one set of parallelized operators includes at least one set of parallelized operator instance of a same type of operator.

In various examples, the query is executed in accordance with the Structured Query Language (SQL). In various examples, the final set of rows corresponding to the query resultant of the query are generated as first SQL rows of a SQL result set in accordance with SQL. In various examples, the final set of execution tracking rows are generated as second SQL rows of a second SQL result set in accordance with SQL.

In various examples, executing each operator of the plurality of operators further includes generating correlation information based on rows processed by the each operator. In various examples, the query output further includes aggregated correlation data generated based on a plurality correlation data generated by the plurality of operators.

In various examples, the final set of execution tracking rows indicates at least one of, for the each of the plurality of operators: a total number of input rows in the set of input query rows processed by the each of the plurality of operators; a total number of output rows in the set of output query rows generated by the each of the plurality of operators; or execution time data. In various examples, the execution time data indicates at least one of: a total amount of time between a first time that execution of the operator is initiated and a second time that that execution of the each operator is finalized; a total execution time corresponding to a plurality of execution time windows between the first time and the second time when the each operator was actively processing rows; or execution time distribution data depicting distribution of the plurality of execution time windows within the total amount of time.

In various examples, the method further includes processing the final set of execution tracking rows to generate cardinality estimate accuracy data based on comparing cardinality estimate data utilized to generate the query operator execution flow for the query with actual cardinality data indicated by the final set of execution tracking rows. In various examples, the method further includes processing the final set of execution tracking rows to generate shuffle distribution evenness data based on a measured distribution of row dispersal via at least one shuffle operator of the plurality of operators for processing by a set of parallelized operators indicated by the final set of execution tracking rows. In various examples, the method further includes processing the final set of execution tracking rows to generate execution flow bottleneck data indicating at least one operator in the plurality of operators having a bottleneck metric indicated by the final set of execution tracking rows comparing unfavorably to a threshold.

In various embodiments, any one of more of the various examples listed above are implemented in conjunction with performing some or all steps of FIG. 29H. In various embodiments, any set of the various examples listed above can be implemented in tandem, for example, in conjunction with performing some or all steps of FIG. 29H.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29H, for example, in conjunction with further implementing any one or more of the various examples described above.

In various embodiments, the operational instructions, when executed by the at least one processor, cause the database system to: determine a query for execution; determine a query operator execution flow for the query, where the query operator execution flow indicates a directed arrangement of a plurality of operators; and/or generate query output based on executing the plurality of operators of the query operator execution flow in conjunction with executing the query. In various embodiments, executing each operator of the plurality of operators includes: generating a set of output query rows based on processing a set of input query rows in accordance with query processing functionality of the each operator; maintaining execution tracking data for the each operator that includes at least one counter tracking at least one event type corresponding to the query processing functionality of the each operator, where the at least one counter is incremented in response to detecting occurrence of the at least one corresponding event type; and/or generating a set of execution tracking rows, where each execution tracking row of the set of execution tracking rows is generated based on sampling the execution tracking data in accordance with a predetermined time interval. In various examples, the query output includes: a final set of rows corresponding to a query resultant of the query; and/or a final set of execution tracking rows generated by a final operator in the directed arrangement based on an aggregation of a plurality of sets of execution tracking rows generated by the plurality of operators.

FIGS. 30A-30F illustrate embodiments of a database system 10 operable to execute queries that indicate filtering parameters that include a disjunction via implementing a disjunction probability approximation module 3020 to compute a disjunction probability approximation value for the disjunction based on distribution data for use in performing flow generation and/or optimization to render a corresponding query operator execution flow for execution. Some or all features and/or functionality of FIGS. 30A-30F can be utilized to any implement query processing and/or execution of database system 10 described in FIGS. 24A-24N when executing queries indicating disjunctions. Some or all features and/or functionality of FIGS. 30A-30F can be utilized to implement any embodiment of the database system 10 described herein.

Figure 30A:
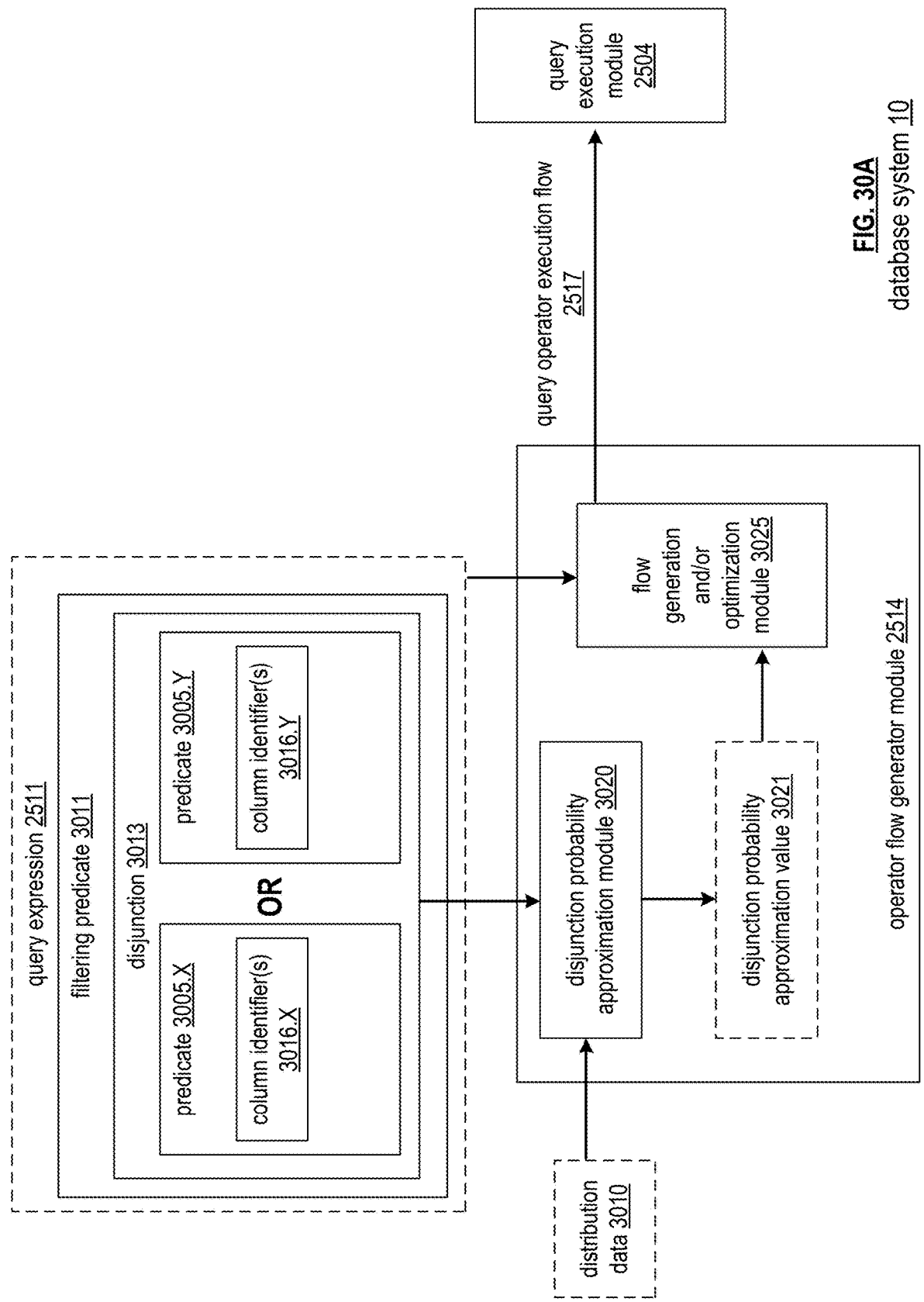
FIG. 30A is a schematic block diagram of a database system that generates a query operator execution flow for execution based on computing a disjunction probability approximation value for a disjunction indicated in a query expression in accordance with various embodiments.
Figure 30B:
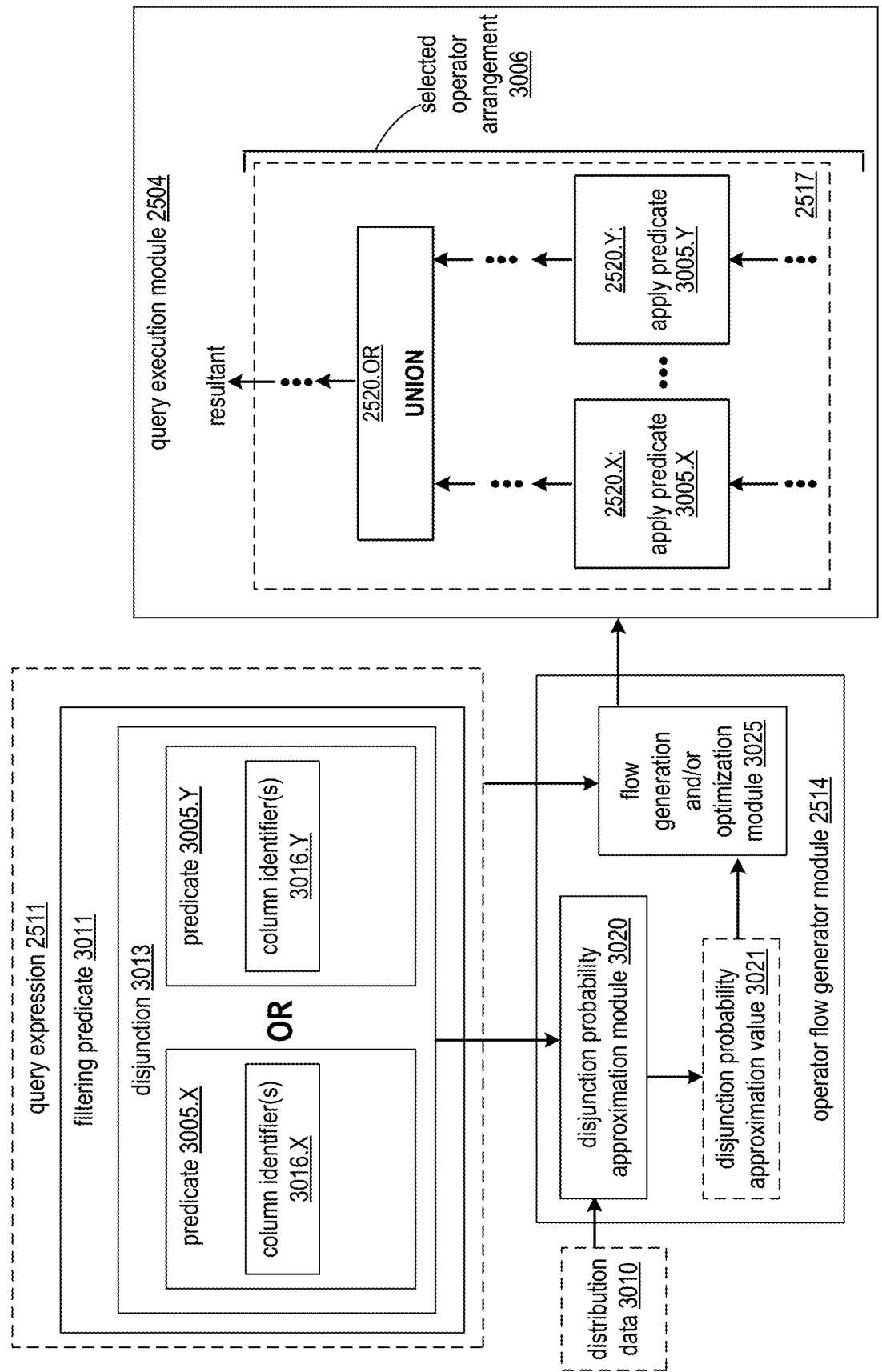
FIG. 30B is a schematic block diagram of a database system that generates a query operator execution flow for execution based on selecting an arrangement of operators in the query operator execution flow based on a disjunction probability approximation value for a disjunction indicated in a query expression in accordance with various embodiments.

FIG. 30A illustrates an embodiment of a database system 10 where an operator flow execution module 2514 implements a disjunction probability approximation module 3020 to generate a disjunction probability approximation value 3021 for a disjunction 3013 indicating as a filtering predicate 3011 of a corresponding query expression 2511 based on distribution data 3010 for a corresponding dataset the query is to be executed against.

The disjunction probability approximation value 3021 can correspond to an approximation for the probability that a given row in the dataset satisfies predicate 3005.X or 3005.Y (or both). Predicate 3005.X can denote a first condition as a function of column values of one or more columns as denoted by column identifiers 3016.X, and/or predicate 3005.Y can denote a second condition as a function of column values of one or more columns as denoted by column identifiers 3016.Y. The disjunction probability approximation value 3021 can correspond to an estimated probability that a given row will meet either, or both, the first condition and the second condition. The column identifiers 3016.X and column identifiers 3016.Y can be mutually exclusive and/or can optionally have a non-null intersection.

The disjunction 3013 can be determined based on processing a portion of the query denoting a disjunction operator such as 'OR'. The disjunction 3013 can otherwise be determined to be syntactically/logically equivalent to a disjunction. As a particular example, a conjunction expression denoted by an 'AND' can optionally be processed as a disjunction based on a negation being applied to this conjunction expression, where the disjunction 3013 is determined as a conjunction of the negation of each predicate 3005 of the conjunction.

While the disjunction 3013 of FIG. 30A indicates only two predicates 3005.X and 3005.Y, the disjunction 3013 for which a disjunction probability approximation value 3021 is generated can include a set of predicates that includes any number of multiple predicates. The disjunction probability approximation value 3021 can denote the probability that non-null subset of the set of multiple predicates are satisfied for a given row.

The conditions denoted by some or all predicates 3005 can correspond to range-based predicate as described in further detail herein, where the condition requires a column value of a corresponding column falls within the corresponding range. For example, such range-based predicates denote the condition via one or more operators such as a less than operator (e.g. '<'), a less than or equal to operator (e.g. '≤' or '<='), a greater than operator (e.g. '>'), a greater than or equal to operator (e.g. '≥' or '>='), a between operator (e.g. 'BETWEEN'), or other operator.

The conditions denoted by some or all predicates 3005 can optionally correspond to other condition, such as equality or inequality, matching/containing a consecutive text pattern (e.g. based on a LIKE or SIMILAR TO operation), being an array structure containing a value meeting a condition as one of its an array elements, a negation of one or more conditions, or other conditional statements and/or filtering predicates.

The disjunction probability approximation value 3021 can be processed by a flow generation and/or optimization module 3025 that processes the query expression 2511 to generate a semantically equivalent query operator execution flow 2517 for execution via query execution module 2504 that will render a correct query resultant for the query.

In particular, the disjunction probability approximation value 3021 can denote a proportion of the dataset that satisfy the corresponding disjunction. This can provide information as to how many rows will require access and/or will ultimately have column values read, communicated between nodes, processed by operators, etc. when the corresponding query is executed. For example, the distinction between whether a large proportion of rows vs. a small proportion of rows in the dataset satisfy the disjunction probability approximation value 3021, or any other predicate of the query, can be highly useful in intelligently arranging operators in the corresponding operator execution flow, for example, via flow generation and/or optimization module 3025, and/or selecting other attributes of how the query be executed most efficiently.

FIG. 30B illustrates an embodiment of a database system 10 that implements a flow generation and/or optimization module 3025 to process disjunction probability approximation value 3021 to generate a query operator execution flow 2517 in accordance with a selected operator arrangement 3006 that includes one or more operators 2520 implementing the disjunction. This selected operator arrangement 3006 can correspond to an optimal/ideal arrangement expected to render efficient query processing based on information denoted in process disjunction probability approximation value 3021, and/or information denoted in other probability values computed for other filtering predicates 3011 of the query. Some or all features and/or functionality of the or query operator execution flow 2517 and/or its generation via operator flow generator module 2514 of FIG. 30B can implement the query operator execution flow 2517 and/or operator flow generator module 2514 of FIG. 30A, and/or any other embodiment of query operator execution flow 2517 and/or operator flow generator module 2514 described herein.

The flow generation and/or optimization module 3025 can utilize the disjunction probability approximation value 3021 for the given query, and/or other probability approximation values for other filtering predicates 3011 of the query, to select/optimize the query operator execution flow 2517 and/or a corresponding query execution plan 2504.

For example, there can be multiple semantically equivalent options for arrangement of a flow of a given query. Different selections/arrangement of operators rendering equivalent output can have significantly different efficiency (e.g. time to process, amount of memory required, processing resources required, etc.). This nature of selecting and utilizing optimal flows for executing a query is discussed in conjunction with applying multiple joins to implement a join process, for example, upon different sized sets to render more optimal execution of join expressions as discussed in conjunction with FIGS. 26A-27I.

Other such optimizations can be made for other query expressions. As another particular example, a plurality of filtering operators (e.g. that all must be satisfied, for example, denoted as in conjunction of the query expression), can be applied serially in any order, where each evaluates only rows satisfying filtering predicates of prior filtering operators and emits only rows satisfying its own corresponding predicate. While semantically equivalent in any order, the ordering in which these filtering operators are applied can be meaningful in rendering differences in query execution efficiency. For example, applying a strict condition that filters many rows at the beginning can render the reading/processing/emitting of fewer rows and/or values by other operators, as their respective inputs include significantly fewer rows. If this strict condition were instead applied last, other minor filtering by other predicates could be redundant and/or render that many more rows be read/processed/moved around to ultimately be filtered out by the strict condition. Thus, it can be ideal in such cases to apply operators expected to filter more rows earlier in the operator execution flow than operators expected to filter fewer rows, when applicable. As another example of semantic equivalence for this case of conjunction, some or all of these filtering operators can optionally be applied in parallel, with an intersection applied to the output rows emitted by parallel tracks. This can be useful in some cases in dividing resources/sourcing of different columns to different resources. In some cases, filtering predicates requiring evaluation can be assigned to greater amount of processing resources/parallelized threads when they are expected to process/emit larger numbers of rows. In some cases, the number of nodes/processing core resources selected to participate in a corresponding query execution plan can be based on the amount of rows expected to be processed.

Such examples illustrate how the number of rows expected to be emitted by a given filtering predicate can be highly significant in determining how the corresponding query be performed. In general the number of rows that must/could be processed by a query can be intelligently factored in by flow generation and/or optimization module 3025, and/or other processing resources of database system 10, to configure any other means by which the query is executed accordingly as a function of how many rows are expected to be read, processed, communicated between nodes, outputted, etc. This can further be a function of the known and/or expected type/size of data values contained in these rows.

For example, the query operator execution flow 2517 can be configured with a selected operator arrangement 3006 that is intelligently selected, for example, via implementing an optimizer by flow generation and/or optimization module 3025. This can include selecting a set of operators included in the query operator execution flow 2517 that includes operator 2520.X that applies predicate 3005.X e.g. emits only rows satisfying the corresponding condition); an operator 2520.Y that applies predicate 3005.Y (e.g. emits only rows satisfying the corresponding condition); and/or an operator 2520.OR that implements the disjunction (e.g. is a UNION operator that emits all input rows from different parallel paths). The optimizer by flow generation and/or optimization module 3025 can further select an arrangement of these operators as selected operator arrangement 3006 to implement the disjunction correctly 3013 (e.g. the UNION is applied to rows emitted by both operator 2520.X and 2520.Y, before or after their outputs being further filtered in accordance with other filtering predicates). As there are optionally many means of arranging these operators in relation to other operators to implement the disjunction, and the remainder of the query, correctly, optimizer by flow generation and/or optimization module 3025 can further select an arrangement of these operators as selected operator arrangement 3006 to implement more efficient execution of the query, for example, based on expected numbers of rows to be outputted by the disjunction and/or by other filtering predicates, and/or their processing implications on other types of operators in the flow (e.g. filter out large numbers of rows early when possible to render passing/reading of fewer rows; apply parallelization to handle processing of many rows, etc.), As a particular example, if the disjunction probability approximation value 3021 indicates the disjunction 3013 is known/expected to be satisfied by a small number of rows, some or all operators implementing the disjunction can be configured for execution serially before other filtering predicates, for example, that are expected to filter out fewer rows. If the disjunction probability approximation value 3021 indicates the disjunction 3013 is known/expected to be satisfied by a large number of rows, some or all operators implementing the disjunction can be configured for execution serially after other filtering predicates, for example, that are expected to filter out fewer rows. The selected operator arrangement 3006 can otherwise be selected from other semantically equivalent options based on this selected operator arrangement 3006 being determined to be the most efficient as a function of disjunction probability approximation value 3021, for example, as a function of, as a function of, and/or to minimize, how many rows are known/expected to be accessed/processed/passed/emitted by various portions of the query operator execution flow and/or by various nodes in the query execution plan, where the amount of rows known/expected to be accessed/processed/passed/emitted can be determined and/or minimized based on the disjunction probability approximation value 3021 and/or other probability approximation values for the query.

In various embodiments, filtering predicates are pushed to the IO level and/or are optionally processed in conjunction with index data stored for various columns. In various embodiments, the selected operator arrangement 3006 of FIG. 30B is a selected arrangement of elements (e.g. filter elements, index elements, and/or source elements) of a corresponding IO pipeline generated via an IO pipeline generator module that implements some or all of the flow generation and/or optimization module 3025, where the disjunction 3013 is thus processed at the IO level via a corresponding IO pipeline having its elements intelligently arranged/selected based on disjunction probability approximation value 3021. Such an IO pipeline and/or IO pipeline generator module can be implemented via any features and/or functionality of the IO pipeline 2835 and/or IO pipeline generator module 2834, and/or other functionality regarding pushing predicates to the IO level, disclosed by U.S. Utility application Ser. No. 17/450,109, entitled "MISSING DATA-BASED INDEXING IN DATABASE SYSTEMS", filed Oct. 6, 2021, which is hereby incorporated herein by reference in its entirety and made part of the present U.S. Utility Patent Application for all purposes. As a particular example, the disjunction 3013 of FIGS. 30A-30F can be implemented via some or all some or all features and/or functionality of any disjunction 3212 disclosed by U.S. Utility application Ser. No. 17/450,109, where a corresponding IO pipeline is configured intelligently to select arrangement of a probabilistic index-based disjunction construct 3210 disclosed by U.S. Utility application Ser. No. 17/450,109 and/or any other index-based disjunction construct 3210, for example, adapted to handle range-based predicates alternatively or in addition to equality.

Alternatively or in addition to intelligent selection of the selected operator arrangement 3006, the operator flow generator module 2514 and/or other processing by query processing system 2510 can intelligently select other configurable attributes of the execution of the query, for example, as a function of the disjunction probability approximation value 3021 and/or other probability approximation values for the query denoting how many rows are known and/or expected to be processed in various portions of the respective execution. Such other configurable attributes of the execution of the query selected intelligently by the query processing system 2510 as a function of the disjunction probability approximation value 3021 and/or other probability approximation values for the query denoting how many rows are known and/or expected to be processed in various portions of the respective execution can include: selection of which/how many nodes participate in the query execution plan 2504 as a function of how many rows are known/ expected to be accessed/processed/passed/emitted by various portions of the query operator execution flow and/or by various nodes in the query execution plan; configuration of participating nodes/levels of the query execution plan 2504 as a function of how many rows are known/expected to be accessed/processed/passed/emitted by various portions of the query operator execution flow and/or by various nodes in the query execution plan; selection of how many parallelized operator instances of larger portions of the flow be applied (e.g. how many nodes/processing core resources apply equivalent portions of the query operator execution flow in parallel) as a function how many rows are known/expected to be accessed/processed/passed/emitted by various portions of the query operator execution flow and/or by various nodes in the query execution plan; allocation of sufficient processing/memory resources for the query execution to account for how many rows will be processed as a function of how many rows are known/expected to be accessed/processed/passed/ emitted by various portions of the query operator execution flow and/or by various nodes in the query execution plan; prioritizing/scheduling the execution of the query in parallel with and/or in a queue of other pending and/or concurrently executed queries by the database system 10, as a function of how many rows are known/expected to be accessed/processed/passed/emitted by various portions of the query operator execution flow and/or by various nodes in the query execution plan for the given query expression, and/or as a further function of how many rows are known/expected to be accessed/processed/passed/emitted by various portions of the query operator execution flow and/or by various nodes in the query execution plan for one or more other query expressions in queue for execution and/or concurrently being executed.

Figure 30C:
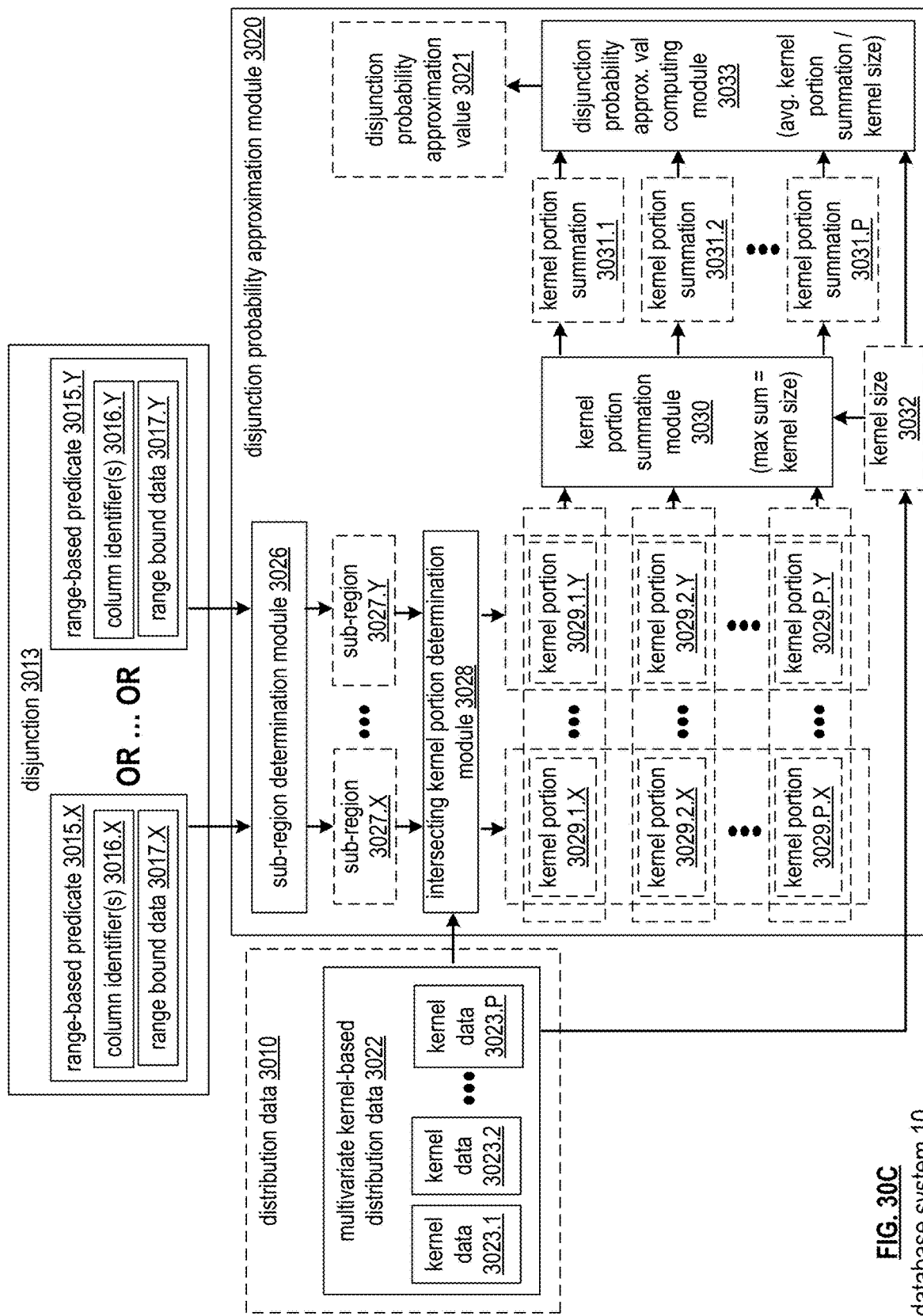
FIG. 30C is a schematic block diagram of a database system that applies a disjunction probability approximation module to generate a disjunction probability approximation value based on kernel data of multivariate kernel-based distribution data in accordance with various embodiments.

FIGS. 30C-30E illustrates a particular example of disjunction probability approximation module 3020 that processes multivariate kernel-based distribution data 3022 indicated in distribution data 3010 to generate a disjunction probability approximation value for a disjunction 3013 of two or more range-based predicates 3015 that includes a first range-based predicate 3015.X and a second range-based predicate 3015.Y. Some or all features and/or functionality of the distribution data 3010, the disjunction 3013, the disjunction probability approximation module 3020, and/or corresponding generation of disjunction probability value 3012 of FIG. 30C can implement the distribution data 3010, the disjunction 3013, the disjunction probability approximation module 3020, and/or corresponding generation of disjunction probability value 3012 of FIGS. 30A and/or 30B, and/or any other generation of a disjunction probability approximation value 3021 described herein. The range-based predicates 3015.X and 3015.Y can implement the predicates 3005.X and 3005.Y of FIGS. 30A and/or 30B.

The disjunction probability approximation module 3020 can be operable to compute the probability of a disjunction 3013 being satisfied as a function of multivariate kernel-based distribution data 3022 (e.g. a kernel-based probability density function and/or multivariate kernel density estimation). In the case of the disjunction 3013 being a disjunction of range-based predicates 3015.X and 3015.Y, the disjunction can be represented as a vector of hyper-rectangles representing the bounds of integration of each disjunct (e.g. each of the bounds denoted in range bound data 3017). It is possible that the bounds of integration may overlap.

For instance, if query expression 2511 denotes a predicate with "WHERE X>0 OR Y>0", disjunction probability approximation value 3021 can be computed to calculate and/or estimate P(X>0 OR Y>0). One means of approximating this probability can be based on "pretending" each range based predicate is mutually exclusive, where the simple but inaccurate approximation of P(X>0 OR Y>0) =min(P(X>0)+P(Y>0), 1) is applied. For many datasets, this approximation can be extremely inaccurate.

As discussed previously in conjunction 30A and 30B, determining the expected number of rows satisfying a given query predicate, such as a given disjunction 3013, can be useful in optimizing the means by which the query is performed. It can therefore be ideal to compute disjunction probability approximation value 3021 with greater levels of accuracy.

To compute the probability exactly, the geometric union of all the bounds of integration can be computed, and the union can be represented as a set of nonoverlapping hyper-rectangles. Next, each region can be integrated, and the sum of all the integrals can be taken. However, such a solution can be extremely complicated to implement and/or can be very slow. As computing the probability of the disjunction 3013 for use in a corresponding query execution consumes its own processing resources in conjunction with the query execution, the computing of this disjunction probability approximation value 3021 ideally utilizes minimal/reasonable levels of processing resources. For example, rather than computing the exact disjunction that is guaranteed to be correct, the computation of disjunction probability approximation value 3021 can be accomplished via a tradeoff of accuracy and processing efficiency.

FIGS. 30C-30E present an embodiment of computing disjunction probability approximation value 3021 that is strictly more accurate than a simple approximation that treats each range-based predicate as being mutually exclusive (e.g. such as P(X>0 OR Y>0)=min(P(X>0)+P(Y>0), 1)) The associated complexity/resources required to compute disjunction probability approximation value 3021 of FIGS. 30C-30E can also be similar to and/or render same/ similar processing speed as, computation of this simple approximation. The strictly improved accuracy of the disjunction probability approximation value 3021, while maintaining similar processing efficiency, can thus render the computing disjunction probability approximation value 3021 of FIGS. 30C-30E as an ideal means of approximating probability of disjunction, for example, for use in improving the execution efficiency of corresponding queries. The means of computing disjunction probability approximation value 3021 of FIGS. 30C-30E can thus improve the technology of database systems by enabling more accurate approximation of probability of disjunction, which can render more accurate estimates of number of rows satisfying the disjunction which can thus improve the associated intelligent configuration of the corresponding query execution discussed in conjunction with FIGS. 30A-30B, while ensuring that the processing efficiency in computing the disjunction probability approximation value 3021 itself is favorable/reasonable.

As illustrated in FIG. 30C, the multivariate kernel-based distribution data 3022 can indicate a plurality of kernel data 3023.1-3023.P for a plurality of kernels, for example, in accordance with a corresponding kernel-based probability distribution function (pdf) and/or corresponding kernel density estimation of a probability distribution function for a corresponding dataset. The multivariate kernel-based distribution data 3022 can correspond to a multivariate distribution having multiple random variables, which can include a first random variable corresponding to a set of X values and can further include a second random variable corresponding to a set of Y values. The multivariate kernel-based distribution data 3022 can denote multi-modal characteristics of the corresponding dataset, for example, based on a distribution/ aggregation of kernel data 3023.1-3023.P across a corresponding multi-dimensional space defined by the set of random variables.

For example, the X values are column values of a corresponding column X of the given dataset for which the multivariate kernel-based distribution data 3022 was generated and against which the given disjunction is performed in a corresponding query execution and/or where the Y values are column values of a corresponding column Y of the given dataset for which the multivariate kernel-based distribution data 3022 was generated and against which the given disjunction is performed in a corresponding query execution. For example, the dataset includes a plurality of rows having a plurality of columns that includes at least the column X and the column Y.

In some embodiments, the multivariate kernel-based distribution data 3022 can correspond to a multivariate distribution having a dimension of two, where only the random variables X and Y are represented. In other embodiments, the multivariate kernel-based distribution data 3022 can correspond to a multivariate distribution having a dimension higher than two, and thus being based on more than two random variables. For example, the multivariate kernel-based distribution data 3022 is generated for a set of multiple columns of the corresponding dataset that optionally includes any number of columns, which can be greater than two. The multivariate kernel-based distribution data 3022 can optionally have a dimension equal to a number of columns of the given dataset, where all columns are corresponding random variables. The multivariate kernel-based distribution data 3022 can optionally have a dimension that is smaller than to a number of columns of the given dataset, where only some columns are corresponding random variables (e.g. all numeric columns, only some numeric columns, or another subset of columns selected/configured when the multivariate kernel-based distribution data 3022 was generated, for example, via a distribution data generator module of FIG. 3040).

The disjunction 3013 can include a plurality of range-based predicates 3015 that includes a first range-based predicate 3015.X and a second range-based predicate 3015.Y. Each range based predicate can be implemented as a predicate 3005 of FIG. 30A and/or 30B. Each predicate can indicate one or more column values via corresponding column identifiers 3016, and can indicate corresponding range bound data indicating the required range for corresponding values to fall within, for example, based on expressing, for a given column: at least one greater than expression; at least one less than expression; at least one greater than or equal to expression; at least one less than or equal to expression; at least one between expression; a negation of any of these expressions; etc.

As an example, range-based predicate 3015.X is expressed as "X>0" and range-based predicate 3015.Y is expressed as "Y>0", where the disjunction is thus satisfied by any rows having column values for column X that are greater than zero and/or having column values for column Y that are greater than zero (e.g. the disjunction is not satisfied if the column values for column X that are less than zero and also the column values for column Y are less than zero).

In some embodiments, the disjunction 3013 can include further disjunction with additional range-based predicates for the same or different column (e.g. the query expression requires "X>0 OR Y>0 OR Z>5", where Z is an additional column of the dataset; or the query expression requires "X>0 OR Y>0 OR Y<−100", where additional values of column Y render satisfying the corresponding filtering predicate).

In some embodiments, a set of columns indicated in the disjunction 3013 is equivalent to the set of columns utilized to generate the multivariate kernel-based distribution data 3022 (e.g. only predicates 3015 denoting range bound data 3017 for columns X and Y are included in the disjunction, and the multivariate kernel-based distribution data 3022 was generated from only columns X and Y.) In some embodiments, a set of columns indicated in the disjunction 3013 is a proper subset of the set of columns utilized to generate the multivariate kernel-based distribution data 3022 (e.g. only predicates 3015 denoting range bound data 3017 for columns X and Y are included in the disjunction, and the multivariate kernel-based distribution data 3022 was generated from columns X, Y, and Z, which can render corresponding sub-regions having greater dimensionality based on also being portions of a multi-dimensional space that includes a dimension for column Z, and can render computing of integrals over these greater-dimensionality sub-regions to compute kernel portions 3029). In some embodiments, a set of columns indicated in the disjunction 3013 is a superset of the set of columns utilized to generate the multivariate kernel-based distribution data 3022 (e.g. predicates 3015 denoting range bound data 3017 for columns X, Y and Z are included in the disjunction, and the multivariate kernel-based distribution data 3022 was generated from only columns X, Y. In this case the approximation is optionally applied to only depict the X and Y portion and ignore the Z range, and/or the combination with column Z can be based on applying other distribution data for column Z and/or can be presumed less accurate).

The columns denoted in range-based predicates 3015 can have numeric datatypes, for example, corresponding to a continuous random variable (and/or effectively a discrete random variable that is treated as a continuous random variable, for example, due to the datatype of the given column having a precision constraint based on its size where a very large number of values is possible, but where the number of possible value is still finite).

A sub-region determination module can extract the corresponding sub-regions of interest for each column denoted in the disjunction 3013. Sub-region 3027.X can denote the region required to satisfy range-based predicate 3015.X (e.g. the region (0, ∞) in the case where the predicate 3015.X denotes X>0) and sub-region 3027.Y can denote the region required to satisfy range-based predicate 3015.Y (e.g. the region (0, ∞) in the case where the predicate 3015.Y denotes Y>0).

In some embodiments, if the disjunction can be satisfied via a column value falling within one of a set of non-continuous ranges (e.g. Y>0 OR Y<−100), the same corresponding sub-region 3027 for the given column can denote these non-continuous ranges for collective processing as a same range, or multiple different sub-regions 3027 can be generated for this same column for each different non-continuous range for separate processing as different ranges (e.g. different bounds of integration for computing multiple different integrals).

An intersecting kernel portion determination module 3028 can compute a plurality of kernel portions 3029 based on the sub-regions 3017 and the kernel data 3023 of the multivariate kernel-based distribution data. For example, for each given kernel data 3023, each sub-region is separately evaluated to determine whether/how much of the corresponding kernel overlaps with (e.g. has area/volume/etc. intersecting with/contained within) the corresponding sub-region. This can include computing/approximating an area/volume/etc. under a corresponding curve for only portions of the curve that are "over"/contained within the corresponding sub-region, for example, based on computing/approximating the integral of the curve with bounds of integration defined by the corresponding sub-region.

In some embodiments, each of the plurality of kernel data 3023.1-3023.P can indicate and/or be based on a multi-dimensional region encompassed by the corresponding kernel. The portion of this multi-dimensional region of a given kernel overlapping with a given sub-region 3017 can be determined as the corresponding kernel portion 3029 for the given kernel and given sub-region (e.g. a corresponding area/volume/higher dimension measurement).

This multi-dimensional region of a given kernel can have a dimensionality that is one dimension greater than a dimensionality of the corresponding multivariate kernel-based distribution data 3022 (e.g. for two dimensional multivariate kernel-based distribution data 3022 for two random variables, the multi-dimensional region of a given kernel is a three-dimensional region, for example, intersecting with a corresponding two-dimensional space corresponding to defined by all values for the two random variables).

This multi-dimensional region of a given kernel can be defined based on at least one of: a kernel point of the given kernel, and/or a kernel function that is common to all of the kernels. For example, each of the plurality of kernel data 3023.1-3023.P can indicate and/or be based on a plurality of kernel points, where each kernel is located at/centered at a corresponding one of the plurality of points. This relation is illustrated in the examples of FIGS. 30D and 30E. The plurality of kernel points can be selected based on corresponding points in the dataset (e.g. rows having a particular set of values for the set of columns defining the corresponding distribution data, where this particular set of values defines the corresponding point). The plurality of kernel data 3023.1-3023.P can thus correspond to P rows from the dataset, which can correspond to all rows of the dataset or a sampled set of rows from the dataset (e.g. a small proportion of rows that is large enough to sufficiently represent the expected distribution of all rows). The sampling of rows from the dataset to generate corresponding multivariate kernel-based distribution data 3022 as some or all of distribution data 3010 can be generated via processing of the dataset as discussed in conjunction with FIG. 30F.

Each of the plurality of kernel data 3023.1-3023.P can alternatively or additionally indicate and/or be based on a kernel function, for example, centered at the corresponding point of the given kernel, and otherwise having a same shape for all of the kernels. The kernel function can optionally be configured in accordance with a selected and/or predetermined parameterization class and/or predetermined shape. The parameterization class/shape for different distribution data of different datasets can be the same or different.

The kernel function can further be based on distribution characteristics of the dataset. For example, a kernel size 3032 of the corresponding kernel (e.g. how far the bounds of the kernel span from the point P) can be based on the mean of the dataset, variance of the dataset, a mean integrated square error computed for the dataset and/or corresponding kernel-based estimation, other error metric computed for the dataset and/or corresponding kernel-based estimation, and/or other metrics. The size of kernels can be different for different datasets based on differences in their distribution. Alternatively, the kernel size 3032 can be fixed/predetermined.

Each kernel portion 3029 can optionally be expressed as an integration of its kernel function over the sub-region 3017. Each kernel portion 3029 can otherwise be expressed as an area/volume/higher dimension measurement expressing how much of the given kernel overlaps with the given sub-region, which can be a raw area/volume/higher dimension measurement. Illustrative examples of computing kernel portions are illustrated in FIGS. 30D and 30E.

The intersection kernel portion determination module 3028 can thus determine kernel portions 3029, for each kernel, and for each sub-region (e.g. #kernel portions computed=P*2, or P*#range-based predicates).

A kernel portion summation module 3030 can sum, for each given the kernel data 3023, the kernel portions 3029 across all sub-regions to render a corresponding kernel portion summation 3031, resulting in a set of P kernel portion summations 3031.1-3031.P for the P kernels. The kernel portion summation can apply a maximum sum, for example, as the full kernel size 3032, where no kernel portion summation 3031 can exceed the full kernel size 3032. This can handle the case where a given kernels overlap fully/significantly with multiple sub-regions that thus renders a sum greater than the total size.

A disjunction probability approximation value computing module 3033 can compute the disjunction probability approximation value as an average across these kernel portion summations 3031.1-3031.P, divided by the kernel size 3032. (e.g. sum of all kernel portion summations 3031.1-3031.P divided by P to render an average kernel portion summation, which is then divided by kernel size 3033 to render a probability value, in the case where kernel size is not already normalized in prior computations.

While the example computation of FIG. 30C applies the kernel size 3032 in a final step after the average is computed, the kernel size 3032 can be applied earlier in other embodiments to achieve equivalent results. For example, each kernel portion is expressed as a proportion of the kernel size vs. raw size measurement (e.g. the integral is divided by the kernel size 3032 and/or the kernel size is normalized as 1), where the max sum is thus 1 vs. the kernel size 3032. Other embodiments can apply other mathematically equivalent/similar differences in computing disjunction probability value 3021.

In some embodiments, each kernel portion 3029 is computed as an integrals of a corresponding kernel function defining the corresponding kernel data 3023 (e.g. the kernel function is the same for all kernels, with a different center defined at a corresponding point for each corresponding kernel), where the bounds of the corresponding integration is defined by the bounds for the corresponding sub-region 3027. A particular example means of computing disjunction probability approximation value 3021 can thus include, for each point that defines the multivariate kernel-based distribution data 3022 (e.g. kernel-based PDF and/or kernel density estimation) finding a number S (e.g. kernel portion summation 3031) as the sum of the integrals of its kernel function over all the regions of integration (e.g. where each kernel portion 3029 is computed as an integral of kernel function over the region of integration defined by the corresponding sub-region 3027.Y) If S (e.g. kernel portion summation 3031) is greater than the total area under the kernel function (ignoring any regions of integration), S is to the total area under the kernel function (e.g. kernel size 3032). The disjunction probability approximation value 3021 can be computed as the average S value across all points divided by the total area under a single kernel (e.g. the average kernel portion summation 3031 divided by kernel size 3032).

FIG. 30D presents an illustrative example of the process of generating disjunction probability approximation value 3021 by disjunction probability approximation module 3020. Some or all features and/or functionality of the disjunction probability approximation module 3020 of FIG. 30D can implement the disjunction probability approximation module 3020 of FIG. 30C, and/or any other embodiment of the disjunction probability approximation module 3020 described herein.

The example multi-variate kernel-based distribution data 3022 characterizing random variables X and Y (e.g. jointly) is illustrated as six example kernel data 3023.1-3023.6 for six example kernels centered at corresponding kernel points 3052 on the multi-dimensional space 3039 (e.g. a two-dimensional space, or a higher dimensional space where a two-dimensional slice of this space is depicted in FIG. 30D and where additional random variables are thus characterized). The circles surrounding these points can represent the area of the corresponding kernels cover, as defined by the corresponding kernel data (e.g. the corresponding kernel function).

Each point's kernel can be a paraboloid that intersects the x-y plane at depicted black circle. For illustrative purposes of example, consider the area with size A inside the circle as corresponds to the volume under the paraboloid.

Consider the example query having filtering predicate 3011 indicating the disjunction 3013 as X>0 OR Y>0. The sub-region 3027.X (e.g. bounds of integration for X>0) is denoted as the corresponding region above the X axis, and the sub-region 3027.Y (e.g. bounds of integration for Y>0) is denoted as the corresponding region to the right of the Y axis. The lightly shaded regions correspond to regions only included in one of the sub-regions 3027.X or 3027.Y The darker shaded region corresponds to an intersection region where these sub-regions 3027.X and 3027.Y overlap. Note that any (X,Y) point included in any of the shaded region (e.g. all points except for those in the lower left quadrant corresponding to X<=0 and Y<=0) would satisfy the corresponding disjunction.

In this example, for each of the points with negative x and y values, we an S value (e.g. kernel portion summation 3031) are computed as having values of 0 (e.g. based on not overlapping with in either sub-region). For each of the points with positive x and y values, the sum of their integrals over each sub-region is 2A (e.g. the integral for each region computed as a corresponding kernel portion is computed as A, and adding these two kernel portions for the two sub-regions together renders 2A). The max value is the kernel size of A, so their S values (e.g. values 3031) are capped at A. The probability 3021 is computed as the average S value, 0.5*A, divided by A, for a final answer of 0.5.

Note that in this case, the answer is exact because every kernel function is either fully contained by the bounds of integration or fully excluded from the bounds of integration. (Note that with application of the simple approach of P(X>0)+P(Y>0), a bad result of 1 would be returned, which would not be representative of the actual probability of disjunction.

FIG. 30E illustrates how the kernel portion summation 3031 is computed via disjunction probability approximation module 3020 for the case where a kernel partially intersects with multiple regions of integration. Some or all features and/or functionality of the disjunction probability approximation module 3020 can implement the disjunction probability approximation module 3020 of FIG. 30C and/or any other embodiment of the disjunction probability approximation module 3020 described herein.

In this example, given an example kernel i at (0, 0) where a corresponding kernel having kernel data 3023.$i$ is centered, an S value (e.g. kernel portion summation 3031) for this kernel is A (e.g. based on kernel portion 3029.X being computed as 0.5A due to half of the kernel intersecting with the sub-region 3023.X, and based on kernel portion 3029.Y being 0.5 A due to half of the kernel intersecting with the sub-region 3023.Y, and summing these values together to compute kernel portion summation 3031 as 0.5A+0.5A=A).

Note that a "correct" S value in this case would be 0.75 A. Thus, the disjunction probability approximation value 3021 generated based on averaging this value with the kernel portion summation 3031 of other kernels could render the resulting disjunction probability approximation value 3021 to be inaccurate. Such cases where kernels are located right at/near the bounds of multiple corresponding sub-regions denoted in a range based query predicate, and thus partially overlap with multiple subregions, can thus render deviation in the approximation from the actual probability of disjunction. However, when computing a probability in practice, it can be unlikely that any/more than a few kernels are right upon the bounds of integration for multiple sub-regions such as this example. Thus, this form of approximation performed by disjunction probability approximation module 3020 as discussed in conjunction with FIGS. 30C-30E can render highly accurate disjunction probability approximation value 3021 in most cases.

Figure 30F:
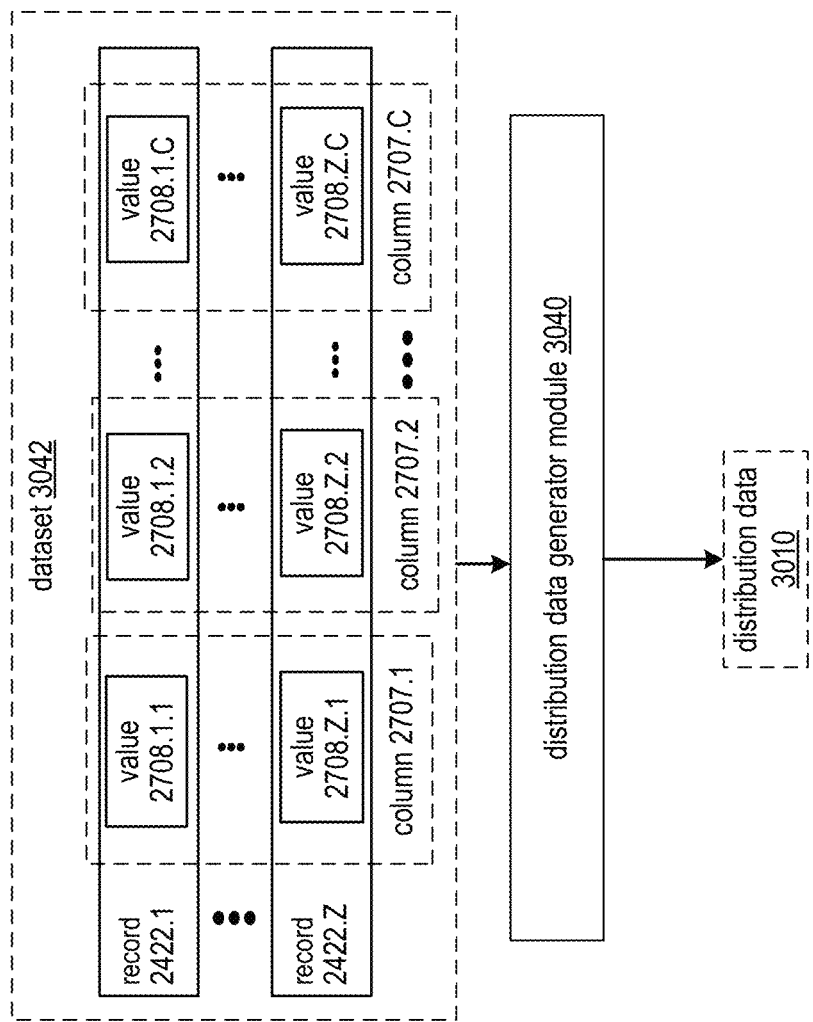
FIG. 30F is a schematic block diagram of a database system that generates distribution data based on processing a dataset in accordance with various embodiments.

FIG. 30F illustrates an embodiment of database system 10 that generates distribution data for a given dataset 3042 via a distribution data generator module 3040. Any embodiment of distribution data 3010 described herein can be generated by the distribution data generator module 3040 for use in query executions against this data set. The distribution data generator module 3040 can be implemented via any processing and/or memory resources of the database system 10.

The distribution data generator module 3040 can generate the some or all of the distribution data 3010 as one or more multivariate kernel-based distribution data 3022 of FIGS. 30C-30E for one or more subsets of the set of columns, and/or can generate other types of distribution data, for example, in addition to generating the multivariate kernel-based distribution data 3022 of FIGS. 30C-30E, for same or different sets of columns.

The distribution data 3010 can be stored in memory resources of the database system 10, such as in database storage 2450 in conjunction with the corresponding dataset, and/or in another location. The distribution data 3010 can optionally be stored in a statistics section of a corresponding segments 2424, where different distribution data 3010 is optionally generated for different segments 2424 based on their own portion of a corresponding dataset.

In some embodiments, the distribution data 3010 can be generated for a given dataset 3042 in conjunction with receiving and/or processing the given dataset (e.g. in conjunction with generating corresponding segments for storage), where processing a given dataset 3042 for storage in conjunction with data ingress of the dataset (e.g. via parallelized ingress sub-system 24 of parallelized data input sub-system) includes generating the distribution data 3010, and then storing both the dataset 3042 and distribution data 3010 for storage and future access in query executions, for example, in same or different memory resources/types of memory of the database system 10.

Alternatively or in addition, the distribution data 3010 is generated after the incoming dataset 3042 is processed and stored based on accessing the dataset 3042 in database storage 2450 to generate the distribution data 3010. Alternatively or in addition, the distribution data 3010 is updated over time as new data is added to the dataset 3042 and/or as the dataset 3042 is modified over time.

The dataset 3042 can be implemented as one or more database tables 2712, and/or a subset of rows of a given database table 2712. The distribution data generator module 3040 can generate distribution data for some or all columns 2707 (e.g. individually or jointly with other columns), and optionally generates distribution data 3010 for only a proper subset of selected columns 2707. Colum X and column Y of discussed in conjunction with FIGS. 30A-30E can be implemented as two columns 2707.

The distribution data generator module 3040 can generate further distribution data for other datasets 3042, where further distribution data 3010 is stored for additional datasets.

Figure 30G:
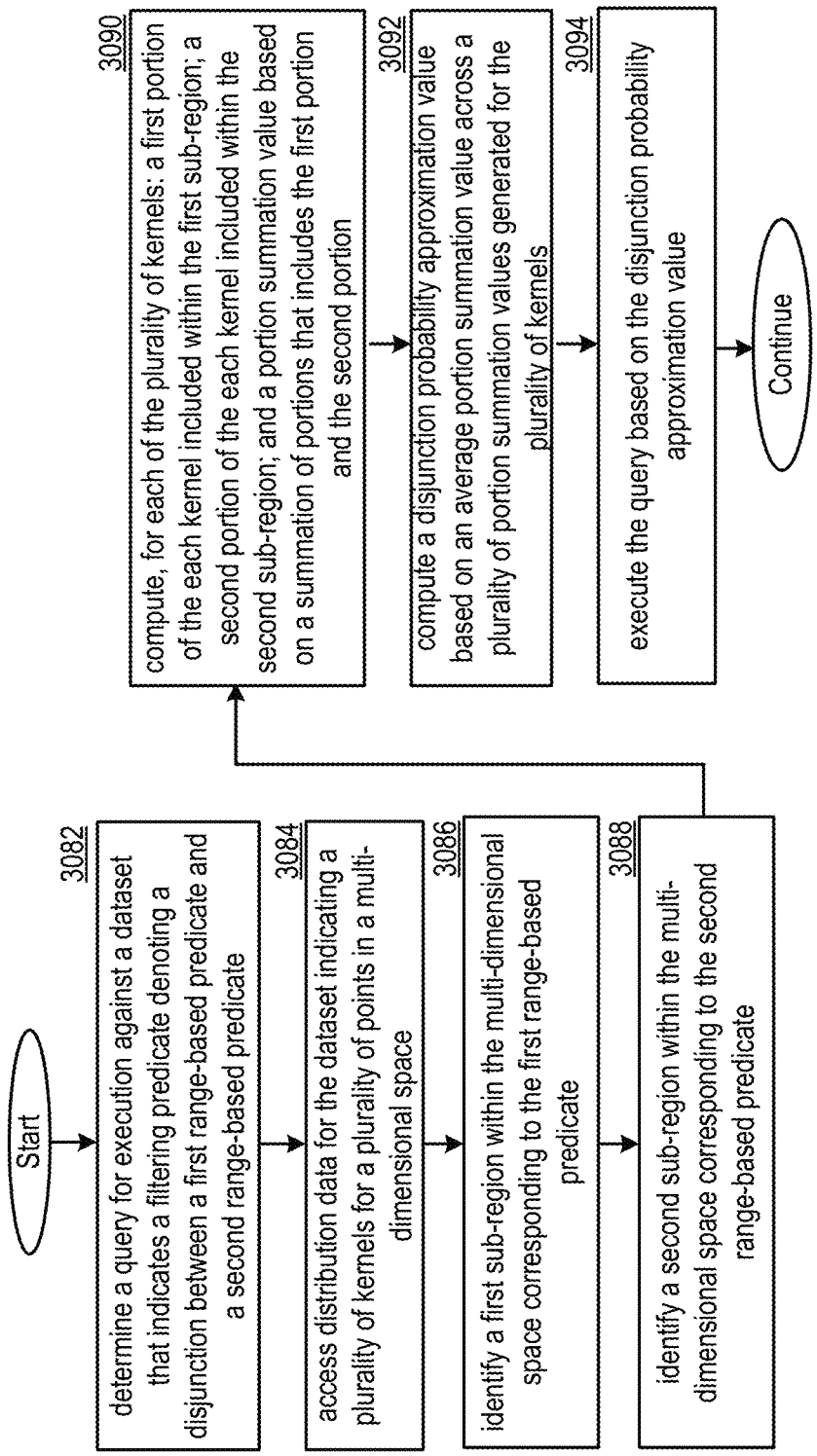
FIG. 30G is a logic diagram illustrating a method for execution in accordance with various embodiments.

FIG. 30G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30G. In particular, a node 37 can utilize the query processing module 2435 to execute some or all of the steps of FIG. 30G, where multiple nodes 37 implement their own query processing modules 2435 to independently execute the steps of FIG. 30G, for example, to facilitate execution of a query as participants in a query execution plan 2405. Some or all of the method of FIG. 30G can be performed by the query processing system 2510, for example, by utilizing an operator flow generator module 2514 and/or a query execution module 2504. In particular, some or all of the method of FIG. 30G can be performed via one or more operator executions of one or more row dispersal operators and/or one or more load operators 2535. Some or all of the steps of FIG. 30G can optionally be performed by any other processing module of the database system 10. Some or all of the steps of FIG. 30G can be performed to implement some or all of the functionality of the database system 10 as described in conjunction with FIGS. 30A-30F, for example, by implementing some or all of the functionality of disjunction probability approximation module when processing queries having filtering parameters indicating a disjunction. Some or all of the steps of FIG. 30G can be performed to implement some or all of the functionality regarding execution of a query via the plurality of nodes in the query execution plan 2405 as described in conjunction with some or all of FIGS. 24A-24I. Some or all steps of FIG. 30G can be performed by database system 10 in accordance with other embodiments of the database system 10 and/or nodes 37 discussed herein. Some or all steps of FIG. 30G can be performed in conjunction with one or more steps of any other method described herein.

Step 3082 includes determining a query for execution against a dataset that indicates a filtering predicate denoting a disjunction between a first range-based predicate and a second range-based predicate. Step 3084 includes accessing distribution data for the dataset indicating a plurality of kernels for a plurality of points in a multi-dimensional space. Step 3086 includes identifying a first sub-region within the multi-dimensional space corresponding to the first range-based predicate. Step 3088 includes identifying a second sub-region within the multi-dimensional space corresponding to the second range-based predicate. Step 3088 includes computing for each of the plurality of kernels: a first portion of the each kernel included within the first sub-region; a second portion of the each kernel included within the second sub-region; and/or a portion summation value based on a summation of portions that includes the first portion and the second portion. Step 3090 includes computing a disjunction probability approximation value based on an average portion summation value across a plurality of portion summation values generated for the plurality of kernels. Step 3092 includes executing the query based on the disjunction probability approximation value.

In various examples, the first sub-region and the second sub-region have a non-null intersection region. In various examples, a difference between the non-null intersection region and the first sub-region is non-null. In various examples, a difference between the non-null intersection region and the second sub-region is non-null.

In various examples, each of the plurality of kernels have a same size. In various examples, computing the portion summation value is further based on: setting the portion summation value as the summation of portions when the summation of portions is less than or equal to a value corresponding to the same size; and/or setting the portion summation value as the value corresponding to same size when the summation of portions is greater than the value corresponding to the same size.

In various examples, the portion summation value for at least one of the plurality of kernels is greater than the value corresponding to the same size based on the at least one of the plurality of kernels intersecting an intersection region between the first sub-region and the second sub-region.

In various examples, the each of the plurality of kernels are defined by a kernel function centered at a corresponding one of the plurality of points. In various examples, determining the portion summation value for the each of the plurality of kernels is based on computing plurality of integrals of the kernel function centered at the corresponding one of the plurality of points. In various examples, each of the plurality of integrals is computed over a corresponding region of integration of a plurality of regions of integration. In various examples, the plurality of regions of integration includes a first region of integration defined by the first sub-region and a second region of integration defined by the second sub-region. In various examples, the first portion of the each kernel included within the first sub-region is computed based on a first integral of the plurality of integrals computed over the first region of integration. In various examples, the second portion of the each kernel included within the first sub-region is computed based on a second integral of the plurality of integrals computed over the first region of integration.

In various examples, all of the plurality of kernels each have a same total integral value when an unbounded integration is applied. In various examples, the portion summation value for the each kernel is computed based on: computing a summation of the plurality of integrals computed for the each kernel; setting the portion summation value as the summation of the plurality of integrals when the summation of the plurality of integrals is less than or equal to same total integral value; and/or setting the portion summation value as the same total integral value when the summation of the plurality of integrals is greater than the same total integral value. In various examples, computing the disjunction probability approximation value is further based on dividing the portion summation value by the same total integral value.

In various examples, the first range-based predicate denotes a first numeric value range for a first column storing a first numeric value for each of a plurality of relational database rows of the dataset. In various examples, the second range-based predicate denotes a second numeric value range for a second column storing a second numeric value for the each of the plurality of relational database rows of the dataset.

In various examples, the multi-dimensional space has a first dimension corresponding to first numeric values of the first column. In various examples, the multi-dimensional space has a second dimension corresponding to second numeric values of the second column.

In various examples, the distribution data for the dataset indicates multivariate kernel-based probability distribution data. In various examples, the multivariate kernel-based probability distribution data has a same dimensionality as the multi-dimensional space. In various examples, the multivariate kernel-based probability distribution data corresponds to a kernel-based estimation of a corresponding multivariate probability density function.

In various examples, the same dimensionality is equal to two based on the multivariate kernel-based probability distribution data being generated for only the first column and the second column.

In various examples, a kernel function defines each of the plurality of kernels as a paraboloid intersecting a two-dimensional plane defining the multi-dimensional space at a circular region surrounding the each of the plurality of kernels. In various examples, computing the first portion of the each kernel included within the first sub-region is based on a first volume under first portions of the paraboloid having corresponding portions of the circular region within the first sub-region. In various examples, computing the second portion of the each kernel included within the second sub-region is based on a second volume under second portions of the paraboloid having corresponding portions of the circular region within the second sub-region.

In various examples, the same dimensionality is greater than two based on the distribution data for the dataset indicating multivariate kernel-based probability distribution data for the first column, the second column, and at least one additional column. In various example, a set of range-based predicates in the disjunction includes a number of range-based predicates (e.g. 2) that is less than a number corresponding to the same dimensionality (e.g. more than 2). In various examples, the set of range-based predicates in the disjunction includes a number of range-based predicates (e.g. more than 2) that is equal to the number corresponding to the same dimensionality (e.g. more than 2).

In various examples, the method further includes: receiving the dataset for storage; and/or processing the dataset for storage based on generating the distribution data for the dataset and/or storing the dataset and the distribution data for the dataset in database system memory resources. In various examples, the distribution data is accessed via the database system memory resources, and wherein executing the query includes accessing at least a portion of the dataset via the database system memory resources. In various examples, the distribution data for the dataset is generated after the dataset is stored and/or is further updated over time as the dataset is updated over time.

In various examples, generating the distribution data for the dataset includes at least one of: sampling a subset of a plurality of rows of the dataset; determining the plurality of points based on values of the subset of a plurality of rows; and/or determining a kernel function defining the plurality of kernels based on at least one distribution characteristic of the values of the subset of a plurality of rows. The subset of a plurality of rows of the dataset that are sampled can be a proper subset (e.g. small proportion) of the plurality of rows, or all of the plurality of rows.

In various examples, the method further includes determining an estimated portion of rows of the dataset satisfying the disjunction between the first range-based predicate and the second range-based predicate based on the disjunction probability approximation value.

In various examples, the method further includes generating query plan data (e.g. a query operator execution flow 2517 and/or query execution plan 2405) for executing the query based on the estimated portion of rows of the dataset satisfying the disjunction in accordance with meeting processing efficiency criteria, wherein the query is executed based on the query plan data.

In various examples, generating the query plan data includes selecting an ordering for applying a plurality of filtering predicates of the query that includes the filtering predicate. In various examples, an ordering and/or arrangement of applying the filtering predicate denoting the disjunction in relation to at least one other one of the plurality of filtering predicates is based comparing the estimated portion of rows of the dataset satisfying the disjunction with at least one other estimate portion of rows of the dataset satisfying the at least one other one of the plurality of filtering predicates.

In various embodiments, any one of more of the various examples listed above are implemented in conjunction with performing some or all steps of FIG. 30G. In various embodiments, any set of the various examples listed above can be implemented in tandem, for example, in conjunction with performing some or all steps of FIG. 30G.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30G, for example, in conjunction with further implementing any one or more of the various examples described above.

In various embodiments, the operational instructions, when executed by the at least one processor, cause the database system to: determine a query for execution against a dataset that indicates a filtering predicate denoting a disjunction between a first range-based predicate and a second range-based predicate; access distribution data for the dataset indicating a plurality of kernels for a plurality of points in a multi-dimensional space; identify a first sub-region within the multi-dimensional space corresponding to the first range-based predicate; identify a second sub-region within the multi-dimensional space corresponding to the second range-based predicate; compute, for each of the plurality of kernels, a first portion of the each kernel included within the first sub-region, a second portion of the each kernel included within the second sub-region, and/or a portion summation value based on a summation of portions that includes the first portion and the second portion; compute a disjunction probability approximation value based on an average portion summation value across a plurality of portion summation values generated for the plurality of kernels; and/or execute the query based on the disjunction probability approximation value.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   determining a query for execution against a dataset that indicates a filtering predicate denoting a disjunction between a first range-based predicate and a second range-based predicate;
   accessing distribution data for the dataset indicating a plurality of kernels in a multi-dimensional space;
   identifying a first sub-region within the multi-dimensional space corresponding to the first range-based predicate;
   identifying a second sub-region within the multi-dimensional space corresponding to the second range-based predicate;
   computing, for a kernel of the plurality of kernels:
      a first portion included within the first sub-region;
      a second portion included within the second sub-region;
      a portion summation value based on a summation of portions that includes the first portion and the second portion;
   computing a disjunction probability approximation value based on an average portion summation value across a plurality of portion summation values generated for the plurality of kernels; and
   executing the query based on the disjunction probability approximation value.

2. The method of claim 1, wherein the first sub-region and the second sub-region have a non-null intersection region, wherein a difference between the non-null intersection region and the first sub-region is non-null, and wherein a difference between the non-null intersection region and the second sub-region is non-null.

3. The method of claim 1, wherein the kernel of the plurality of kernels have a same size as at least one other kernel of the plurality of kernels, and wherein computing the portion summation value is further based on:
   setting the portion summation value as the summation of portions when the summation of portions is less than or equal to a value corresponding to the same size; and setting the portion summation value as the value corresponding to same size when the summation of portions is greater than the value corresponding to the same size.

4. The method of claim 3, wherein the portion summation value for at least one kernel of the plurality of kernels is greater than the value corresponding to the same size based on the at least one of the plurality of kernels intersecting an intersection region between the first sub-region and the second sub-region.

5. The method of claim 1, wherein the kernel of the plurality of kernels is defined by a kernel function centered at a corresponding point of a plurality of points in the multi-dimensional space, and wherein determining the portion summation value for the kernel of the plurality of kernels is based on:
computing an integral of the kernel function centered at the corresponding point of the plurality of points, wherein the integral is computed over a corresponding region of integration of a plurality of regions of integration, wherein the plurality of regions of integration includes a first region of integration defined by the first sub-region and a second region of integration defined by the second sub-region, wherein the first portion of the kernel of the plurality of kernels included within the first sub-region is computed based on a first integral computed over the first region of integration, wherein the second portion of the kernel included within the first sub-region is computed based on a second integral computed over the first region of integration.

6. The method of claim 5, wherein the kernel of the plurality of kernels has a same total integral value as at least one of the other kernels of the plurality of kernels when an unbounded integration is applied, and wherein the portion summation value for the kernel is computed based on:
computing a summation of the integral of the at least one other kernel and for the kernel;
setting the portion summation value as the summation of the at least one other kernel and the kernel when the summation of the at least one other kernel and the kernel is less than or equal to same total integral value; and
setting the portion summation value as the same total integral value when the summation of the at least one other kernel and the kernel is greater than the same total integral value, wherein computing the disjunction probability approximation value is further based on:
dividing the portion summation value by the same total integral value.

7. The method of claim 1, wherein the first range-based predicate denotes a first numeric value range for a first column storing a first numeric value for a relational database row of a plurality of relational database rows of the dataset, and wherein the second range-based predicate denotes a second numeric value range for a second column storing a second numeric value for the relational database rows of the plurality of relational database rows of the dataset.

8. The method of claim 7, wherein the multi-dimensional space has a first dimension corresponding to first numeric values of the first column, and wherein the multi-dimensional space has a second dimension corresponding to second numeric values of the second column.

9. The method of claim 8, wherein the distribution data for the dataset indicates multivariate kernel-based probability distribution data, and wherein the multivariate kernel-based probability distribution data has a same dimensionality as the multi-dimensional space.

10. The method of claim 9, wherein the multivariate kernel-based probability distribution data corresponds to a kernel-based estimation of a corresponding multivariate probability density function.

11. The method of claim 9, wherein the same dimensionality is equal to two based on the multivariate kernel-based probability distribution data being generated for only the first column and the second column.

12. The method of claim 9, wherein a kernel function defines each of the kernel of the plurality of kernels as a paraboloid intersecting a two-dimensional plane defining the multi-dimensional space at a circular region surrounding the kernel of the plurality of kernels, wherein computing the first portion of the kernel of the plurality of kernels included within the first sub-region is based on a first volume under first portions of the paraboloid having corresponding portions of the circular region within the first sub-region; and wherein computing the second portion of the kernel of the plurality of kernels included within the second sub-region is based on a second volume under second portions of the paraboloid having corresponding portions of the circular region within the second sub-region.

13. The method of claim 9, wherein the same dimensionality is greater than two based on the distribution data for the dataset indicating multivariate kernel-based probability distribution data for the first column, the second column, and at least one additional column.

14. The method of claim 1, further comprising:
receiving the dataset for storage;
processing the dataset for storage based on:
generating the distribution data for the dataset; and
storing the dataset and the distribution data for the dataset in database system memory resources, wherein the distribution data is accessed via the database system memory resources, and wherein executing the query includes accessing at least a portion of the dataset via the database system memory resources.

15. The method of claim 14, wherein generating the distribution data for the dataset includes at least one of:
sampling a subset of a plurality of rows of the dataset;
determining the plurality of points based on values of the subset of a plurality of rows; or
determining a kernel function defining the plurality of kernels based on at least one distribution characteristic of the values of the subset of a plurality of rows.

16. The method of claim 1, further comprising:
determining an estimated portion of rows of the dataset satisfying the disjunction between the first range-based predicate and the second range-based predicate based on the disjunction probability approximation value.

17. The method of claim 16, further comprising:
generating query plan data for executing the query based on the estimated portion of rows of the dataset satisfying the disjunction in accordance with meeting processing efficiency criteria, wherein the query is executed based on the query plan data.

18. The method of claim 17, wherein generating the query plan data includes selecting an ordering for applying a plurality of filtering predicates of the query that includes the filtering predicate, and wherein an ordering of applying the filtering predicate denoting the disjunction in relation to at least one other one of the plurality of filtering predicates is based on comparing the estimated portion of rows of the dataset satisfying the disjunction with at least one other estimate portion of rows of the dataset satisfying the at least one other one of the plurality of filtering predicates.

19. A query processing system includes:
at least one processor; and
a memory that stores operational instructions that, when executed by the at least one processor, cause the query processing system to:
  determine a query for execution against a dataset that indicates a filtering predicate denoting a disjunction between a first range-based predicate and a second range-based predicate;
  access distribution data for the dataset indicating a plurality of kernels in a multi-dimensional space;
  identify a first sub-region within the multi-dimensional space corresponding to the first range-based predicate;
  identify a second sub-region within the multi-dimensional space corresponding to the second range-based predicate;
  compute, for a kernel of the plurality of kernels:
    a first portion within the first sub-region;
    a second portion within the second sub-region;
    a portion summation value based on a summation of portions that includes the first portion and the second portion;
  compute a disjunction probability approximation value based on an average portion summation value across a plurality of portion summation values generated for the plurality of kernels; and
  execute the query based on the disjunction probability approximation value.

20. A non-transitory computer readable storage medium comprises:
at least one memory section that stores operational instructions that, when executed by at least one processing module that includes a processor and a memory, causes the at least one processing module to:
  determine a query for execution against a dataset that indicates a filtering predicate denoting a disjunction between a first range-based predicate and a second range-based predicate;
  access distribution data for the dataset indicating a plurality of kernels in a multi-dimensional space;
  identify a first sub-region within the multi-dimensional space corresponding to the first range-based predicate;
  identify a second sub-region within the multi-dimensional space corresponding to the second range-based predicate;
  compute, for a kernel of the plurality of kernels:
    a first portion included within the first sub-region;
    a second portion included within the second sub-region;
    a portion summation value based on a summation of portions that includes the first portion and the second portion;
  compute a disjunction probability approximation value based on an average portion summation value across a plurality of portion summation values generated for the plurality of kernels; and
  execute the query based on the disjunction probability approximation value.

\* \* \* \* \*